(12) United States Patent
Hulme et al.

(10) Patent No.: US 12,521,386 B2
(45) Date of Patent: Jan. 13, 2026

(54) SMALL MOLECULE INHIBITORS OF THE ANDROGEN RECEPTOR ACTIVITY AND/OR EXPRESSION AND USES THEREOF

(71) Applicant: Arizona Board of Regents on Behalf of the University of Arizona, Tucson, AZ (US)

(72) Inventors: Christopher Hulme, Tucson, AZ (US); Yeng-Jeng Shaw, Tucson, AZ (US); Vijay Gokhale, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 1252 days.

(21) Appl. No.: 17/413,139

(22) PCT Filed: Dec. 11, 2019

(86) PCT No.: PCT/US2019/065751
§ 371 (c)(1),
(2) Date: Jun. 11, 2021

(87) PCT Pub. No.: WO2020/123670
PCT Pub. Date: Jun. 18, 2020

(65) Prior Publication Data
US 2022/0062278 A1 Mar. 3, 2022

Related U.S. Application Data

(60) Provisional application No. 62/778,139, filed on Dec. 11, 2018.

(51) Int. Cl.
*A61K 31/496* (2006.01)
*A61K 31/454* (2006.01)
*A61K 45/06* (2006.01)
*C07D 213/74* (2006.01)
*C07D 257/04* (2006.01)
*C07D 401/12* (2006.01)
*C07D 401/14* (2006.01)
*C07D 405/12* (2006.01)
*C07D 405/14* (2006.01)
*C07D 409/14* (2006.01)
*C07D 413/14* (2006.01)

(52) U.S. Cl.
CPC .......... *A61K 31/496* (2013.01); *A61K 31/454* (2013.01); *A61K 45/06* (2013.01); *C07D 213/74* (2013.01); *C07D 257/04* (2013.01); *C07D 401/12* (2013.01); *C07D 401/14* (2013.01); *C07D 405/12* (2013.01); *C07D 405/14* (2013.01); *C07D 409/14* (2013.01); *C07D 413/14* (2013.01)

(58) Field of Classification Search
CPC .... A61K 31/496; A61K 31/454; A61K 45/06; C07D 213/74; C07D 257/04; C07D 401/12; C07D 401/14; C07D 405/12; C07D 405/14; C07D 409/14; C07D 413/14; C07D 307/81; C07D 401/06; C07D 405/06
See application file for complete search history.

(56) References Cited

U.S. PATENT DOCUMENTS

| | | | |
|---|---|---|---|
| 3,989,816 A | 11/1976 | Rajadhyaksha | |
| 4,444,762 A | 4/1984 | Rajadhyaksha | |
| 5,770,581 A | 6/1998 | Weichselbaum et al. | |
| 2004/0009969 A1 | 1/2004 | Cleve et al. | |
| 2007/0249564 A1 | 10/2007 | Erion et al. | |
| 2010/0016279 A1* | 1/2010 | Bradbury | A61P 13/08 514/217.05 |
| 2014/0350015 A1 | 11/2014 | Mcdonald et al. | |

FOREIGN PATENT DOCUMENTS

| WO | WO 2017/165822 | 9/2017 | |
|---|---|---|---|
| WO | WO-2017165822 A1 * | 9/2017 | ......... A61K 31/4166 |

OTHER PUBLICATIONS

Mak et al., Artificial intelligence in drug development: present status and future prospects, Drug Discovery Today; Drug Discovery Today vol. 24, No. 3, Mar. 2019 (pp. 773-780) (Year: 2019).*
D. Taylor, in Pharmaceuticals in the Environment, ed. R. E. Hester and R. M. Harrison, The Royal Society of Chemistry, 2015, pp. 1-33. Doi: https://doi.org/10.1039/9781782622345-00001 (Year: 2015).*
Kranz M, et al., "Bridging from Brain to Tumor Imaging: (S)-(-)- and (R)-(+)-[18F]Fluspidine for Investigation of Sigma-1 Receptors in Tumor-Bearing Mice", Molecules. Mar. 20, 2018;23(3).

(Continued)

*Primary Examiner* — Danah Al-Awadi
*Assistant Examiner* — Chantal Adlam
(74) *Attorney, Agent, or Firm* — Casimir Jones, S.C.; Robert A. Goetz

(57) ABSTRACT

This invention is in the field of medicinal chemistry. In particular, the invention relates to a new class of small-molecules having a piperazine (or similar) structure which function as antagonists of androgen receptor activity, and their use as therapeutics for the treatment of cancer (e.g., castration-resistant prostate cancer) and other conditions characterized with androgen receptor activity and/or androgen receptor expression.

4 Claims, No Drawings

(56) References Cited

OTHER PUBLICATIONS

Sadeghzadeh M, et al., "Radioiodination and preclinical evaluation of 4-benzyl-1-(3-[125I]-iodobenzylsulfonyl)piperidine as a breast tumor imaging tracer in mouse", Ann Nucl Med. May 2017;31(4):335-346.

Baum E, et al., "PET Imaging Evaluation of Four s1 Radiotracers in Nonhuman Primates", J Nucl Med. Jun. 2017;58(6):982-988.

Yang D, et al., "Design and Investigation of a [18F]-labeled Benzamide Derivative as a High Affinity Dual Sigma Receptor Subtype Radioligand for Prostate Tumor Imaging", Mol Pharm. Mar. 6, 2017;14(3):770-780.

International Search Report and Written Opinion of PCT/US19/65751; mailed Dec. 11, 2019; 9 pages.

"1-[(1-Tert-butyltetrazol-5-yl)methyl]-4-(4-methoxyphenyl)piperazine", Pubchem CID 1436459, 2005, pp. 2, 7.

\* cited by examiner

SMALL MOLECULE INHIBITORS OF THE ANDROGEN RECEPTOR ACTIVITY AND/OR EXPRESSION AND USES THEREOF

CROSS REFERENCE TO RELATED APPLICATIONS

This application is a U.S. 371 national phase entry of International Patent Application No. PCT/US2019/065751, filed Dec. 11, 2019, which claims priority to and the benefit of U.S. Provisional Application No. 62/778,139, filed Dec. 11, 2018, which are hereby incorporated by reference in their entireties.

STATEMENT REGARDING FEDERALLY SPONSORED RESEARCH OR DEVELOPMENT

This invention was made with government support under Grant No. MH090878 awarded by NIH. The government has certain rights in the invention.

FIELD OF THE INVENTION

This invention is in the field of medicinal chemistry. In particular, the invention relates to a new class of small-molecules having a piperazine (or similar) structure which function as antagonists of androgen receptor activity, and their use as therapeutics for the treatment of cancer (e.g., castration-resistant prostate cancer) and other conditions characterized with androgen receptor activity and/or androgen receptor expression.

INTRODUCTION

Prostate cancer is the most common male cancer and second leading cause of cancer-related deaths in developed countries. The androgen receptor (AR) is a key molecular target in the etiology and progression of the disease where the early stages of prostate cancer tumor growth are androgen dependent and respond well to androgen ablation and androgen receptor antagonists. However, castration-resistant prostate cancer (CRPC) typically develops in 1-2 years after androgen deprivation therapy and AR antagonist administration. Despite promising results from the recently approved second generation AR antagonist enzalutamide, which is now solidly the first line treatment (median survival rate+5 months relative to placebo, see both PREVAIL and AFFIRM studies), CRPC remains a largely unmet medical with less than a 15% 5-year survival rate and resistance to Enzalutamide is already emerging due to already identified one-point mutations in the ligand binding domain (LBD).

Improved strategies and related methods are needed for treating CRPC and other conditions related to AR activity and/or AR expression.

The present invention addresses this need.

SUMMARY OF THE INVENTION

Experiments conducted during the course of developing embodiments for the present invention developed a new class of small-molecules having a piperazine (or similar) structure which function as antagonists of AR activity. Indeed, such experiments resulted in the synthesis of small molecule androgen receptor antagonists with promising biological profiles as demonstrated in an FP binding assay and a GeneBlazer functional assay. Moreover, such small molecule androgen receptor antagonists demonstrated anti-proliferative activity against LNCaP cell growth. Several of the small molecule androgen receptor antagonists were shown to be differentiated from Enzalutamide, in that they are 4-8 fold more active in LNCAP prostate-specific cell viability studies thereby representing a significant improvement.

As such, the present invention provides a new class of small-molecules having a piperazine (or similar) structure which function as inhibitors of AR activity and/or AR expression, and their use as therapeutics for the treatment of any type of condition or cancer characterized with AR activity and/or AR expression (e.g., cancer (e.g., CRPC) (e.g., cancers resistant to Enzalutamide treatment)).

Accordingly, the present invention contemplates that exposure of animals (e.g., humans) suffering from cancer (e.g., and/or cancer related disorders) to therapeutically effective amounts of drug(s) having a piperazine (or similar) that inhibit AR activity and/or AR expression will inhibit the growth of cancer cells or supporting cells outright and/or render such cells as a population more susceptible to the cell death-inducing activity of cancer therapeutic drugs or radiation therapies. In some embodiments, the inhibition of AR activity occurs through, for example, directly binding with an AR. The present invention contemplates that such AR antagonists satisfy an unmet need for the treatment of multiple cancer types, either when administered as monotherapy to induce cell growth inhibition, apoptosis and/or cell cycle arrest in cancer cells, or when administered in a temporal relationship with additional agent(s), such as other cell death-inducing or cell cycle disrupting cancer therapeutic drugs or radiation therapies (combination therapies), so as to render a greater proportion of the cancer cells or supportive cells susceptible to executing the apoptosis program compared to the corresponding proportion of cells in an animal treated only with the cancer therapeutic drug or radiation therapy alone.

In certain embodiments of the invention, combination treatment of animals with a therapeutically effective amount of a compound of the present invention and a course of an anticancer agent produces a greater tumor response and clinical benefit in such animals compared to those treated with the compound or anticancer drugs/radiation alone. Since the doses for all approved anticancer drugs and radiation treatments are known, the present invention contemplates the various combinations of them with the present compounds.

The Applicants have found that certain piperazine (or similar) compounds function as antagonists of AR activity and/or AR expression, and serve as therapeutics for the treatment of cancer (e.g., CRPC) and other diseases. Thus, the present invention relates to piperazine (or similar) compounds useful for inhibiting AR activity and/or AR expression, and increasing the sensitivity of cells to inducers of apoptosis and/or cell cycle arrest.

Certain piperazine (or similar) compounds of the present invention may exist as stereoisomers including optical isomers. The invention includes all stereoisomers, both as pure individual stereoisomer preparations and enriched preparations of each, and both the racemic mixtures of such stereoisomers as well as the individual diastereomers and enantiomers that may be separated according to methods that are well known to those of skill in the art.

In a particular embodiment, piperazine (or similar) compounds encompassed within Formulas I is provided:

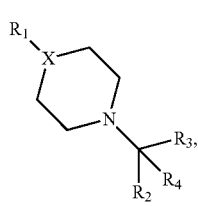
(Formula I)

including pharmaceutically acceptable salts, solvates, and/or prodrugs thereof.

Formula I is not limited to a particular chemical moiety for X, R1, R2, R3, and R4. In some embodiments, the particular chemical moiety for X, R1, R2, R3, and R4 independently include any chemical moiety that permits the resulting compound to inhibit AR activity and/or inhibit AR expression.

In some embodiments, X is Nitrogen rendering the resulting compound encompassed within Formula II:

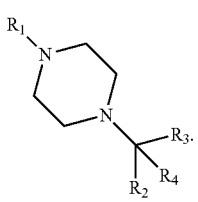
(Formula II)

In some embodiments, X is C—H rendering the resulting compound encompassed within Formula III:

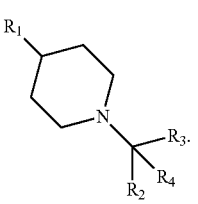
(Formula III)

In some embodiments, R2 and R4 are combined to form a cycloalkyl ring moiety. In some embodiments wherein R2 and R4 are combined to form a cycloalkyl ring moiety, the resulting compound is encompassed within Formula IV:

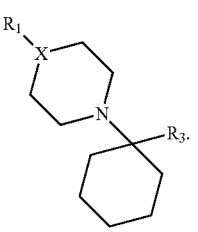
(Formula IV)

In some embodiments wherein R2 and R4 are combined to form a cycloalkyl ring moiety, the resulting compound is encompassed within Formula V:

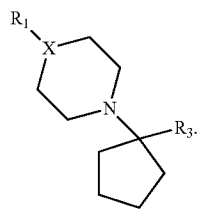
(Formula V)

In some embodiments, R2 and R4 are combined to form a ketone moiety rendering the resulting compound encompassed within Formula VI:

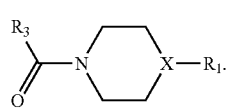
(Formula VI)

In some embodiments, R1 is selected from an alkyl moiety, a substituted aryl moiety, an unsubstituted aryl moiety, a substituted heterocyclyl moiety, an unsubstituted heterocyclyl moiety, and a carbonyl moiety.

In some embodiments, R1 is selected from

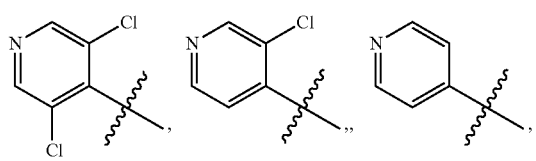

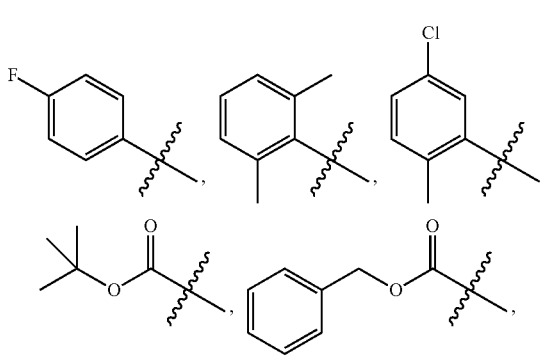

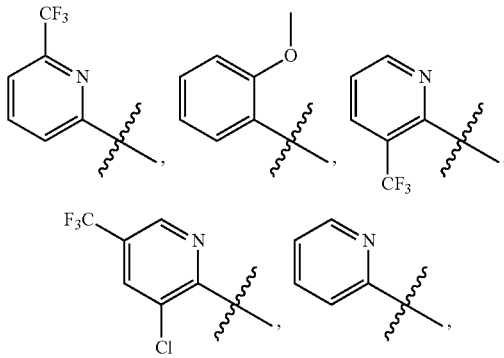

-continued

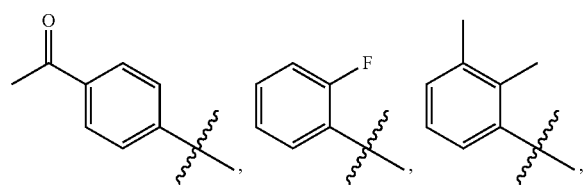

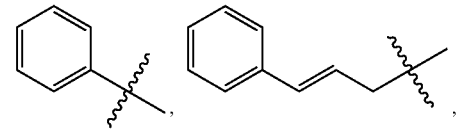

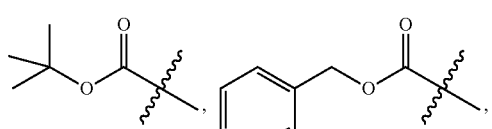

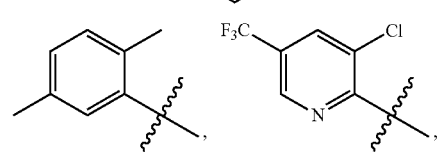

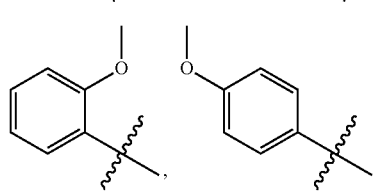

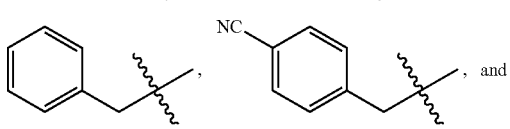

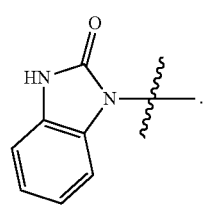

In some embodiments, R2 is selected from an alkyl moiety, a substituted aryl moiety, an unsubstituted aryl moiety, a substituted heterocyclyl moiety, and an unsubstituted heterocyclyl moiety.

In some embodiments, R2 is selected from hydrogen, methyl,

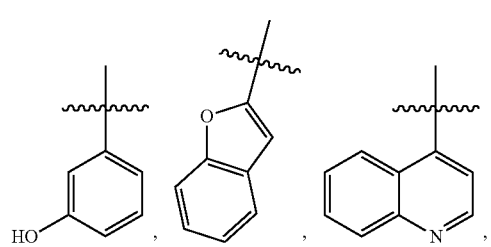

-continued

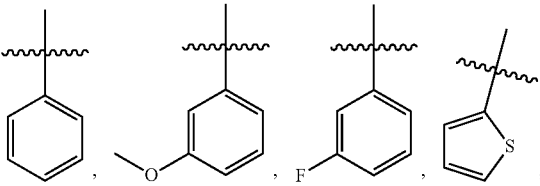

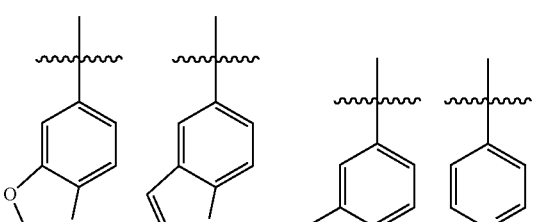

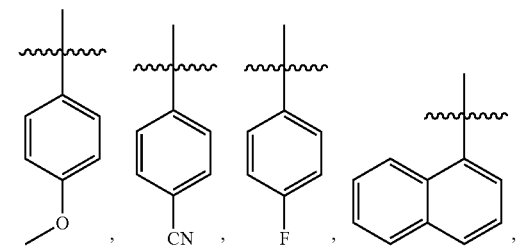

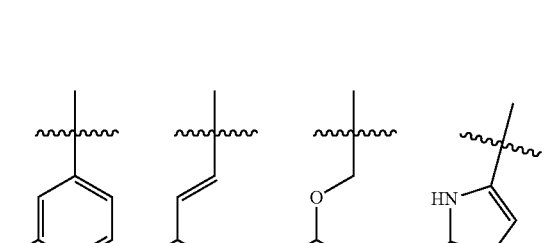

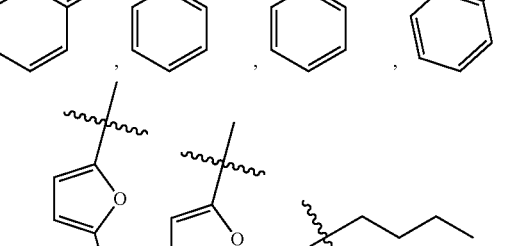

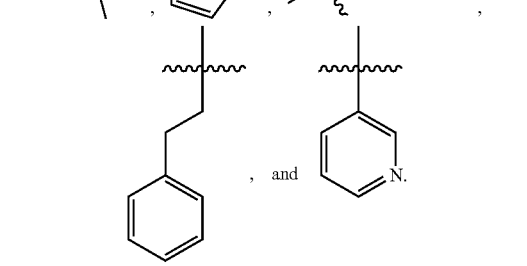

In some embodiments, R3 is selected from hydrogen, an acyclic alkyl moiety, a cyclic alkyl moiety, a substituted aryl moiety, an unsubstituted aryl moiety, an alkynyl moiety, a carbonyl moiety, a cyano moiety, a carboxylyl moiety, a carboxamide moiety, and a substituted heterocyclyl moiety, and an unsubstituted heterocyclyl moiety.

In some embodiments, R3 is selected from hydrogen, methyl,
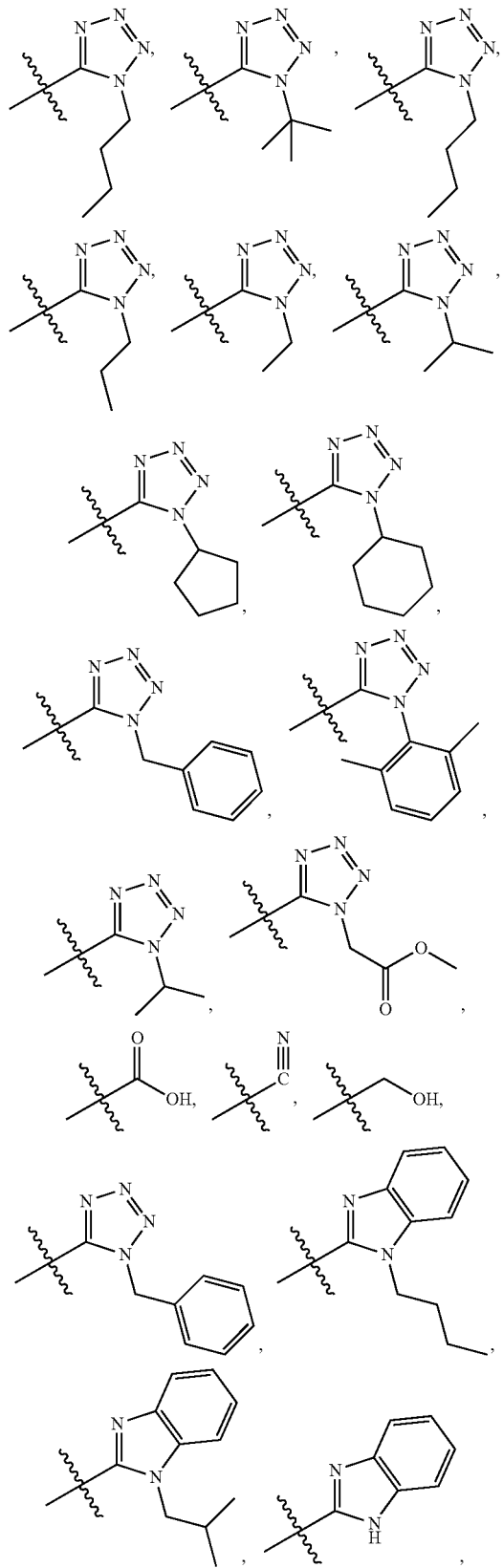
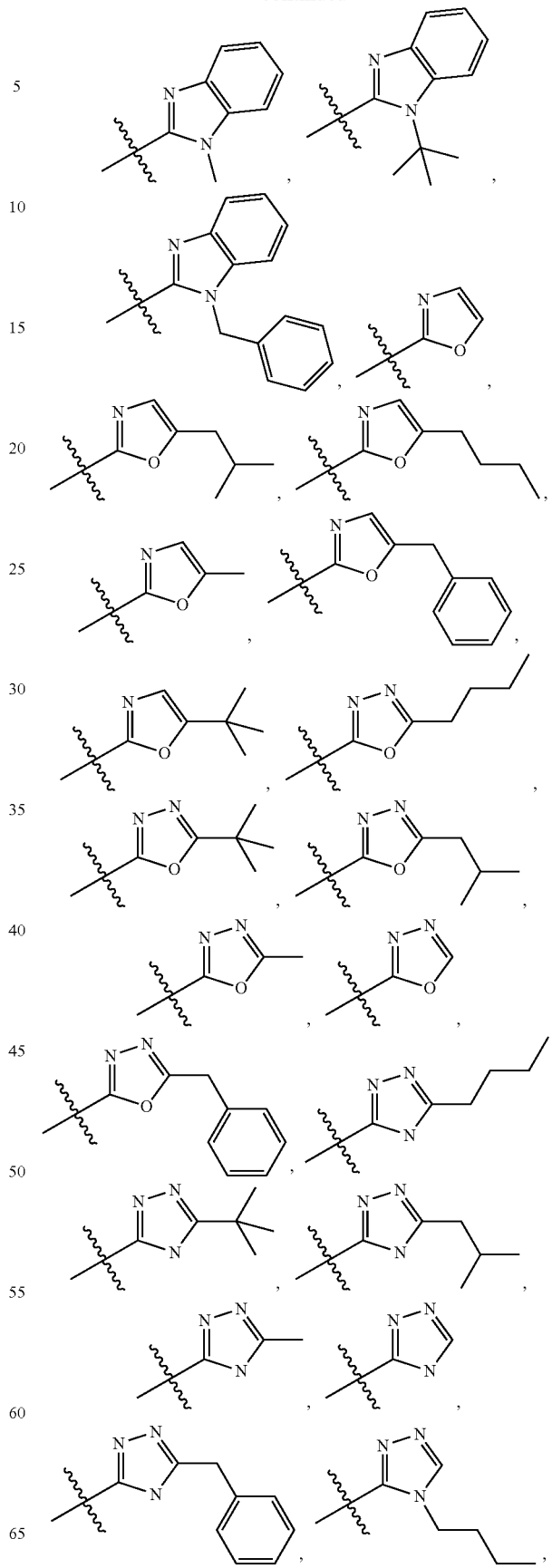

-continued

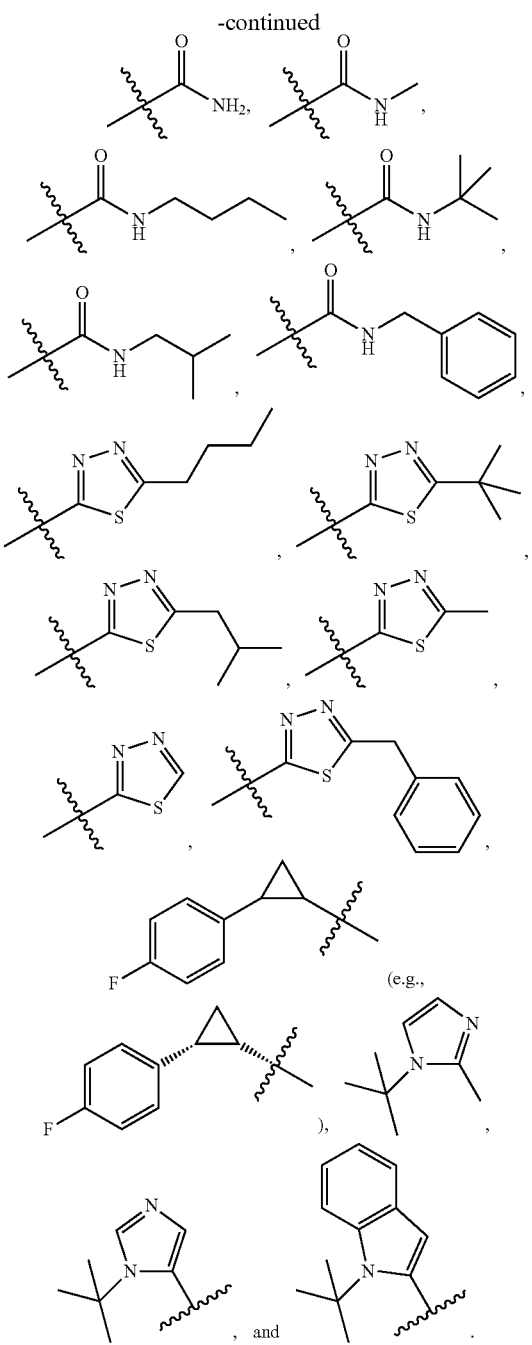

In some embodiments, R4 is selected from hydrogen and methyl.

In some embodiments, compounds shown in Tables II, III and IV and the compounds shown in Example III are contemplated for Formula I.

The invention further provides processes for preparing any of the compounds of the present invention through following at least a portion of the techniques recited in the experimental section.

The compounds of the invention are useful for the treatment, amelioration, or prevention of disorders characterized with AR activity and/or AR expression (e.g., cancer (e.g., CRPC)).

The compounds of the invention are useful for the treatment, amelioration, or prevention of disorders, such as those responsive to induction of apoptotic cell death, e.g., disorders characterized by dysregulation of apoptosis, including hyperproliferative diseases such as cancer. In certain embodiments, the compounds can be used to treat, ameliorate, or prevent cancer that is characterized by resistance to cancer therapies (e.g., those cancer cells which are chemoresistant, radiation resistant, hormone resistant, and the like) (e.g., cancers resistant to Enzalutamide treatment). In certain embodiments, the cancer is any type of cancer characterized with AR activity and/or AR expression (e.g., cancer (e.g., CRPC)).

The invention also provides pharmaceutical compositions comprising the compounds of the invention in a pharmaceutically acceptable carrier.

The invention also provides kits comprising a compound of the invention and instructions for administering the compound to an animal. The kits may optionally contain other therapeutic agents, e.g., anticancer agents or apoptosis-modulating agents, e.g., therapeutic agents useful in treating any type of cancer characterized with AR activity and/or AR expression (e.g., cancer (e.g., CRPC) (e.g., cancers resistant to Enzalutamide treatment)).

The present disclosure further provides bifunctional compounds that function to recruit endogenous proteins to an E3 Ubiquitin Ligase for degradation, and methods of using the same. In particular, the present disclosure provides bifunctional or proteolysis targeting chimeric (PROTAC) compounds, which find utility as modulators of targeted ubiquitination of a variety of polypeptides and other proteins, which are then degraded and/or otherwise inhibited. An exemplary advantage of the compounds provided herein is that a broad range of pharmacological activities is possible, consistent with the degradation/inhibition of targeted polypeptides from virtually any protein class or family. In addition, the description provides methods of using an effective amount of the compounds as described herein for the treatment or amelioration of a disease condition, such as any type of cancer characterized with AR activity and/or AR expression (e.g., cancer (e.g., CRPC) (e.g., cancers resistant to Enzalutamide treatment)).

In an additional aspect, the disclosure provides bifunctional or PROTAC compounds, which comprise an E3 Ubiquitin Ligase binding moiety (e.g., a ligand for an E3 Ubiquitin Ligase or "ULM" group), and a moiety that binds a target protein (e.g., a protein/polypeptide targeting ligand or "PTM" group) (e.g., an AR activity and/or AR expression inhibitor) such that the target protein/polypeptide is placed in proximity to the ubiquitin ligase to effect degradation (and inhibition) of that protein (e.g., inhibit AR receptor activity and/or AR expression). In certain embodiments, the PTM is any of the compounds as described herein showing inhibitory activity against AR activity and/or AR expression. In some embodiments, the ULM is a VHL, cereblon, mouse double minute 2 (MDM2), and/or inhibitor of apoptosis protein (IAP) E3 ligase binding moiety. For example, the structure of the bifunctional compound can be depicted as PTM-ULM.

The respective positions of the PTM and ULM moieties, as well as their number as illustrated herein, is provided by way of example only and is not intended to limit the compounds in any way. As would be understood by the skilled artisan, the bifunctional compounds as described herein can be synthesized such that the number and position of the respective functional moieties can be varied as desired.

In certain embodiments, the bifunctional compound further comprises a chemical linker ("L"). In this example, the structure of the bifunctional compound can be depicted as PTM-L-ULM, where PTM is a protein/polypeptide targeting moiety (e.g., any of the compounds as described herein showing inhibitory activity against AR activity and/or AR expression), L is a linker, and ULM is a VHL, cereblon, MDM2, or IAP E3 ligase binding moiety binding moiety.

Such embodiments are not limited to a specific type of linker. In some embodiments, the linker group is optionally substituted (poly)ethyleneglycol having between 1 and about 100 ethylene glycol units, between about 1 and about 50 ethylene glycol units, between 1 and about 25 ethylene glycol units, between about 1 and 10 ethylene glycol units, between 1 and about 8 ethylene glycol units and 1 and 6 ethylene glycol units, between 2 and 4 ethylene glycol units, or optionally substituted alkyl groups interdispersed with optionally substituted, O, N, S, P or Si atoms. In certain embodiments, the linker is substituted with an aryl, phenyl, benzyl, alkyl, alkylene, or heterocycle group. In certain embodiments, the linker may be asymmetric or symmetrical. In some embodiments, the linker is a substituted or unsubstituted polyethylene glycol group ranging in size from about 1 to about 12 ethylene glycol units, between 1 and about 10 ethylene glycol units, about 2 about 6 ethylene glycol units, between about 2 and 5 ethylene glycol units, between about 2 and 4 ethylene glycol units.

The ULM group and PIM group may be covalently linked to the linker group through any group which is appropriate and stable to the chemistry of the linker. In exemplary aspects of the present invention, the linker is independently covalently bonded to the ULM group and the PIM group in certain embodiments through an amide, ester, thioester, keto group, carbamate (urethane), carbon or ether, each of which groups may be inserted anywhere on the ULM group and PIM group to provide maximum binding of the ULM group on the ubiquitin ligase and the PTM group on the target protein to be degraded. In certain aspects where the PTM group is a ULM group, the target protein for degradation may be the ubiquitin ligase itself. In certain exemplary aspects, the linker may be linked to an optionally substituted alkyl, alkylene, alkene or alkyne group, an aryl group or a heterocyclic group on the ULM and/or PTM groups.

In certain embodiments, the compounds as described herein comprise multiple ULMs, multiple PTMs, multiple chemical linkers, or any combinations thereof.

In some embodiments, the present invention provides a method of ubiquitinating/degrading AR receptor activity and/or AR expression in a cell comprising administering a bifunctional compound as described herein comprising an ULM and a PTM, in certain embodiments linked through a linker moiety, as otherwise described herein, wherein the ULM is coupled to the PTM and wherein the ULM recognizes a ubiquitin pathway protein and the PTM recognizes the target protein such that degradation of the target protein occurs when the target protein is placed in proximity to the ubiquitin ligase, thus resulting in degradation/inhibition of the effects of the target protein and the control of protein levels. The control of protein levels afforded by the present invention provides treatment of a disease state or condition, which is modulated through the target protein by lowering the level of that protein in the cells of a patient.

In certain embodiments, the compounds of the present invention (e.g., the compounds shown in Tables II, III and IV and Example III) can be manipulated to serve as imaging agents (see, e.g., Kranz M, et al., Molecules. 2018 Mar. 20; 23(3); Sadeghzadeh M, et al., Ann Nucl Med. 2017 May; 31(4):335-346; Baum E, et al., J Nucl Med. 2017 June; 58(6):982-988; Yang D, et al., Mol Pharm. 2017 Mar. 6; 14(3):770-780).

Definitions

The term "anticancer agent" as used herein, refer to any therapeutic agents (e.g., chemotherapeutic compounds and/or molecular therapeutic compounds), antisense therapies, radiation therapies, or surgical interventions, used in the treatment of hyperproliferative diseases such as cancer (e.g., in mammals, e.g., in humans).

The term "prodrug" as used herein, refers to a pharmacologically inactive derivative of a parent "drug" molecule that requires biotransformation (e.g., either spontaneous or enzymatic) within the target physiological system to release, or to convert (e.g., enzymatically, physiologically, mechanically, electromagnetically) the prodrug into the active drug. Prodrugs are designed to overcome problems associated with stability, water solubility, toxicity, lack of specificity, or limited bioavailability. Exemplary prodrugs comprise an active drug molecule itself and a chemical masking group (e.g., a group that reversibly suppresses the activity of the drug). Some prodrugs are variations or derivatives of compounds that have groups cleavable under metabolic conditions. Prodrugs can be readily prepared from the parent compounds using methods known in the art, such as those described in A Textbook of Drug Design and Development, Krogsgaard-Larsen and H. Bundgaard (eds.), Gordon & Breach, 1991, particularly Chapter 5: "Design and Applications of Prodrugs"; Design of Prodrugs, H. Bundgaard (ed.), Elsevier, 1985; Prodrugs: Topical and Ocular Drug Delivery, K. B. Sloan (ed.), Marcel Dekker, 1998; Methods in Enzymology, K. Widder et al. (eds.), Vol. 42, Academic Press, 1985, particularly pp. 309-396; Burger's Medicinal Chemistry and Drug Discovery, 5th Ed., M. Wolff (ed.), John Wiley & Sons, 1995, particularly Vol. 1 and pp. 172-178 and pp. 949-982; Pro-Drugs as Novel Delivery Systems, T. Higuchi and V. Stella (eds.), Am. Chem. Soc., 1975; and Bioreversible Carriers in Drug Design, E. B. Roche (ed.), Elsevier, 1987.

Exemplary prodrugs become pharmaceutically active in vivo or in vitro when they undergo solvolysis under physiological conditions or undergo enzymatic degradation or other biochemical transformation (e.g., phosphorylation, hydrogenation, dehydrogenation, glycosylation). Prodrugs often offer advantages of water solubility, tissue compatibility, or delayed release in the mammalian organism. (See e.g., Bundgard, Design of Prodrugs, pp. 7-9, 21-24, Elsevier, Amsterdam (1985); and Silverman, The Organic Chemistry of Drug Design and Drug Action, pp. 352-401, Academic Press, San Diego, CA (1992)). Common prodrugs include acid derivatives such as esters prepared by reaction of parent acids with a suitable alcohol (e.g., a lower alkanol) or esters prepared by reaction of parent alcohol with a suitable carboxylic acid, (e.g., an amino acid), amides prepared by reaction of the parent acid compound with an amine, basic groups reacted to form an acylated base derivative (e.g., a lower alkylamide), or phosphorus-containing derivatives, e.g., phosphate, phosphonate, and phosphoramidate esters, including cyclic phosphate, phosphonate, and phosphoramidate (see, e.g., US Patent Application Publication No. US 2007/0249564 A1; herein incorporated by reference in its entirety).

The term "pharmaceutically acceptable salt" as used herein, refers to any salt (e.g., obtained by reaction with an acid or a base) of a compound of the present invention that is physiologically tolerated in the target animal (e.g., a mammal). Salts of the compounds of the present invention may be derived from inorganic or organic acids and bases. Examples of acids include, but are not limited to, hydrochloric, hydrobromic, sulfuric, nitric, perchloric, fumaric, maleic, phosphoric, glycolic, lactic, salicylic, succinic, toluene-p-sulfonic, tartaric, acetic, citric, methanesulfonic, ethanesulfonic, formic, benzoic, malonic, sulfonic, naphthalene-2-sulfonic, benzenesulfonic acid, and the like. Other acids, such as oxalic, while not in themselves pharmaceutically acceptable, may be employed in the preparation of salts useful as intermediates in obtaining the compounds of the invention and their pharmaceutically acceptable acid addition salts.

Examples of bases include, but are not limited to, alkali metal (e.g., sodium) hydroxides, alkaline earth metal (e.g., magnesium) hydroxides, ammonia, and compounds of formula $NW_4^+$, wherein W is $C_{1-4}$ alkyl, and the like.

Examples of salts include, but are not limited to: acetate, adipate, alginate, aspartate, benzoate, benzenesulfonate, bisulfate, butyrate, citrate, camphorate, camphorsulfonate, cyclopentanepropionate, digluconate, dodecylsulfate, ethanesulfonate, fumarate, flucoheptanoate, glycerophosphate, hemisulfate, heptanoate, hexanoate, chloride, bromide, iodide, 2-hydroxyethanesulfonate, lactate, maleate, mesylate, methanesulfonate, 2-naphthalenesulfonate, nicotinate, oxalate, palmoate, pectinate, persulfate, phenylpropionate, picrate, pivalate, propionate, succinate, tartrate, thiocyanate, tosylate, undecanoate, and the like. Other examples of salts include anions of the compounds of the present invention compounded with a suitable cation such as $Na^+$, $NH_4^+$, and $NW_4^+$ (wherein W is a $C_{1-4}$ alkyl group), and the like. For therapeutic use, salts of the compounds of the present invention are contemplated as being pharmaceutically acceptable. However, salts of acids and bases that are non-pharmaceutically acceptable may also find use, for example, in the preparation or purification of a pharmaceutically acceptable compound.

The term "solvate" as used herein, refers to the physical association of a compound of the invention with one or more solvent molecules, whether organic or inorganic. This physical association often includes hydrogen bonding. In certain instances, the solvate is capable of isolation, for example, when one or more solvate molecules are incorporated in the crystal lattice of the crystalline solid. "Solvate" encompasses both solution-phase and isolable solvates. Exemplary solvates include hydrates, ethanolates, and methanolates.

The term "therapeutically effective amount," as used herein, refers to that amount of the therapeutic agent sufficient to result in amelioration of one or more symptoms of a disorder, or prevent advancement of a disorder, or cause regression of the disorder. For example, with respect to the treatment of cancer, in one embodiment, a therapeutically effective amount will refer to the amount of a therapeutic agent that decreases the rate of tumor growth, decreases tumor mass, decreases the number of metastases, increases time to tumor progression, or increases survival time by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%.

The terms "sensitize" and "sensitizing," as used herein, refer to making, through the administration of a first agent (e.g., a piperazine (or similar) compound of the invention), an animal or a cell within an animal more susceptible, or more responsive, to the biological effects (e.g., promotion or retardation of an aspect of cellular function including, but not limited to, cell division, cell growth, proliferation, invasion, angiogenesis, necrosis, or apoptosis) of a second agent. The sensitizing effect of a first agent on a target cell can be measured as the difference in the intended biological effect (e.g., promotion or retardation of an aspect of cellular function including, but not limited to, cell growth, proliferation, invasion, angiogenesis, or apoptosis) observed upon the administration of a second agent with and without administration of the first agent. The response of the sensitized cell can be increased by at least about 10%, at least about 20%, at least about 30%, at least about 40%, at least about 50%, at least about 60%, at least about 70%, at least about 80%, at least about 90%, at least about 100%, at least about 150%, at least about 200%, at least about 250%, at least 300%, at least about 350%, at least about 400%, at least about 450%, or at least about 500% over the response in the absence of the first agent.

The term "dysregulation of apoptosis," as used herein, refers to any aberration in the ability of (e.g., predisposition) a cell to undergo cell death via apoptosis. Dysregulation of apoptosis is associated with or induced by a variety of conditions, non-limiting examples of which include, autoimmune disorders (e.g., systemic lupus erythematosus, rheumatoid arthritis, graft-versus-host disease, myasthenia gravis, or Sjogren's syndrome), chronic inflammatory conditions (e.g., psoriasis, asthma or Crohn's disease), hyperproliferative disorders (e.g., tumors, B cell lymphomas, or T cell lymphomas), viral infections (e.g., herpes, papilloma, or HIV), and other conditions such as osteoarthritis and atherosclerosis.

The term "hyperproliferative disease," as used herein, refers to any condition in which a localized population of proliferating cells in an animal is not governed by the usual limitations of normal growth. Examples of hyperproliferative disorders include tumors, neoplasms, lymphomas and the like. A neoplasm is said to be benign if it does not undergo invasion or metastasis and malignant if it does either of these. A "metastatic" cell means that the cell can invade and destroy neighboring body structures. Hyperplasia is a form of cell proliferation involving an increase in cell number in a tissue or organ without significant alteration in structure or function. Metaplasia is a form of controlled cell growth in which one type of fully differentiated cell substitutes for another type of differentiated cell.

The pathological growth of activated lymphoid cells often results in an autoimmune disorder or a chronic inflammatory condition. As used herein, the term "autoimmune disorder" refers to any condition in which an organism produces antibodies or immune cells which recognize the organism's own molecules, cells or tissues. Non-limiting examples of autoimmune disorders include autoimmune hemolytic anemia, autoimmune hepatitis, Berger's disease or IgA nephropathy, celiac sprue, chronic fatigue syndrome, Crohn's disease, dermatomyositis, fibromyalgia, graft versus host disease, Grave's disease, Hashimoto's thyroiditis, idiopathic thrombocytopenia purpura, lichen planus, multiple sclerosis, myasthenia gravis, psoriasis, rheumatic fever, rheumatic arthritis, scleroderma, Sjögren's syndrome, systemic lupus erythematosus, type 1 diabetes, ulcerative colitis, vitiligo, and the like.

The term "neoplastic disease," as used herein, refers to any abnormal growth of cells being either benign (non-cancerous) or malignant (cancerous).

The term "normal cell," as used herein, refers to a cell that is not undergoing abnormal growth or division. Normal cells are non-cancerous and are not part of any hyperproliferative disease or disorder.

The term "anti-neoplastic agent," as used herein, refers to any compound that retards the proliferation, growth, or spread of a targeted (e.g., malignant) neoplasm.

The terms "prevent," "preventing," and "prevention," as used herein, refer to a decrease in the occurrence of pathological cells (e.g., hyperproliferative or neoplastic cells) in an animal. The prevention may be complete, e.g., the total absence of pathological cells in a subject. The prevention may also be partial, such that the occurrence of pathological cells in a subject is less than that which would have occurred without the present invention.

The term "pharmaceutically acceptable carrier" or "pharmaceutically acceptable vehicle" encompasses any of the standard pharmaceutical carriers, solvents, surfactants, or vehicles. Suitable pharmaceutically acceptable vehicles include aqueous vehicles and nonaqueous vehicles. Standard pharmaceutical carriers and their formulations are described in Remington's Pharmaceutical Sciences, Mack Publishing Co., Easton, PA, 19th ed. 1995.

DETAILED DESCRIPTION OF THE INVENTION

Experiments conducted during the course of developing embodiments for the present invention developed a new class of small-molecules having a piperazine (or similar) structure which function as antagonists of AR activity. Indeed, such experiments resulted in the synthesis of small molecule androgen receptor antagonists with promising biological profiles as demonstrated in an FP binding assay, a GeneBlazer functional assay. Moreover, such small molecule androgen receptor antagonists demonstrated anti-proliferative activity against LNCaP cell growth. Several of the small molecule androgen receptor antagonists were shown to be differentiated from Enzalutamide, in that they are 4-8 fold more active in LNCAP prostate-specific cell viability studies thereby representing a significant improvement.

As such, the present invention provides a new class of small-molecules having a piperazine (or similar) structure which function as inhibitors of AR activity and/or AR expression, and their use as therapeutics for the treatment of any type of condition or cancer characterized with AR activity and/or AR expression (e.g., cancer (e.g., CRPC) (e.g., cancers resistant to Enzalutamide treatment)).

In a particular embodiment, piperazine (or similar) compounds encompassed within Formula I are provided:

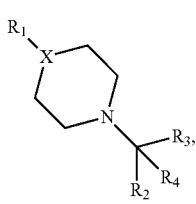

(Formula I)

including pharmaceutically acceptable salts, solvates, and/or prodrugs thereof.

Formula I is not limited to a particular chemical moiety for X, R1, R2, R3, and R4. In some embodiments, the particular chemical moiety for X, R1, R2, R3, and R4 independently include any chemical moiety that permits the resulting compound to inhibit AR activity and/or inhibit AR expression.

In some embodiments, X is Nitrogen rendering the resulting compound encompassed within Formula II:

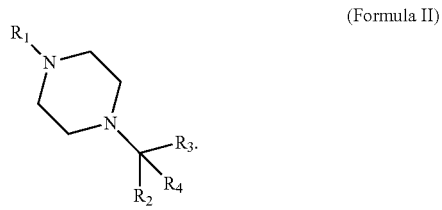

(Formula II)

In some embodiments, X is C—H rendering the resulting compound encompassed within Formula III:

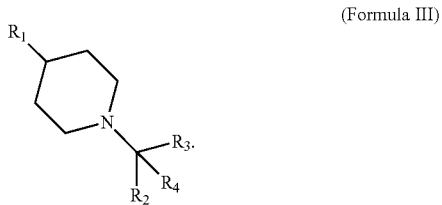

(Formula III)

In some embodiments, R2 and R4 are combined to form a cycloalkyl ring moiety. In some embodiments wherein R2 and R4 are combined to form a cycloalkyl ring moiety, the resulting compound is encompassed within Formula IV:

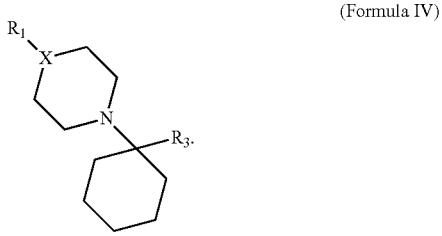

(Formula IV)

In some embodiments wherein R2 and R4 are combined to form a cycloalkyl ring moiety, the resulting compound is encompassed within Formula V:

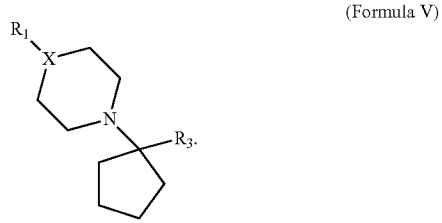

(Formula V)

In some embodiments, R2 and R4 are combined to form a ketone moiety rendering the resulting compound encompassed within Formula VI:

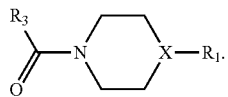

(Formula VI)

In some embodiments, R1 is selected from an alkyl moiety, a substituted aryl moiety, an unsubstituted aryl moiety, a substituted heterocyclyl moiety, an unsubstituted heterocyclyl moiety, and a carbonyl moiety.

In some embodiments, R1 is selected from

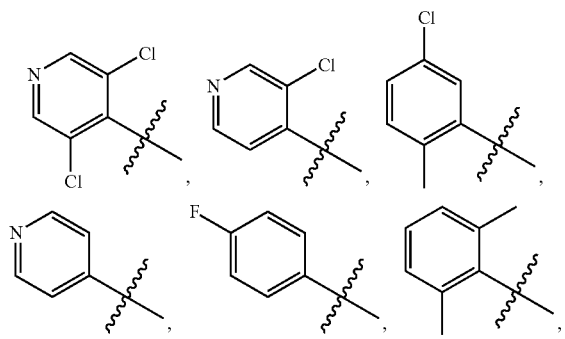

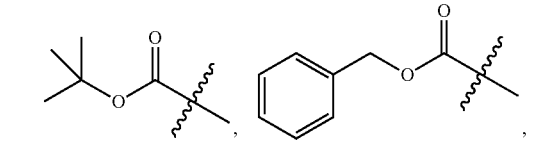

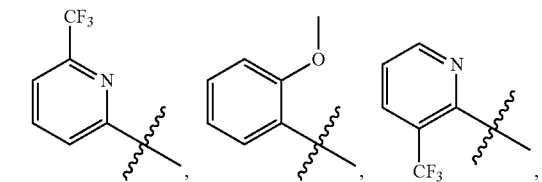

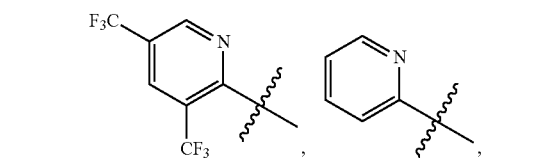

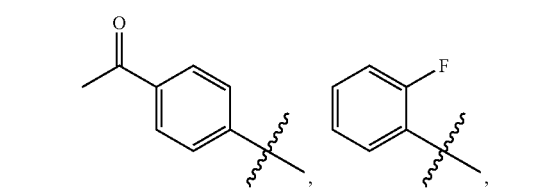

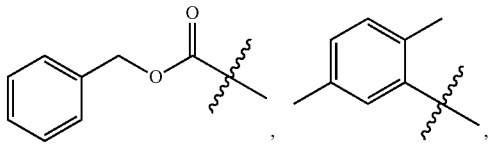

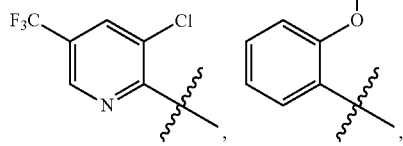

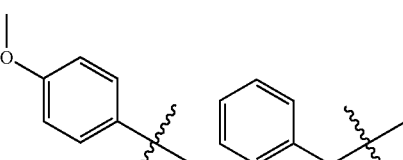

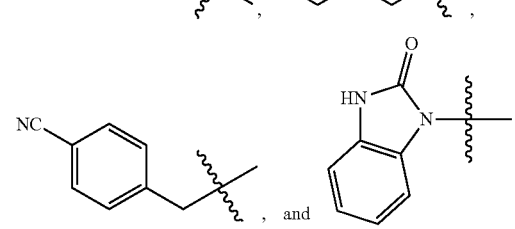

, and

In some embodiments, R2 is selected from an alkyl moiety, a substituted aryl moiety, an unsubstituted aryl moiety, a substituted heterocyclyl moiety, and an unsubstituted heterocyclyl moiety.

In some embodiments, R2 is selected from hydrogen, methyl,

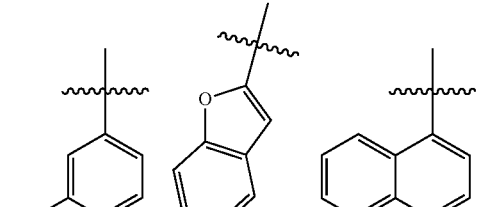

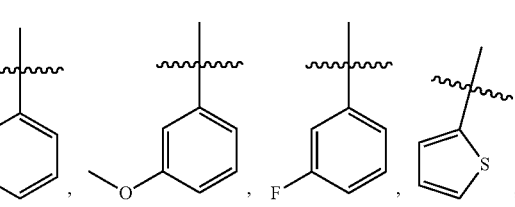

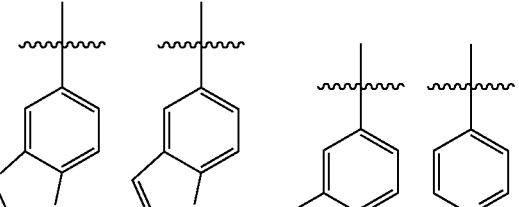

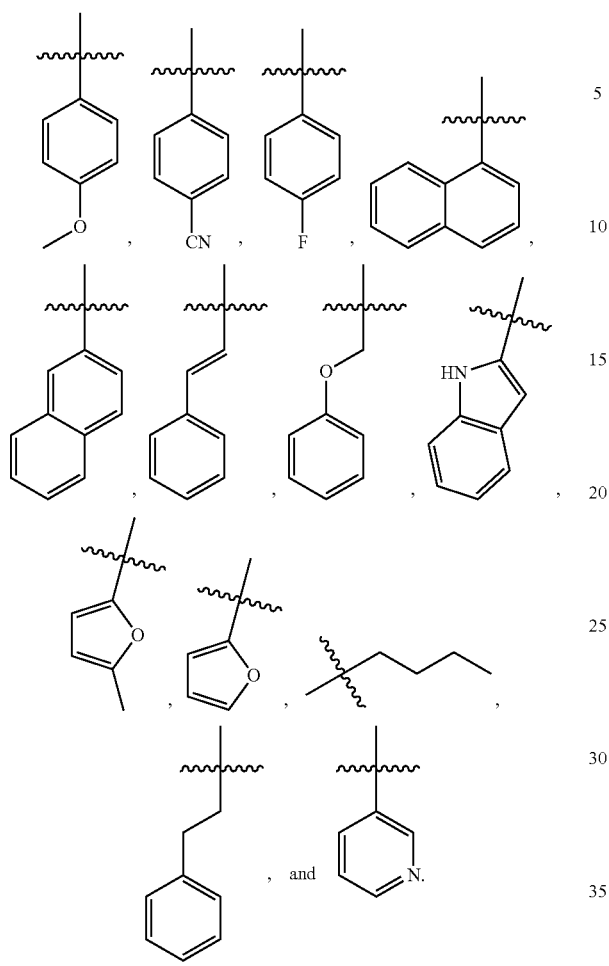

In some embodiments, R3 is selected from hydrogen, an acyclic alkyl moiety, a cyclic alkyl moiety, a substituted aryl moiety, an unsubstituted aryl moiety, an alkynyl moiety, a carbonyl moiety, a cyano moiety, a carboxylyl moiety, a carboxamide moiety, and a substituted heterocyclyl moiety, and an unsubstituted heterocyclyl moiety.

In some embodiments, R3 is selected from hydrogen, methyl,

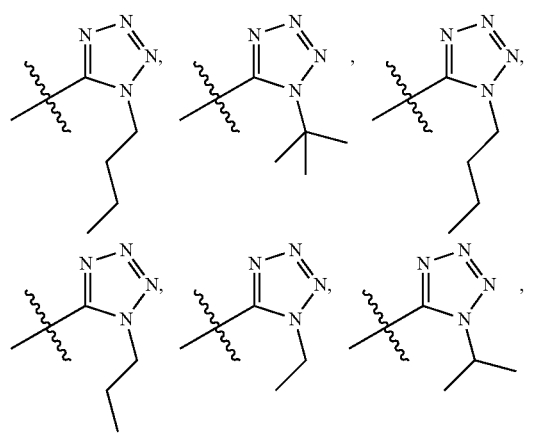

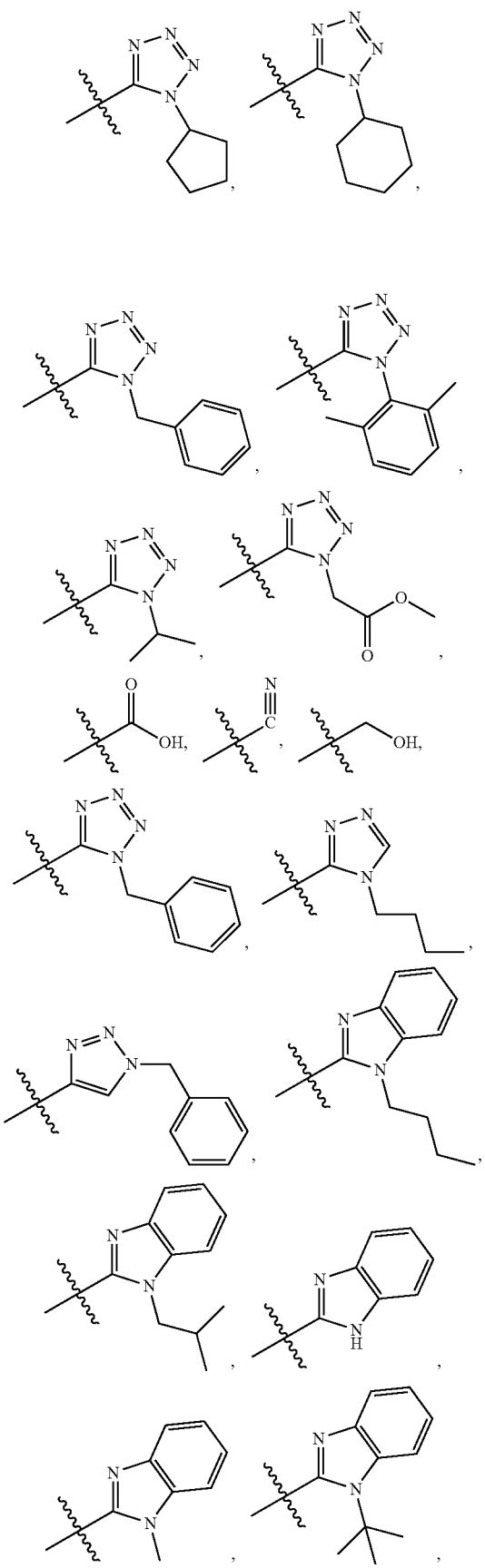

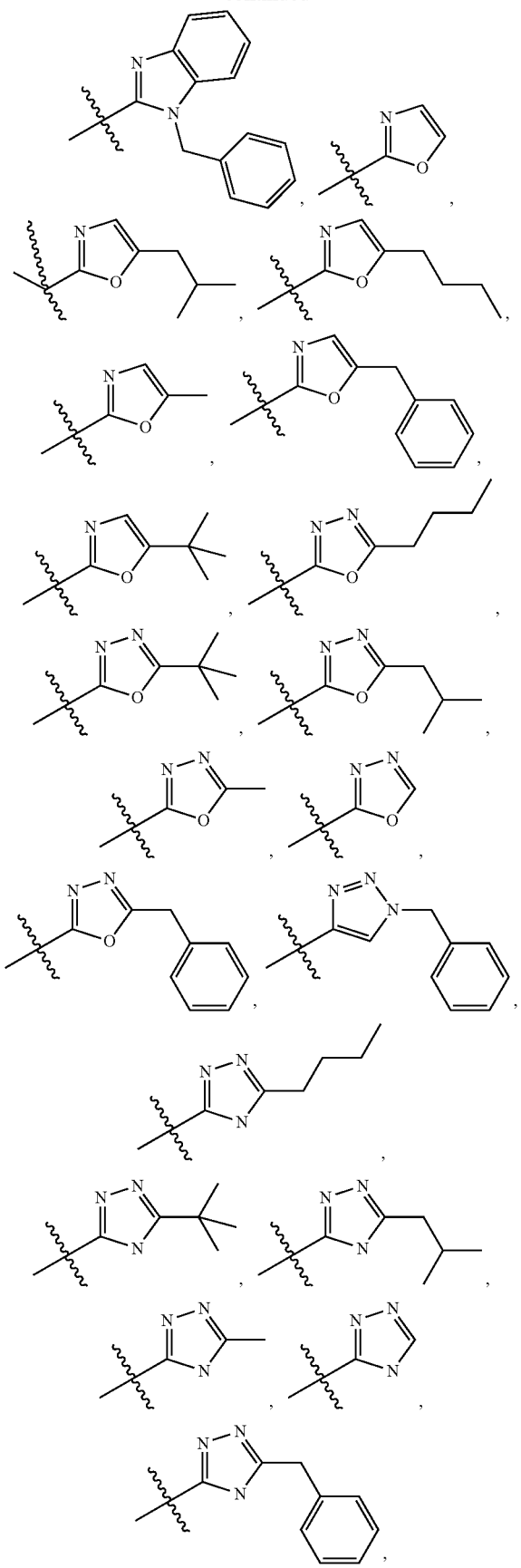

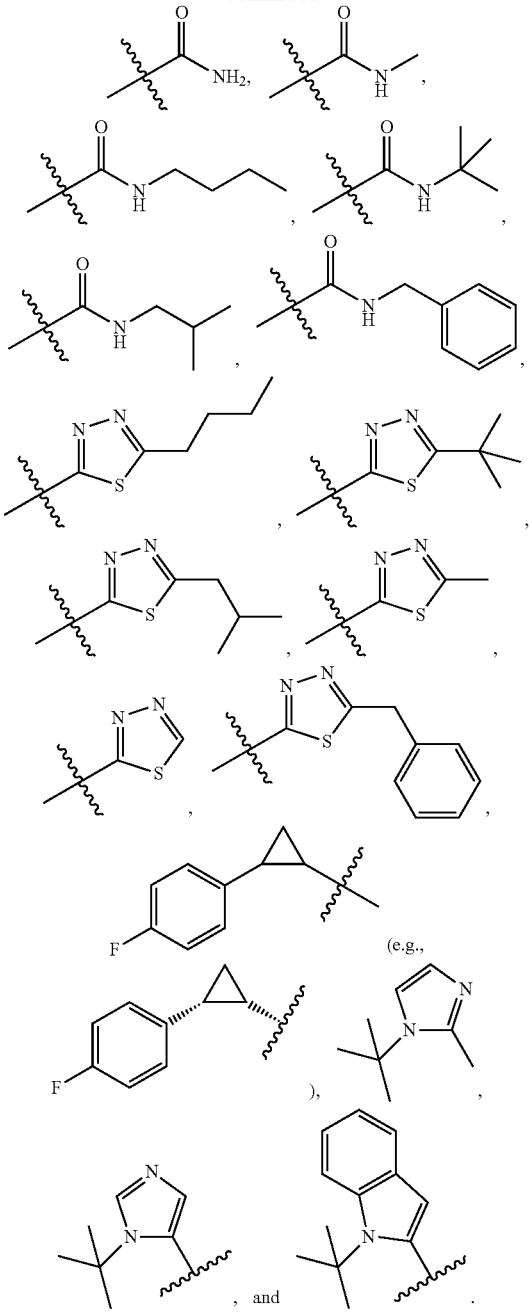

In some embodiments, R4 is selected from hydrogen and methyl.

In some embodiments, compounds shown in Tables II, III and IV and the compounds shown in Example III are contemplated for Formula I.

An important aspect of the present invention is that compounds of the invention induce cell cycle arrest and/or apoptosis and also potentiate the induction of cell cycle arrest and/or apoptosis either alone or in response to additional apoptosis induction signals. Therefore, it is contemplated that these compounds sensitize cells to induction of cell cycle arrest and/or apoptosis, including cells that are resistant to such inducing stimuli. The AR activity inhibitors and/or AR expression inhibitors of the present invention (e.g., piperazine (or similar) compounds) can be used to induce apoptosis in any disorder that can be treated, ameliorated, or prevented by the induction of apoptosis. In one embodiment, the inhibitors can be used to induce apoptosis in cells comprising AR activity.

In some embodiments, the compositions and methods of the present invention are used to treat diseased cells, tissues, organs, or pathological conditions and/or disease states in an animal (e.g., a mammalian patient including, but not limited to, humans and veterinary animals). In this regard, various diseases and pathologies are amenable to treatment or prophylaxis using the present methods and compositions. A non-limiting exemplary list of these diseases and conditions includes, but is not limited to, any type of cancer characterized with AR activity and/or AR expression (e.g., cancer (e.g., CRPC) (e.g., cancers resistant to Enzalutamide treatment)) including but not limited to pancreatic cancer, breast cancer, prostate cancer, lymphoma, skin cancer, colon cancer, melanoma, malignant melanoma, ovarian cancer, brain cancer, primary brain carcinoma, head and neck cancer, glioma, glioblastoma, liver cancer, bladder cancer, non-small cell lung cancer, head or neck carcinoma, breast carcinoma, ovarian carcinoma, lung carcinoma, small-cell lung carcinoma, Wilms' tumor, cervical carcinoma, testicular carcinoma, bladder carcinoma, pancreatic carcinoma, stomach carcinoma, colon carcinoma, prostatic carcinoma, genitourinary carcinoma, thyroid carcinoma, esophageal carcinoma, myeloma, multiple myeloma, adrenal carcinoma, renal cell carcinoma, endometrial carcinoma, adrenal cortex carcinoma, malignant pancreatic insulinoma, malignant carcinoid carcinoma, choriocarcinoma, mycosis fungoides, malignant hypercalcemia, cervical hyperplasia, leukemia, acute lymphocytic leukemia, chronic lymphocytic leukemia, acute myelogenous leukemia, chronic myelogenous leukemia, chronic granulocytic leukemia, acute granulocytic leukemia, hairy cell leukemia, neuroblastoma, rhabdomyosarcoma, Kaposi's sarcoma, polycythemia vera, essential thrombocytosis, Hodgkin's disease, non-Hodgkin's lymphoma, soft-tissue sarcoma, osteogenic sarcoma, primary macroglobulinemia, and retinoblastoma, and the like, T and B cell mediated autoimmune diseases; inflammatory diseases; infections; hyperproliferative diseases; AIDS; degenerative conditions, vascular diseases, and the like. In some embodiments, the cancer cells being treated are metastatic. In other embodiments, the cancer cells being treated are resistant to anticancer agents (e.g., Enzalutamide). In other embodiments, the disorder is any disorder having cells having AR activity and/or AR expression.

Some embodiments of the present invention provide methods for administering an effective amount of a compound of the invention and at least one additional therapeutic agent (including, but not limited to, chemotherapeutic antineoplastics, apoptosis-modulating agents, antimicrobials, antivirals, antifungals, and anti-inflammatory agents) and/or therapeutic technique (e.g., surgical intervention, and/or radiotherapies).

In a particular embodiment, the additional therapeutic agent(s) is an anticancer agent. A number of suitable anticancer agents are contemplated for use in the methods of the present invention. Indeed, the present invention contemplates, but is not limited to, administration of numerous anticancer agents such as: agents that induce apoptosis; polynucleotides (e.g., anti-sense, ribozymes, siRNA); polypeptides (e.g., enzymes and antibodies); biological mimetics; alkaloids; alkylating agents; antitumor antibiotics; antimetabolites; hormones; platinum compounds; monoclonal or polyclonal antibodies (e.g., antibodies conjugated with anticancer drugs, toxins, defensins), toxins; radionuclides; biological response modifiers (e.g., interferons (e.g., IFN-α) and interleukins (e.g., IL-2)); adoptive immunotherapy agents; hematopoietic growth factors; agents that induce tumor cell differentiation (e.g., all-trans-retinoic acid); gene therapy reagents (e.g., antisense therapy reagents and nucleotides); tumor vaccines; angiogenesis inhibitors; proteosome inhibitors: NF-KB modulators; anti-CDK compounds; HDAC inhibitors; and the like. Numerous other examples of chemotherapeutic compounds and anticancer therapies suitable for co-administration with the disclosed compounds are known to those skilled in the art.

In certain embodiments, anticancer agents comprise agents that induce or stimulate apoptosis. Agents that induce apoptosis include, but are not limited to, radiation (e.g., X-rays, gamma rays, UV); tumor necrosis factor (TNF)-related factors (e.g., TNF family receptor proteins, TNF family ligands, TRAIL, antibodies to TRAIL-R1 or TRAIL-R2); kinase inhibitors (e.g., epidermal growth factor receptor (EGFR) kinase inhibitor, vascular growth factor receptor (VGFR) kinase inhibitor, fibroblast growth factor receptor (FGFR) kinase inhibitor, platelet-derived growth factor receptor (PDGFR) kinase inhibitor, and Bcr-Abl kinase inhibitors (such as GLEEVEC)); antisense molecules; antibodies (e.g., HERCEPTIN, RITUXAN, ZEVALIN, and AVASTIN); anti-estrogens (e.g., raloxifene and tamoxifen); anti-androgens (e.g., flutamide, bicalutamide, finasteride, aminoglutethamide, ketoconazole, and corticosteroids); cyclooxygenase 2 (COX-2) inhibitors (e.g., celecoxib, meloxicam, NS-398, and non-steroidal anti-inflammatory drugs (NSAIDs)); anti-inflammatory drugs (e.g., butazolidin, DECADRON, DELTASONE, dexamethasone, dexamethasone intensol, DEXONE, HEXADROL, hydroxychloroquine, METICORTEN, ORADEXON, ORASONE, oxyphenbutazone, PEDIAPRED, phenylbutazone, PLAQUENIL, prednisolone, prednisone, PRELONE, and TANDEARIL); and cancer chemotherapeutic drugs (e.g., irinotecan (CAMPTOSAR), CPT-11, fludarabine (FLUDARA), dacarbazine (DTIC), dexamethasone, mitoxantrone, MYLOTARG, VP-16, cisplatin, carboplatin, oxaliplatin, 5-FU, doxorubicin, gemcitabine, bortezomib, gefitinib, bevacizumab, TAXOTERE or TAXOL); cellular signaling molecules; ceramides and cytokines; staurosporine, and the like.

In still other embodiments, the compositions and methods of the present invention provide a compound of the invention and at least one anti-hyperproliferative or antineoplastic agent selected from alkylating agents, antimetabolites, and natural products (e.g., herbs and other plant and/or animal derived compounds).

Alkylating agents suitable for use in the present compositions and methods include, but are not limited to: 1) nitrogen mustards (e.g., mechlorethamine, cyclophosphamide, ifosfamide, melphalan (L-sarcolysin); and chlorambucil); 2) ethylenimines and methylmelamines (e.g., hexamethylmelamine and thiotepa); 3) alkyl sulfonates (e.g., busulfan); 4) nitrosoureas (e.g., carmustine (BCNU); lomustine (CCNU); semustine (methyl-CCNU); and streptozocin (streptozotocin)); and 5) triazenes (e.g., dacarbazine (DTIC; dimethyltriazenoimid-azolecarboxamide).

In some embodiments, antimetabolites suitable for use in the present compositions and methods include, but are not limited to: 1) folic acid analogs (e.g., methotrexate (amethopterin)); 2) pyrimidine analogs (e.g., fluorouracil (5-fluorouracil; 5-FU), floxuridine (fluorode-oxyuridine; FudR), and cytarabine (cytosine arabinoside)); and 3) purine analogs (e.g., mercaptopurine (6-mercaptopurine; 6-MP), thioguanine (6-thioguanine; TG), and pentostatin (2'-deoxycoformycin)).

In still further embodiments, chemotherapeutic agents suitable for use in the compositions and methods of the present invention include, but are not limited to: 1) vinca alkaloids (e.g., vinblastine (VLB), vincristine); 2) epipodophyllotoxins (e.g., etoposide and teniposide); 3) antibiotics (e.g., dactinomycin (actinomycin D), daunorubicin (daunomycin; rubidomycin), doxorubicin, bleomycin, plicamycin (mithramycin), and mitomycin (mitomycin C)); 4) enzymes (e.g., L-asparaginase); 5) biological response modifiers (e.g., interferon-alfa); 6) platinum coordinating complexes (e.g., cisplatin (cis-DDP) and carboplatin); 7) anthracenediones (e.g., mitoxantrone); 8) substituted ureas (e.g., hydroxyurea); 9) methylhydrazine derivatives (e.g., procarbazine (N-methylhydrazine; MIH)); 10) adrenocortical suppressants (e.g., mitotane (o,p'-DDD) and aminoglutethimide); 11) adrenocorticosteroids (e.g., prednisone); 12) progestins (e.g., hydroxyprogesterone caproate, medroxyprogesterone acetate, and megestrol acetate); 13) estrogens (e.g., diethylstilbestrol and ethinyl estradiol); 14) antiestrogens (e.g., tamoxifen); 15) androgens (e.g., testosterone propionate and fluoxymesterone); 16) antiandrogens (e.g., flutamide); and 17) gonadotropin-releasing hormone analogs (e.g., leuprolide).

Any oncolytic agent that is routinely used in a cancer therapy context finds use in the compositions and methods of the present invention. For example, the U.S. Food and Drug Administration maintains a formulary of oncolytic agents approved for use in the United States. International counterpart agencies to the U.S.F.D.A. maintain similar formularies. Table 1 provides a list of exemplary antineoplastic agents approved for use in the U.S. Those skilled in the art will appreciate that the "product labels" required on all U.S. approved chemotherapeutics describe approved indications, dosing information, toxicity data, and the like, for the exemplary agents.

TABLE 1

| | | |
|---|---|---|
| Aldesleukin (des-alanyl-1, serine-125 human interleukin-2) | Proleukin | Chiron Corp., Emeryville, CA |
| Alemtuzumab (IgG1κ anti CD52 antibody) | Campath | Millennium and ILEX Partners, LP, Cambridge, MA |
| Alitretinoin (9-cis-retinoic acid) | Panretin | Ligand Pharmaceuticals, Inc., San Diego CA |
| Allopurinol (1,5-dihydro-4H-pyrazolo[3,4-d]pyrimidin-4-one monosodium salt) | Zyloprim | GlaxoSmithKline, Research Triangle Park, NC |
| Altretamine (N,N,N',N',N'',N''-hexamethyl-1,3,5-triazine-2,4,6-triamine) | Hexalen | US Bioscience, West Conshohocken, PA |
| Amifostine (ethanethiol, 2-[(3-aminopropyl)amino]-, dihydrogen phosphate (ester)) | Ethyol | US Bioscience |
| Anastrozole (1,3-Benzenediacetonitrile, a,a,a',a'-tetramethyl-5-(1H-1,2,4-triazol-1-ylmethyl)) | Arimidex | AstraZeneca Pharmaceuticals, LP, Wilmington, DE |
| Arsenic trioxide | Trisenox | Cell Therapeutic, Inc., Seattle, WA |
| Asparaginase (L-asparagine amidohydrolase, type EC-2) | Elspar | Merck & Co., Inc., Whitehouse Station, NJ |
| BCG Live (lyophilized preparation of an attenuated strain of *Mycobacterium bovis* (*Bacillus Calmette-Gukin* [BCG], substrain Montreal) | TICE BCG | Organon Teknika, Corp., Durham, NC |
| bexarotene capsules (4-[1-(5,6,7,8-tetrahydro-3,5,5,8,8-pentamethyl-2-napthalenyl)ethenyl] benzoic acid) | Targretin | Ligand Pharmaceuticals |
| bexarotene gel | Targretin | Ligand Pharmaceuticals |
| Bleomycin (cytotoxic glycopeptide antibiotics produced by *Streptomyces verticillus*; bleomycin $A_2$ and bleomycin $B_2$) | Blenoxane | Bristol-Myers Squibb Co., NY, NY |
| Capecitabine (5'-deoxy-5-fluoro-N-[(pentyloxy)carbonyl]-cytidine) | Xeloda | Roche |
| Carboplatin (platinum, diammine [1,1-cyclobutanedicarboxylato(2-)-0,0']-,(SP-4-2)) | Paraplatin | Bristol-Myers Squibb |
| Carmustine (1,3-bis(2-chloroethyl)-1-nitrosourea) | BCNU, BiCNU | Bristol-Myers Squibb |
| Carmustine with Polifeprosan 20 Implant | Gliadel Wafer | Guilford Pharmaceuticals, Inc., Baltimore, MD |
| Celecoxib (as 4-[5-(4-methylphenyl)-3-(trifluoromethyl)-1H-pyrazol-1-yl] benzenesulfonamide) | Celebrex | Searle Pharmaceuticals, England |
| Chlorambucil (4-[bis(2chlorethyl)amino]benzenebutanoic acid) | Leukeran | GlaxoSmithKline |

TABLE 1-continued

| | | |
|---|---|---|
| Cisplatin (PtCl$_2$H$_6$N$_2$) | Platinol | Bristol-Myers Squibb |
| Cladribine (2-chloro-2'-deoxy-b-D-adenosine) | Leustatin, 2-CdA | R.W. Johnson Pharmaceutical Research Institute, Raritan, NJ |
| Cyclophosphamide (2-[bis(2-chloroethyl)amino]tetrahydro-2H-13,2-oxazaphosphorine 2-oxide monohydrate) | Cytoxan, Neosar | Bristol-Myers Squibb |
| Cytarabine (1-b-D-Arabinofuranosylcytosine, C$_9$H$_{13}$N$_3$O$_5$) | Cytosar-U | Pharmacia & Upjohn Company |
| cytarabine liposomal | DepoCyt | Skye Pharmaceuticals, Inc., San Diego, CA |
| Dacarbazine (5-(3,3-dimethyl-1-triazeno)-imidazole-4-carboxamide (DTIC)) | DTIC-Dome | Bayer AG, Leverkusen, Germany |
| Dactinomycin, actinomycin D (actinomycin produced by *Streptomyces parvullus*, C$_{62}$H$_{86}$N$_{12}$O$_{16}$) | Cosmegen | Merck |
| Darbepoetin alfa (recombinant peptide) | Aranesp | Amgen, Inc., Thousand Oaks, CA |
| daunorubicin liposomal ((8S-cis)-8-acetyl-10-[(3-amino-2,3,6-trideoxy-á-L-lyxo-hexopyranosyl)oxy]-7,8,9,10-tetrahydro-6,8,11-trihydroxy-1-methoxy-5,12-naphthacenedione hydrochloride) | Danuo Xome | Nexstar Pharmaceuticals, Inc., Boulder, CO |
| Daunorubicin HCl, daunomycin ((1S,3S)-3-Acetyl-1,2,3,4,6,11-hexahydro-3,5,12-trihydroxy-10-methoxy-6,11-dioxo-1-naphthacenyl 3-amino-2,3,6-trideoxy-(alpha)-L-lyxo-hexopyranoside hydrochloride) | Cerubidine | Wyeth Ayerst, Madison, NJ |
| Denileukin diftitox (recombinant peptide) | Ontak | Seragen, Inc., Hopkinton, MA |
| Dexrazoxane ((S)-4,4'-(1-methyl-1,2-ethanediyl)bis-2,6-piperazinedione) | Zinecard | Pharmacia & Upjohn Company |
| Docetaxel ((2R,3S)-N-carboxy-3-phenylisoserine, N-tert-butyl ester, 13-ester with 5b-20-epoxy-12a,4,7b,10b,13a-hexahydroxytax-11-en-9-one 4-acetate 2-benzoate, trihydrate) | Taxotere | Aventis Pharmaceuticals, Inc., Bridgewater, NJ |
| Doxorubicin HCl (8S,10S)-10-[(3-amino-2,3,6-trideoxy-a-L-lyxo-hexopyranosyl)oxy]-8-glycolyl-7,8,9,10-tetrahydro-6,8,11-trihydroxy-1-methoxy-5,12-naphthacenedione hydrochloride) | Adriamycin, Rubex | Pharmacia & Upjohn Company |
| doxorubicin | Adriamycin PFS Intravenous injection | Pharmacia & Upjohn Company |
| doxorubicin liposomal | Doxil | Sequs Pharmaceuticals, Inc., Menlo park, CA |
| dromostanolone propionate (17b-Hydroxy-2a-methyl-5a-androstan-3-one propionate) | Dromostanolone | Eli Lilly & Company, Indianapolis, IN |
| dromostanolone propionate | Masterone injection | Syntex, Corp., Palo Alto, CA |
| Elliott's B Solution | Elliott's B Solution | Orphan Medical, Inc |
| Epirubicin ((8S-cis)-10-[(3-amino-2,3,6-trideoxy-a-L-arabino-hexopyranosyl)oxy]-7,8,9,10-tetrahydro-6,8,11-trihydroxy-8-(hydroxyacetyl)-1-methoxy-5,12-naphthacenedione hydrochloride) | Ellence | Pharmacia & Upjohn Company |
| Epoetin alfa (recombinant peptide) | Epogen | Amgen, Inc |
| Estramustine (estra-1,3,5(10)-triene-3,17-diol(17(beta))-, 3-[bis(2-chloroethyl)carbamate] 17-(dihydrogen phosphate), disodium salt, monohydrate, or estradiol 3-[bis(2-chloroethyl)carbamate] 17-(dihydrogen phosphate), disodium salt, monohydrate) | Emcyt | Pharmacia & Upjohn Company |
| Etoposide phosphate (4'-Demethylepipodophyllotoxin 9-[4,6-O-(R)-ethylidene-(beta)-D-glucopyranoside], 4'-(dihydrogen phosphate)) | Etopophos | Bristol-Myers Squibb |
| etoposide, VP-16 (4'-demethylepipodophyllotoxin 9-[4,6-0-(R)-ethylidene-(beta)-D-glucopyranoside]) | Vepesid | Bristol-Myers Squibb |

TABLE 1-continued

| | | |
|---|---|---|
| Exemestane (6-methylenandrosta-1,4-diene-3,17-dione) | Aromasin | Pharmacia & Upjohn Company |
| Filgrastim (r-metHuG-CSF) | Neupogen | Amgen, Inc |
| floxuridine (intraarterial) (2'-deoxy-5-fluorouridine) | FUDR | Roche |
| Fludarabine (fluorinated nucleotide analog of the antiviral agent vidarabine, 9-b-D-arabinofuranosyladenine (ara-A)) | Fludara | Berlex Laboratories, Inc., Cedar Knolls, NJ |
| Fluorouracil, 5-FU (5-fluoro-2,4(1H,3H)-pyrimidinedione) | Adrucil | ICN Pharmaceuticals, Inc., Humacao, Puerto Rico |
| Fulvestrant (7-alpha-[9-(4,4,5,5,5-penta fluoropentylsulphinyl)nonyl]estra-1,3,5-(10)-triene-3,17-beta-diol) | Faslodex | IPR Pharmaceuticals, Guayama, Puerto Rico |
| Gemcitabine (2'-deoxy-2', 2'-difluorocytidine monohydrochloride (b-isomer)) | Gemzar | Eli Lilly |
| Gemtuzumab Ozogamicin (anti-CD33 hP67.6) | Mylotarg | Wyeth Ayerst |
| Goserelin acetate | Zoladex Implant | AstraZeneca Pharmaceuticals |
| Hydroxyurea | Hydrea | Bristol-Myers Squibb |
| Ibritumomab Tiuxetan (immunoconjugate resulting from a thiourea covalent bond between the monoclonal antibody Ibritumomab and the linker-chelator tiuxetan [N-[2-bis(carboxymethyl)amino]-3-(p-isothiocyanatophenyl)-propyl]-[N-[2-bis(carboxymethyl)amino]-2-(methyl)-ethyl]glycine) | Zevalin | Biogen IDEC, Inc., Cambridge MA |
| Idarubicin (5,12-Naphthacenedione, 9-acetyl-7-[(3-amino-2,3,6-trideoxy-(alpha)-L-lyxo-hexopyranosyl)oxy]-7,8,9,10-tetrahydro-6,9,11-trihydroxyhydrochloride, (7S-cis)) | Idamycin | Pharmacia & Upjohn Company |
| Ifosfamide (3-(2-chloroethyl)-2-[(2-chloroethyl)amino]tetrahydro-2H-1,3,2-oxazaphosphorine 2-oxide) | IFEX | Bristol-Myers Squibb |
| Imatinib Mesilate (4-[(4-Methyl-1-piperazinyl)methyl]-N-[4-methyl-3-[[4-(3-pyridinyl)-2-pyrimidinyl]amino]-phenyl]benzamide methanesulfonate) | Gleevec | Novartis AG, Basel, Switzerland |
| Interferon alfa-2a (recombinant peptide) | Roferon-A | Hoffmann-La Roche, Inc., Nutley, NJ |
| Interferon alfa-2b (recombinant peptide) | Intron A (Lyophilized Betaseron) | Schering AG, Berlin, Germany |
| Irinotecan HCl ((4S)-4,11-diethyl-4-hydroxy-9-[(4-piperi-dinopiperidino)carbonyloxy]-1H-pyrano[3',4': 6,7] indolizino[1,2-b] quinoline-3,14(4H, 12H) dione hydrochloride trihydrate) | Camptosar | Pharmacia & Upjohn Company |
| Letrozole (4,4'-(1H-1,2,4-Triazol-1-ylmethylene) dibenzonitrile) | Femara | Novartis |
| Leucovorin (L-Glutamic acid, N[4[[(2amino-5-formyl-1,4,5,6,7,8 hexahydro4oxo6-pteridinyl)methyl]amino]benzoyl], calcium salt (1:1)) | Wellcovorin, Leucovorin | Immunex, Corp., Seattle, WA |
| Levamisole HCl ((−)-S)-2,3,5,6-tetrahydro-6-phenylimidazo [2,1-b] thiazole monohydrochloride $C_{11}H_{12}N_2S \cdot HCl$ | Ergamisol | Janssen Research Foundation, Titusville, NJ |
| Lomustine (1-(2-chloro-ethyl)-3-cyclohexyl-1-nitrosourea) | CeeNU | Bristol-Myers Squibb |
| Mechlorethamine, nitrogen mustard (2-chloro-N-(2-chloroethyl)-N-methylethanamine hydrochloride) | Mustargen | Merck |
| Megestrol acetate 17a(acetyloxy)-6-methylpregna-4,6-diene-3,20-dione | Megace | Bristol-Myers Squibb |
| Melphalan, L-PAM (4-[bis(2-chloroethyl)amino]-L-phenylalanine) | Alkeran | GlaxoSmithKline |

TABLE 1-continued

| | | |
|---|---|---|
| Mercaptopurine, 6-MP (1,7-dihydro-6H-purine-6-thione monohydrate) | Purinethol | GlaxoSmithKline |
| Mesna (sodium 2-mercaptoethane sulfonate) | Mesnex | Asta Medica |
| Methotrexate (N-[4-[[(2,4-diamino-6-pteridinyl)methyl]methylamino]benzoyl]-L-glutamic acid) | Methotrexate | Lederle Laboratories |
| Methoxsalen (9-methoxy-7H-furo[3,2-g][1]-benzopyran-7-one) | Uvadex | Therakos, Inc., Way Exton, Pa |
| Mitomycin C | Mutamycin | Bristol-Myers Squibb |
| mitomycin C | Mitozytrex | SuperGen, Inc., Dublin, CA |
| Mitotane (1,1-dichloro-2-(o-chlorophenyl)-2-(p-chlorophenyl) ethane) | Lysodren | Bristol-Myers Squibb |
| Mitoxantrone (1,4-dihydroxy-5,8-bis[[2-[(2-hydroxyethyl)amino]ethyl]amino]-9,10-anthracenedione dihydrochloride) | Novantrone | Immunex Corporation |
| Nandrolone phenpropionate | Durabolin-50 | Organon, Inc., West Orange, NJ |
| Nofetumomab | Verluma | Boehringer Ingelheim Pharma KG, Germany |
| Oprelvekin (IL-11) | Neumega | Genetics Institute, Inc., Alexandria, VA |
| Oxaliplatin (cis-[(1R,2R)-1,2-cyclohexanediamine-N,N'][oxalato(2-)-O,O'] platinum) | Eloxatin | Sanofi Synthelabo, Inc., NY, NY |
| Paclitaxel (5β,20-Epoxy-1,2a,4,7β,10β,13a-hexahydroxytax-11-en-9-one 4,10-diacetate 2-benzoate 13-ester with (2R,3S)-N-benzoyl-3-phenylisoserine) | TAXOL | Bristol-Myers Squibb |
| Pamidronate (phosphonic acid (3-amino-1-hydroxypropylidene) bis-, disodium salt, pentahydrate, (APD)) | Aredia | Novartis |
| Pegademase ((monomethoxypolyethylene glycol succinimidyl) 11-17-adenosine deaminase) | Adagen (Pegademase Bovine) | Enzon Pharmaceuticals, Inc., Bridgewater, NJ |
| Pegaspargase (monomethoxypolyethylene glycol succinimidyl L-asparaginase) | Oncaspar | Enzon |
| Pegfilgrastim (covalent conjugate of recombinant methionyl human G-CSF (Filgrastim) and monomethoxypolyethylene glycol) | Neulasta | Amgen, Inc |
| Pentostatin | Nipent | Parke-Davis Pharmaceutical Co., Rockville, MD |
| Pipobroman | Vercyte | Abbott Laboratories, Abbott Park, IL |
| Plicamycin, Mithramycin (antibiotic produced by *Streptomyces plicatus*) | Mithracin | Pfizer, Inc., NY, NY |
| Porfimer sodium | Photofrin | QLT Phototherapeutics, Inc., Vancouver, Canada |
| Procarbazine (N-isopropyl-μ-(2-methylhydrazino)-p-toluamide monohydrochloride) | Matulane | Sigma Tau Pharmaceuticals, Inc., Gaithersburg, MD |
| Quinacrine (6-chloro-9-(1-methyl-4-diethyl-amine) butylamino-2-methoxyacridine) | Atabrine | Abbott Labs |
| Rasburicase (recombinant peptide) | Elitek | Sanofi-Synthelabo, Inc., |
| Rituximab (recombinant anti-CD20 antibody) | Rituxan | Genentech, Inc., South San Francisco, CA |
| Sargramostim (recombinant peptide) | Prokine | Immunex Corp |
| Streptozocin (streptozocin 2-deoxy-2-[[[(methylnitrosoamino)carbonyl]amino]-a(and b)-D-glucopyranose and 220 mg citric acid anhydrous) | Zanosar | Pharmacia & Upjohn Company |
| Talc ($Mg_3Si_4O_{10}(OH)_2$) | Sclerosol | Bryan, Corp., Woburn, MA |
| Tamoxifen | Nolvadex | AstraZeneca |

TABLE 1-continued

| | | |
|---|---|---|
| ((Z)2-[4-(1,2-diphenyl-1-butenyl) phenoxy]-N,N-dimethylethanamine 2-hydroxy-1,2,3-propanetricarboxylate (1:1)) | | Pharmaceuticals |
| Temozolomide (3,4-dihydro-3-methyl-4-oxoimidazo[5,1-d]-as-tetrazine-8-carboxamide) | Temodar | Schering |
| teniposide, VM-26 (4'-demethylepipodophyllotoxin 9-[4,6-0-(R)-2-thenylidene-(beta)-D-glucopyranoside]) | Vumon | Bristol-Myers Squibb |
| Testolactone (13-hydroxy-3-oxo-13,17-secoandrosta-1,4-dien-17-oic acid [dgr]-lactone) | Teslac | Bristol-Myers Squibb |
| Thioguanine, 6-TG (2-amino-1,7-dihydro-6H-purine-6-thione) | Thioguanine | GlaxoSmithKline |
| Thiotepa (Aziridine, 1,1',1''-phosphinothioylidynetris-, or Tris (1-aziridinyl) phosphine sulfide) | Thioplex | Immunex Corporation |
| Topotecan HCl ((S)-10-[(dimethylamino) methyl]-4-ethyl-4,9-dihydroxy-1H-pyrano[3',4':6,7] indolizino [1,2-b] quinoline-3,14-(4H,12H)-dione monohydrochloride) | Hycamtin | GlaxoSmithKline |
| Toremifene (2-(p-[(Z)-4-chloro-1,2-diphenyl-1-butenyl]-phenoxy)-N,N-dimethylethylamine citrate (1:1)) | Fareston | Roberts Pharmaceutical Corp., Eatontown, NJ |
| Tositumomab, I 131 Tositumomab (recombinant murine immunotherapeutic monoclonal $IgG_{2a}$ lambda anti-CD20 antibody (I 131 is a radioimmunotherapeutic antibody)) | Bexxar | Corixa Corp., Seattle, WA |
| Trastuzumab (recombinant monoclonal $IgG_1$ kappa anti-HER2 antibody) | Herceptin | Genentech, Inc |
| Tretinoin, ATRA (all-trans retinoic acid) | Vesanoid | Roche |
| Uracil Mustard | Uracil Mustard Capsules | Roberts Labs |
| Valrubicin, N-trifluoroacetyladriamycin-14-valerate ((2S-cis)-2-[1,2,3,4,6,11-hexahydro-2,5,12-trihydroxy-7 methoxy-6,11-dioxo-[4 2,3,6-trideoxy-3-[(trifluoroacetyl)-amino-α-L-lyxo-hexopyranosyl]oxyl]-2-naphthacenyl]-2-oxoethyl pentanoate) | Valstar | Anthra --> Medeva |
| Vinblastine, Leurocristine ($C_{46}H_{56}N_4O_{10} \cdot H_2SO_4$) | Velban | Eli Lilly |
| Vincristine ($C_{46}H_{56}N_4O_{10} \cdot H_2SO_4$) | Oncovin | Eli Lilly |
| Vinorelbine (3',4'-didehydro-4'-deoxy-C'-norvincaleukoblastine [R-(R*,R*)-2,3-dihydroxybutanedioate (1:2)(salt)]) | Navelbine | GlaxoSmithKline |
| Zoledronate, Zoledronic acid ((1-Hydroxy-2-imidazol-1-yl-phosphonoethyl) phosphonic acid monohydrate) | Zometa | Novartis |

Anticancer agents further include compounds which have been identified to have anticancer activity. Examples include, but are not limited to, 3-AP, 12-O-tetradecanoylphorbol-13-acetate, 17AAG, 852A, ABI-007, ABR-217620, ABT-751, ADI-PEG 20, AE-941, AG-013736, AGRO100, alanosine, AMG 706, antibody G250, antineoplastons, AP23573, apaziquone, APC8015, atiprimod, ATN-161, atrasentan, azacitidine, BB-10901, BCX-1777, bevacizumab, BG00001, bicalutamide, BMS 247550, bortezomib, bryostatin-1, buserelin, calcitriol, CCI-779, CDB-2914, cefixime, cetuximab, CG0070, cilengitide, clofarabine, combretastatin A4 phosphate, CP-675,206, CP-724,714, CpG 7909, curcumin, decitabine, DENSPM, doxercalciferol, E7070, E7389, ecteinascidin 743, efaproxiral, eflornithine, EKB-569, enzastaurin, erlotinib, exisulind, fenretinide, flavopiridol, fludarabine, flutamide, fotemustine, FR901228, G17DT, galiximab, gefitinib, genistein, glufosfamide, GTI-2040, histrelin, HKI-272, homoharringtonine, HSPPC-96, hu14.18-interleukin-2 fusion protein, HuMax-CD4, iloprost, imiquimod, infliximab, interleukin-12, IPI-504, irofulven, ixabepilone, lapatinib, lenalidomide, lestaurtinib, leuprolide, LMB-9 immunotoxin, lonafarnib, luniliximab, mafosfamide, MB07133, MDX-010, MLN2704, monoclonal antibody 3F8, monoclonal antibody J591, motexafin, MS-275, MVA-MUCI-IL2, nilutamide, nitrocamptothecin, nolatrexed dihydrochloride, nolvadex, NS-9, O6-benzylguanine, oblimersen sodium, ONYX-015, oregovomab, OSI-774, panitumumab, paraplatin, PD-0325901, pemetrexed, PHY906, pioglitazone, pirfenidone, pixantrone, PS-341, PSC 833, PXD101, pyrazoloacridine, R115777, RAD001, ranpirnase, rebeccamycin analogue, rhuAngiostatin protein, rhuMab 2C4, rosiglitazone, rubitecan, S-1, S-8184, satraplatin, SB-, 15992, SGN-0010, SGN-40, sorafenib, SR31747A, ST1571, SU011248, suberoylanilide hydroxamic acid, suramin, talabostat, talampanel, tariquidar, temsirolimus, TGFa-PE38 immunotoxin, thalidomide, thymalfasin, tipifarnib, tirapazamine, TLK286, trabectedin, trimetrexate glucuronate, TroVax, UCN-1, valproic acid, vinflunine, VNP40101M, volociximab, vorinostat, VX-680, ZD1839, ZD6474, zileuton, and zosuquidar trihydrochloride.

For a more detailed description of anticancer agents and other therapeutic agents, those skilled in the art are referred to any number of instructive manuals including, but not limited to, the Physician's Desk Reference and to Goodman and Gilman's "Pharmaceutical Basis of Therapeutics" tenth edition, Eds. Hardman et al., 2002.

The present invention provides methods for administering a compound of the invention with radiation therapy. The invention is not limited by the types, amounts, or delivery and administration systems used to deliver the therapeutic dose of radiation to an animal. For example, the animal may receive photon radiotherapy, particle beam radiation therapy, other types of radiotherapies, and combinations thereof. In some embodiments, the radiation is delivered to the animal using a linear accelerator. In still other embodiments, the radiation is delivered using a gamma knife.

The source of radiation can be external or internal to the animal. External radiation therapy is most common and involves directing a beam of high-energy radiation to a tumor site through the skin using, for instance, a linear accelerator. While the beam of radiation is localized to the tumor site, it is nearly impossible to avoid exposure of normal, healthy tissue. However, external radiation is usually well tolerated by animals. Internal radiation therapy involves implanting a radiation-emitting source, such as beads, wires, pellets, capsules, particles, and the like, inside the body at or near the tumor site including the use of delivery systems that specifically target cancer cells (e.g., using particles attached to cancer cell binding ligands). Such implants can be removed following treatment, or left in the body inactive. Types of internal radiation therapy include, but are not limited to, brachytherapy, interstitial irradiation, intracavity irradiation, radioimmunotherapy, and the like.

The animal may optionally receive radiosensitizers (e.g., metronidazole, misonidazole, intra-arterial Budr, intravenous iododeoxyuridine (IudR), nitroimidazole, 5-substituted-4-nitroimidazoles, 2H-isoindolediones, [[(2-bromoethyl)-amino]methyl]-nitro-1H-imidazole-1-ethanol, nitroaniline derivatives, DNA-affinic hypoxia selective cytotoxins, halogenated DNA ligand, 1,2,4 benzotriazine oxides, 2-nitroimidazole derivatives, fluorine-containing nitroazole derivatives, benzamide, nicotinamide, acridine-intercalator, 5-thiotretrazole derivative, 3-nitro-1,2,4-triazole, 4,5-dinitroimidazole derivative, hydroxylated texaphrins, cisplatin, mitomycin, tiripazamine, nitrosourea, mercaptopurine, methotrexate, fluorouracil, bleomycin, vincristine, carboplatin, epirubicin, doxorubicin, cyclophosphamide, vindesine, etoposide, paclitaxel, heat (hyperthermia), and the like), radioprotectors (e.g., cysteamine, aminoalkyl dihydrogen phosphorothioates, amifostine (WR 2721), IL-1, IL-6, and the like). Radiosensitizers enhance the killing of tumor cells. Radioprotectors protect healthy tissue from the harmful effects of radiation.

Any type of radiation can be administered to an animal, so long as the dose of radiation is tolerated by the animal without unacceptable negative side-effects. Suitable types of radiotherapy include, for example, ionizing (electromagnetic) radiotherapy (e.g., X-rays or gamma rays) or particle beam radiation therapy (e.g., high linear energy radiation). Ionizing radiation is defined as radiation comprising particles or photons that have sufficient energy to produce ionization, i.e., gain or loss of electrons (as described in, for example, U.S. Pat. No. 5,770,581 incorporated herein by reference in its entirety). The effects of radiation can be at least partially controlled by the clinician. In one embodiment, the dose of radiation is fractionated for maximal target cell exposure and reduced toxicity.

In one embodiment, the total dose of radiation administered to an animal is about 0.01 Gray (Gy) to about 100 Gy. In another embodiment, about 10 Gy to about 65 Gy (e.g., about 15 Gy, 20 Gy, 25 Gy, 30 Gy, 35 Gy, 40 Gy, 45 Gy, 50 Gy, 55 Gy, or 60 Gy) are administered over the course of treatment. While in some embodiments a complete dose of radiation can be administered over the course of one day, the total dose is ideally fractionated and administered over several days. Desirably, radiotherapy is administered over the course of at least about 3 days, e.g., at least 5, 7, 10, 14, 17, 21, 25, 28, 32, 35, 38, 42, 46, 52, or 56 days (about 1-8 weeks). Accordingly, a daily dose of radiation will comprise approximately 1-5 Gy (e.g., about 1 Gy, 1.5 Gy, 1.8 Gy, 2 Gy, 2.5 Gy, 2.8 Gy, 3 Gy, 3.2 Gy, 3.5 Gy, 3.8 Gy, 4 Gy, 4.2 Gy, or 4.5 Gy), or 1-2 Gy (e.g., 1.5-2 Gy). The daily dose of radiation should be sufficient to induce destruction of the targeted cells. If stretched over a period, in one embodiment, radiation is not administered every day, thereby allowing the animal to rest and the effects of the therapy to be realized. For example, radiation desirably is administered on 5 consecutive days, and not administered on 2 days, for each week of treatment, thereby allowing 2 days of rest per week. However, radiation can be administered 1 day/week, 2 days/week, 3 days/week, 4 days/week, 5 days/week, 6 days/week, or all 7 days/week, depending on the animal's responsiveness and any potential side effects. Radiation therapy can be initiated at any time in the therapeutic period. In one embodiment, radiation is initiated in week 1 or week 2, and is administered for the remaining duration of the therapeutic period. For example, radiation is administered in weeks 1-6 or in weeks 2-6 of a therapeutic period comprising 6 weeks for treating, for instance, a solid tumor. Alternatively, radiation is administered in weeks 1-5 or weeks 2-5 of a therapeutic period comprising 5 weeks. These exemplary radiotherapy administration schedules are not intended, however, to limit the present invention.

Antimicrobial therapeutic agents may also be used as therapeutic agents in the present invention. Any agent that can kill, inhibit, or otherwise attenuate the function of microbial organisms may be used, as well as any agent contemplated to have such activities. Antimicrobial agents include, but are not limited to, natural and synthetic antibiotics, antibodies, inhibitory proteins (e.g., defensins), antisense nucleic acids, membrane disruptive agents and the like, used alone or in combination. Indeed, any type of antibiotic may be used including, but not limited to, antibacterial agents, antiviral agents, antifungal agents, and the like.

In some embodiments of the present invention, a compound of the invention and one or more therapeutic agents or anticancer agents are administered to an animal under one or more of the following conditions: at different periodicities, at different durations, at different concentrations, by different administration routes, etc. In some embodiments, the compound is administered prior to the therapeutic or anticancer agent, e.g., 0.5, 1, 2, 3, 4, 5, 10, 12, or 18 hours, 1, 2, 3, 4, 5, or 6 days, or 1, 2, 3, or 4 weeks prior to the administration of the therapeutic or anticancer agent. In some embodiments, the compound is administered after the therapeutic or anticancer agent, e.g., 0.5, 1, 2, 3, 4, 5, 10, 12, or 18 hours, 1, 2, 3, 4, 5, or 6 days, or 1, 2, 3, or 4 weeks after the administration of the anticancer agent. In some embodiments, the compound and the therapeutic or anticancer agent are administered concurrently but on different schedules, e.g., the compound is administered daily while the therapeutic or anticancer agent is administered once a week, once every two weeks, once every three weeks, or once every four weeks. In other embodiments, the compound is administered once a week while the therapeutic or anticancer agent is administered daily, once a week, once every two weeks, once every three weeks, or once every four weeks.

Compositions within the scope of this invention include all compositions wherein the compounds of the present invention are contained in an amount which is effective to achieve its intended purpose. While individual needs vary, determination of optimal ranges of effective amounts of each component is within the skill of the art. Typically, the compounds may be administered to mammals, e.g. humans, orally at a dose of 0.0025 to 50 mg/kg, or an equivalent amount of the pharmaceutically acceptable salt thereof, per day of the body weight of the mammal being treated for disorders responsive to induction of apoptosis. In one embodiment, about 0.01 to about 25 mg/kg is orally administered to treat, ameliorate, or prevent such disorders. For intramuscular injection, the dose is generally about one-half of the oral dose. For example, a suitable intramuscular dose would be about 0.0025 to about 25 mg/kg, or from about 0.01 to about 5 mg/kg.

The unit oral dose may comprise from about 0.01 to about 1000 mg, for example, about 0.1 to about 100 mg of the compound. The unit dose may be administered one or more times daily as one or more tablets or capsules each containing from about 0.1 to about 10 mg, conveniently about 0.25 to 50 mg of the compound or its solvates.

In a topical formulation, the compound may be present at a concentration of about 0.01 to 100 mg per gram of carrier. In a one embodiment, the compound is present at a concentration of about 0.07-1.0 mg/ml, for example, about 0.1-0.5 mg/ml, and in one embodiment, about 0.4 mg/ml.

In addition to administering the compound as a raw chemical, the compounds of the invention may be administered as part of a pharmaceutical preparation containing suitable pharmaceutically acceptable carriers comprising excipients and auxiliaries which facilitate processing of the compounds into preparations which can be used pharmaceutically. The preparations, particularly those preparations which can be administered orally or topically and which can be used for one type of administration, such as tablets, dragees, slow release lozenges and capsules, mouth rinses and mouth washes, gels, liquid suspensions, hair rinses, hair gels, shampoos and also preparations which can be administered rectally, such as suppositories, as well as suitable solutions for administration by intravenous infusion, injection, topically or orally, contain from about 0.01 to 99 percent, in one embodiment from about 0.25 to 75 percent of active compound(s), together with the excipient.

The pharmaceutical compositions of the invention may be administered to any patient which may experience the beneficial effects of the compounds of the invention. Foremost among such patients are mammals, e.g., humans, although the invention is not intended to be so limited. Other patients include veterinary animals (cows, sheep, pigs, horses, dogs, cats and the like).

The compounds and pharmaceutical compositions thereof may be administered by any means that achieve their intended purpose. For example, administration may be by parenteral, subcutaneous, intravenous, intramuscular, intraperitoneal, transdermal, buccal, intrathecal, intracranial, intranasal or topical routes. Alternatively, or concurrently, administration may be by the oral route. The dosage administered will be dependent upon the age, health, and weight of the recipient, kind of concurrent treatment, if any, frequency of treatment, and the nature of the effect desired.

The pharmaceutical preparations of the present invention are manufactured in a manner which is itself known, for example, by means of conventional mixing, granulating, dragee-making, dissolving, or lyophilizing processes. Thus, pharmaceutical preparations for oral use can be obtained by combining the active compounds with solid excipients, optionally grinding the resulting mixture and processing the mixture of granules, after adding suitable auxiliaries, if desired or necessary, to obtain tablets or dragee cores.

Suitable excipients are, in particular, fillers such as saccharides, for example lactose or sucrose, mannitol or sorbitol, cellulose preparations and/or calcium phosphates, for example tricalcium phosphate or calcium hydrogen phosphate, as well as binders such as starch paste, using, for example, maize starch, wheat starch, rice starch, potato starch, gelatin, tragacanth, methyl cellulose, hydroxypropylmethylcellulose, sodium carboxymethylcellulose, and/or polyvinyl pyrrolidone. If desired, disintegrating agents may be added such as the above-mentioned starches and also carboxymethyl-starch, cross-linked polyvinyl pyrrolidone, agar, or alginic acid or a salt thereof, such as sodium alginate. Auxiliaries are, above all, flow-regulating agents and lubricants, for example, silica, talc, stearic acid or salts thereof, such as magnesium stearate or calcium stearate, and/or polyethylene glycol. Dragee cores are provided with suitable coatings which, if desired, are resistant to gastric juices. For this purpose, concentrated saccharide solutions may be used, which may optionally contain gum arabic, talc, polyvinyl pyrrolidone, polyethylene glycol and/or titanium dioxide, lacquer solutions and suitable organic solvents or solvent mixtures. In order to produce coatings resistant to gastric juices, solutions of suitable cellulose preparations such as acetylcellulose phthalate or hydroxypropylmethylcellulose phthalate, are used. Dye stuffs or pigments may be added to the tablets or dragee coatings, for example, for identification or in order to characterize combinations of active compound doses.

Other pharmaceutical preparations which can be used orally include push-fit capsules made of gelatin, as well as soft, sealed capsules made of gelatin and a plasticizer such as glycerol or sorbitol. The push-fit capsules can contain the active compounds in the form of granules which may be mixed with fillers such as lactose, binders such as starches, and/or lubricants such as talc or magnesium stearate and, optionally, stabilizers. In soft capsules, the active compounds are in one embodiment dissolved or suspended in suitable liquids, such as fatty oils, or liquid paraffin. In addition, stabilizers may be added.

Possible pharmaceutical preparations which can be used rectally include, for example, suppositories, which consist of a combination of one or more of the active compounds with a suppository base. Suitable suppository bases are, for example, natural or synthetic triglycerides, or paraffin hydrocarbons. In addition, it is also possible to use gelatin rectal capsules which consist of a combination of the active compounds with a base. Possible base materials include, for example, liquid triglycerides, polyethylene glycols, or paraffin hydrocarbons.

Suitable formulations for parenteral administration include aqueous solutions of the active compounds in water-soluble form, for example, water-soluble salts and alkaline solutions. In addition, suspensions of the active compounds as appropriate oily injection suspensions may be administered. Suitable lipophilic solvents or vehicles include fatty oils, for example, sesame oil, or synthetic fatty acid esters, for example, ethyl oleate or triglycerides or polyethylene glycol-400. Aqueous injection suspensions may contain substances which increase the viscosity of the suspension include, for example, sodium carboxymethyl cellulose, sorbitol, and/or dextran. Optionally, the suspension may also contain stabilizers.

The topical compositions of this invention are formulated in one embodiment as oils, creams, lotions, ointments and the like by choice of appropriate carriers. Suitable carriers include vegetable or mineral oils, white petrolatum (white soft paraffin), branched chain fats or oils, animal fats and high molecular weight alcohol (greater than $C_{12}$). The carriers may be those in which the active ingredient is soluble. Emulsifiers, stabilizers, humectants and antioxidants may also be included as well as agents imparting color or fragrance, if desired. Additionally, transdermal penetration enhancers can be employed in these topical formulations. Examples of such enhancers can be found in U.S. Pat. Nos. 3,989,816 and 4,444,762; each herein incorporated by reference in its entirety.

Ointments may be formulated by mixing a solution of the active ingredient in a vegetable oil such as almond oil with warm soft paraffin and allowing the mixture to cool. A typical example of such an ointment is one which includes about 30% almond oil and about 70% white soft paraffin by weight. Lotions may be conveniently prepared by dissolving the active ingredient, in a suitable high molecular weight alcohol such as propylene glycol or polyethylene glycol.

One of ordinary skill in the art will readily recognize that the foregoing represents merely a detailed description of certain preferred embodiments of the present invention. Various modifications and alterations of the compositions and methods described above can readily be achieved using expertise available in the art and are within the scope of the invention.

EXAMPLES

The following examples are illustrative, but not limiting, of the compounds, compositions, and methods of the present invention. Other suitable modifications and adaptations of the variety of conditions and parameters normally encountered in clinical therapy and which are obvious to those skilled in the art are within the spirit and scope of the invention.

Example I

Tables II, III and IV show % inhibition against AR activity at 10 μm within a GeneBlazer assay, and $IC_{50}$ values (nM) in GeneBlazer assay.

TABLE II

TABLE II-continued
Compound:
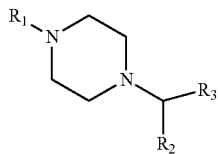
| | R₁ | R₂ | R₃ |
|---|---|---|---|
| 4 | 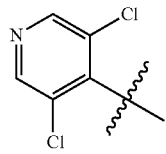 [SMILES: *c1c(Cl)cncc1Cl] | 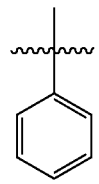 [SMILES: *c1ccccc1] | 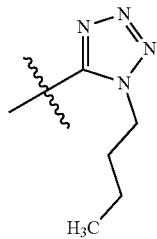 [SMILES: *c1nnnn1CCCC] |
| 5 | 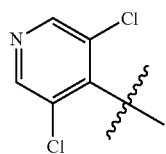 | —H | 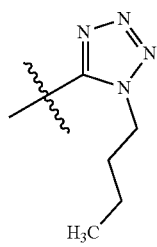 [SMILES: *c1nnnn1CCCC] |
| 6 | 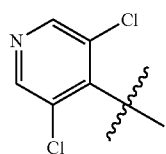 [SMILES: *c1c(Cl)cncc1Cl] | —CH₃ | 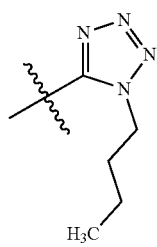 [SMILES: *c1nnnn1CCCC] |
| 7 | 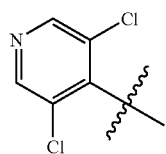 | 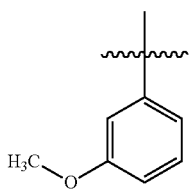 [SMILES: *c1cccc(OC)c1] | 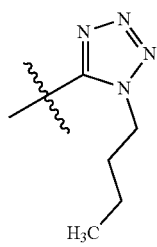 [SMILES: *c1nnnn1CCCC] |
| 8 | 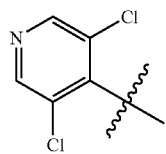 [SMILES: *c1c(Cl)cncc1Cl] | 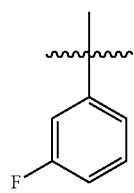 | 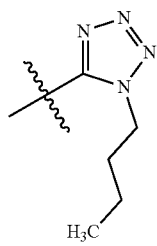 |

TABLE II-continued

Compound:

R₁-N(piperazine)N-CH(R₂)(R₃)

| # | R₁ | R₂ | R₃ |
|---|----|----|----|
| 9 | 3,5-dichloropyridin-4-yl | thiophen-2-yl | 1-tert-butyl-1H-tetrazol-5-yl |
| 10 | 3,5-dichloropyridin-4-yl | thiophen-2-yl | 1-butyl-1H-tetrazol-5-yl |
| 11 | 3,5-dichloropyridin-4-yl | benzo[d][1,3]dioxol-5-yl | 1-butyl-1H-tetrazol-5-yl |
| 12 | 3,5-dichloropyridin-4-yl | 1H-indol-5-yl | 1-butyl-1H-tetrazol-5-yl |
| 13 | 3,5-dichloropyridin-4-yl | 3-hydroxyphenyl | 1-propyl-1H-tetrazol-5-yl |
| 14 | 3,5-dichloropyridin-4-yl | 3-hydroxyphenyl | 1-ethyl-1H-tetrazol-5-yl |

TABLE II-continued

| Compound: | R₁ | R₂ | R₃ |
|---|---|---|---|
| 15 | 3,5-dichloropyridin-4-yl | 3-hydroxyphenyl | 1-isopropyl-1H-tetrazol-5-yl |
| 16 | 3,5-dichloropyridin-4-yl | 3-hydroxyphenyl | 1-tert-butyl-1H-tetrazol-5-yl |
| 17 | 3,5-dichloropyridin-4-yl | 3-hydroxyphenyl | 1-cyclopentyl-1H-tetrazol-5-yl |
| 18 | 3,5-dichloropyridin-4-yl | 3-hydroxyphenyl | 1-cyclohexyl-1H-tetrazol-5-yl |
| 19 | 3,5-dichloropyridin-4-yl | 3-hydroxyphenyl | 1-benzyl-1H-tetrazol-5-yl |
| 20 | 3,5-dichloropyridin-4-yl | 3-hydroxyphenyl | 1-(2,6-dimethylphenyl)-1H-tetrazol-5-yl |
| 21 | 3,5-dichloropyridin-4-yl | 3-hydroxyphenyl | N-butylcarbamoyl-methyl |

TABLE II-continued
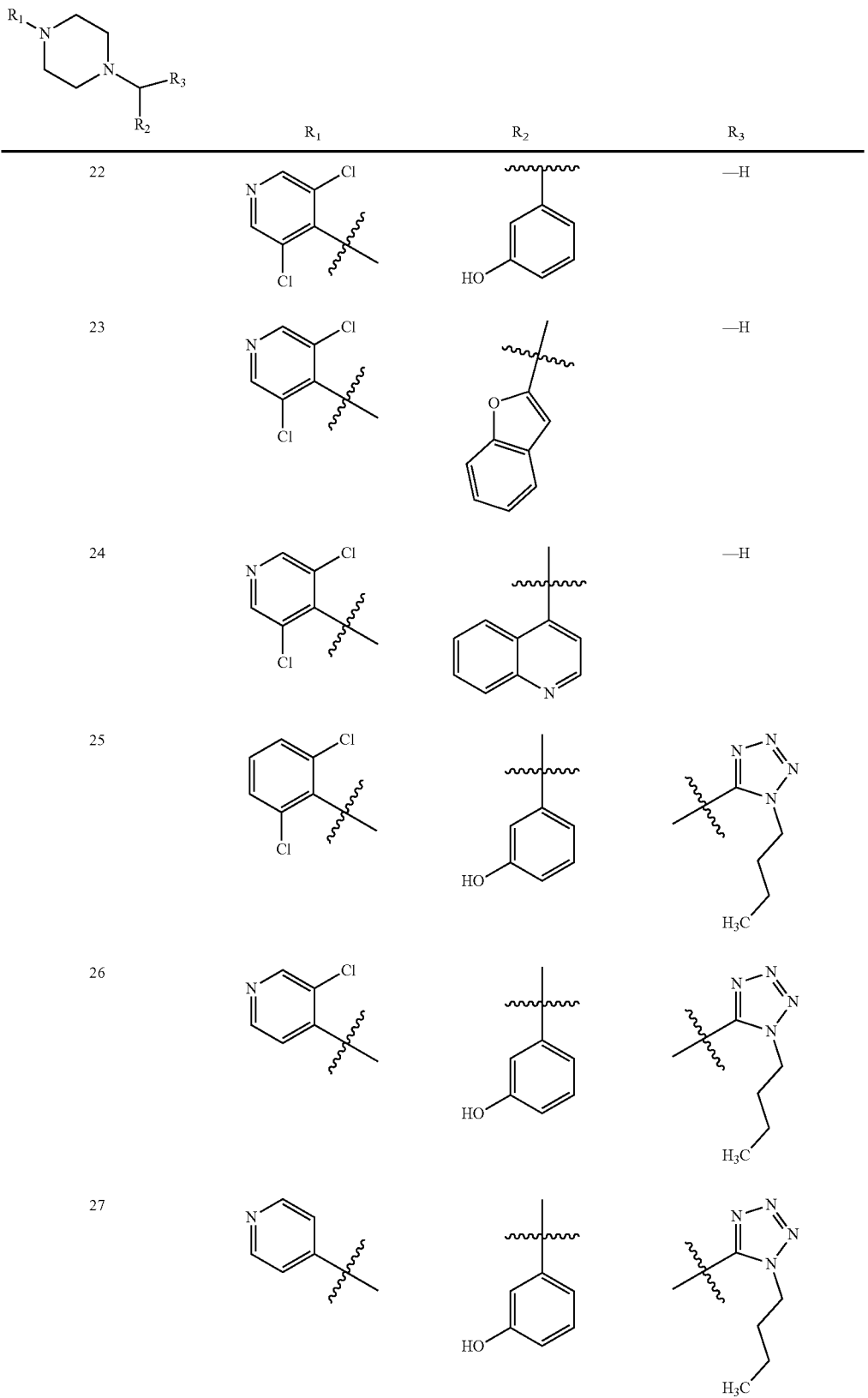

TABLE II-continued
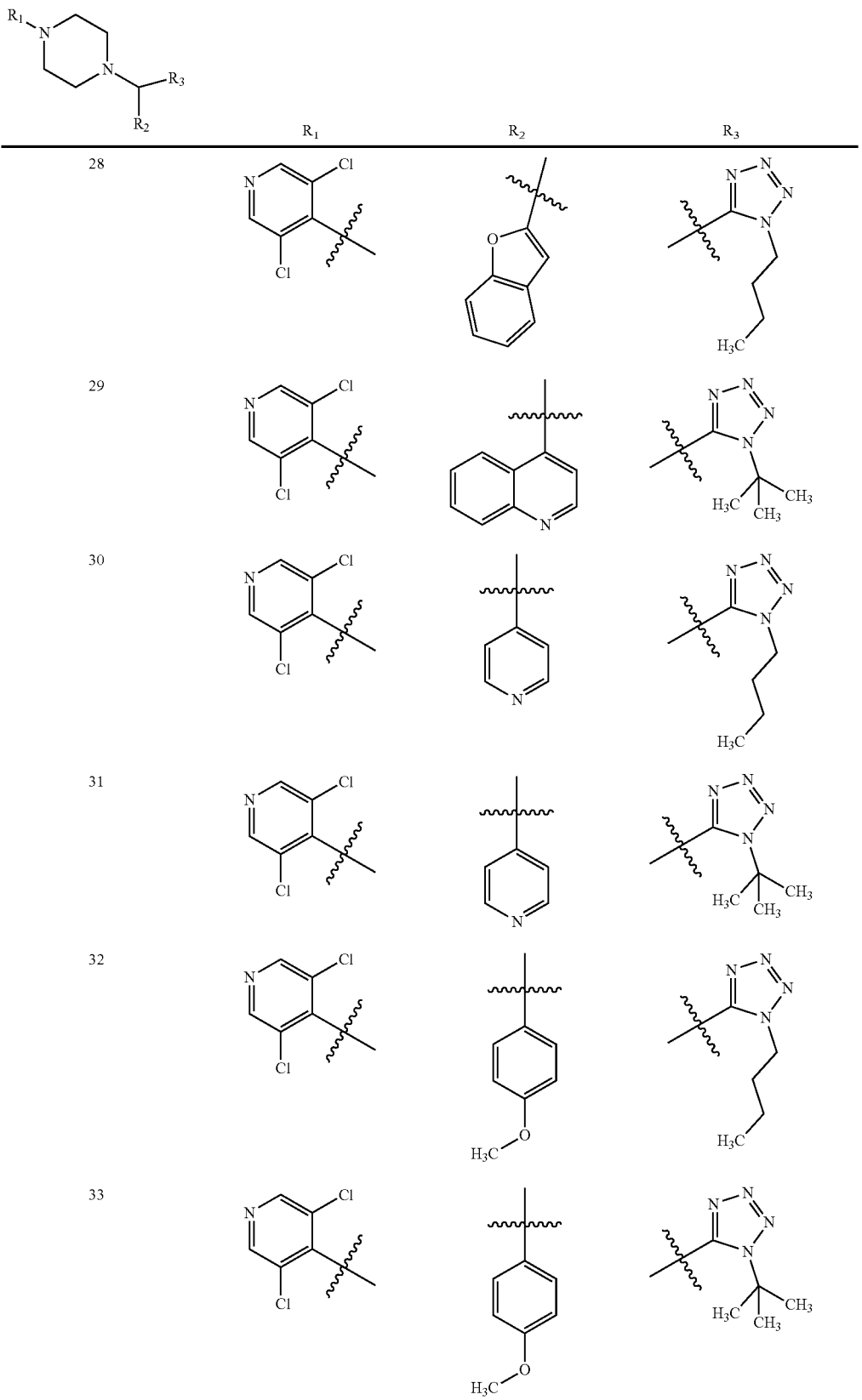

TABLE II-continued

| Compound: | R₁ | R₂ | R₃ |
|---|---|---|---|
| 34 | 3,5-dichloropyridin-4-yl | 4-cyanophenyl | 1-butyl-1H-tetrazol-5-yl |
| 35 | 3,5-dichloropyridin-4-yl | 4-cyanophenyl | 1-tert-butyl-1H-tetrazol-5-yl |
| 36 | 3,5-dichloropyridin-4-yl | 4-fluorophenyl | 1-butyl-1H-tetrazol-5-yl |
| 37 | 3,5-dichloropyridin-4-yl | 4-fluorophenyl | 1-tert-butyl-1H-tetrazol-5-yl |
| 38 | 3,5-dichloropyridin-4-yl | naphthalen-1-yl | 1-butyl-1H-tetrazol-5-yl |
| 39 | 3,5-dichloropyridin-4-yl | naphthalen-1-yl | 1-tert-butyl-1H-tetrazol-5-yl |

TABLE II-continued

| Compound: | R₁ | R₂ | R₃ |
|---|---|---|---|
| 40 | 3,5-dichloropyridin-4-yl | naphthalen-2-yl | 1-butyl-1H-tetrazol-5-yl |
| 41 | 3,5-dichloropyridin-4-yl | naphthalen-2-yl | 1-tert-butyl-1H-tetrazol-5-yl |
| 42 | | | |
| | 3,5-dichloropyridin-4-yl | (E)-styryl | 1-butyl-1H-tetrazol-5-yl |
| 43 | 3,5-dichloropyridin-4-yl | (E)-styryl | 1-tert-butyl-1H-tetrazol-5-yl |
| 44 | 3,5-dichloropyridin-4-yl | phenoxymethyl | 1-butyl-1H-tetrazol-5-yl |

TABLE II-continued

Compound:

| | R₁ | R₂ | R₃ |
|---|---|---|---|
| 45 | 3,5-dichloropyridin-4-yl | phenoxymethyl | 1-tert-butyl-1H-tetrazol-5-yl |
| 46 | 3,5-dichloropyridin-4-yl | 1H-indol-2-yl | 1-butyl-1H-tetrazol-5-yl |
| 47 | 3,5-dichloropyridin-4-yl | 1H-indol-2-yl | 1-tert-butyl-1H-tetrazol-5-yl |
| 48 | 3,5-dichloropyridin-4-yl | 5-methylfuran-2-yl | 1-butyl-1H-tetrazol-5-yl |
| 49 | 3,5-dichloropyridin-4-yl | 5-methylfuran-2-yl | 1-tert-butyl-1H-tetrazol-5-yl |
| 50 | 3,5-dichloropyridin-4-yl | furan-2-yl | 1-isopropyl-1H-tetrazol-5-yl |

TABLE II-continued

Compound:

| | R₁ | R₂ | R₃ |
|---|---|---|---|
| 51 | 3,5-dichloropyridin-4-yl | quinolin-4-yl | 1-isopropyl-1H-tetrazol-5-yl |
| 52 | 3,5-dichloropyridin-4-yl | butyl | 1-isopropyl-1H-tetrazol-5-yl |
| 53 | 3,5-dichloropyridin-4-yl | 3-hydroxyphenyl | 1-(2-methoxy-2-oxoethyl)-1H-tetrazol-5-yl |
| 54 | 4-fluorophenyl | 3-hydroxyphenyl | 1-butyl-1H-tetrazol-5-yl |
| 55 | 2,6-dimethylphenyl | 3-hydroxyphenyl | 1-butyl-1H-tetrazol-5-yl |
| 56 | tert-butyl 2-methylpropanoate | 3-hydroxyphenyl | 1-butyl-1H-tetrazol-5-yl |

TABLE II-continued
Compound:
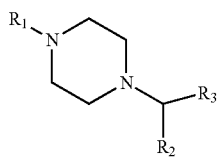
| | R₁ | R₂ | R₃ |
|---|---|---|---|
| 57 | 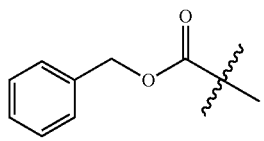 [SMILES: *C(=O)OCc1ccccc1] | 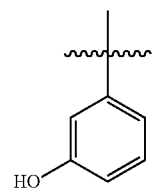 [SMILES: *c1cccc(O)c1] | 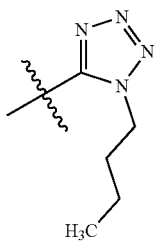 [SMILES: *c1nnnn1CCCC] |
| 58 | 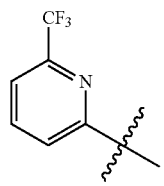 [SMILES: *c1cccc(C(F)(F)F)n1] | 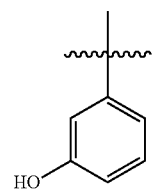 [SMILES: *c1cccc(O)c1] | 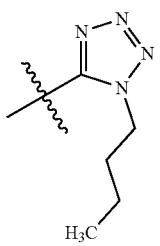 [SMILES: *c1nnnn1CCCC] |
| 59 | 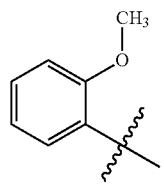 [SMILES: *c1ccccc1OC] | 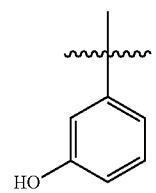 [SMILES: *c1cccc(O)c1] | 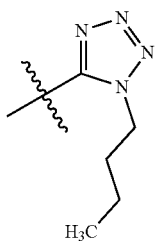 [SMILES: *c1nnnn1CCCC] |
| 60 | 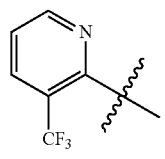 [SMILES: *c1ncccc1C(F)(F)F] | 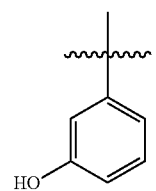 [SMILES: *c1cccc(O)c1] | 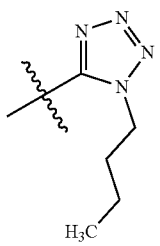 [SMILES: *c1nnnn1CCCC] |
| 61 | 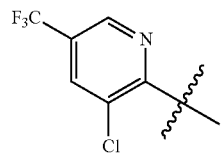 [SMILES: *c1ncc(C(F)(F)F)cc1Cl] | 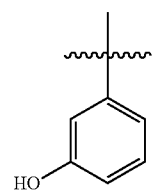 [SMILES: *c1cccc(O)c1] | 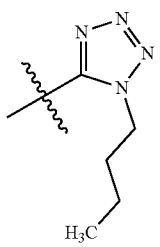 |

TABLE II-continued

Compound:

| | $R_1$ | $R_2$ | $R_3$ |
|---|---|---|---|
| 62 | pyridin-2-yl-methyl | 3-hydroxyphenyl | 1-butyl-1H-tetrazol-5-yl |
| 63 | 1-(4-acetylphenyl)ethyl | 3-hydroxyphenyl | 1-butyl-1H-tetrazol-5-yl |
| 65 | 1-(2-fluorophenyl)ethyl | 3-hydroxyphenyl | 1-butyl-1H-tetrazol-5-yl |
| 66 | 1-(2,3-dimethylphenyl)ethyl | 3-hydroxyphenyl | 1-butyl-1H-tetrazol-5-yl |
| 67 | 1-phenylethyl | 3-hydroxyphenyl | 1-butyl-1H-tetrazol-5-yl |
| 68 | (E)-4-phenylbut-3-en-2-yl | 3-hydroxyphenyl | 1-tert-butyl-1H-tetrazol-5-yl |

TABLE II-continued
Compound:
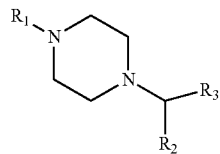
| | R₁ | R₂ | R₃ |
|---|---|---|---|
| 69 | 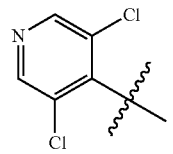 [SMILES: *c1c(Cl)cncc1Cl] | 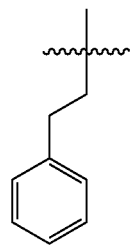 [SMILES: *CCc1ccccc1] | 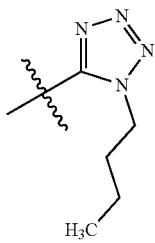 [SMILES: *c1nnnn1CCCC] |
| 70 | 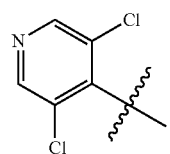 [SMILES: *c1c(Cl)cncc1Cl] | 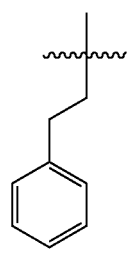 [SMILES: *CCc1ccccc1] | 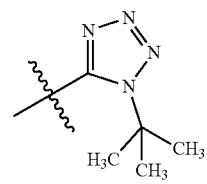 [SMILES: *c1nnnn1C(C)(C)C] |
| 71 | 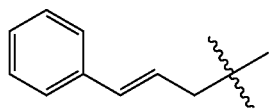 [SMILES: *C/C=C/c1ccccc1] | 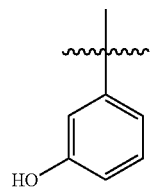 [SMILES: *c1cccc(O)c1] | 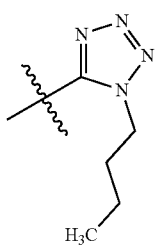 [SMILES: *c1nnnn1CCCC] |
| 72 | 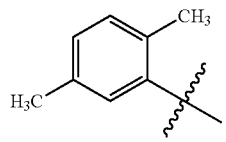 | 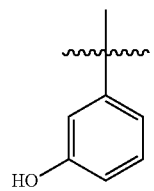 [SMILES: *c1cccc(O)c1] | 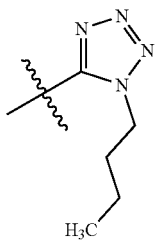 [SMILES: *c1nnnn1CCCC] |
| 73 | 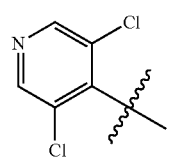 [SMILES: *c1c(Cl)cncc1Cl] | 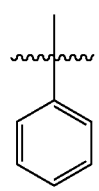 [SMILES: *c1ccccc1] | 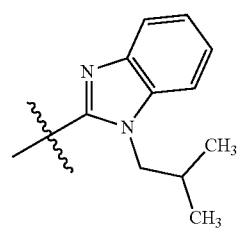 [SMILES: *c1nc2ccccc2n1CC(C)C] |

TABLE II-continued

Compound:

| | R₁ | R₂ | R₃ |
|---|---|---|---|
| 74 | 3,5-dichloropyridin-4-yl | pyridin-3-yl | 1-isobutyl-1H-benzimidazol-2-yl |
| 75 | 3,5-dichloropyridin-4-yl | pyridin-3-yl | 1-methyl-1H-benzimidazol-2-yl |
| 78 | 3-chloro-5-(trifluoromethyl)pyridin-2-yl | 3-methoxyphenyl | 1-tert-butyl-1H-tetrazol-5-yl |
| 79 | 3-chloro-5-(trifluoromethyl)pyridin-2-yl | quinolin-4-yl | 1-tert-butyl-1H-tetrazol-5-yl |
| 80 | 2,4-dimethylphenyl | 3-methoxyphenyl | 1-tert-butyl-1H-tetrazol-5-yl |
| 81 | 2,4-dimethylphenyl | quinolin-4-yl | 1-tert-butyl-1H-tetrazol-5-yl |
| 82 | 3,5-dichloropyridin-4-yl | 3-methoxyphenyl | -C(CH₃)(COOH)- |

TABLE II-continued

| Compound: | R₁ | R₂ | R₃ |
|---|---|---|---|
| 83 | 3,5-dichloropyridin-4-yl | 3-methoxyphenyl | —CN |
| 84 | 3,5-dichloropyridin-4-yl | 3-methoxyphenyl | 2-hydroxy-1,1-dimethylethyl |
| 85 | 3,5-dichloropyridin-4-yl | 3-methoxyphenyl | oxazol-2-yl |
| 86 | 3-chloro-5-(trifluoromethyl)pyridin-2-yl | benzofuran-2-yl | 1-tert-butyl-1H-tetrazol-5-yl |
| 87 | 3-chloro-5-(trifluoromethyl)pyridin-2-yl | benzofuran-2-yl | 1-butyl-1H-tetrazol-5-yl |
| 88 | 2-methoxyphenyl | benzofuran-2-yl | 1-tert-butyl-1H-tetrazol-5-yl |

TABLE II-continued
Compound:
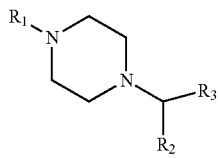
| | R₁ | R₂ | R₃ |
|---|---|---|---|
| 89 | 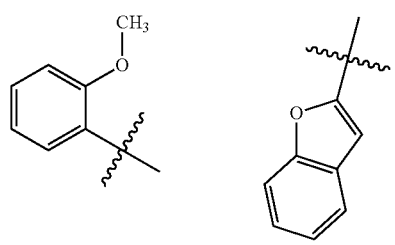 | | |
| 90 | 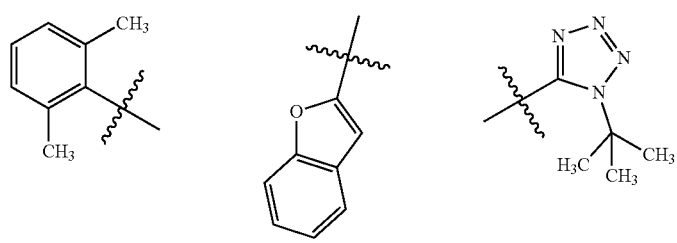 | | |
| 91 | 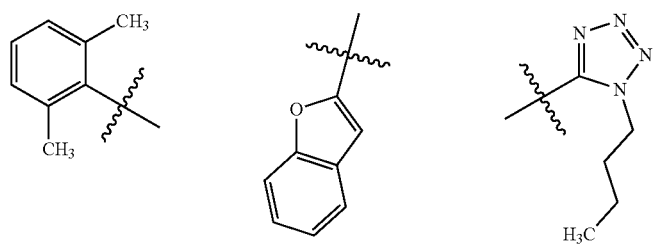 | | |
| 92 | 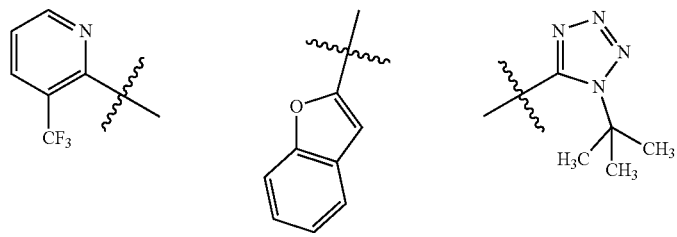 | | |
| 93 | 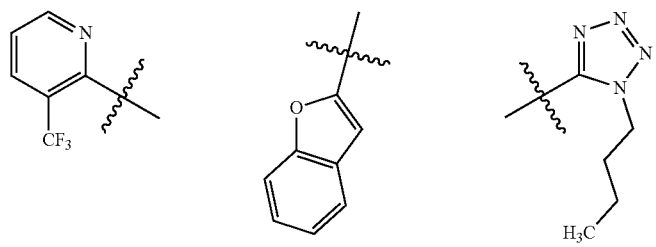 | | |

TABLE II-continued
Compound:
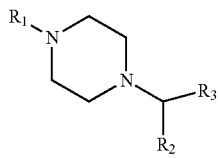
| | R₁ | R₂ | R₃ |
|---|---|---|---|
| 94 | 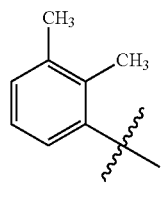 [SMILES: *c1cccc(C)c1C] | 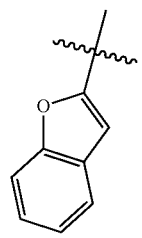 [SMILES: *c1cc2ccccc2o1] | 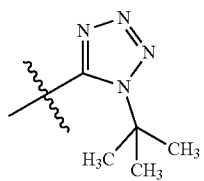 |
| 95 | 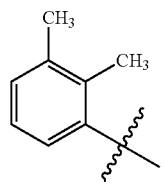 [SMILES: *c1cccc(C)c1C] | 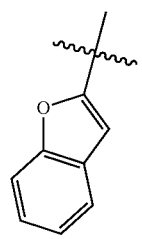 [SMILES: *c1cc2ccccc2o1] | 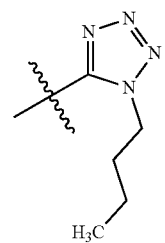 [SMILES: *c1nnnn1CCCC] |
| 96 | 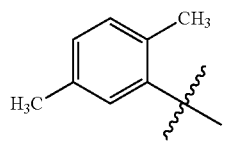 | 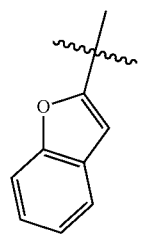 [SMILES: *c1cc2ccccc2o1] | 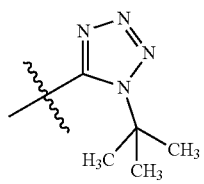 |
| 97 | 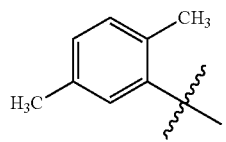 | 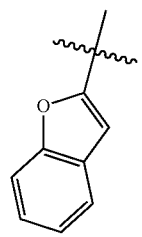 [SMILES: *c1cc2ccccc2o1] | 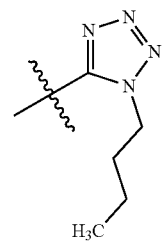 |
| 100 | 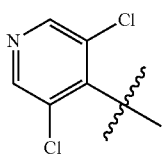 [SMILES: *c1c(Cl)cncc1Cl] | 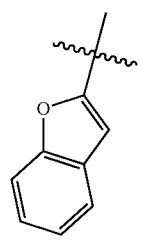 [SMILES: *c1cc2ccccc2o1] | 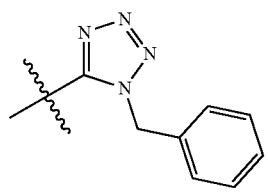 [SMILES: *c1nnnn1Cc1ccccc1] |

TABLE II-continued
Compound:
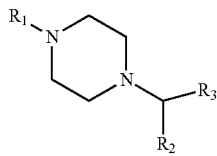
| | R₁ | R₂ | R₃ |
|---|---|---|---|
| 101 | 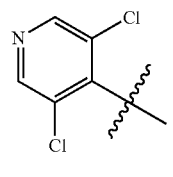 | 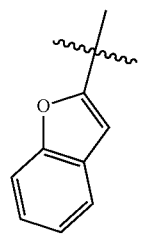 [SMILES: *c1cc2ccccc2o1] | 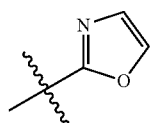 [SMILES: *c1ncco1] |
| 102 | 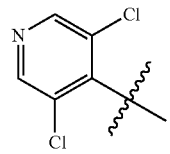 | 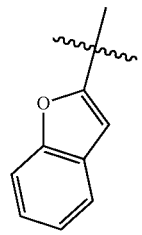 [SMILES: *c1cc2ccccc2o1] | 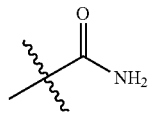 [SMILES: *C(N)=O] |
| 103 | 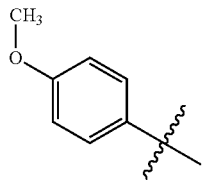 [SMILES: *c1ccc(OC)cc1] | 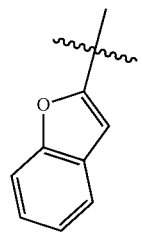 [SMILES: *c1cc2ccccc2o1] | 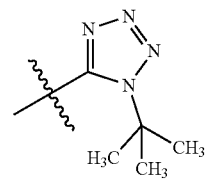 |
| 104 | 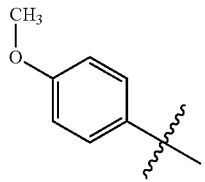 [SMILES: *c1ccc(OC)cc1] | 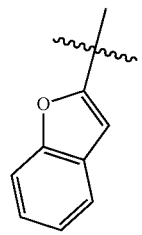 [SMILES: *c1cc2ccccc2o1] | 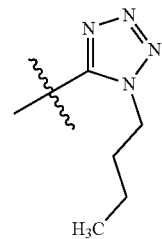 |
| 105 | 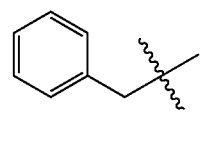 [SMILES: *Cc1ccccc1] | 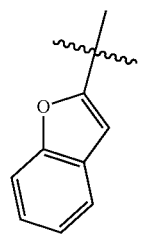 [SMILES: *c1cc2ccccc2o1] | 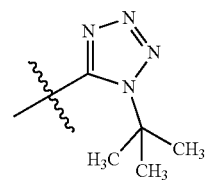 |

TABLE II-continued
Compound:
| | R₁ | R₂ | R₃ |
|---|---|---|---|
| 106 | 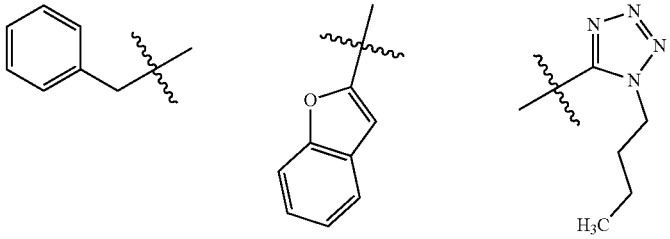 | 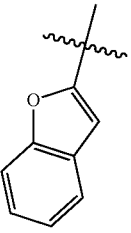 [SMILES: *c1cc2ccccc2o1] | 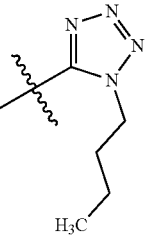 |
| 109 | 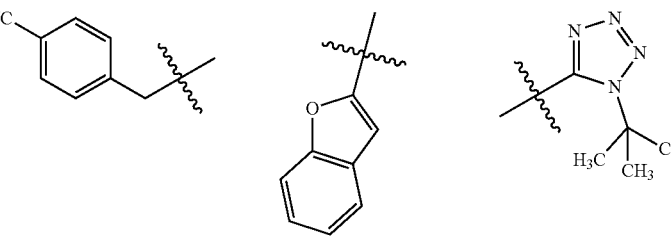 | 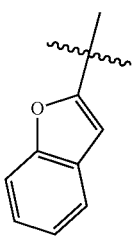 [SMILES: *c1cc2ccccc2o1] | 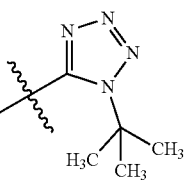 |
| 110 | 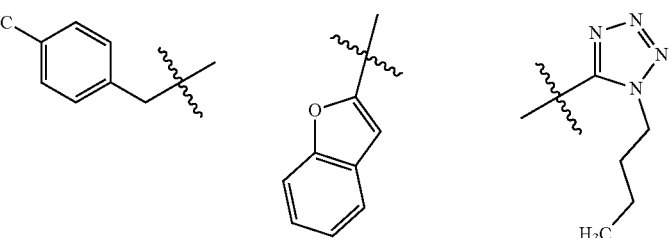 | 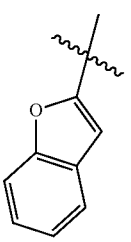 [SMILES: *c1cc2ccccc2o1] | 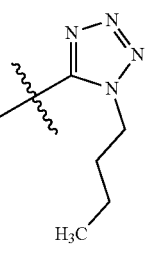 |
| 111 | 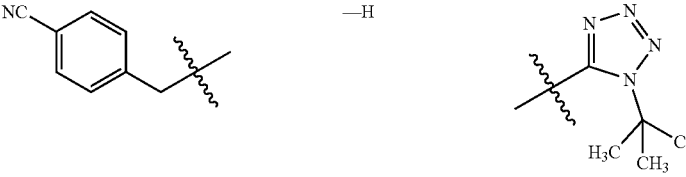 | —H | 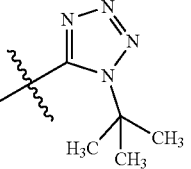 |
| 112 | 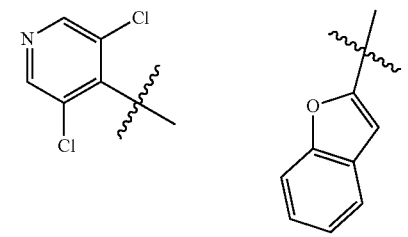 | 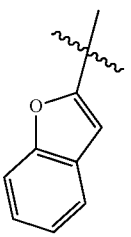 [SMILES: *c1cc2ccccc2o1] | —H |
| 113 | 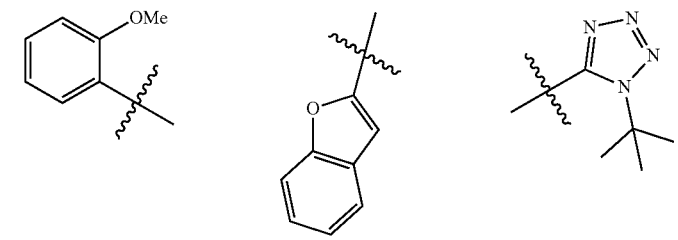 | 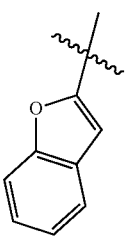 [SMILES: *c1cc2ccccc2o1] | 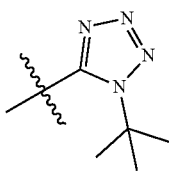 [SMILES: *c1nnnn1C(C)(C)C] |

TABLE II-continued
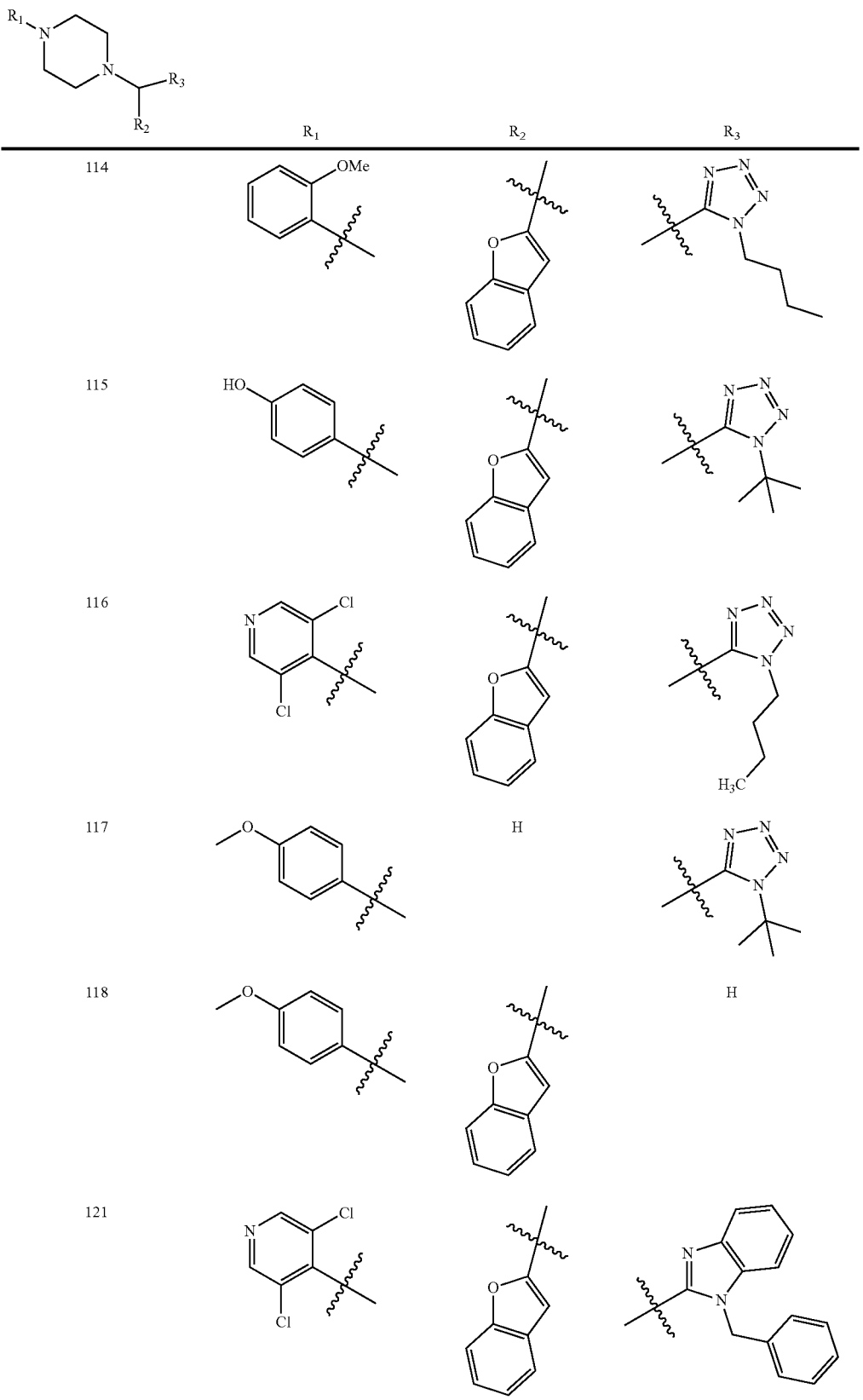

TABLE II-continued

| Compound: | R₁ | R₂ | R₃ |
|---|---|---|---|
| 122 | 4-methoxyphenyl | benzofuran-2-yl | 5-butyl-1,3,4-oxadiazol-2-yl |
| 123 | 4-methoxyphenyl | benzofuran-2-yl | 5-tert-butyl-1,3,4-oxadiazol-2-yl |
| 124 | 4-methoxyphenyl | benzofuran-2-yl | 4-butyl-4H-1,2,4-triazol-3-yl |
| 125 | 4-methoxyphenyl | benzofuran-2-yl | 1-benzyl-1H-1,2,3-triazol-4-yl |

| Compound: | % Inhibition against AR at 10 uM - GeneBlazer Assay | IC$_{50}$ value (nM) - GeneBlazer Assay |
|---|---|---|
| 1 | 81.5 | 45.9 |
| 2 | 108.1 | 557 |
| 3 | 109.8 | 523 |
| 4 | 101.4 | -- |
| 5 | 95.2 | 1710 |
| 6 | 95.3 | -- |
| 7 | 107.7 | -- |
| 8 | 95.3 | -- |
| 9 | 104.4 | -- |
| 10 | 98.2 | -- |
| 11 | 98.4 | -- |
| 12 | 93.9 | -- |

TABLE II-continued
Compound:
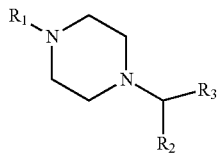
| | R₁ | R₂ | R₃ |
|---|---|---|---|
| 13 | | -- | -- |
| 14 | | -- | -- |
| 15 | | 86.0 | -- |
| 16 | | 102.5 | -- |
| 17 | | 108.2 | -- |
| 18 | | 110.2 | -- |
| 19 | | 119.5 | 134 |
| 20 | | 111.0 | -- |
| 21 | | 93.0 | -- |
| 22 | | 68.1 | -- |
| 23 | | 101.3 | -- |
| 24 | | -- | -- |
| 25 | | 98.0 | 1600 |
| 26 | | -- | -- |
| 27 | | 1.04 | -- |
| 28 | | 96.8 | -- |
| 29 | | 108.5 | -- |
| 30 | | 100.3 | -- |
| 31 | | 91.4 | -- |
| 32 | | 91.6 | -- |
| 33 | | 97.5 | -- |
| 34 | | 99.8 | -- |
| 35 | | 106.2 | -- |
| 36 | | 102.2 | -- |
| 37 | | 111.2 | -- |
| 38 | | 97.6 | -- |
| 39 | | 106.6 | -- |
| 40 | | 87.6 | -- |
| 41 | | 107.8 | -- |
| 42 | | 46.1 | -- |
| 43 | | 111.3 | --- |
| 44 | | -- | -- |
| 45 | | -- | -- |
| 46 | | 102.3 | 381 |
| 47 | | 113.8 | 182 |
| 48 | | 100.1 | -- |
| 49 | | 100.2 | -- |
| 50 | | 96.7 | -- |
| 51 | | 100.6 | -- |
| 52 | | 95.8 | -- |
| 53 | | 72.4 | -- |
| 54 | | 51.3 | -- |
| 55 | | 109.4 | -- |
| 56 | | 24.6 | -- |
| 57 | | 24.9 | -- |
| 58 | | 58.4 | -- |
| 59 | | 94.5 | -- |
| 60 | | 104.7 | -- |
| 61 | | 101.7 | 2270 |
| 62 | | 19.9 | -- |
| 63 | | 47.9 | -- |
| 65 | | 79.8 | -- |
| 66 | | 106.1 | -- |
| 67 | | 63.9 | -- |
| 68 | | 17.2 | -- |
| 69 | | 96.0 | -- |
| 70 | | 109.2 | 1280 |
| 71 | | 11.9 | -- |
| 72 | | 112.2 | 790 |
| 73 | | -- | -- |
| 74 | | -- | -- |
| 75 | | -- | -- |
| 78 | | -- | -- |
| 79 | | -- | -- |
| 80 | | -- | -- |
| 81 | | -- | -- |
| 82 | | -- | -- |
| 83 | | -- | -- |
| 84 | | -- | -- |

TABLE II-continued
Compound:
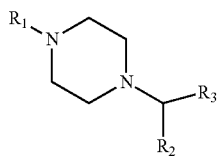
| | R₁ | R₂ | R₃ |
|---|---|---|---|
| 85 | | -- | -- |
| 86 | | -- | -- |
| 87 | | -- | -- |
| 88 | | -- | -- |
| 89 | | -- | -- |
| 90 | | -- | -- |
| 91 | | -- | -- |
| 92 | | -- | -- |
| 93 | | -- | -- |
| 94 | | -- | -- |
| 95 | | -- | -- |
| 96 | | -- | -- |
| 97 | | -- | -- |
| 100 | | -- | -- |
| 101 | | -- | -- |
| 102 | | -- | -- |
| 103 | | -- | -- |
| 104 | | -- | -- |
| 105 | | -- | -- |
| 106 | | -- | -- |
| 109 | | -- | -- |
| 110 | | -- | -- |
| 111 | | -- | -- |
| 112 | | -- | -- |
| 113 | | -- | -- |
| 114 | | -- | -- |
| 115 | | -- | -- |
| 116 | | -- | -- |
| 117 | | -- | -- |
| 118 | | -- | -- |
| 121 | | -- | -- |
| 122 | | -- | -- |
| 123 | | -- | -- |
| 124 | | -- | -- |
| 125 | | -- | -- |
TABLE III
Compound
| | R₁ | R₂ | R₃ | % Inhibition against AR at 10 uM - GeneBlazer Assay | IC₅₀ value (nM) - GeneBlazer Assay |
|---|---|---|---|---|---|
| 64 | | | | 83.9 | -- |
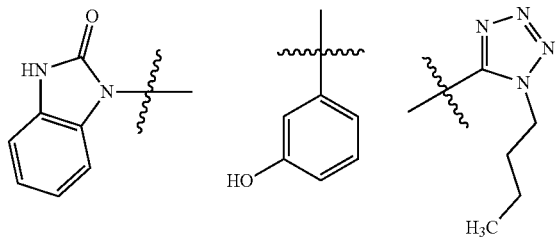

TABLE III-continued
| Compound | R₁ | R₂ | R₃ | % Inhibition against AR at 10 uM - GeneBlazer Assay | IC₅₀ value (nM) - GeneBlazer Assay |
|---|---|---|---|---|---|
| 98 | 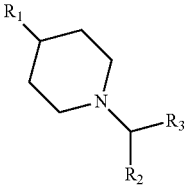 | 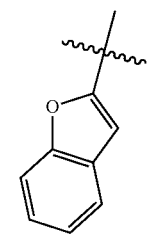 [SMILES: *c1cc2ccccc2o1] | 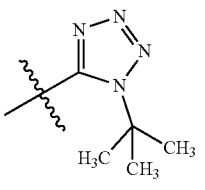 [SMILES: *c1nnnn1C(C)(C)C] | -- | -- |
| 99 | 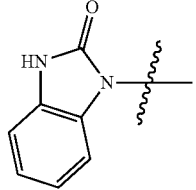 [SMILES: *n1c(=O)[nH]c2ccccc21] | 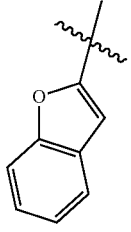 [SMILES: *c1cc2ccccc2o1] | 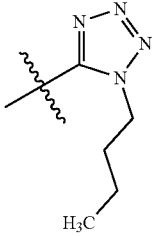 [SMILES: *c1nnnn1CCCC] | -- | -- |
| 107 | 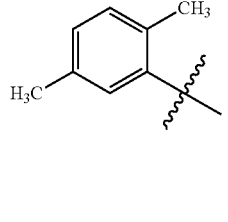 | 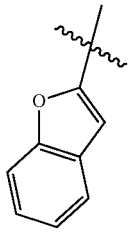 [SMILES: *c1cc2ccccc2o1] | 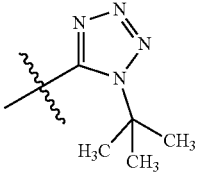 [SMILES: *c1nnnn1C(C)(C)C] | -- | -- |
| 108 | 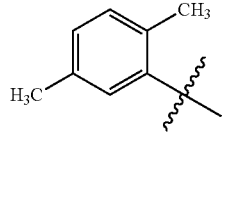 | 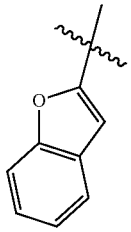 [SMILES: *c1cc2ccccc2o1] | 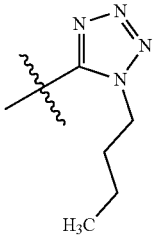 [SMILES: *c1nnnn1CCCC] | -- | -- |
| 113 | 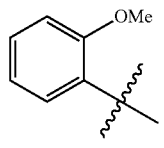 [SMILES: *c1ccccc1OC] | 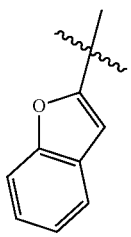 [SMILES: *c1cc2ccccc2o1] | 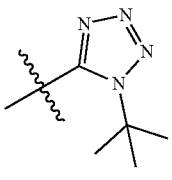 [SMILES: *c1nnnn1C(C)(C)C] | -- | -- |

TABLE III-continued

| Compound | R₁ | R₂ | R₃ | % Inhibition against AR at 10 uM - GeneBlazer Assay | IC₅₀ value (nM) - GeneBlazer Assay |
|---|---|---|---|---|---|
| 114 | 2-methoxyphenyl | benzofuran-2-yl | 1-butyl-1H-tetrazol-5-yl | -- | -- |
| 119 | 4-methoxyphenyl | benzofuran-2-yl | 1-tert-butyl-1H-tetrazol-5-yl | - | - |
| 120 | 4-methoxyphenyl | benzofuran-2-yl | 1-butyl-1H-tetrazol-5-yl | - | - |

TABLE IV

| Compound | R₁ | R₂/R₄ | R₃ | % Inhibition against AR at 10 uM - GeneBlazer Assay | IC₅₀ value (nM) - GeneBlazer Assay |
|---|---|---|---|---|---|
| 76 | 3,5-dichloropyridin-4-yl | —CH₃/—CH₃ | 1-tert-butyl-1H-tetrazol-5-yl | -- | -- |

TABLE IV-continued

| Compound | | | | % Inhibition against AR at 10 uM - GeneBlazer Assay | IC$_{50}$ value (nM) - GeneBlazer Assay |
|---|---|---|---|---|---|
| | R$_1$ | R$_2$/R$_4$ | R$_3$ | | |
| 77 | 3,5-dichloropyridin-4-yl | cyclohexyl | 1-tert-butyl-tetrazol-5-yl | -- | -- |

Example II

This example describes the general procedures for the synthesis of compounds of the following formulas I, II, and III.

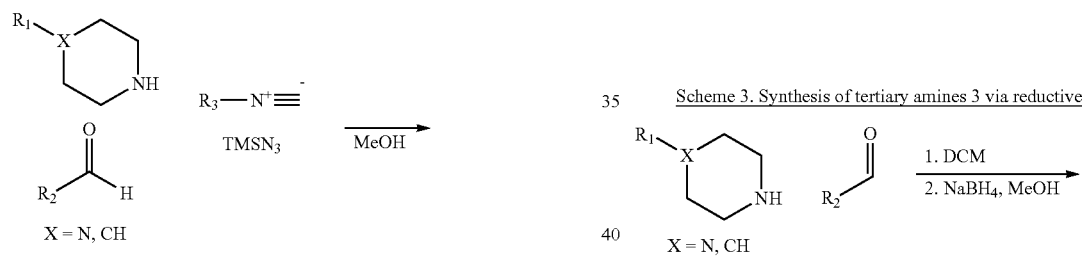

Scheme 1. Synthesis of tetrazoles 1 including via one-step TMSN$_3$-Ugi reaction.

Scheme 2. Synthesis of tetrazoles 2 including via one-step TMSN$_3$-Ugi reaction.

Scheme 3. Synthesis of tertiary amines 3 via reductive amination.

Scheme 4. Synthesis of benzimidazoles 4.

-continued

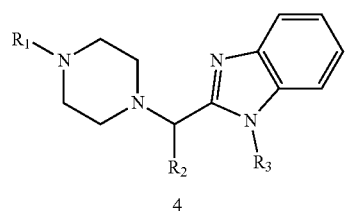

4

Scheme 5. Synthesis of carboxamides 5.

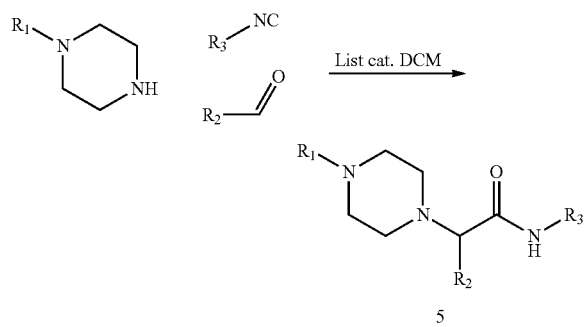

Scheme 6. Synthesis of 1,3,4-oxadiazoles 6.

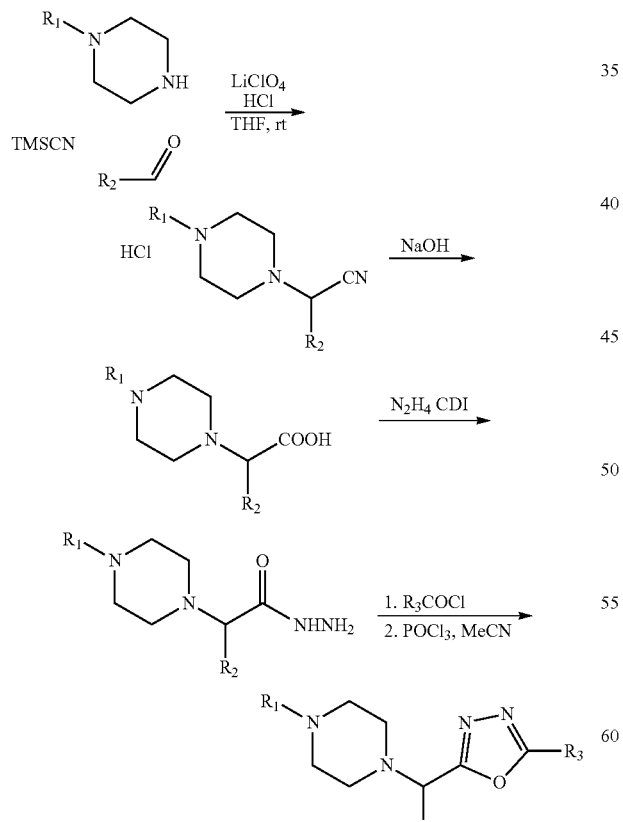

Example III

This example demonstrates synthetic and characterization data for several of the compounds of the present invention.

3-((1-butyl-1H-tetrazol-5-yl)(4-(3,5-dichloropyridin-4-yl)piperazin-1-yl)methyl)phenol (1)

A mixture of 1-(3,5-dichloropyridin-4-yl)piperazine (116 mg, 0.5 mmol), azidotrimethylsilane (66.2 uL, 0.5 mmol), 1-isocyanobutane (52.6 uL, 0.5 mmol) and 3-hydroxybenzaldehyde (61.1 mg, 0.5 mmol) in MeOH (2 mL) was stirred at rt for 16 h. The reaction solvent was removed and the crude product was purified with silica gel chromatography (eluent, ethyl acetate:hexanes=0 to 50%) to afford 1 (100 mg, 43.3%). $^1$H NMR (400 MHz, CDCl$_3$) δ 8.34-8.25 (m, 2H), 7.30-7.18 (m, 1H), 6.90 (ddd, J=24.4, 19.5, 11.9 Hz, 2H), 4.89 (s, 1H), 4.30 (t, J=7.5 Hz, 2H), 3.46-3.22 (m, 4H), 2.74 (dd, J=8.5, 5.4 Hz, 2H), 2.54 (dd, J=8.9, 5.1 Hz, 2H), 1.79-1.63 (m, 2H), 1.43-1.25 (m, 2H), 0.91 (t, J=7.4 Hz, 3H). $^{13}$C NMR (100 MHz, CDCl$_3$) δ 157.6, 154.3, 151.1, 148.8, 135.9, 130.1, 128.3, 120.2, 116.6, 115.7, 65.3, 52.0, 49.9, 47.5, 31.2, 19.7, 13.4.

1-(benzofuran-2-yl(1-(tert-butyl)-1H-tetrazol-5-yl) methyl)-4-(3,5-dichloropyridin-4-yl)piperazine (2)

$C_{23}H_{25}Cl_2N_7O$
MW: 486.40

The synthetic procedure of 2 was similar to that of 1. $^1$H NMR (400 MHz, CDCl$_3$) δ 8.32-8.29 (m, 1H), 7.61-7.55 (m, 1H), 7.55-7.49 (m, 1H), 7.36-7.29 (m, 1H), 7.27-7.23 (m, 1H), 7.00-6.85 (m, 1H), 5.81-5.58 (m, 1H), 3.43-3.31 (m, 4H), 3.06 (dt, J=10.1, 4.5 Hz, 2H), 2.87-2.70 (m, 2H), 1.80

(d, J=2.1 ¹H NMR (400 MHz, CDCl₃) δ 8.32-8.29 (s, 2H), 7.61-7.55 (m, 1H), 7.55-7.49 (m, 1H), 7.36-7.29 (m, 1H), 7.27-7.23 (m, 1H), 7.00-6.85 (m, 1H), 5.81-5.58 (m, 1H), 3.43-3.31 (m, 4H), 3.06 (dt, J=10.1, 4.5 Hz, 2H), 2.87-2.70 (m, 2H), 1.80 (d, J=2.1 Hz, 9H). ¹³C NMR (100 MHz, CDCl₃) δ 154.7, 151.7, 150.9, 150.8, 149.1, 128.3, 127.7, 124.8, 123.1, 121.5, 111.3, 109.0, 61.8, 58.7, 50.5, 50.2, 30.1.

4-((1-butyl-1H-tetrazol-5-yl)(4-(3,5-dichloropyridin-4-yl)piperazin-1-yl)methyl)quinoline (3)

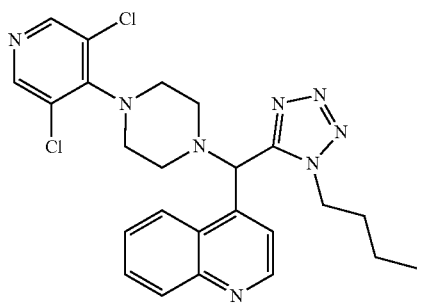

C₂₄H₂₆Cl₂N₈
MW: 497.42

The synthetic procedure of 3 was similar to that of 1. ¹H NMR (400 MHz, CDCl₃) δ 9.02-8.92 (m, 1H), 8.45 (t, J=7.1 Hz, 1H), 8.36-8.30 (m, 1H), 8.22-8.15 (m, 1H), 7.83-7.75 (m, 1H), 7.71-7.60 (m, 2H), 7.26 (d, J=1.7 Hz, 1H), 5.92 (d, J=14.0 Hz, 1H), 4.24 (tt, J=12.3, 3.7 Hz, 2H), 3.53-3.29 (m, 4H), 3.01-2.86 (m, 2H), 2.68-2.50 (m, 2H), 1.73-1.61 (m, 1H), 1.60-1.47 (m, 1H), 1.34-1.12 (m, 2H), 0.84 (t, J=7.4 Hz, 3H). ¹³C NMR (100 MHz, CDCl₃) δ 152.2, 150.7, 149.6, 149.2, 148.8, 140.3, 130.5, 130.0, 128.4, 127.7, 126.4, 123.2, 120.5, 60.4, 51.7, 50.0, 47.6, 31.1, 19.6, 13.3.

1-((1-butyl-1H-tetrazol-5-yl)(phenyl)methyl)-4-(3,5-dichloropyridin-4-yl)piperazine (4)

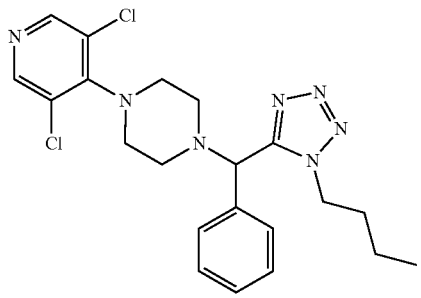

C₂₁H₂₅Cl₂N₇
MW: 446.38

The synthetic procedure of 4 was similar to that of 1. ¹H NMR (400 MHz, CDCl₃) δ 8.32 (s, 1H), 7.48-7.32 (m, 3H), 5.00 (s, 1H), 4.32 (t, J=7.5 Hz, 1H), 3.41 (t, J=4.8 Hz, 3H), 2.77 (dt, J=10.2, 4.8 Hz, 1H), 2.53 (dt, J=10.4, 4.8 Hz, 1H), 1.77-1.66 (m, 1H), 1.32 (dqd, J=16.1, 7.3, 1.6 Hz, 1H), 0.91 (t, J=7.4 Hz, 2H). ¹³C NMR (100 MHz, CDCl₃) δ 153.9, 150.9, 149.1, 134.7, 128.9, 128.8, 128.8, 128.3, 65.2, 51.7, 50.0, 47.3, 31.3, 19.7, 13.4.

1-((1-butyl-1H-tetrazol-5-yl)methyl)-4-(3,5-dichloropyridin-4-yl)piperazine (5)

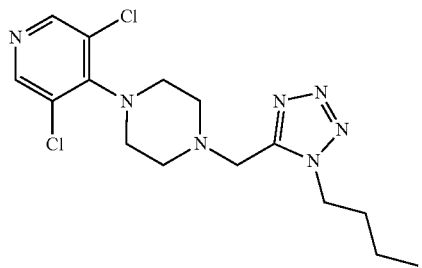

C₁₅H₂₁Cl₂N₇
MW: 370.28

The synthetic procedure of 5 was similar to that of 1. ¹H NMR (400 MHz, CDCl₃) δ 8.34 (s, 1H), 4.50-4.44 (m, 2H), 3.91 (s, 2H), 3.39-3.32 (m, 3H), 2.68-2.62 (m, 3H), 2.01-1.92 (m, 2H), 1.48-1.38 (m, 2H). ¹³C NMR (100 MHz, CDCl₃) δ 151.3, 150.8, 149.1, 128.5, 53.6, 50.9, 49.8, 47.4, 31.5, 19.7, 13.8, 13.5.

1-(1-(1-butyl-1H-tetrazol-5-yl)ethyl)-4-(3,5-dichloropyridin-4-yl)piperazine (6)

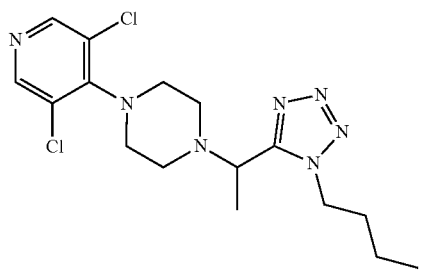

C₁₆H₂₃Cl₂N₇
MW: 384.31

The synthetic procedure of 6 was similar to that of 1. ¹H NMR (400 MHz, CDCl₃) δ 8.34 (d, J=0.4 Hz, 1H), 4.55-4.36 (m, 2H), 4.22-4.12 (m, 1H), 3.40-3.24 (m, 4H), 2.78-2.59 (m, 3H), 2.04-1.93 (m, 2H), 1.61 (d, J=6.9 Hz, 2H), 1.53-1.36 (m, 2H), 1.01 (t, J=7.4 Hz, 2H). ¹³C NMR (100 MHz, CDCl₃) δ 154.9, 150.9, 149.2, 128.5, 54.6, 50.1, 49.3, 47.5, 31.6, 19.9, 13.5, 11.4.

1-((1-butyl-1H-tetrazol-5-yl)(3-methoxyphenyl)methyl)-4-(3,5-dichloropyridin-4-yl)piperazine (7)

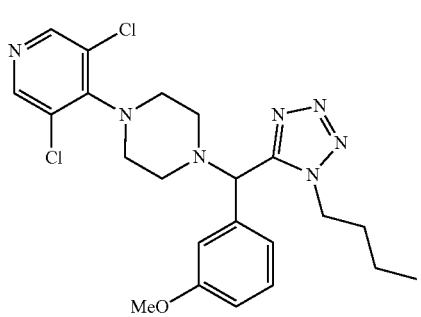

C₂₂H₂₇Cl₂N₇O
MW: 476.40

The synthetic procedure of 7 was similar to that of 1. $^1$H NMR (400 MHz, CDCl₃) δ 8.32 (d, J=0.4 Hz, 2H), 7.29 (t, J=8.2 Hz, 1H), 7.04-7.00 (m, 2H), 6.87 (ddd, J=8.3, 2.4, 1.1 Hz, 1H), 4.95 (s, 1H), 4.32 (t, J=7.6 Hz, 2H), 3.41 (t, J=4.8 Hz, 5H), 2.77 (dt, J=10.2, 4.7 Hz, 2H), 2.52 (dt, J=10.7, 5.1 Hz, 2H), 1.81-1.60 (m, 3H), 1.38-1.28 (m, 2H), 0.92 (t, J=7.4 Hz, 3H). $^{13}$C NMR (100 MHz, CDCl₃) δ 160.1, 153.9, 150.9, 149.1, 136.4, 129.9, 128.3, 120.9, 114.4, 114.1, 65.2, 55.3, 51.9, 50.0, 47.4, 31.3, 19.7, 13.4.

1-((1-butyl-1H-tetrazol-5-yl)(3-fluorophenyl)methyl)-4-(3,5-dichloropyridin-4-yl)piperazine (5)

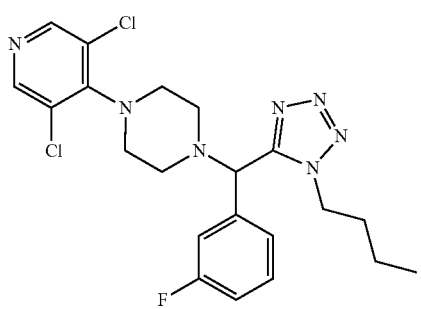

C₂₁H₂₄Cl₂FN₇
MW: 464.37

The synthetic procedure of 8 was similar to that of 1. $^1$H NMR (400 MHz, CDCl₃) δ 8.33 (s, 1H), 7.36 (td, J=8.0, 5.8 Hz, 1H), 7.28-7.21 (m, 2H), 7.06 (tdd, J=8.3, 2.6, 1.0 Hz, 1H), 5.03 (s, 1H), 4.35 (t, J=7.7 Hz, 1H), 3.41 (t, J=4.8 Hz, 3H), 2.76 (dt, J=10.7, 5.1 Hz, 1H), 2.52 (dt, J=10.2, 4.8 Hz, 1H), 1.75 (ddtd, J=20.6, 13.8, 6.8, 1.3 Hz, 1H), 1.43-1.27 (m, 1H), 0.93 (t, J=7.3 Hz, 2H). $^{13}$C NMR (100 MHz, CDCl₃) δ 164.1, 153.3, 150.8, 149.1, 137.3, 137.2, 130.5, 130.4, 128.3, 124.5, 124.4, 116.0, 115.8, 115.8, 115.6, 76.6, 64.5, 64.4, 51.6, 49.9, 47.4, 31.4, 19.7, 13.4.

1-((1-(tert-butyl)-1H-tetrazol-5-yl)(thiophen-2-yl)methyl)-4-(3,5-dichloropyridin-4-yl)piperazine (9)

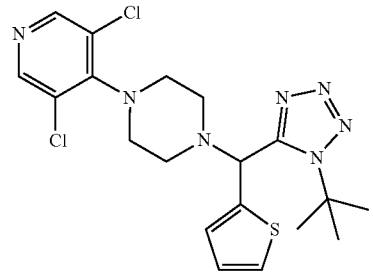

C₁₉H₂₃Cl₂N₇S
MW: 452.40

The synthetic procedure of 9 was similar to that of 1. $^1$H NMR (400 MHz, CDCl₃) δ 8.30 (s, 2H), 8.30 (s, 2H), 8.30 (s, 2H), 7.37 (dd, J=5.1, 1.2 Hz, 1H), 7.37 (dd, J=5.1, 1.2 Hz, 1H), 7.40-7.24 (m, 2H), 7.27 (s, 1H), 6.97 (dd, J=5.1, 3.6 Hz, 1H), 6.97 (dd, J=5.1, 3.6 Hz, 1H), 7.01-6.90 (m, 2H), 6.93 (ddd, J=3.5, 1.3, 0.6 Hz, 1H), 5.71-5.65 (m, 1H), 5.70-5.67 (m, 1H), 5.71-5.65 (m, 1H), 3.41-3.33 (m, 4H), 3.62-3.13 (m, 5H), 3.42-3.31 (m, 4H), 3.01-2.88 (m, 2H), 2.98-2.91 (m, 2H), 2.98-2.90 (m, 2H), 2.66 (ddd, J=7.0, 5.7, 3.0 Hz, 2H), 2.66 (ddd, J=7.0, 5.7, 3.0 Hz, 2H), 2.66 (ddd, J=7.0, 5.7, 3.0 Hz, 2H), 1.78 (s, 9H), 1.78 (s, 9H), 1.78 (s, 9H). $^{13}$C NMR (100 MHz, CDCl₃) δ 153.4, 150.9, 149.1, 137.3, 128.7, 128.2, 127.1, 126.4, 61.6, 60.1, 50.3, 50.2, 30.2.

1-((1-butyl-1H-tetrazol-5-yl)(thiophen-2-yl)methyl)-4-(3,5-dichloropyridin-4-yl)piperazine (10)

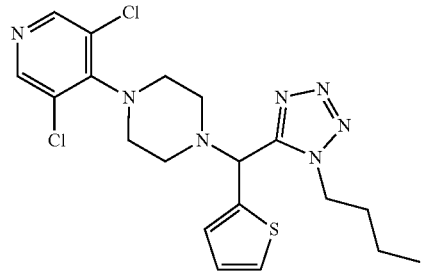

C₁₉H₂₃Cl₂N₇S
MW: 452.40

The synthetic procedure of 10 was similar to that of 1. $^1$H NMR (400 MHz, CDCl₃) δ 8.40-8.23 (m, 2H), 8.34-8.29 (m, 1H), 7.37 (dd, J=5.1, 1.2 Hz, 1H), 7.37 (dd, J=5.1, 1.2 Hz, 1H), 7.07 (ddd, J=3.4, 1.4, 0.7 Hz, 1H), 7.07 (ddd, J=3.4, 1.4, 0.7 Hz, 1H), 7.01 (dd, J=5.1, 3.5 Hz, 1H), 7.01 (dd, J=5.1, 3.5 Hz, 1H), 5.42-5.37 (m, 1H), 5.42-5.37 (m, 1H), 4.52-4.38 (m, 2H), 4.50-4.38 (m, 2H), 3.39 (t, J=4.8 Hz, 4H), 3.39 (t, J=4.8 Hz, 4H), 2.86-2.77 (m, 2H), 2.85-2.78 (m, 2H), 2.64-2.55 (m, 2H), 2.63-2.56 (m, 2H), 1.93-1.84

(m, 2H), 1.93-1.84 (m, 2H), 1.46-1.35 (m, 2H), 1.46-1.35 (m, 2H), 0.97 (t, J=7.4 Hz, 3H), 0.97 (t, J=7.4 Hz, 3H). $^{13}$C NMR (100 MHz, CDCl$_3$) δ 153.2, 150.8, 149.1, 136.8, 128.3, 128.3, 126.8, 109.9, 60.0, 51.0, 50.0, 47.7, 31.5, 19.8, 13.5.

1-(benzo[d][1,3]dioxol-5-yl(1-butyl-1H-tetrazol-5-yl)methyl)-4-(3,5-dichloropyridin-4-yl)piperazine (11)

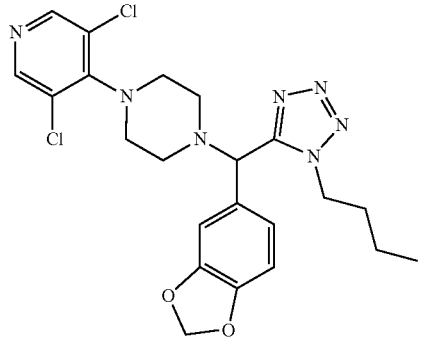

C$_{22}$H$_{25}$Cl$_2$N$_7$O$_2$
MW: 490.39

The synthetic procedure of 11 was similar to that of 1. $^1$H NMR (400 MHz, CDCl$_3$) δ 8.32 (s, 1H), 7.02 (d, J=1.7 Hz, 1H), 6.86 (dd, J=8.1, 1.8 Hz, 1H), 6.78 (d, J=8.0 Hz, 1H), 6.01-5.96 (m, 1H), 4.87 (s, 1H), 4.36-4.28 (m, 1H), 3.40 (t, J=4.8 Hz, 3H), 2.74 (dt, J=10.4, 4.8 Hz, 1H), 2.56-2.48 (m, 1H), 1.84-1.72 (m, 1H), 1.35 (dd, J=7.3, 1.1 Hz, 1H), 0.94 (t, J=7.4 Hz, 2H). $^{13}$C NMR (100 MHz, CDCl$_3$) δ 154.0, 150.9, 149.1, 148.3, 148.0, 128.4, 128.3, 122.4, 108.9, 108.2, 101.4, 64.9, 51.6, 50.0, 47.3, 31.4, 19.7, 13.5.

5-((1-butyl-1H-tetrazol-5-yl)(4-(3,5-dichloropyridin-4-yl)piperazin-1-yl)methyl-1H-indole (12)

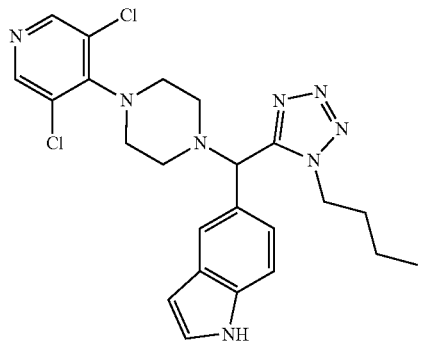

C$_{23}$H$_{26}$Cl$_2$N$_8$
MW: 485.41

The synthetic procedure of 12 was similar to that of 1. $^1$H NMR (400 MHz, CDCl$_3$) δ 8.42 (s, 1H), 8.42 (s, 1H), 8.31 (s, 2H), 8.31 (s, 2H), 7.70-7.64 (m, 1H), 7.69-7.66 (m, 1H), 7.39 (dt, J=8.4, 0.8 Hz, 1H), 7.39 (dt, J=8.4, 0.8 Hz, 1H), 7.29-7.24 (m, 3H), 7.29-7.24 (m, 3H), 6.54 (ddd, J=3.1, 2.0, 0.9 Hz, 1H), 6.54 (ddd, J=3.1, 2.0, 0.9 Hz, 1H), 5.03 (s, 1H), 5.03 (s, 1H), 4.34-4.24 (m, 2H), 4.32-4.25 (m, 2H), 3.42 (t, J=4.8 Hz, 4H), 3.42 (t, J=4.8 Hz, 4H), 2.83-2.75 (m, 2H), 2.85-2.73 (m, 2H), 2.59 (ddd, J=15.7, 7.2, 3.9 Hz, 2H), 2.59 (ddd, J=15.7, 7.2, 3.9 Hz, 2H), 1.73-1.64 (m, 2H), 1.68 (dddd, J=8.9, 7.7, 6.5, 1.9 Hz, 2H), 1.36-1.24 (m, 2H), 1.36-1.25 (m, 2H), 0.86 (t, J=7.4 Hz, 3H), 0.86 (t, J=7.4 Hz, 3H). $^{13}$C NMR (100 MHz, CDCl$_3$) δ 154.8, 151.0, 149.1, 135.7, 128.2, 127.9, 126.1, 125.3, 122.6, 121.1, 111.6, 102.8, 65.9, 51.9, 50.0, 47.3, 31.2, 19.7, 13.4.

3-((4-(3,5-dichloropyridin-4-yl)piperazin-1-yl)(1-isopropyl-1H-tetrazol-5-yl)methylphenol (15)

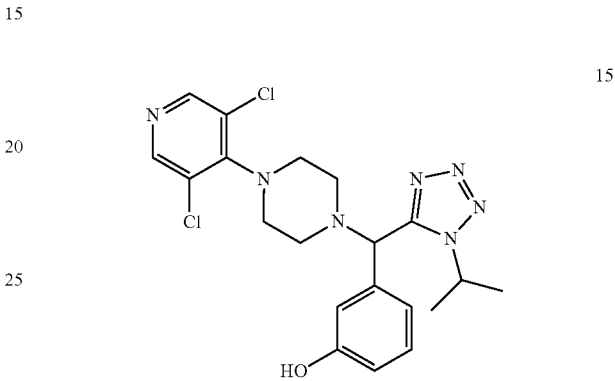

C$_{20}$H$_{23}$Cl$_2$N$_7$O
MW: 448.35

The synthetic procedure of 15 was similar to that of 1. $^1$H NMR (400 MHz, CDCl$_3$) δ 8.48-8.34 (m, 1H), 8.30 (s, 2H), 7.24 (t, J=7.9 Hz, 1H), 7.09-7.02 (m, 1H), 6.96 (d, J=7.7 Hz, 1H), 6.88 (ddd, J=8.2, 2.5, 0.8 Hz, 1H), 5.03-4.82 (m, 2H), 3.52-3.26 (m, 4H), 2.86-2.71 (m, 2H), 2.61-2.44 (m, 2H), 1.43 (dd, J=19.0, 6.6 Hz, 6H). $^{13}$C NMR (100 MHz, CDCl$_3$) δ 157.6, 153.5, 151.1, 148.9, 136.2, 130.1, 128.3, 119.9, 116.5, 115.6, 65.5, 52.2, 51.2, 49.9, 22.6, 22.5, 22.3.

3-((1-(tert-butyl)-1H-tetrazol-5-yl)(4-(3,5-dichloro-pyridin-4-yl)piperazin-1-yl)methyl)phenol (16)

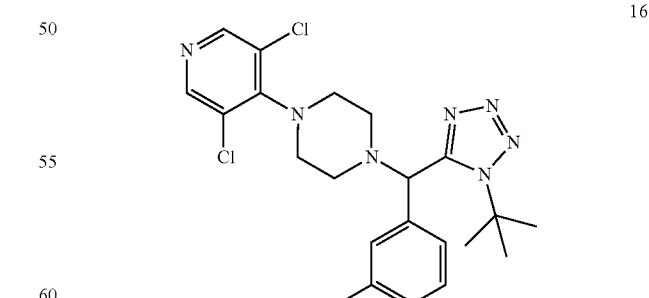

C$_{21}$H$_{25}$Cl$_2$N$_7$O
MW: 462.38

The synthetic procedure of 16 was similar to that of 1. ¹H NMR (400 MHz, CDCl₃) δ 8.28 (s, 1H), 7.93 (s, 1H), 7.22 (t, J=7.9 Hz, 1H), 7.02-6.99 (m, 1H), 6.93 (dt, J=7.8, 1.2 Hz, 1H), 6.86 (ddd, J=8.2, 2.5, 1.0 Hz, 1H), 5.20 (s, 1H), 3.31 (dddd, J=36.0, 12.3, 6.8, 2.9 Hz, 3H), 2.66 (dddd, J=73.4, 10.3, 6.5, 2.8 Hz, 3H), 1.71 (s, 6H). ¹³C NMR (100 MHz, CDCl₃) δ 157.2, 154.6, 151.1, 148.9, 136.3, 129.7, 128.2, 121.4, 116.4, 116.3, 109.9, 65.7, 61.8, 51.5, 50.1, 30.2, 30.2.

3-((1-cyclopentyl-1H-tetrazol-5-yl)(4-(3,5-dichloropyridin-4-yl)piperazin-1-yl)methyl)phenol (17)

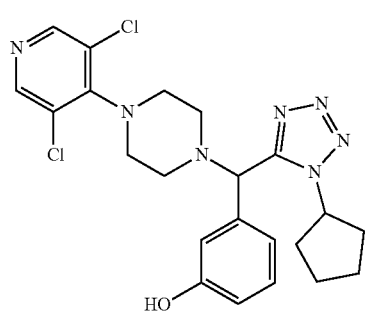

C₂₂H₂₅Cl₂N₇O
MW: 474.39

The synthetic procedure of 17 was similar to that of 1. ¹H NMR (400 MHz, CDCl₃) δ 8.30 (s, 1H), 7.81 (s, 1H), 7.24 (t, J=7.9 Hz, 1H), 7.04-7.01 (m, 1H), 6.96 (dt, J=7.7, 1.2 Hz, 1H), 6.86 (ddd, J=8.2, 2.5, 0.9 Hz, 1H), 5.04 (qd, J=7.3, 5.2 Hz, 1H), 4.94 (s, 1H), 3.44-3.29 (m, 2H), 2.75 (ddd, J=10.2, 6.4, 3.1 Hz, 1H), 2.53 (ddd, J=10.7, 6.5, 3.7 Hz, 1H), 2.11-1.63 (m, 6H). ¹³C NMR (100 MHz, CDCl₃) δ 163.4, 157.3, 153.9, 151.0, 148.9, 136.4, 130.1, 128.3, 120.1, 116.4, 115.6, 103.8, 65.6, 59.3, 52.1, 49.9, 33.5, 33.2, 24.7, 24.6, 12.8.

3-((1-cyclohexyl-1H-tetrazol-5-yl)(4-(3,5-dichloropyridin-4-yl)piperazin-1-yl)methy)phenol (18)

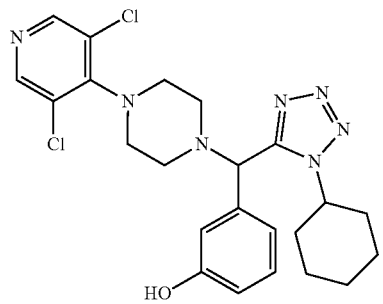

C₂₃H₂₇Cl₂N₇O
MW: 488.41

The synthetic procedure of 18 was similar to that of 1. ¹H NMR (400 MHz, CDCl₃) δ 8.30 (s, 1H), 7.96 (s, 0H), 7.26-7.22 (m, 1H), 7.06-7.02 (m, 1H), 6.97 (dt, J=7.7, 1.2 Hz, 1H), 6.86 (ddd, J=8.2, 2.5, 0.9 Hz, 1H), 4.91 (s, 1H), 4.47 (ddt, J=11.7, 7.8, 3.9 Hz, 1H), 3.45-3.29 (m, 2H), 2.81-2.71 (m, 1H), 2.53 (ddd, J=11.2, 6.3, 3.2 Hz, 1H), 1.99-1.22 (m, 7H). ¹³C NMR (100 MHz, CDCl₃) δ 157.5, 153.5, 151.0, 149.0, 136.4, 130.1, 128.4, 120.0, 116.5, 115.5, 85.1, 65.5, 58.3, 52.2, 49.9, 32.8, 32.6, 25.4, 25.3, 24.7.

3-((1-benzyl-1H-tetrazol-5-yl)(4-(3,5-dichloropyridin-4-yl)piperazin-1-yl)methyl)phenol (19)

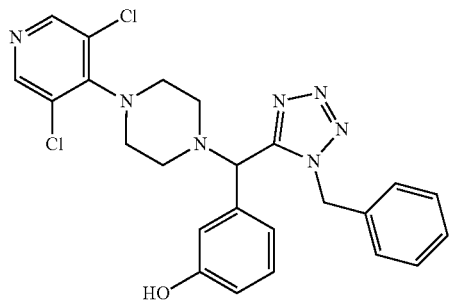

C₂₄H₂₃Cl₂N₇O
MW: 496.39

The synthetic procedure of 19 was similar to that of 1. ¹H NMR (400 MHz, CDCl₃) δ 8.27 (s, 2H), 7.38-7.31 (m, 3H), 7.23-7.16 (m, 2H), 7.14-7.09 (m, 2H), 6.92 (t, J=2.0 Hz, 1H), 6.84 (dd, J=8.1, 2.3 Hz, 2H), 5.73-5.64 (m, 1H), 5.39 (d, J=15.5 Hz, 1H), 4.74 (s, 1H), 3.32-3.18 (m, 4H), 2.54 (ddd, J=10.2, 6.3, 3.3 Hz, 2H), 2.40 (ddd, J=10.4, 5.9, 3.2 Hz, 2H). ¹³C NMR (100 MHz, CDCl₃) δ 157.0, 154.7, 151.0, 148.9, 135.5, 133.1, 130.0, 129.1, 128.9, 128.2, 127.4, 120.8, 116.4, 115.7, 65.0, 51.6, 51.2, 49.8.

3-((4-(3,5-dichloropyridin-4-yl)piperazin-1-yl)(1-(2,6-dimethylphenyl)-1H-tetrazol-5-yl)methyl)phenol (20)

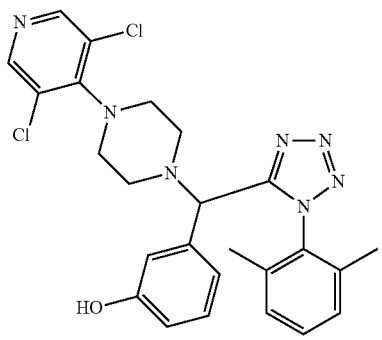

C₂₅H₂₅Cl₂N₇O
MW: 510.42

The synthetic procedure of 20 was similar to that of 1. ¹H NMR (400 MHz, CDCl₃) δ 8.27 (s, J=0.9 Hz, 2H), 7.40 (t, J=7.6 Hz, 1H), 7.28 (d, J=1.4 Hz, 0H), 7.12-7.04 (m, 2H), 6.84 (ddd, J=8.3, 2.5, 1.0 Hz, 1H), 6.39 (d, J=7.3 Hz, 1H), 4.23 (s, 1H), 3.43-3.17 (m, 3H), 2.73-2.50 (m, 2H), 2.04 (s, 2H), 1.19 (s, 2H). ¹³C NMR (100 MHz, CDCl₃) δ 156.1, 151.0, 148.9, 137.2, 135.7, 134.6, 131.3, 131.1, 129.8, 129.0, 128.6, 128.3, 121.2, 116.8, 115.5, 65.9, 52.3, 49.8, 17.6, 16.6.

N-butyl-2-(4-(3,5-dichloropyridin-4-yl)piperazin-1-yl)-2-(3-hydroxyphenyl)acetamide (21)

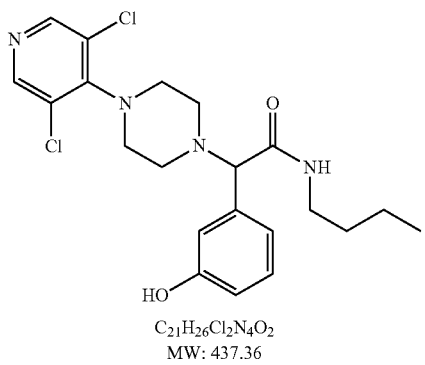

C₂₁H₂₆Cl₂N₄O₂
MW: 437.36

A mixture of 1-(3,5-dichloropyridin-4-yl)piperazine (232 mg, 1.0 mmol), 1-isocyanobutane (83 mg, 1.000 mmol) and 3-hydroxybenzaldehyde (122 mg, 1.000 mmol) in DCM (1 mL) in the presence of phenylphosphinic acid (0.4 mmol) was stirred at room temperature for 16 h. The reaction solvent was removed and the crude product was purified with silica gel chromatography (eluent, ethyl acetate: hexanes=0 to 50%) to afford 21 (80 mg, 18.29% yield). ¹H NMR (400 MHz, CDCl₃) δ 8.24 (s, 2H), 7.25-7.13 (m, 1H), 6.94-6.81 (m, 2H), 6.80-6.71 (m, 1H), 5.52 (s, 1H), 4.94 (d, J=2.8 Hz, 1H), 3.81 (s, 1H), 3.56-3.12 (m, 4H), 2.57 (s, 2H), 1.88-1.12 (m, 6H), 0.92 (dt, J=16.4, 7.2 Hz, 3H). ¹³C NMR (100 MHz, CDCl₃) δ 149.1, 130.0, 129.8, 128.4, 119.7, 118.2, 116.0, 74.0, 52.2, 39.4, 37.9, 31.5, 20.1, 19.9, 13.7.

3-((4-(3,5-dichloropyridin-4-yl)piperazin-1-yl)methyl)phenol (22)

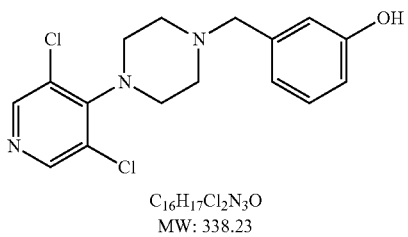

C₁₆H₁₇Cl₂N₃O
MW: 338.23

A mixure of 1-(3,5-dichloropyridin-4-yl)piperazine (122 mg, 0.5 mmol) and 3-hydroxybenzaldehyde (67.2 mg, 0.550 mmol) was stirred at rt for 1 h. The reaction solvent was removed in vacuo and re-dissolved in MeOH (3 mL), followed by the addition of sodium borohydride (18.92 mg, 0.500 mmol). The resulting mixture was stirred at rt for another 2h. The reaction solvent was removed in vacuo and dissolved in ethyl acetate (10 mL), washed with water (10 mL) and brine (10 mL). The organic layer was dried over MgSO₄, evaporated in vacuo to get the crude product. The crude product was purified with silica gel chromatography to obtain 22 (65 mg, 38.4% yield). ¹H NMR (400 MHz, CDCl₃) δ 8.89 (s, 1H), 8.31 (d, J=10.5 Hz, 1H), 7.11 (t, J=7.8 Hz, 1H), 6.80 (dd, J=9.4, 8.5 Hz, 2H), 6.72-6.65 (m, 1H), 4.50 (d, J=15.5 Hz, 1H), 3.49 (s, 2H), 3.43-3.31 (m, 4H), 2.58 (dd, J=4.8, 3.2 Hz, 4H). ¹³C NMR (100 MHz, CDCl₃) δ 156.1, 150.1, 147.8, 142.4, 138.4, 127.7, 126.9, 118.7, 116.2, 114.7, 113.0, 62.7, 61.7, 52.3, 48.8.

1-(benzofuran-2-ylmethyl)-4-(3,5-dichloropyridin-4-yl)piperazine (23)

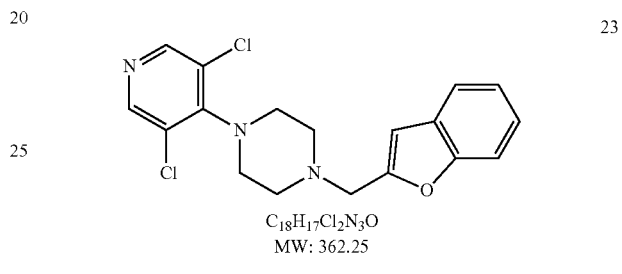

C₁₈H₁₇Cl₂N₃O
MW: 362.25

The synthetic procedure of 23 was similar to that of 22. ¹H NMR (400 MHz, CDCl₃) δ 8.41-8.26 (m, 2H), 7.60-7.44 (m, 2H), 7.30-7.19 (m, 2H), 6.65 (s, 1H), 3.78 (s, 2H), 3.53-3.34 (m, 4H), 2.72 (d, J=3.9 Hz, 4H). ¹³C NMR (100 MHz, CDCl₃) δ 155.1, 151.2, 149.1, 128.3, 128.1, 124.0, 122.7, 120.7, 111.3, 105.9, 55.7, 53.5, 49.8.

3-((1-butyl-1H-tetrazol-5-yl)(4-(2,6-dichlorophenyl)piperazin-1-yl)methyl)phenol (25)

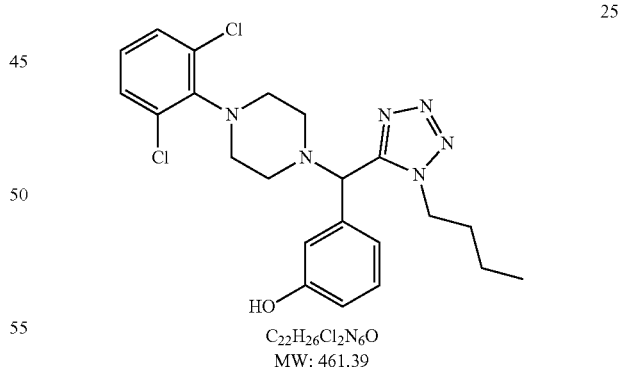

C₂₂H₂₆Cl₂N₆O
MW: 461.39

The synthetic procedure of 25 was similar to that of 1. ¹H NMR (400 MHz, CDCl₃) δ 9.93 (s, 1H), 7.42 (d, J=2.0 Hz, 1H), 7.25-7.22 (m, 1H), 7.12-7.09 (m, 1H), 7.03-6.97 (m, 1H), 6.97-6.92 (m, 1H), 6.90-6.85 (m, 1H), 6.32 (brs, 1H), 4.86 (d, J=19.0 Hz, 1H), 4.45-4.30 (m, 2H), 3.30-3.13 (m, 4H), 2.77-2.64 (m, 2H), 2.55-2.43 (m, 2H), 1.84-1.68 (m, 2H), 1.43-1.31 (m, 2H), 1.01-0.88 (m, 3H). ¹³C NMR (100 MHz, CDCl₃) δ 193.2, 157.0, 138.0, 135.0, 130.4, 129.0, 123.0, 122.2, 114.8, 66.0, 52.5, 48.9, 47.6, 31.2, 19.7, 13.5.

3-((1-butyl-1H-tetrazol-5-yl)(4-(pyridin-4-yl)piperazin-1-yl)methyl)phenol (27)

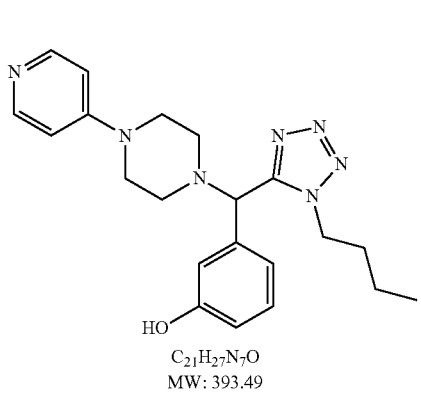

C$_{21}$H$_{27}$N$_{7}$O
MW: 393.49

The synthetic procedure of 27 was similar to that of 1. $^1$H NMR (400 MHz, DMSO) δ 9.54 (s, 1H), 8.19-7.91 (m, 2H), 7.18-7.02 (m, 1H), 6.88-6.75 (m, 2H), 6.74-6.62 (m, 3H), 5.19 (s, 1H), 4.46-4.27 (m, 2H), 3.34-3.18 (m, 4H), 2.66-2.50 (m, 2H), 2.45-2.28 (m, 2H), 1.69-1.39 (m, 2H), 1.31-1.01 (m, 2H), 0.74 (t, J=7.4 Hz, 3H). $^{13}$C NMR (100 MHz, d$_6$-DMSO) δ 157.94, 154.77, 154.53, 150.24, 136.80, 129.92, 120.07, 116.19, 115.83, 108.78, 62.49, 49.82, 47.03, 45.95, 31.41, 19.43, 13.76.

1-(benzofuran-2-yl(1-butyl-1H-tetrazol-5-yl)methyl)-4-(3,5-dichloropyridin-4-yl)piperazine (28)

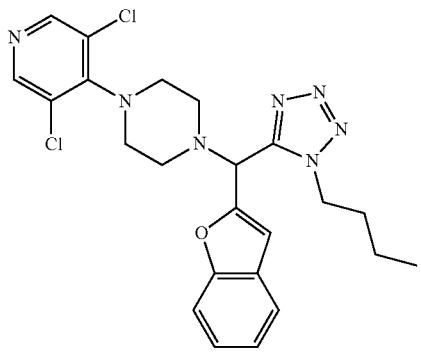

C$_{23}$H$_{25}$Cl$_{2}$N$_{7}$O
MW: 486.40

The synthetic procedure of 28 was similar to that of 1. $^1$H NMR (400 MHz, CDCl$_3$) δ 8.32 (s, 2H), 7.62-7.57 (m, 1H), 7.48 (d, J=8.2 Hz, 1H), 7.38-7.31 (m, 1H), 7.29-7.24 (m, 1H), 7.00 (s, 1H), 5.39 (s, 1H), 4.67 (dd, J=14.7, 7.2 Hz, 2H), 3.39 (t, J=4.8 Hz, 4H), 2.90-2.77 (m, 2H), 2.74-2.56 (m, 2H), 2.00 (td, J=14.9, 7.4 Hz, 2H), 1.49 (dd, J=15.1, 7.5 Hz, 2H), 1.01 (t, J=7.4 Hz, 3H). $^{13}$C NMR (100 MHz, CDCl$_3$) δ149.1, 125.1, 123.4, 121.5, 111.3, 108.8, 59.1, 51.3, 49.9, 48.1, 31.7, 19.9, 13.6.

4-((1-(tert-butyl)-1H-tetrazol-5-yl)(4-(3,5-dichloropyridin-4-yl)piperazin-1-yl)methyl)quinoline (29)

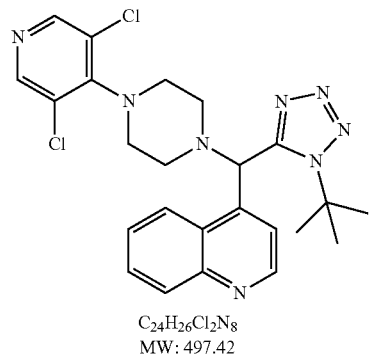

C$_{24}$H$_{26}$Cl$_{2}$N$_{8}$
MW: 497.42

The synthetic procedure of 29 was similar to that of 1. $^1$H NMR (400 MHz, CDCl$_3$) δ 8.83 (d, J=4.5 Hz, 1H), 8.50 (d, J=7.9 Hz, 1H), 8.29 (s, 2H), 8.22 (d, J=8.4 Hz, 1H), 7.86-7.79 (m, 1H), 7.78-7.70 (m, 1H), 7.04 (d, J=4.5 Hz, 1H), 6.39 (s, 1H), 3.34 (p, J=6.6 Hz, 2H), 3.27-3.16 (m, 4H), 2.76-2.65 (m, 2H), 1.60 (s, 9H). $^{13}$C NMR (100 MHz, CDCl$_3$) δ 152.2, 150.9, 149.8, 149.1, 148.8, 140.8, 130.6, 129.7, 128.2, 127.6, 126.6, 123.5, 122.1, 61.4, 60.3, 50.6, 49.9, 30.2.

1-((1-butyl-1H-tetrazol-5-yl)(pyridin-4-yl)methyl)-4-(3,5-dichloropyridin-4-yl)piperazine (30)

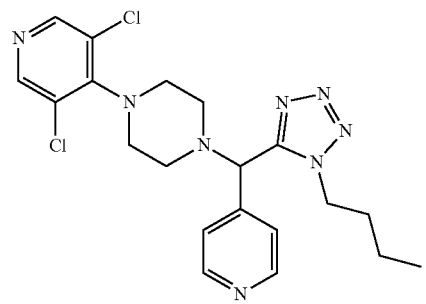

C$_{20}$H$_{24}$Cl$_{2}$N$_{8}$
MW: 447.36

The synthetic procedure of 30 was similar to that of 1. $^1$H NMR (400 MHz, CDCl$_3$) δ 8.76-8.60 (m, 2H), 8.45-8.21 (m, 2H), 7.45 (dd, J=4.5, 1.5 Hz, 2H), 5.07 (s, 1H), 4.51-4.32 (m, 2H), 3.53-3.34 (m, 4H), 2.87-2.70 (m, 2H), 2.59-2.48 (m, 2H), 1.91-1.72 (m, 2H), 1.47-1.28 (m, 2H), 0.97 (dt, J=14.7, 7.4 Hz, 3H). $^{13}$C NMR (100 MHz, CDCl$_3$) δ 152.3, 150.7, 150.4, 149.2, 143.4, 128.4, 123.7, 63.7, 51.3, 49.9, 47.6, 31.4, 19.7, 13.4.

1-((1-(tert-butyl)-1H-tetrazol-5-yl)(pyridin-4-yl) methyl)-4-(3,5-dichloropyridin-4-yl)piperazine (31)

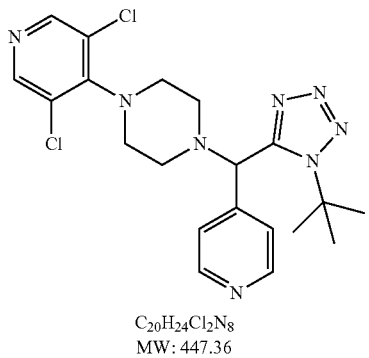

C₂₀H₂₄Cl₂N₈
MW: 447.36

The synthetic procedure of 31 was similar to that of 1. ¹H NMR (400 MHz, CDCl₃) δ 8.74-8.60 (m, 2H), 8.39-8.26 (m, 2H), 7.42 (dd, J=4.5, 1.6 Hz, 2H), 5.39 (s, 1H), 3.44-3.26 (m, 5H), 2.99-2.83 (m, 2H), 2.65-2.56 (m, 2H), 1.76 (s, 9H). ¹³C NMR (100 MHz, CDCl₃) δ 152.6, 150.8, 150.2, 149.1, 143.9, 128.3, 124.4, 64.1, 61.7, 50.7, 50.2, 30.4.

1-((1-butyl-1H-tetrazol-5-yl)(4-methoxyphenyl) methyl)-4-(3,5-dichloropyridin-4-yl)piperazine (32)

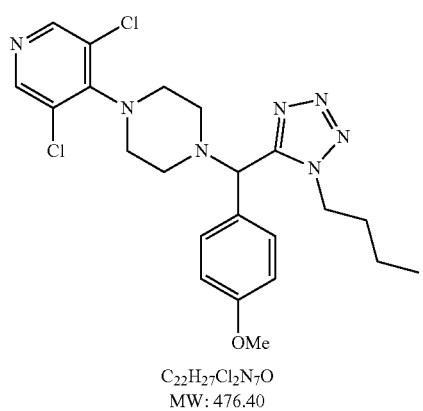

C₂₂H₂₇Cl₂N₇O
MW: 476.40

The synthetic procedure of 32 was similar to that of 1. ¹H NMR (400 MHz, CDCl₃) δ 8.31 (s, 2H), 7.40-7.34 (m, 2H), 6.93-6.88 (m, 2H), 4.92 (s, 1H), 4.34-4.27 (m, 2H), 3.81 (s, 3H), 3.40 (t, J=4.8 Hz, 4H), 2.74 (dt, J=10.1, 4.6 Hz, 2H), 2.53 (dt, J=10.3, 4.7 Hz, 2H), 1.80-1.69 (m, 2H), 1.39-1.27 (m, 2H), 0.92 (t, J=7.4 Hz, 2H). ¹³C NMR (100 MHz, CDCl₃) δ 159.8, 154.2, 150.9, 149.1, 130.0, 128.3, 126.5, 114.2, 64.6, 55.3, 51.6, 50.0, 47.3, 31.3, 19.7, 13.4.

1-((1-(tert-butyl)-1H-tetrazol-5-yl)(4-methoxyphenyl)methyl)-4-(3,5-dichloropyridin-4-yl)piperazine (33)

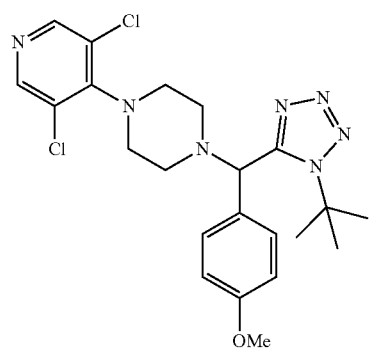

C₂₂H₂₇Cl₂N₇O
MW: 476.40

The synthetic procedure of 33 was similar to that of 1. ¹H NMR (400 MHz, CDCl₃) δ 8.29 (s, 2H), 7.40-7.34 (m, 2H), 6.90-6.85 (m, 2H), 5.24 (s, 1H), 3.80 (s, 3H), 3.41-3.30 (m, 4H), 2.82 (dt, J=9.6, 4.4 Hz, 2H), 2.61-2.54 (m, 2H), 1.70 (s, 9H). ¹³C NMR (100 MHz, CDCl₃) δ 159.7, 154.4, 151.0, 149.1, 130.9, 128.2, 127.0, 113.9, 65.0, 61.3, 55.2, 51.1, 50.2, 30.2.

4-((1-butyl-1H-tetrazol-5-yl)(4-(3,5-dichloropyridin-4-yl)piperazin-1-yl)methy)benzonitrile (34)

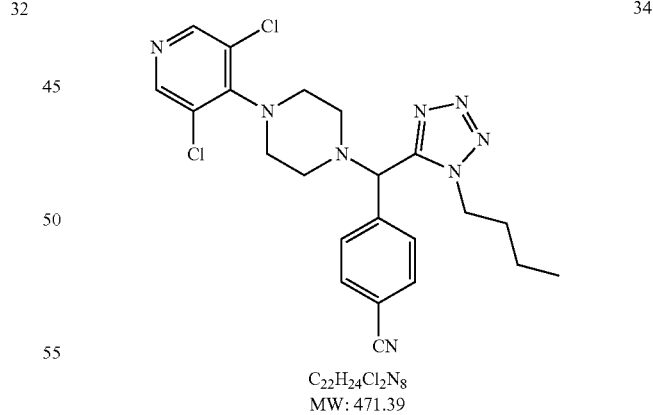

C₂₂H₂₄Cl₂N₈
MW: 471.39

The synthetic procedure of 34 was similar to that of 1. ¹H NMR (400 MHz, CDCl₃) δ 8.33 (s, 1H), 7.74-7.64 (m, 4H), 5.09 (s, 1H), 4.38 (t, J=7.5 Hz, 2H), 3.39 (t, J=4.8 Hz, 4H), 2.71 (dt, J=10.1, 4.7 Hz, 2H), 2.53 (dt, J=10.2, 4.7 Hz, 2H), 1.91-1.73 (m, 2H), 1.36 (dqd, J=14.1, 7.3, 1.4 Hz, 2H), 0.95 (t, J=7.4 Hz, 3H). ¹³C NMR (100 MHz, CDCl₃) δ 152.6, 150.6, 149.2, 139.8, 132.6, 129.7, 128.4, 118.0, 112.9, 109.9, 64.3, 51.3, 49.9, 47.5, 31.5, 19.7, 13.4.

4-((1-(tert-butyl)-1H-tetrazol-5-yl)(4-(3,5-dichloropyridin-4-yl)piperazin-1-yl)methyl)benzonitrile (35)

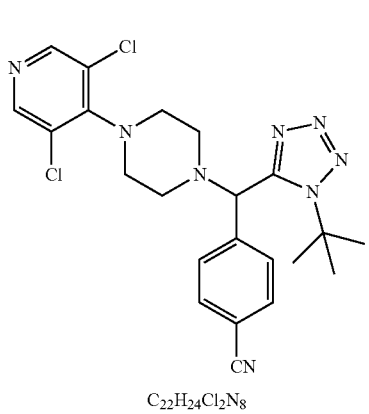

C$_{22}$H$_{24}$Cl$_2$N$_8$
MW: 471.39

The synthetic procedure of 35 was similar to that of 1. $^1$H NMR (400 MHz, CDCl$_3$) δ 8.31 (s, 2H), 4.71-7.62 (m, 4H), 5.44-5.41 (s, 1H), 3.37-3.31 (t, J=4.8 Hz, 4H), 2.88-2.81 (m, 2H), 2.61-2.54 (m, 2H), 1.77-1.73 (s, 9H). $^{13}$C NMR (100 MHz, CDCl$_3$) δ 152.9, 150.8, 149.1, 140.5, 132.4, 130.4, 128.3, 118.1, 112.7, 110.0, 64.6, 50.8, 50.2, 30.4.

1-((1-butyl-1H-tetrazol-5-yl)(4-fluorophenyl)methyl)-4-(3,5-dichloropyridin-4-yl)piperazine (36)

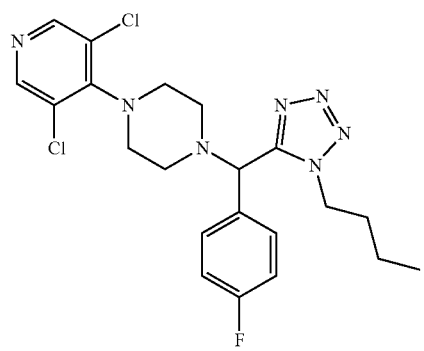

C$_{21}$H$_{24}$Cl$_2$FN$_7$
MW: 464.37

The synthetic procedure of 36 was similar to that of 1. $^1$H NMR (400 MHz, CDCl$_3$) δ 8.32 (s, 2H), 7.51-7.44 (m, 2H), 7.13-7.05 (m, 2H), 4.98 (s, 1H), 4.34 (t, J=7.5 Hz, 2H), 3.40 (t, J=4.8 Hz, 4H), 1.84-1.69 (m, 2H), 1.40-1.28 (m, 2H), 0.93 (t, J=7.4 Hz, 3H). $^{13}$C NMR (100 MHz, CDCl$_3$) δ 161.5, 153.7, 150.8, 149.1, 130.6, 130.6, 130.4, 130.4, 128.3, 116.0, 115.8, 109.9, 64.3, 51.5, 49.9, 47.4, 31.4, 19.7, 13.4.

1-((1-(tert-butyl)-1H-tetrazol-5-yl)(4-fluorophenyl)methyl)-4-(3,5-dichloropyridin-4-yl)piperazine (37)

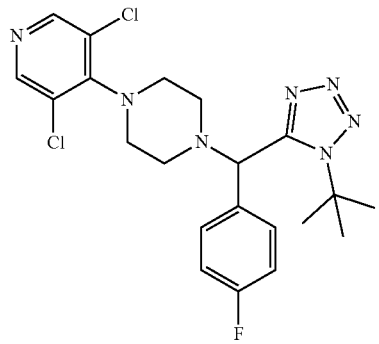

C$_{21}$H$_{24}$Cl$_2$FN$_7$
MW: 464.37

The synthetic procedure of 37 was similar to that of 1. $^1$H NMR (400 MHz, CDCl$_3$) δ 8.30 (s, 2H), 7.49-7.44 (m, 2H), 7.09-7.03 (m, 2H), 5.31 (s, 1H), 3.39-3.30 (m, 4H), 2.86-2.78 (m, 2H), 2.61-2.53 (m, 2H), 1.72 (s, 9H). $^{13}$C NMR (100 MHz, CDCl$_3$) δ 163.9, 161.4, 154.0, 151.0, 149.1, 131.5, 130.9, 128.2, 115.7, 115.5, 110.0, 64.6, 61.4, 51.0, 50.2, 30.3.

1-((1-butyl-1H-tetrazol-5-yl)(naphthalen-1-yl)methyl)-4-(3,5-dichloropyridin-4-yl)piperazine (38)

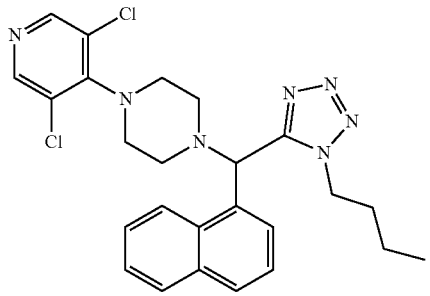

C$_{25}$H$_{27}$Cl$_2$N$_7$
MW: 496.43

The synthetic of 38 was similar to that of 1. $^1$H NMR (400 MHz, CDCl$_3$) δ 8.55-8.44 (d, J=8.3 Hz, 1H), 8.39-8.27 (s, 2H), 7.96-7.82 (ddd, J=9.3, 8.2, 1.3 Hz, 2H), 7.73-7.39 (m, 4H), 5.92-5.77 (s, 1H), 4.28-4.03 (ddd, J=10.4, 8.4, 6.6 Hz, 2H), 3.58-3.26 (ddd, J=14.8, 6.6, 2.9 Hz, 4H), 3.04-2.85 (t, J=7.3 Hz, 2H), 2.72-2.54 (d, J=7.3 Hz, 2H), 1.65-1.36 (m, 2H), 1.29-1.07 (dt, J=7.4, 6.4 Hz, 2H), 0.91-0.65 (m, 3H). $^{13}$C NMR (100 MHz, CDCl$_3$) δ 153.5, 150.9, 149.1, 134.1, 131.4, 130.5, 129.7, 128.9, 128.2, 127.0, 126.7, 126.2, 124.9, 123.3, 61.5, 51.7, 50.2, 47.4, 31.0, 19.5, 13.3.

1-((1-(tert-butyl)-1H-tetrazol-5-yl)(naphthalen-1-yl)methyl)-4-(3,5-dichloropyridin-4-yl)piperazine (39)

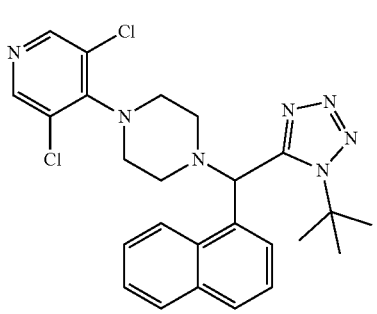

C25H27Cl2N7
MW: 496.43

The synthetic procedure of 39 was similar to that of 1. $^1$H NMR (400 MHz, CDCl$_3$) δ 8.49-8.45 (m, 1H), 8.34-8.20 (s, 2H), 7.95-7.89 (m, 1H), 7.86-7.82 (m, 1H), 7.71-7.65 (ddd, J=8.5, 6.9, 1.4 Hz, 1H), 7.61-7.55 (ddd, J=8.1, 6.8, 1.1 Hz, 1H), 7.37-7.32 (dd, J=8.2, 7.2 Hz, 1H), 7.08-7.03 (m, 1H), 6.39-6.36 (s, 1H), 3.37-3.29 (m, 2H), 3.24-3.16 (m, 4H), 2.79-2.71 (m, 2H), 1.58-1.52 (s, 9H). $^{13}$C NMR (100 MHz, CDCl$_3$) δ 153.5, 151.1, 149.1, 134.1, 131.6, 131.3, 129.5, 128.9, 128.1, 126.9, 126.1, 124.8, 123.6, 109.9, 61.2, 61.1, 50.8, 49.7, 30.0.

1-((1-butyl-1H-tetrazol-5-yl)(naphthalen-2-yl)methyl)-4-(3,5-dichloropyridin-4-yl)piperazine (40)

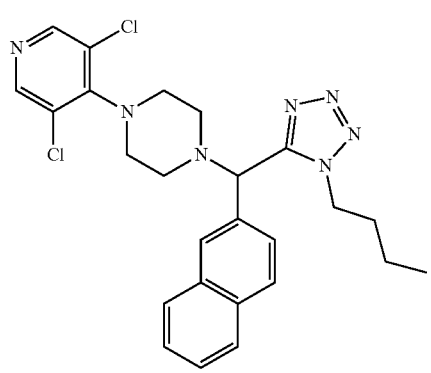

C25H27Cl2N7
MW: 496.43

The synthetic procedure of 40 was similar to that of 1. $^1$H NMR (400 MHz, CDCl$_3$) δ 8.41-8.18 (s, 2H), 7.95-7.78 (m, 4H), 7.66-7.60 (dd, J=8.5, 1.8 Hz, 1H), 7.57-7.48 (m, 2H), 5.21-5.13 (s, 1H), 4.42-4.29 (td, J=7.6, 1.7 Hz, 2H), 3.51-3.34 (t, J=4.8 Hz, 4H), 2.87-2.78 (dt, J=9.7, 4.6 Hz, 2H), 2.66-2.55 (dd, J=10.6, 5.1 Hz, 2H), 1.79-1.65 (m, 2H), 1.38-1.24 (m, 2H), 0.94-0.78 (t, J=7.4 Hz, 3H). $^{13}$C NMR (100 MHz, CDCl$_3$) δ 153.9, 150.9, 149.1, 133.2, 133.0, 132.3, 128.9, 128.3, 128.1, 127.9, 127.7, 126.8, 126.7, 125.9, 109.9, 65.3, 51.8, 50.0, 47.4, 31.3, 19.7, 13.4.

1-((1-(tert-butyl)-1H-tetrazol-5-yl)(naphthalen-2-yl)methyl)-4-(3,5-dichloropyridin-4-yl)piperazine (41)

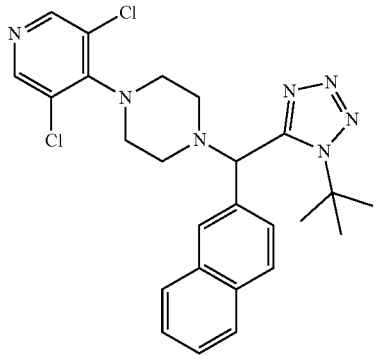

C25H27Cl2N7
MW: 496.43

The synthetic procedure of 41 was similar to that of 1. $^1$H NMR (400 MHz, CDClb) δ 8.29 (s, 2H), 7.89-7.78 (m, 3H), 7.77-7.71 (dt, J=4.4, 2.2 Hz, 2H), 7.53-7.47 (m, 2H), 5.51 (s, 1H), 3.39-3.32 (t, J=4.8 Hz, 4H), 2.94-2.87 (dd, J=10.4, 5.1 Hz, 2H), 2.68-2.61 (m, 2H), 1.72 (s, 9H). $^{13}$C NMR (100 MHz, CDCl$_3$) δ 154.1, 151.0, 149.1, 133.1, 132.9, 132.8, 128.9, 128.6, 128.2, 128.1, 127.6, 127.0, 126.7, 126.5, 65.5, 61.4, 51.1, 50.3, 30.3.

(E)-1-(1-(1-(tert-butyl)-1H-tetrazol-5-yl)-3-phenylallyl)-4-(3,5-dichloropyridin-4-yl)piperazine (43)

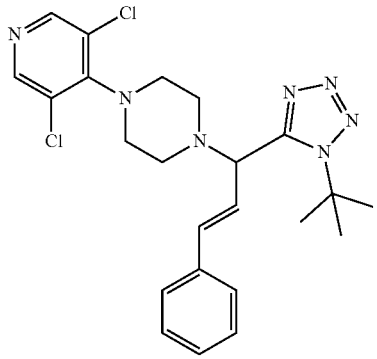

C23H27Cl2N7
MW: 472.41

The synthetic procedure of 43 was similar to that of 1. $^1$H NMR (400 MHz, CDCl$_3$) δ 8.36-8.23 (m, 2H), 7.54-7.41 (m, 1H), 7.41-7.21 (m, 4H), 6.94-6.80 (m, 1H), 6.66-6.47 (m, 1H), 4.88-4.69 (m, 1H), 3.47-3.21 (m, 4H), 2.92-2.68 (m, 4H), 1.96-1.77 (s, 9H). $^{13}$C NMR (100 MHz, CDCl$_3$) δ 153.5, 150.9, 149.1, 135.7, 128.7, 128.6, 126.8, 122.8, 63.1, 62.1, 50.4, 49.7, 29.9.

2-((1-butyl-1H-tetrazol-5-yl)(4-(3,5-dichloropyridin-4-yl)piperazin-1-yl)methyl)-1H-indole (46)

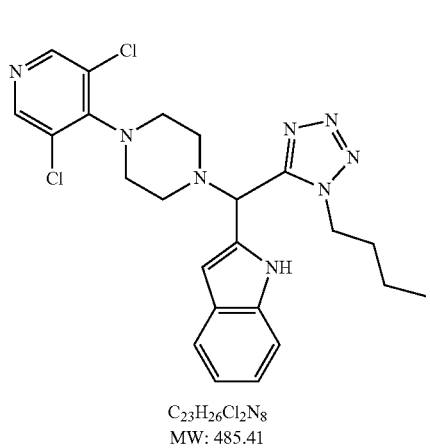

$C_{23}H_{26}Cl_2N_8$
MW: 485.41

The synthetic procedure of 46 was similar to that of 1. $^1$H NMR (400 MHz, CDCl$_3$) δ 9.57 (s, 1H), 8.30 (s, 2H), 7.60 (dd, J=7.9, 0.6 Hz, 1H), 7.43 (dd, J=8.2, 0.8 Hz, 1H), 7.23 (ddd, J=8.2, 7.1, 1.2 Hz, 1H), 7.12 (td, J=7.6, 0.9 Hz, 1H), 6.52 (d, J=1.4 Hz, 1H), 5.20 (s, 1H), 4.45 (t, J=7.4 Hz, 2H), 3.42-3.25 (m, 4H), 2.88-2.50 (m, 5H), 2.02-1.91 (m, 2H), 1.42 (dd, J=15.1, 7.5 Hz, 2H), 0.99 (t, J=7.4 Hz, 3H). $^{13}$C NMR (100 MHz, CDCl$_3$) δ 152.8, 150.8, 149.1, 136.6, 129.8, 128.4, 127.3, 122.8, 120.6, 120.1, 111.5, 104.2, 60.3, 57.8, 50.7, 49.9, 47.5, 31.6, 21.0, 19.7, 14.2, 13.5.

2-((1-(tert-butyl)-1H-tetrazol-5-yl)(4-(3,5-dichloropyridin-4-yl)piperazin-1-yl)methyl)-1H-indole (47)

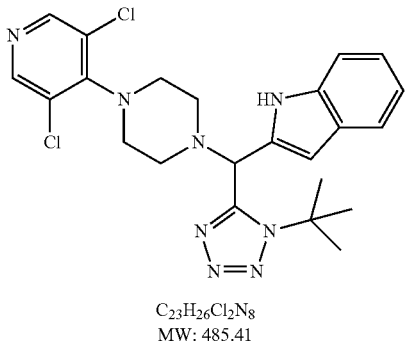

$C_{23}H_{26}Cl_2N_8$
MW: 485.41

The synthetic procedure of 47 was similar to that of 1. $^1$H NMR (400 MHz, CDCl$_3$) δ 9.59 (d, J=28.3 Hz, 1H), 8.46-8.16 (s, 2H), 7.56 (dd, J=17.7, 6.7 Hz, 1H), 7.40 (t, J=10.0 Hz, 1H), 7.30-7.17 (m, 1H), 7.17-7.06 (m, 1H), 6.49 (s, 1H), 5.49 (s, 1H), 3.49-3.24 (m, 4H), 2.92-2.73 (m, 2H), 2.69-2.49 (m, 2H), 1.84 (d, J=0.8 Hz, 9H). $^{13}$C NMR (100 MHz, CDCl$_3$) δ 153.1, 150.8, 149.1, 136.7, 130.3, 128.35, 127.2, 122.7, 120.5, 120.0, 111.5, 104.3, 62.0, 58.8, 50.7, 50.1, 30.2.

1-((1-butyl-1H-tetrazol-5-yl)(5-methylfuran-2-yl)methyl)-4-(3,5-dichloropyridin-4-yl)piperazine (48)

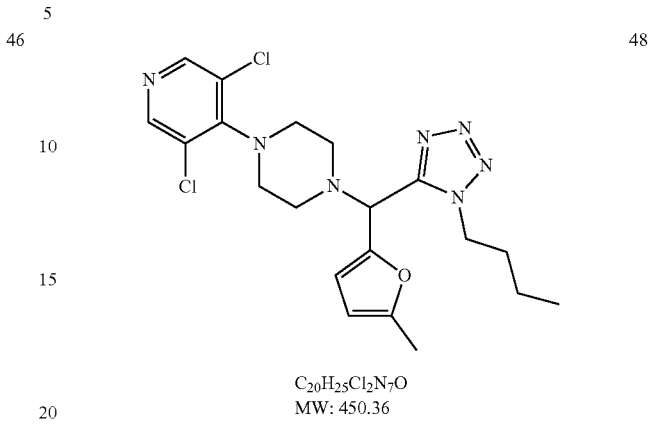

$C_{20}H_{25}Cl_2N_7O$
MW: 450.36

The synthetic procedure of 48 was similar to that of 1. $^1$H NMR (400 MHz, CDCl$_3$) δ 8.33 (s, 2H), 6.40 (d, J=3.1 Hz, 1H), 5.98 (s, 1H), 4.59 (ddd, J=8.6, 6.4, 1.5 Hz, 2H), 3.37 (t, J=4.8 Hz, 4H), 2.73-2.65 (m, 2H), 2.52 (dt, J=10.4, 4.8 Hz, 2H), 2.30 (s, 3H), 2.01-1.91 (m, 2H), 1.52-1.41 (m, 2H), 1.01 (t, J=7.4 Hz, 3H). $^{13}$C NMR (100 MHz, CDCl$_3$) δ 153.2, 152.4, 150.8, 149.2, 145.5, 128.4, 112.6, 106.7, 58.9, 51.3, 49.9, 48.0, 31.6, 19.9, 13.6, 13.6.

1-((1-(tert-butyl)-1H-tetrazol-5-yl)(5-methylfuran-2-yl)methyl)-4-(3,5-dichloropyridin-4-yl)piperazine (49)

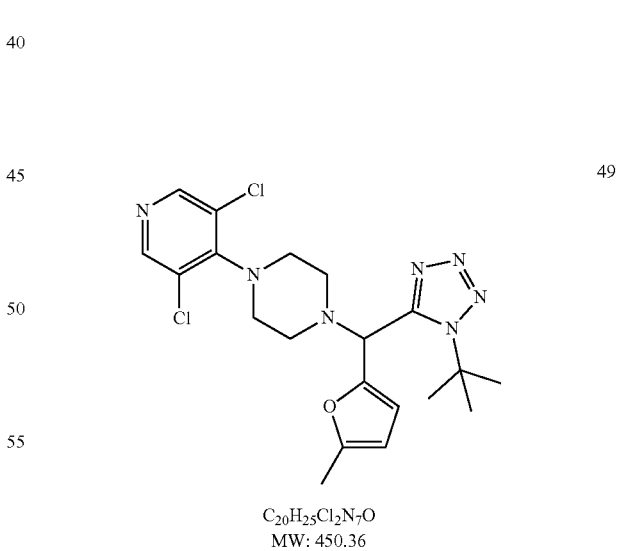

$C_{20}H_{25}Cl_2N_7O$
MW: 450.36

The synthetic procedure of 49 was similar to that of 1. $^1$H NMR (400 MHz, CDCl$_3$) δ 8.30 (s, 2H), 6.34 (s, 1H), 5.97 (s, 1H), 5.43 (s, 1H), 3.43-3.31 (m, 4H), 2.97-2.89 (m, 2H), 2.73-2.63 (m, 2H), 2.31 (s, 3H), 1.76 (s, 9H). $^{13}$C NMR (100 MHz, CDCl$_3$) δ 152.6, 152.3, 151.0, 149.1, 146.1, 128.2, 112.9, 106.7, 61.6, 58.5, 50.5, 50.2, 30.0, 13.7.

1-(3,5-dichloropyridin-4-yl)-4-(furan-2-yl(1-isopropyl-1H-tetrazol-5-yl)methyl)piperazine (50)

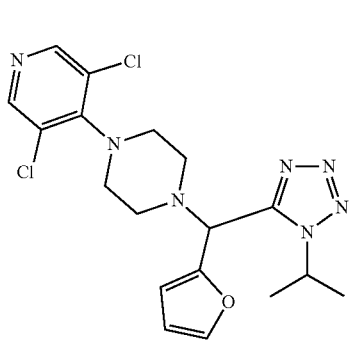

C$_{18}$H$_{21}$Cl$_2$N$_7$O
MW: 422.31

The synthetic procedure of 50 was similar to that of 1. $^1$H NMR (400 MHz, CDCl$_3$) δ 8.33 (s, 2H), 7.45 (s, 1H), 6.60-6.53 (dd, J=3.3, 0.8 Hz, 1H), 6.45-6.36 (dd, J=3.3, 1.9 Hz, 1H), 5.50-5.35 (d, J=6.7 Hz, 1H), 5.25 (s, 1H), 3.45-3.31 (m, 4H), 2.67-2.64 (m, 2H), 2.53-2.51 (m, 2H), 1.65 (d, J=6.8 Hz, 3H), 1.60 (d, J=6.4 Hz, 3H). $^{13}$C NMR (100 MHz, CDCl$_3$) δ 151.4, 150.8, 149.2, 147.6, 143.2, 128.3, 111.8, 110.8, 59.0, 51.6, 51.5, 49.9, 22.9, 22.8.

4-((4-(3,5-dichloropyridin-4-yl)piperazin-1-yl)(1-isopropyl-1H-tetrazol-5-yl)methyl)quinoline (51)

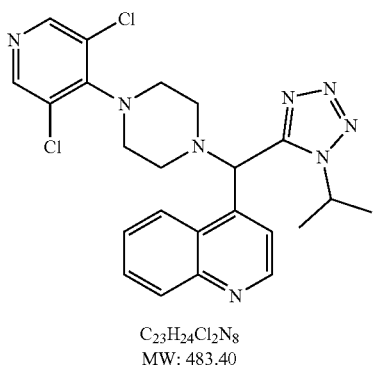

C$_{23}$H$_{24}$Cl$_2$N$_8$
MW: 483.40

The synthetic of 51 was similar to that of 1. $^1$H NMR (400 MHz, CDCl$_3$) δ 9.00-8.94 (d, J=4.5 Hz, 1H), 8.52-8.43 (m, 1H), 8.38-8.30 (s, 2H), 8.21-8.12 (m, 1H), 7.83-7.73 (m, 1H), 7.72-7.62 (m, 2H), 5.96-5.91 (s, 1H), 4.97-4.80 (t, J=6.7 Hz, 1H), 3.54-3.33 (m, 4H), 3.06-2.89 (m, 2H), 2.62-2.51 (m, 2H), 1.70-1.63 (d, J=6.7 Hz, 1H), 1.50-1.43 (d, J=6.6 Hz, 3H), 1.28-1.21 (d, J=6.7 Hz, 3H). $^{13}$C NMR (100 MHz, CDCl$_3$) δ 218.3, 151.3, 150.7, 149.8, 149.2, 149.1, 148.9, 140.4, 130.6, 129.9, 128.4, 127.6, 126.3, 123.3, 120.2, 60.6, 51.9, 51.3, 50.0, 22.7, 22.5.

1-(3,5-dichloropyridin-4-yl)-4-(1-(1-isopropyl-1H-tetrazol-5-yl)pentyl)piperazine (52)

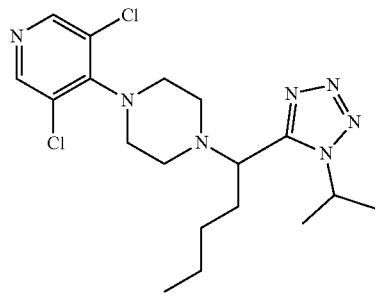

C$_{18}$H$_{27}$Cl$_2$N$_7$
MW: 412.36

The synthetic procedure of 52 was similar to that of 1. $^1$H NMR (400 MHz, CDCl$_3$) δ 8.33 (s, 2H), 4.98-4.83 (td, J=6.7, 1.1 Hz, 1H), 3.96-3.87 (ddd, J=10.2, 4.6, 1.1 Hz, 1H), 3.38-3.25 (dt, J=6.5, 3.4 Hz, 4H), 2.80-2.69 (m, 2H), 2.68-2.57 (m, 2H), 2.18-1.98 (m, 3H), 1.72-1.64 (dd, J=6.7, 1.1 Hz, 3H), 1.65-1.56 (m, 2H), 1.43-1.30 (m, 2H), 1.25-1.14 (m, 2H), 0.94-0.83 (m, 3H). $^{13}$C NMR (100 MHz, CDCl$_3$) δ 153.0, 150.8, 149.1, 128.3, 59.8, 50.6, 50.3, 49.8, 28.9, 27.0, 22.9, 22.7, 22.5, 22.5, 13.8, 13.8.

Methyl 2-(5-((4-(3,5-dichloropyridin-4-yl)piperazin-1-yl)(3-hydroxyphenyl)methyl)-1H-tetrazol-1-yl)acetate (53)

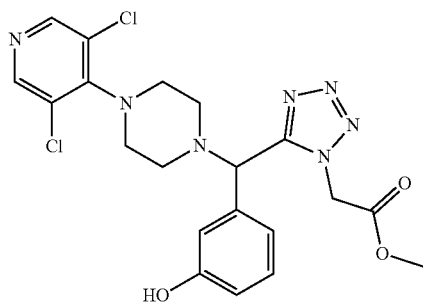

C$_{20}$H$_{21}$Cl$_2$N$_7$O$_3$
MW: 478.33

The synthetic procedure of 53 was similar to that of 1. $^1$H NMR (400 MHz, CDCl$_3$) δ 9.21 (s, 1H), 8.34-8.24 (s, 2H), 7.14 (dt, J=8.7, 6.2 Hz, 1H), 6.87-6.72 (m, 2H), 5.07 (s, 1H), 3.73 (s, 3H), 3.40-3.27 (m, 4H), 3.16 (s, 2H), 2.75-2.63 (m, 2H), 2.58-2.49 (m, 2H). $^{13}$C NMR (100 MHz, CDCl$_3$) δ 164.8, 156.5, 153.8, 149.5, 147.7, 133.7, 128.3, 126.9, 118.5, 114.8, 114.7, 63.2, 51.7, 49.9, 48.7, 47.1.

3-((1-butyl-1H-tetrazol-5-yl)(4-(4-fluorophenyl) piperazin-1-yl)methyl)phenol (54)

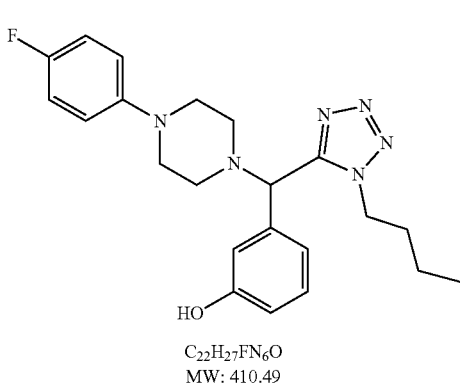

C$_{22}$H$_{27}$FN$_6$O
MW: 410.49

The synthetic procedure of 54 was similar to that of 1. $^1$H NMR (400 MHz, CDCl$_3$) δ 8.07 (s, 1H), 7.21 (dd, J=9.9, 5.9 Hz, 1H), 7.04-6.99 (m, 1H), 6.97-6.89 (m, 3H), 6.87 (ddd, J=8.2, 2.4, 0.8 Hz, 1H), 6.81 (ddd, J=6.9, 5.2, 3.1 Hz, 2H), 4.86 (s, 1H), 4.38-4.19 (m, 2H), 3.24-2.98 (m, 4H), 2.80-2.68 (m, 2H), 2.52 (dd, J=9.2, 5.0 Hz, 2H), 1.80-1.59 (m, 2H), 1.40-1.23 (m, 2H), 0.88 (t, J=7.4 Hz, 3H). $^{13}$C NMR (100 MHz, CDCl$_3$) δ 158.4, 157.3, 157.3, 156.1, 154.4, 154.4, 147.5, 135.7, 135.7, 130.0, 120.2, 117.9, 117.8, 116.6, 115.7, 115.6, 115.4, 65.1, 51.3, 50.0, 47.6, 31.1, 19.6, 13.4.

3-((1-butyl-1H-tetrazol-5-yl)(4-(2,6-dimethylphenyl) piperazin-1-yl)methyl)phenol (55)

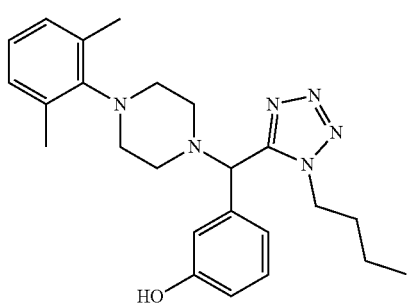

C$_{24}$H$_{32}$N$_6$O
MW: 420.55

The synthetic procedure of 55 was similar to that of 1. $^1$H NMR (400 MHz, d$_6$-DMSO) δ 9.80 (s, 1H), 7.47 (t, J=7.8 Hz, 1H), 7.32-7.14 (m, 5H), 7.02 (ddd, J=8.1, 2.4, 0.8 Hz, 1H), 5.52 (s, 1H), 4.77 (td, J=7.4, 1.7 Hz, 2H), 3.30 (t, J=4.3 Hz, 4H), 2.98-2.86 (m, 2H), 2.77-2.68 (m, 2H), 2.53 (d, J=7.7 Hz, 6H), 2.05-1.87 (m, 2H), 1.54 (ddd, J=14.9, 7.5, 2.3 Hz, 2H), 1.14 (t, J=7.4 Hz, 3H). $^{13}$C NMR (100 MHz, d$_6$-DMSO) δ 157.8, 154.7, 148.2, 137.1, 136.5, 129.8, 129.2, 125.2, 120.2, 116.2, 115.6, 63.1, 51.7, 49.8, 47.0, 31.5, 19.7, 19.5, 13.8.

tert-butyl 4-((1-butyl-1H-tetrazol-5-yl)(3-hydroxy-phenyl)methyl)piperazine-1-carboxylate (56)

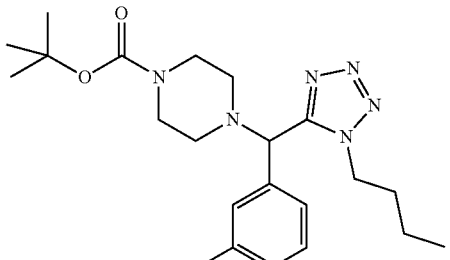

C$_{21}$H$_{32}$N$_6$O$_3$
MW: 416.52

The synthetic procedure of 56 was similar to that of 1. $^1$H NMR (400 MHz, CDCl$_3$) δ 8.06 (s, 1H), 7.24-7.16 (m, 1H), 6.95-6.92 (m, 1H), 6.87 (dd, J=7.9, 2.1 Hz, 2H), 4.82 (s, 1H), 4.32-4.19 (m, 2H), 3.58-3.33 (m, 4H), 2.67-2.50 (m, 2H), 2.42-2.29 (m, 2H), 1.76-1.60 (m, 2H), 1.45 (s, 9H), 1.36-1.20 (m, 2H), 0.88 (t, J=7.4 Hz, 3H). $^{13}$C NMR (100 MHz, CDCl$_3$) δ 157.4, 154.7, 154.2, 135.6, 130.0, 120.2, 116.5, 115.6, 80.1, 65.0, 51.0, 47.5, 31.1, 28.3, 19.6, 13.4.

benzyl 4-((1-butyl-1H-tetrazol-5-yl)(3-hydroxyphe-nyl)methyl)piperazine-1-carboxylate (57)

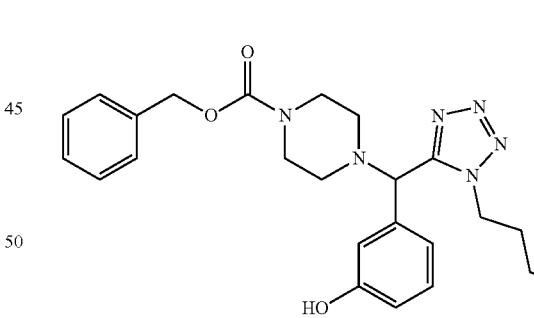

C$_{24}$H$_{30}$N$_6$O$_3$
MW: 450.53

The synthetic procedure of 57 was similar to that of 1. $^1$H NMR (400 MHz, d$_6$-DMSO) δ 9.49 (s, 1H), 7.38-7.24 (m, 4H), 7.18-7.11 (m, 1H), 6.87-6.77 (m, 2H), 6.70 (ddd, J=8.1, 2.4, 0.8 Hz, 1H), 5.22 (d, J=6.0 Hz, 1H), 5.03 (s, 2H), 4.45-4.31 (m, 2H), 3.38 (s, 4H), 3.32 (s, 2H), 2.58-2.49 (m, 2H), 2.39-2.22 (m, 2H), 1.71-1.47 (m, 2H), 1.28-1.08 (m, 2H), 0.79 (t, J=7.4 Hz, 3H). $^{13}$C NMR (100 MHz, d$_6$-DMSO) δ 157.8, 154.7, 154.4, 137.3, 136.7, 129.8, 128.8, 128.2, 127.9, 120.1, 116.2, 115.8, 66.6, 62.4, 49.9, 47.0, 44.0, 31.3, 19.4, 13.7.

3-((1-butyl-1H-tetrazol-5-yl)(4-(6-(trifluoromethyl)pyridin-2-yl)piperazin-1-yl)methyl)phenol (58)

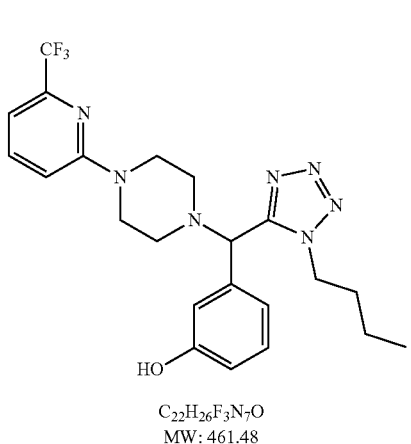

C$_{22}$H$_{26}$F$_3$N$_7$O
MW: 461.48

The synthetic procedure of 58 was similar to that of 1. $^1$H NMR (400 MHz, d$_6$-DMSO) δ 9.50 (s, 1H) 7.80-7.60 (m, 1H), 7.25-7.11 (m, 1H), 7.05 (d, J=8.8 Hz, 1H), 7.00 (d, J=7.3 Hz, 1H), 6.91-6.81 (m, 2H), 6.71 (ddd, J=8.1, 2.4, 0.8 Hz, 1H), 5.25 (s, 1H), 4.50-4.35 (m, 2H), 3.55 (t, J=4.9 Hz, 3H), 2.69-2.53 (m, 2H), 2.42 (ddd, J=41.8, 24.5, 16.6 Hz, 2H), 1.75-1.48 (m, 2H), 1.35-1.09 (m, 2H), 0.80 (t, J=7.4 Hz, 3H). $^{13}$C NMR (100 MHz, do-DMSO) δ 158.7, 157.8, 154.5, 139.4, 136.8, 129.9, 120.1, 116.1, 115.7, 111.1, 109.0, 62.5, 49.9, 47.0, 44.7, 31.4, 19.4, 13.7.

3-((1-butyl-1H-tetrazol-5-yl)(4-(2-methoxyphenyl)piperazin-1-yl)methyl)phenol (59)

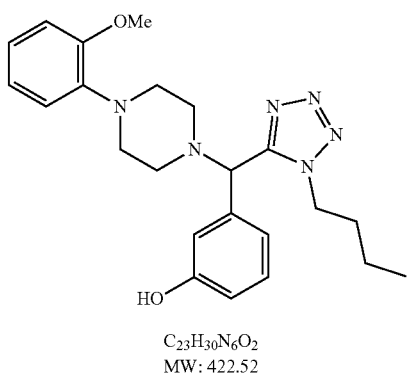

C$_{23}$H$_{30}$N$_6$O$_2$
MW: 422.52

The synthetic procedure of 59 was similar to that of 1. $^1$H NMR (400 MHz, CDCl$_3$) δ 7.79 (s, 1H), 7.25-7.17 (m, 1H), 7.02 (dd, J=4.0, 2.2 Hz, 1H), 7.00-6.97 (m, 1H), 6.95 (d, J=7.7 Hz, 1H), 6.93-6.87 (m, 2H), 6.87-6.81 (m, 2H), 4.85 (s, 1H), 4.42-4.23 (m, 2H), 3.80 (s, 3H), 3.08 (s, 4H), 2.76 (d, J=5.2 Hz, 2H), 2.58 (d, J=6.0 Hz, 2H), 1.80-1.62 (m, 2H), 1.38-1.24 (m, 2H), 0.90 (t, J=7.4 Hz, 3H). $^{13}$C NMR (100 MHz, CDCl$_3$) δ 157.2, 154.5, 152.2, 140.7, 135.9, 129.9, 123.2, 120.9, 120.3, 118.2, 116.4, 115.9, 111.1, 65.4, 55.3, 51.6, 50.4, 47.5, 31.2, 19.7, 13.4.

3-((1-butyl-1H-tetrazol-5-yl)(4-(3-(trifluoromethyl)pyridin-2-yl)piperazin-1-yl)methyl)phenol (60)

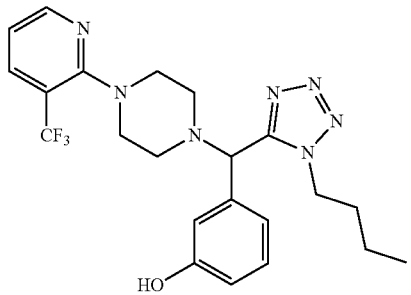

C$_{22}$H$_{26}$F$_3$N$_7$O
MW: 461.48

The synthetic procedure of 60 was similar to that of 1.

3-((1-butyl-1H-tetrazol-5-yl)(4-(3-chloro-5-(trifluoromethyl)pyridin-2-yl)piperazin-1-yl)methyl)phenol (61)

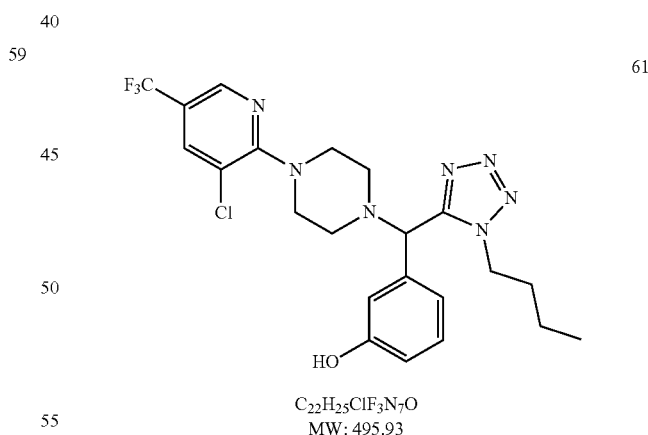

C$_{22}$H$_{25}$ClF$_3$N$_7$O
MW: 495.93

The synthetic procedure of 61 was similar to that of 1. $^1$H NMR (400 MHz, d$_6$-DMSO) δ 9.49 (s, 1H), 8.51 (dd, J=1.9, 0.8 Hz, 1H), 8.13 (d, J=2.1 Hz, 1H), 7.16 (t, J=7.8 Hz, 1H), 6.98-6.80 (m, 2H), 6.78-6.63 (m, 1H), 5.28 (s, 1H), 4.42 (td, J=7.3, 2.0 Hz, 2H), 3.44 (t, J=4.5 Hz, 4H), 2.77-2.61 (m, 2H), 2.59-2.49 (m, 2H), 1.61 (dd, J=14.9, 7.7 Hz, 2H), 1.19 (ddd, J=11.4, 7.3, 3.3 Hz, 2H), 0.80 (t, J=7.4 Hz, 3H). $^{13}$C NMR (100 MHz, d$_6$-DMSO) δ 159.8, 157.8, 154.4, 136.6, 129.8, 120.4, 120.2, 116.3, 115.8, 62.5, 49.9, 48.7, 47.0, 31.4, 19.4, 13.7.

3-((1-butyl-1H-tetrazol-5-yl)(4-(pyridin-2-yl)piperazin-1-yl)methyl)phenol (62)

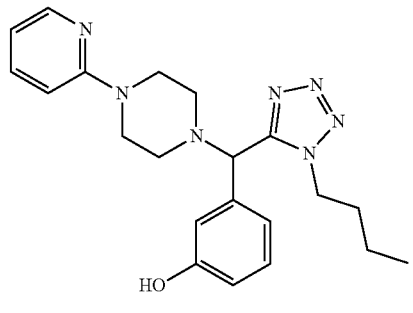

C$_{21}$H$_{27}$N$_{7}$O
MW: 393.49

The synthetic procedure of 62 was similar to that of 1. $^1$H NMR (400 MHz, do-DMSO) δ 9.50 (s, 1H), 8.24-7.97 (m, 1H), 7.47 (ddd, J=8.9, 7.1, 2.0 Hz, 1H), 7.29-7.11 (m, 1H), 6.98-6.83 (m, 2H), 6.82-6.67 (m, 2H), 6.59 (dd, J=6.8, 5.0 Hz, 1H), 5.21 (s, 1H), 4.50-4.35 (m, 2H), 3.46 (t, J=4.9 Hz, 4H), 2.71-2.55 (m, 2H), 2.45-2.32 (m, 2H), 1.81-1.52 (m, 2H), 1.36-1.07 (m, 2H), 0.80 (t, J=7.4 Hz, 3H). $^{13}$C NMR (100 MHz, do-DMSO) δ 159.2, 157.8, 154.6, 147.9, 137.9, 136.9, 129.8, 120.1, 116.2, 115.7, 113.4, 107.5, 62.7, 50.1, 47.0, 45.1, 31.4, 19.4, 13.7.

1-(4-(4-((1-butyl-1H-tetrazol-5-yl)(3-hydroxyphenyl)methyl)piperazin-1-yl)phenyl)ethanone (63)

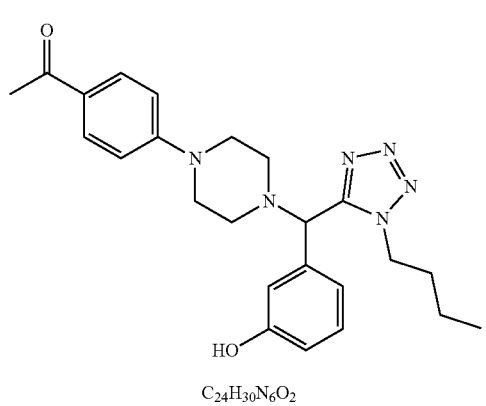

C$_{24}$H$_{30}$N$_{6}$O$_{2}$
MW: 434.53

The synthetic procedure of 63 was similar to that of 1. $^1$H NMR (400 MHz, CDCl$_3$) δ 8.09 (t, J=19.1 Hz, 1H), 7.97-7.74 (m, 2H), 7.26-7.19 (m, 1H), 7.07-7.01 (m, 1H), 6.90 (dd, J=8.0, 2.1 Hz, 2H), 6.78 (t, J=5.9 Hz, 2H), 4.89 (s, 1H), 4.30 (dd, J=27.7, 20.2 Hz, 2H), 3.48-3.22 (m, 4H), 2.87-2.69 (m, 2H), 2.66-2.43 (m, 5H), 1.80-1.57 (m, 2H), 1.38-1.18 (m, 2H), 0.87 (t, J=7.4 Hz, 3H). $^{13}$C NMR (100 MHz, CDCl$_3$) δ 197.1, 157.4, 154.1, 153.9, 135.6, 130.4, 130.1, 127.5, 120.2, 116.6, 115.6, 113.3, 64.9, 50.9, 47.5, 47.1, 31.1, 26.1, 19.6, 13.4.

1-(1-((1-butyl-1H-tetrazol-5-yl)(3-hydroxyphenyl)methyl)piperidin-4-yl)-1H-benzo[d]imidazol-2(3H)-one (64)

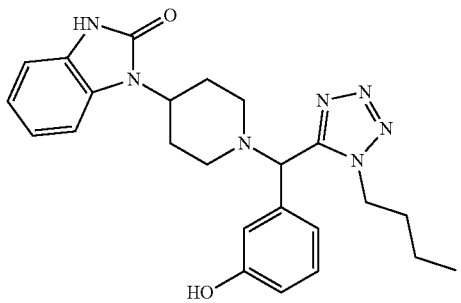

C$_{24}$H$_{29}$N$_{7}$O$_{2}$
MW: 447.53

The synthetic procedure of 64 was similar to that of 1. $^1$H NMR (400 MHz, CDCl$_3$) δ 9.17 (s, 1H), 7.17 (dd, J=9.6, 6.2 Hz, 2H), 7.03-6.96 (m, 3H), 6.93 (d, J=1.7 Hz, 1H), 6.86 (d, J=7.7 Hz, 1H), 6.79 (dd, J=8.1, 1.7 Hz, 1H), 5.01 (s, 1H), 4.45-4.31 (m, 2H), 4.30-4.14 (m, 1H), 3.25-3.04 (m, 2H), 2.88 (d, J=9.0 Hz, 1H), 2.61-2.33 (m, 3H), 2.18 (t, J=11.1 Hz, 1H), 1.74 (dt, J=15.2, 7.6 Hz, 4H), 1.44-1.27 (m, 2H), 0.93 (t, J=7.4 Hz, 3H). $^{13}$C NMR (100 MHz, CDCl$_3$) δ 156.7, 153.4, 153.2, 135.3, 128.6, 128.1, 127.5, 119.7, 119.4, 118.4, 114.7, 114.7, 108.3, 107.7, 63.2, 50.0, 49.4, 49.3, 46.3, 39.4, 39.2, 39.0, 38.8, 38.6, 30.2, 28.2, 28.1, 18.6, 12.5.

3-((1-butyl-1H-tetrazol-5-yl)(4-(2-fluorophenyl)piperazin-1-yl)methyl)phenol (65)

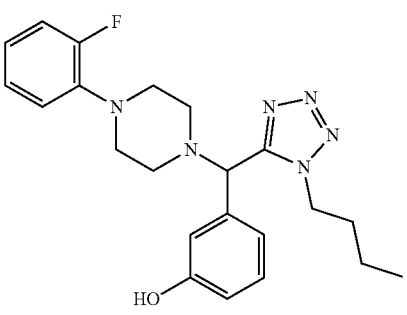

C$_{22}$H$_{27}$FN$_{6}$O
MW: 410.49

The synthetic procedure of 65 was similar to that of 1. $^1$H NMR (400 MHz, CDCl$_3$) δ 7.67 (s, 1H), 7.29-7.17 (m, 1H), 7.09-6.84 (m, 6H), 4.85 (s, 1H), 4.35-4.25 (m, 2H), 3.22-2.99 (m, 4H), 2.83-2.68 (m, 2H), 2.57 (dd, J=9.0, 5.6 Hz, 2H), 1.86-1.62 (m, 2H), 1.39-1.22 (m, 2H), 0.90 (t, J=7.4 Hz, 3H). $^{13}$C NMR (100 MHz, CDCl$_3$) δ 157.2, 156.9, 154.4, 139.7, 139.6, 135.8, 130.0, 124.4, 124.4, 122.6, 122.6, 120.4, 118.9, 118.9, 116.6, 116.2, 116.0, 115.8, 65.3, 51.5, 50.3, 50.2, 47.5, 31.2, 19.7, 13.4.

3-((1-butyl-1H-tetrazol-5-yl)(4-(2,3-dimethylphenyl)piperazin-1-yl)methyl)phenol (66)

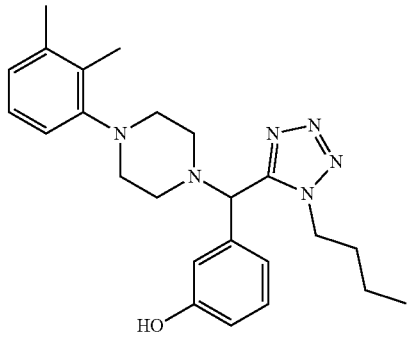

C$_{24}$H$_{32}$N$_6$O
MW: 420.55

The synthetic procedure of 66 was similar to that of 1. $^1$H NMR (400 MHz, CDCl$_3$) δ 7.77 (s, 1H), 7.31-7.20 (m, 1H), 7.09-7.01 (m, 2H), 6.97 (d, J=7.7 Hz, 1H), 6.93-6.87 (m, 2H), 6.84 (d, J=8.0 Hz, 1H), 4.90 (s, 1H), 4.43-4.28 (m, 2H), 3.00-2.78 (m, 4H), 2.73 (s, 2H), 2.53 (s, 2H), 2.31-2.20 (m, 3H), 2.14 (s, 3H), 1.72 (dt, J=15.2, 7.6 Hz, 2H), 1.42-1.27 (m, 2H), 0.91 (t, J=7.4 Hz, 3H). $^{13}$C NMR (100 MHz, CDCl$_3$) δ 157.3, 154.5, 151.1, 137.9, 136.1, 131.2, 130.0, 125.7, 125.1, 120.3, 116.5, 116.5, 115.8, 65.4, 52.1, 51.8, 47.6, 31.2, 20.5, 19.7, 13.9, 13.4.

3-((1-butyl-1H-tetrazol-5-yl)(4-phenylpiperazin-1-yl)methyl)phenol (67)

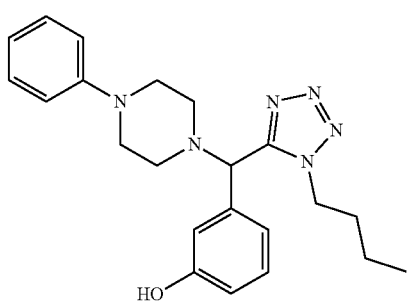

C$_{22}$H$_{28}$N$_6$O
MW: 392.50

The synthetic procedure of 67 was similar to that of 1.

(E)-3-((1-(tert-butyl)-1H-tetrazol-5-yl)(4-cinnamylpiperazin-1-yl)methyl)phenol (68)

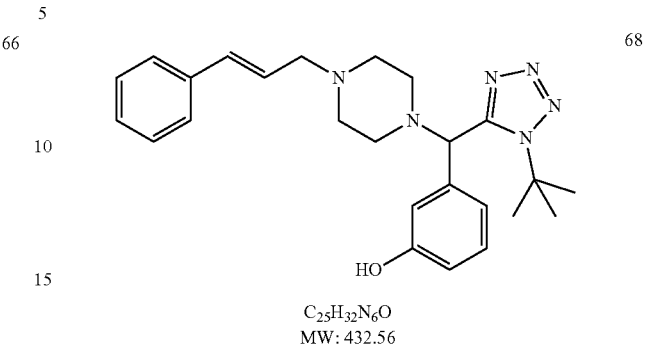

C$_{25}$H$_{32}$N$_6$O
MW: 432.56

The synthetic procedure of 68 was similar to that of 1. $^1$H NMR (400 MHz, CDCl$_3$) δ 7.28-7.20 (m, 4H), 7.20-7.12 (m, 2H), 6.94-6.87 (m, 1H), 6.83 (d, J=7.7 Hz, 1H), 6.76-6.70 (m, 1H), 6.45 (t, J=18.1 Hz, 1H), 6.17 (dt, J=15.7, 6.9 Hz, 1H), 5.10 (d, J=7.4 Hz, 1H), 3.25-3.02 (m, 2H), 2.64 (dd, J=81.7, 60.1 Hz, 8H), 1.63 (s, 9H). $^{13}$C NMR (100 MHz, CDCl$_3$) δ 156.9, 154.3, 136.5, 134.6, 134.0, 129.5, 128.4, 127.5, 126.3, 124.9, 121.2, 116.9, 116.4, 64.9, 61.5, 60.6, 52.9, 50.2, 30.1.

1-(1-(1-butyl-1H-tetrazol-5-yl)-3-phenylpropyl)-4-(3,5-dichloropyridin-4-yl)piperazine (69)

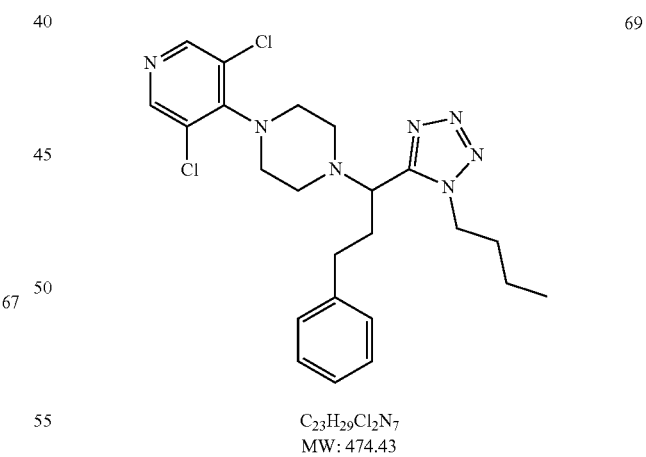

C$_{23}$H$_{29}$Cl$_2$N$_7$
MW: 474.43

The synthetic procedure of 69 was similar to that of 1. $^1$H NMR (400 MHz, CDCl$_3$) δ 8.53-8.17 (m, 2H), 7.33-7.26 (m, 2H), 7.25-7.18 (m, 1H), 7.18-7.12 (m, 2H), 4.36-4.19 (m, 2H), 3.86 (dd, J=9.6, 4.5 Hz, 1H), 3.40-3.16 (m, 4H), 2.88-2.75 (m, 1H), 2.75-2.59 (m, 4H), 2.59-2.32 (m, 3H), 1.95-1.79 (m, 2H), 1.44-1.28 (m, 2H), 0.95 (t, J=7.4 Hz, 3H). $^{13}$C NMR (100 MHz, CDCl$_3$) δ 153.3, 150.9, 149.1, 140.6, 128.5, 128.4, 128.4, 126.3, 57.9, 50.2, 49.4, 47.2, 32.4, 31.5, 27.8, 19.8, 13.5.

1-(1-(1-(tert-butyl)-1H-tetrazol-5-yl)-3-phenylpropyl)-4-(3,5-dichloropyridin-4-yl)piperazine (70)

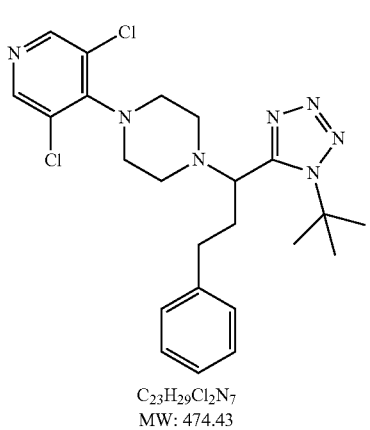

$C_{23}H_{29}Cl_2N_7$
MW: 474.43

The synthetic procedure of 70 was similar to that of 1. $^1$H NMR (400 MHz, CDCl$_3$) δ 8.38-8.26 (m, 2H), 7.32-7.21 (m, 2H), 7.21-7.12 (m, 3H), 4.22 (dd, J=9.3, 4.4 Hz, 1H), 3.36-3.19 (m, 6H), 2.83-2.63 (m, 4H), 1.70 (s, 9H), 1.67-1.61 (m, 2H). $^{13}$C NMR (100 MHz, CDCl$_3$) δ151.5, 149.0, 147.2, 139.25, 126.7, 126.6, 126.5, 126.5, 126.2, 124.3, 60.1, 56.4, 48.5, 46.9, 30.4, 27.9, 27.8, 25.3.

(E)-3-((1-butyl-1H-tetrazol-5-yl)(4-cinnamylpiperazin-1-yl)methyl)phenol (71)

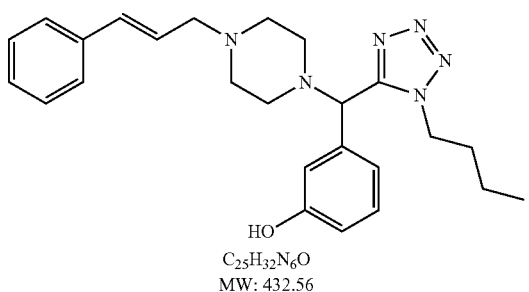

$C_{25}H_{32}N_6O$
MW: 432.56

The synthetic procedure of 71 was similar to that of 1. $^1$H NMR (400 MHz, CDCl$_3$) δ 9.14 (s, 1H), 7.32-7.21 (m, 3H), 7.21-7.12 (m, 2H), 6.89 (s, 1H), 6.85 (d, J=7.6 Hz, 1H), 6.78 (dd, J=8.1, 2.2 Hz, 1H), 6.48 (d, J=15.8 Hz, 1H), 6.25-6.09 (m, 1H), 4.87-4.75 (m, 1H), 4.32-4.16 (m, 2H), 3.23-3.07 (m, 2H), 2.67 (m, 8H), 1.76-1.59 (m, 2H), 1.37-1.19 (m, 2H), 0.86 (t, J=7.4 Hz, 3H). $^{13}$C NMR (100 MHz, CDCl$_3$) δ 157.3, 154.3, 136.5, 135.3, 134.0, 129.9, 128.4, 127.6, 126.3, 124.9, 120.0, 116.5, 116.1, 64.8, 60.5, 52.7, 50.6, 47.4, 31.1, 19.6, 13.4.

3-((1-butyl-1H-tetrazol-5-yl)(4-(2,5-dimethylphenyl)piperazin-1-yl)methyl)phenol (72)

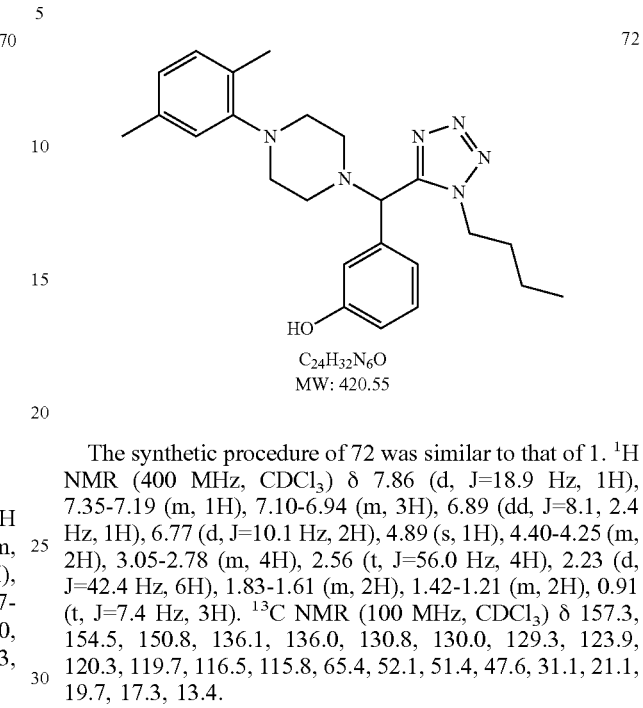

$C_{24}H_{32}N_6O$
MW: 420.55

The synthetic procedure of 72 was similar to that of 1. $^1$H NMR (400 MHz, CDCl$_3$) δ 7.86 (d, J=18.9 Hz, 1H), 7.35-7.19 (m, 1H), 7.10-6.94 (m, 3H), 6.89 (dd, J=8.1, 2.4 Hz, 1H), 6.77 (d, J=10.1 Hz, 2H), 4.89 (s, 1H), 4.40-4.25 (m, 2H), 3.05-2.78 (m, 4H), 2.56 (t, J=56.0 Hz, 4H), 2.23 (d, J=42.4 Hz, 6H), 1.83-1.61 (m, 2H), 1.42-1.21 (m, 2H), 0.91 (t, J=7.4 Hz, 3H). $^{13}$C NMR (100 MHz, CDCl$_3$) δ 157.3, 154.5, 150.8, 136.1, 136.0, 130.8, 130.0, 129.3, 123.9, 120.3, 119.7, 116.5, 115.8, 65.4, 52.1, 51.4, 47.6, 31.1, 21.1, 19.7, 17.3, 13.4.

2-((4-(3,5-dichloropyridin-4-yl)piperazin-1-yl)(phenyl)methyl)-1-Isobutyl-1H-benzo[d]imidazole (73)

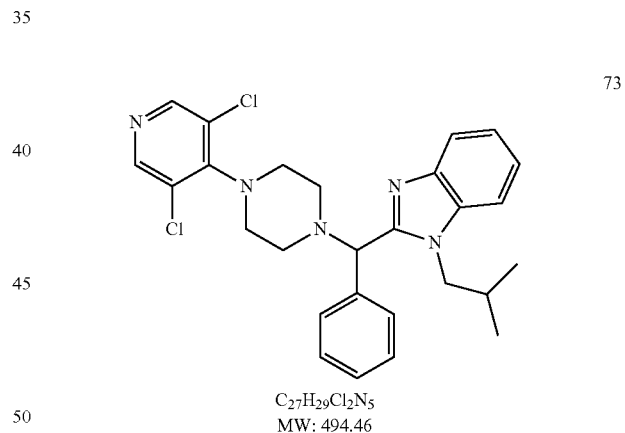

$C_{27}H_{29}Cl_2N_5$
MW: 494.46

A mixture of 1-(3,5-dichloropyridin-4-yl)piperazine (116 mg, 0.5 mmol), 2-(N-Boc-amino)-phenyl-isocyanide (109 mg, 0.50 mmol) and benzaldehyde (53 mg, 0.5 mmol) in DCM (1 mL) in the presence of phenylphosphinic acid (0.4 mmol) was stirred at room temperature for 16 h. The reaction solvent was removed under reduced pressure. The residue was dissolved in 10% TFA/DCE (2 mL) and heated under microwave irradiation at 100° C. for 10 min. After the microwave vial was cooled to room temperature, the solvent was diluted with EtOAc (15 mL) and washed with saturated Na$_2$CO$_3$ (10 mL). The organic layer was dried over MgSO$_4$ and concentrated to obtain the benzimidazole intermediate. The intermediate was dissolved in DMF (1 mL) and was further treated with sodium hydride (24 mg, 1.0 mmol) and isopropyl bromide (137 mg, 1.0 mmol). The reaction mixture was stirred at rt for 4 hr. The reaction solution was neutralized with 1N HCl (1 mL), washed with DCM (5 mL) and brine (5 mL). The organic layer was dried over MgSO$_4$, evaporated in vacuo. The residue was purified by Teledyne Isco CombiFlash Rf (hexane/EtOAc 20-100%) to afford 73. $^1$H NMR (400 MHz, CDCl$_3$) δ 8.42-8.21 (s, 2H), 7.95-7.80 (m, 1H). 7.64-7.55 (m, 2H), 7.38-7.27 (m, 4H), 7.26-7.20 (m, 2H), 4.80 (s, 1H), 4.01-3.82 (m, 2H), 3.55-3.35 (m, 4H), 2.66 (m, 4H), 1.28 (m, 1H), 0.97-0.87 (m, 6H). $^{13}$C NMR (100 MHz, CDCl$_3$) δ 151.4, 149.1, 135.2, 129.4, 128.6, 128.2, 128.1, 122.3, 121.9, 120.1, 110.0, 68.3, 52.4, 51.1, 50.0, 29.3, 20.2.

2-((4-(3,5-dichloropyridin-4-yl)piperazin-1-yl)(pyridin-3-yl)methyl)-1-isobutyl-1H-benzo[d]imidazole (74)

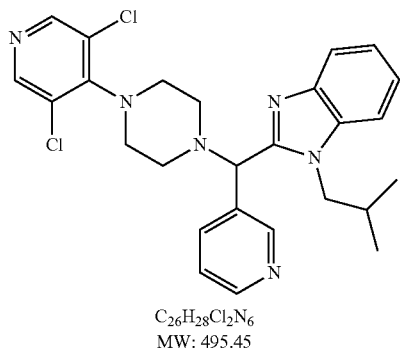

C$_{26}$H$_{28}$Cl$_2$N$_6$
MW: 495.45

The synthetic procedure of 74 was similar to that of 73. $^1$H NMR (400 MHz, CDCl$_3$) δ 8.84-8.71 (s, 1H), 8.61-8.48 (m, 1H), 8.35-8.26 (m, 2H), 8.22-8.13 (m, 1H), 7.94-7.82 (m, 1H), 7.38-7.31 (m, 2H), 7.31-7.24 (m, 2H), 4.91 (s, 1H), 4.15-3.93 (m, 2H), 3.54-3.34 (m, 4H), 2.68 (m, 4H), 1.31-1.22 (m, 1H), 1.03-0.81 (m, 6H). $^{13}$C NMR (100 MHz, CDCl$_3$) δ 151.0, 150.1, 149.6, 149.1, 137.6, 135.2, 128.2, 123.9, 122.8, 122.3, 120.1, 110.1, 64.8, 51.9, 51.2, 49.9, 29.6, 20.4, 20.3.

2-((4-(3,5-dichloropyridin-4-yl)piperazin-1-yl)(pyridin-3-yl)methyl)-1-methyl-1H-benzo[d]imidazole (75)

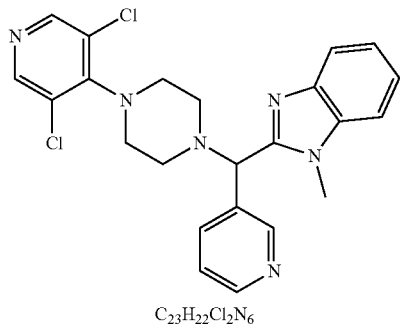

C$_{23}$H$_{22}$Cl$_2$N$_6$
MW: 453.37

The synthetic procedure of 75 was similar to that of 73. $^1$H NMR (400 MHz, CDCl$_3$) δ 8.92-8.78 (m, 1H), 8.59-8.50 (m, 1H), 8.39-8.25 (s, 2H), 8.08-7.99 (m, 1H), 7.83-7.75 (m, 1H), 7.35-7.21 (m, 4H), 5.03 (s, 1H), 3.92 (s, 3H), 3.52-3.36 (m, 4H), 2.90-2.55 (m, 4H). $^{13}$C NMR (100 MHz, CDCl$_3$) δ 151.8, 150.9, 149.8, 149.4, 149.0, 142.1, 136.9, 136.0, 132.6, 128.2, 123.8, 122.9, 122.3, 119.9, 109.2, 66.8, 52.1, 50.0, 30.3.

1-(2-(1-(tert-butyl)-1H-tetrazol-5-yl)propan-2-yl)-4-(3,5-dichloropyridin-4-yl)piperazine (76)

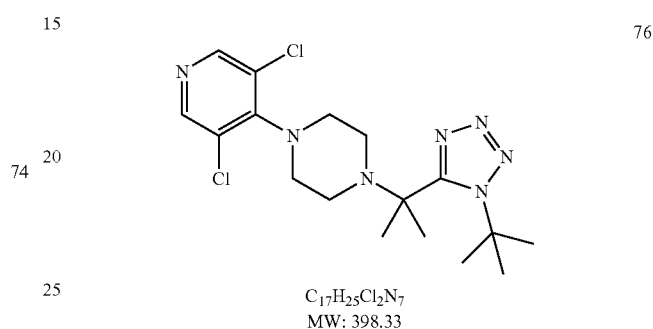

C$_{17}$H$_{25}$Cl$_2$N$_7$
MW: 398.33

The synthetic procedure of 76 was similar to that of 1. $^1$H NMR (400 MHz, CDCl$_3$) δ 8.33 (s, 2H), 3.42-3.26 (m, 4H), 2.76-2.57 (m, 4H), 1.91 (s, 9H), 1.68 (s, 6H). $^{13}$C NMR (100 MHz, CDCl$_3$) δ 159.8, 150.8, 149.1, 128.2, 64.5, 59.3, 50.0, 46.7, 31.4, 24.0.

1-(1-(1-(tert-butyl)-1H-tetrazol-5-yl)cyclohexyl)-4-(3,5-dichloropyridin-4-yl)piperazine (77)

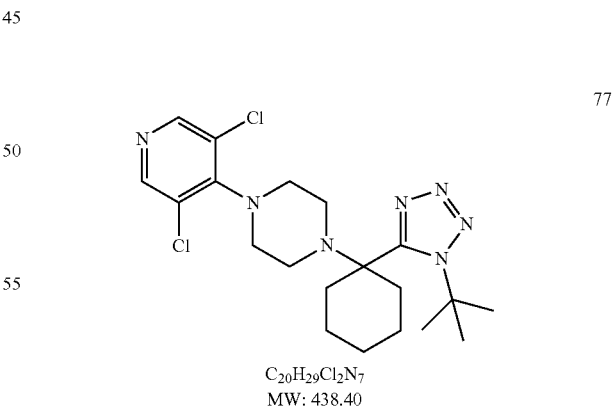

C$_{20}$H$_{29}$Cl$_2$N$_7$
MW: 438.40

The synthetic procedure of 77 was similar to that of 1. $^1$H NMR (400 MHz, CDCl$_3$) δ 8.31 (s, (m, 4H), 2.66 (m, 4H), 1.88 (s, 9H), 1.86-1.80 (m, 4H), 1.78-1.69 (m, 2H), 1.64 (m, 2H), 1.31-1.11 (m, 2H). $^{13}$C NMR (100 MHz, CDCl$_3$) δ 157.2, 150.8, 149.1, 128.2, 64.9, 62.5, 62.1, 50.4, 46.4, 38.5, 31.9, 30.6, 25.7, 24.7, 23.3, 21.0.

1-((1-(tert-butyl)-1H-tetrazol-5-yl)(3-methoxyphenyl)methyl)-4-(3-chloro-5-(trifluoromethyl)pyridin-2-yl)piperazine (78)

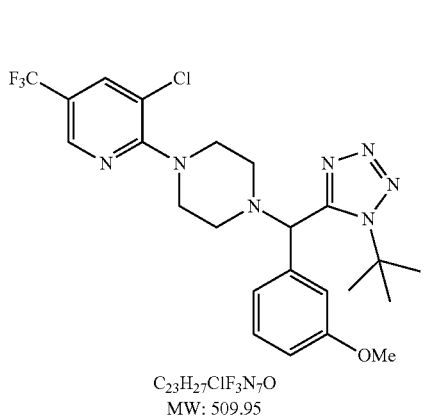

C₂₃H₂₇ClF₃N₇O
MW: 509.95

The synesthetic procedure of 78 was similar to that of 1. ¹H NMR (400 MHz, CDCl₃) δ 8.40-8.31 (m, 1H), 7.69 (t, J=9.6 Hz, 1H), 7.29-7.22 (m, 1H), 7.07 (s, 1H), 6.98 (t, J=10.3 Hz, 1H), 6.87 (dd, J=8.1, 2.3 Hz, 1H), 5.36-5.25 (s, 1H), 3.80 (s, 3H), 3.52 (t, J=4.8 Hz, 4H), 2.99-2.78 (m, 2H), 2.69-2.53 (m, 2H), 1.78-1.65 (s, 9H). ¹³C NMR (100 MHz, CDCl₃) δ 159.5, 142.9, 129.3, 122.2, 115.6, 114.1, 65.1, 55.3, 50.2, 48.3, 30.4.

4-((1-(tert-butyl)-1H-tetrazol-5-yl)(4-(3-chloro-5-(trifluoromethyl)pyridin-2-yl)piperazin-1-yl)methy)quinoline (79)

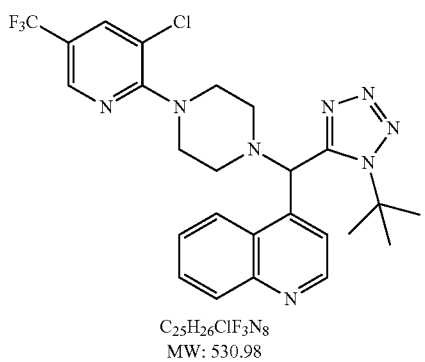

C₂₅H₂₆ClF₃N₈
MW: 530.98

The synthetic procedure of 79 was similar to that of 1. ¹H NMR (400 MHz, CDCl₃) δ 8.83 (t, J=5.2 Hz, 1H), 8.48 (dd, J=13.9, 13.2 Hz, 1H), 8.32 (dt, J=18.6, 9.3 Hz, 1H), 8.27-8.16 (m, 1H), 7.88-7.79 (m, 1H), 7.78-7.65 (m, 2H), 7.01 (d, J=4.5 Hz, 1H), 6.40 (s, 1H), 3.52 (ddd, J=12.0, 6.9, 2.6 Hz, 2H), 3.42-3.32 (m, 2H), 3.30-3.17 (m, 2H), 2.78-2.61 (m, 2H), 1.61 (s, 9H). ¹³C NMR (100 MHz, CDCl₃) δ 159.8, 152.1, 149.9, 148.9, 142.9, 141.0, 135.9, 130.5, 129.9, 128.0, 126.5, 123.7, 122.0, 120, 61.7, 60.0, 48.7, 30.0.

1-((1-(tert-butyl)-1H-tetrazol-5-yl)(3-methoxyphenyl)methyl)-4-(2,5-dimethylphenyl)piperazine (80)

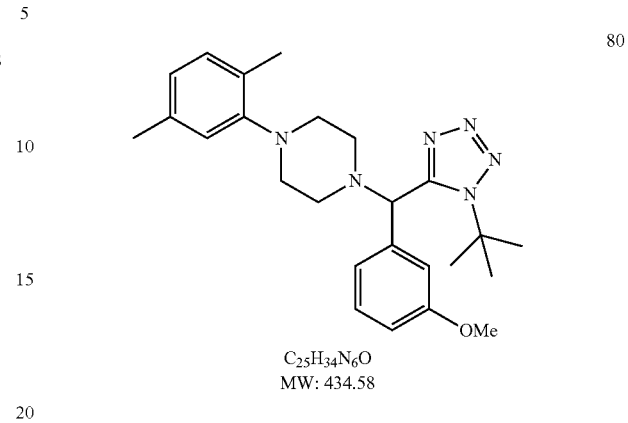

C₂₅H₃₄N₆O
MW: 434.58

The synthetic procedure of 80 was similar to that of 1. ¹H NMR (400 MHz, CDCl₃) δ 7.31-7.23 (m, 1H), 7.10 (dd, J=11.7, 9.7 Hz, 1H), 7.01 (t, J=7.9 Hz, 2H), 6.90-6.84 (m, 1H), 6.82-6.74 (m, 2H), 5.29-5.23 (s, 1H), 3.81 (s, 3H), 2.91 (dd, J=6.0, 3.7 Hz, 4H), 2.85 (dd, J=10.9, 3.4 Hz, 2H), 2.68-2.54 (m, 2H), 1.72 (s, 9H). ¹³C NMR (100 MHz, CDCl₃) δ 159.7, 154.3, 151.1, 136.8, 136.0, 130.7, 129.4, 129.3, 123.7, 122.1, 119.7, 115.3, 114.0, 77.3, 77.0, 76.7, 65.3, 61.4, 55.3, 51.8, 51.1, 30.3, 21.1, 17.4.

4-((1-(tert-butyl)-1H-tetrazol-5-yl)(4-(2,5-dimethylphenyl)piperazin-1-yl)methyl)quinoline (81)

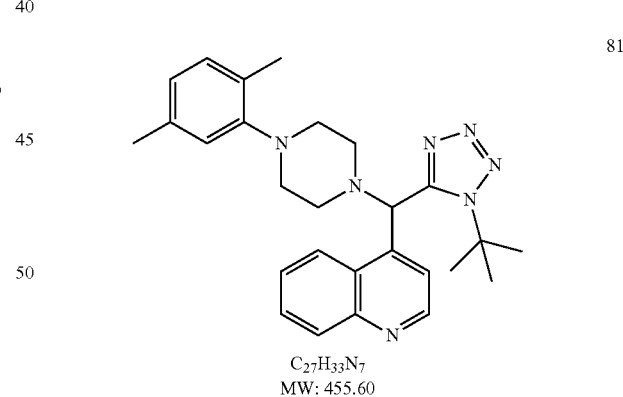

C₂₇H₃₃N₇
MW: 455.60

The synthetic procedure of 81 was similar to that of 1. ¹H NMR (400 MHz, CDCl₃) δ 8.83 (t, J=5.2 Hz, 1H), 8.56-8.47 (m, 1H), 8.25-8.15 (m, 1H), 7.81 (ddd, J=8.4, 6.9, 1.3 Hz, 1H), 7.73 (ddd, J=8.3, 6.9, 1.3 Hz, 1H), 7.08 (d, J=4.5 Hz, 1H), 7.02 (d, J=7.5 Hz, 1H), 6.75 (d, J=2.3 Hz, 1H), 6.39 (s, 1H), 5.35-5.22 (s, 1H), 3.32-3.15 (m, 4H), 2.92-2.82 (m, 2H), 2.81-2.61 (m, 4H), 2.25 (s, 3H), 2.20 (s, 3H), 1.62 (s, 9H). ¹³C NMR (100 MHz, CDCl₃) δ 152.4, 151.1, 149.8, 148.8, 141.0, 135.9, 130.8, 130.5, 129.6, 129.4, 127.4, 126.7, 123.7, 123.6, 122.1, 119.7, 61.3, 60.1, 52.2, 30.2, 21.1, 17.4.

2-(4-(3,5-dichloropyridin-4-yl)piperazin-1-yl)-2-(3-methoxyphenyl)acetic acid (82)

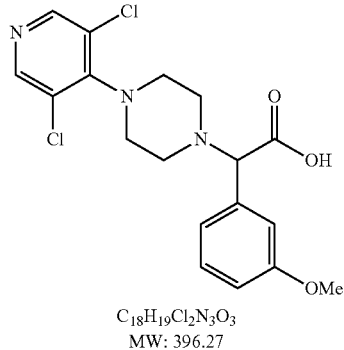

C₁₈H₁₉Cl₂N₃O₃
MW: 396.27

The mixture of 1-(3,5-dichloropyridin-4-yl)piperazine (2.5 g, 10.77 mmol), (3-methoxymethyl)boronic acid (1.637 g, 10.77), and 2-oxoacetic acid (1.439 mL, 12.92 mmol) in DCM (10 ml) was stirred at room temperature for 16 h. The reaction solution was evaporated in vacuo to the dryness. The residue was dissolved in isopropyl alcohol/chloroform (1/3, 50 mL) and washed with water (50 ml). The organic layer was dried over MgSO₄, evaporated in vacuo and purified with silica gel chromatography (eluent, MeOH: ethyl acetate=0 to 20%) to afford 82 (1.7 g, 4.29 mmol, 39.8%). 1H NMR (400 MHz, CDCl₃) δ 10.51 (brs, 1H), 8.32 (s, 2H), 7.21 (t, J=7.9 Hz, 1H), 7.13 (s, 1H), 7.08 (d, J=7.6 Hz, 1H), 6.85 (dd, J=8.2, 2.1 Hz, 1H), 4.42 (s, 1H), 3.74 (s, 3H), 3.60-3.33 (m, 4H), 3.17-2.85 (m, 4H). ¹³C NMR (100 MHz, CDCl₃) δ 160.0, 150.3, 149.1, 134.8, 129.9, 128.4, 121.4 115.0, 114.1, 74.7, 55.1, 51.5, 48.5.

2-(4-(3,5-dichloropyridin-4-yl)piperazin-1-yl)-2-(3-methoxyphenyl)acetonitrile (83)

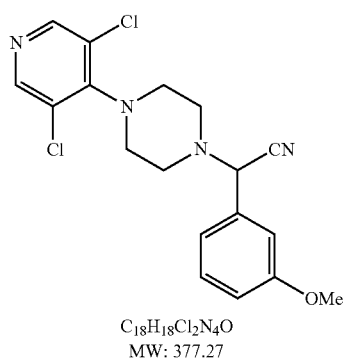

C₁₈H₁₈Cl₂N₄O
MW: 377.27

The mixture of 1-(3,5-dichloropyridin-4-yl)piperazine (232 mg, 1.0 mmol), trimethyl silanecarbonitrile (0.15 ml, 1.2 mmol), 3-methoxybenzaldehyde (0.122 ml, 1.0 mmol), and lithium perchlorate (213 mg, 2.0 mmol) in THF (10 ml) was stirred at room temperature for 16 h. The reaction solution was diluted with ethyl acetate (10 ml), washed with water (10 ml) and brine (10 ml). The organic layer was dried over MgSO₄, evaporated in vacuo to get the crude product. The crude product was purified with silica gel flash column (eluent, ethyl acetate:hexanes=0 to 50%) to afford 83 (215 mg, 0.57 mmol, 57%). ¹H NMR (400 MHz, CDCl₃) δ 8.45-8.24 (m, 2H), 7.39-7.31 (m, 1H), 7.20-7.15 (m, 1H), 7.14-7.10 (m, 1H), 6.98-6.90 (m, 1H), 4.89 (s, 1H), 3.86-3.83 (m, 4H), 3.52-3.23 (m, 4H), 2.93-2.67 (m, 4H). ¹³C NMR (100 MHz, CDCl₃) δ 160.0, 148.9, 129.7, 119.7, 118.8, 115.6, 114.3, 113.3, 111.8, 62.3, 55.3, 50.0.

2-(4-(3,5-dichloropyridin-4-yl)piperazin-1-yl)-2-(3-methoxyphenyl)ethanol (84)

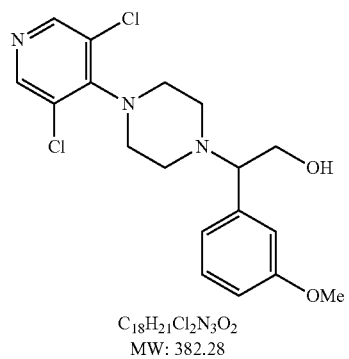

C₁₈H₂₁Cl₂N₃O₂
MW: 382.28

A mixture of 2-(4-(3,5-dichloropyridin-4-yl)piperazin-1-yl)-2-(3-methoxyphenyl)acetic acid (AR082, 6.3 g, 15.9 mmol) and lithium aluminium hydride (15.9 ml, 15.9 mmol, 1.0 M in THF) was stirred at room temperature for 16 h. The reaction solvent was removed and recharged with ethyl acetate (100 ml), washed with 10% NaOH (100 ml), and brine (100 ml). The organic layer was dried over MgSO₄, evaporated in vacuo to obtain the crude product. The crude product was purified with silica gel chromatography to afford 2-(4-(3,5-dichloropyridin-4-yl)piperazin-1-yl)-2-(3-methoxyphenyl)ethanol (84, 1.54 g, 4.03 mmol, 25.3%) as a colorless oil. ¹H NMR (400 MHz CDCl₃) δ 8.37-8.20 (s, 1H), 7.37-7.25 (t, J=7.9 Hz, 1H), 6.92-6.84 (ddd, J=8.2, 2.5, 0.9 Hz, 1H), 6.87-6.80 (dt, J=7.5, 1.3 Hz, 1H), 6.82-6.76 (dd, J=2.5, 1.5 Hz, 1H), 4.04-3.89 (dd, J=10.8, 8.6 Hz, 1H), 3.87-3.79 (s, 3H), 3.80-3.70 (dd, J=10.8, 5.1 Hz, 1H), 3.72-3.62 (dd, J=8.6, 5.1 Hz, 1H), 3.46-3.32 (m, 4H), 2.78-2.42 (m, 4H). ¹³C NMR (100 MHz, CDCl₃) δ 159.6, 151.0, 149.1, 129.4, 128.2, 121.1, 114.9, 112.8, 70.4, 60.7, 55.2, 50.4, 50.1.

1-(benzofuran-2-yl(1-(tert-butyl)-1H-tetrazol-5-yl)methyl)-4-(3-chloro-5-(trifluoromethyl)pyridin-2-yl)piperazine (86)

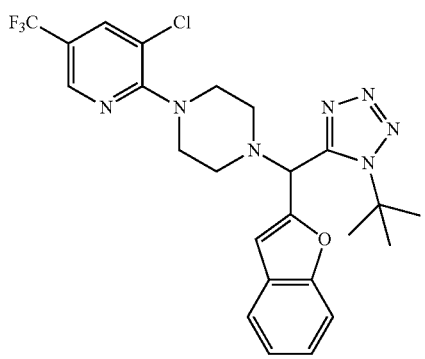

C$_{24}$H$_{25}$ClF$_3$N$_7$O
MW: 519.95

The synthetic procedure of 86 was similar to that of 1. $^1$H NMR (400 MHz, CDCl$_3$) δ 8.46-8.21 (m, 1H), 7.83-7.62 (d, J=2.2 Hz, 1H), 7.61-7.54 (m, 1H), 7.53-7.47 (m, 1H), 7.35-7.29 (m, 1H), 7.28-7.22 (m, 1H), 6.97 (s, 1H), 5.69 (s, 1H), 3.63-3.41 (m, 4H), 3.15-2.97 (t, J=6.2 Hz, 2H), 2.91-2.67 (m, 2H), 1.95-1.70 (s, 9H). $^{13}$C NMR (100 MHz, CDCl$_3$) δ 159.6, 154.8, 151.8, 150.4, 142.8, 135.6, 127.8, 125.1, 123.2, 121.3, 120.7, 111.4, 109.0, 61.9, 58.3, 49.6, 48.5, 29.8.

1-(benzofuran-2-yl(1-butyl-1H-tetrazol-5-yl)methyl)-4-(3-chloro-5-(trifluoromethyl)pyridin-2-piperazine (87)

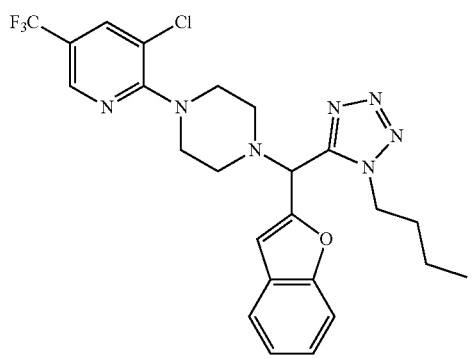

C$_{24}$H$_{25}$ClF$_3$N$_7$O
MW: 519.95

The synthetic procedure of 87 was similar to that of 1. H NMR (400 MHz, CDCl$_3$) δ 8.51-8.28 (dd, J=2.2, 1.1 Hz, 1H), 7.87-7.69 (d, J=2.1 Hz, 1H), 7.65-7.53 (dd, J=7.4, 1.2 Hz, 1H), 7.53-7.43 (m, 1H), 7.38-7.28 (td, J=8.3, 7.8, 1.4 Hz, 1H), 7.31-7.23 (m, 1H), 7.05-6.98 (d, J=0.9 Hz, 1H), 5.45-5.33 (s, 1H), 4.72-4.56 (t, J=7.5 Hz, 2H), 3.64-3.48 (dd, J=6.2, 3.1 Hz, 4H), 2.89-2.75 (d, J=5.4 Hz, 2H), 2.73-2.58 (t, J=5.7 Hz, 2H), 2.04-1.92 (m, 2H), 1.53-1.40 (m, 2H), 1.07-0.92 (t, J=7.4 Hz, 3H). $^{13}$C NMR (100 MHz, CDCl$_3$) δ 159.5, 154.9, 151.7, 149.8, 142.9, 136.0, 136.0, 127.5, 125.1, 123.3, 121.5, 120.9, 120.1, 111.3, 108.8, 58.9, 50.5, 48.1, 31.6, 19.9, 13.6.

1-(benzofuran-2-yl(1-(tert-butyl)-1H-tetrazol-5-yl)methyl)-4-(2-methoxyphenyl)piperazine (88)

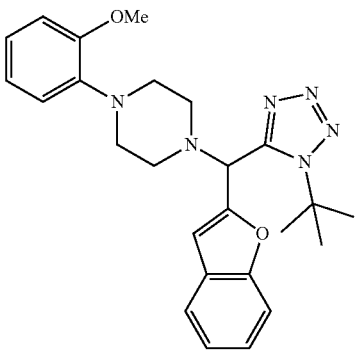

C$_{24}$H$_{30}$N$_6$O$_2$
MW: 446.54

The synthetic procedure of 88 was similar to that of 1. $^1$H NMR (400 MHz, CDCl$_3$) δ 7.62-7.51 (ddd, J=7.7, 1.4, 0.7 Hz, 1H), 7.53-7.45 (dq, J=8.3, 0.9 Hz, 1H), 7.33-7.27 (m, 1H), 7.26-7.20 (m, 1H), 7.04-7.01 (m, 1H), 7.01-6.94 (m, 1H), 6.92-6.86 (dd, J=4.8, 1.1 Hz, 2H), 6.85-6.79 (d, J=8.0 Hz, 1H), 5.63 (s, 1H), 3.8 (s, 3H), 3.17-2.99 (m, 6H), 2.93-2.76 (m, 2H), 1.8 (s, 9H). $^{13}$C NMR (100 MHz, CDCl$_3$) δ 154.6, 152.1, 151.8, 150.6, 140.9, 127.9, 124.6, 123.0, 123.0, 121.4, 120.8, 118.1, 111.3, 111.0, 109.0, 77.2, 61.9, 58.4, 55.2, 50.7, 50.0, 30.0.

1-(benzofuran-2-yl(1-butyl-1H-tetrazol-5-yl)methyl)-4-(2-methoxyphenyl)piperazine (89)

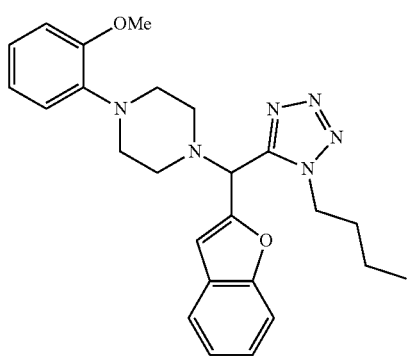

C$_{24}$H$_{30}$N$_6$O$_2$
MW: 446.54

The synthetic procedure of 89 was similar to that of 1. $^1$H NMR (400 MHz, CDCl$_3$) δ 7.65-7.51 (m, 1H), 7.49-7.43 (m, 1H), 7.35-7.28 (ddd, J=8.4, 7.3, 1.4 Hz, 1H), 7.27-7.22 (m, 1H), 7.04-7.02 (d, J=0.9 Hz, 1H), 7.02-6.96 (m, 1H), 6.94-6.88 (m, 2H), 6.87-6.82 (d, J=8.0 Hz, 1H), 5.40-5.33 (s, 1H), 4.72-4.63 (td, J=7.3, 2.5 Hz, 2H), 3.86-3.77 (s, 3H), 3.21-

2.98 (brs, 4H), 2.93-2.60 (m, 4H), 2.09-1.91 (m, 2H), 1.56-1.41 (m, 2H), 1.05-0.94 (t, J=7.4 Hz, 3H). $^{13}$C NMR (100 MHz, CDCl$_3$) δ 154.9, 152.1, 151.9, 150.1, 140.7, 127.6, 124.9, 123.2, 123.2, 121.4, 120.9, 118.0, 111.3, 111.1, 108.6, 59.0, 55.3, 51.0, 50.5, 48.1, 31.6, 19.9, 13.6.

1-(benzofuran-2-yl(1-(tert-butyl)-1H-tetrazol-5-yl)methyl)-4-(2,6-dimethylphenyl)piperazine (90)

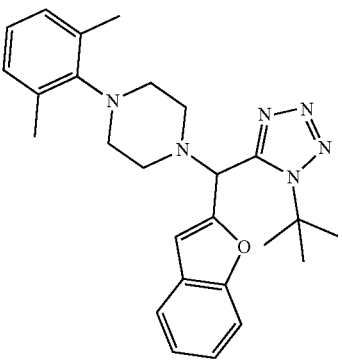

C$_{26}$H$_{32}$N$_6$O
MW: 444.57

The synthetic procedure of 90 was similar to that of 1. $^1$H NMR (400 MHz, CDCl$_3$) δ 7.61-7.56 (m, 2H), 7.55-7.49 (dq, J=8.2, 0.9 Hz, 2H), 7.35-7.29 (ddd, J=8.3, 7.3, 1.4 Hz, 2H), 7.28-7.22 (m, 3H), 6.98-6.89 (m, 8H), 5.72-5.60 (s, 2H), 3.18-3.05 (t, J=4.8 Hz, 9H), 3.01-2.89 (dt, J=10.1, 4.4 Hz, 4H), 2.81-2.67 (dt, J=10.0, 4.7 Hz, 4H), 2.34-2.21 (s, 13H), 1.89-1.79 (m, 1H). $^{13}$C NMR (100 MHz, CDCl$_3$) δ 154.7, 147.9, 136.9, 128.9, 127.9, 125.1, 124.6, 123.0, 121.5, 111.3, 108.8, 61.9, 58.9, 51.2, 49.7, 30.1, 19.6.

1-(benzofuran-2-yl(1-butyl-1H-tetrazol-5-yl)methyl)-4-(2,6-dimethylphenyl)piperazine

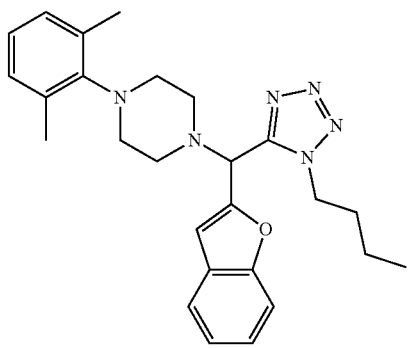

C$_{26}$H$_{32}$N$_6$O
MW: 444.57

The synthetic procedure of 91 was similar to that of 1. $^1$H NMR (400 MHz, CDCl$_3$) δ 7.63-7.56 (m, 1H), 7.53-7.45 (dd, J=8.2, 1.1 Hz, 1H), 7.40-7.29 (ddd, J=8.2, 7.2, 1.4 Hz, 1H), 7.29-7.22 (m, 1H), 7.04-6.90 (m, 4H), 5.41-5.33 (s, 1H), 4.80-4.61 (m, 2H), 3.23-3.05 (t, J=4.8 Hz, 4H), 2.80-2.48 (ddt, J=59.7, 10.3, 4.4 Hz, 4H), 2.35-2.19 (s, 6H), 2.12-1.92 (m, 2H), 1.59-1.42 (m, 2H), 1.07-0.95 (t, J=7.4 Hz, 3H). $^{13}$C NMR (100 MHz, CDCl$_3$) δ 154.9, 152.0, 150.4, 147.7, 136.8, 128.9, 127.5, 125.3, 124.9, 123.2, 121.5, 111.3, 108.4, 77.2, 59.5, 52.1, 49.5, 48.1, 31.7, 20.0, 19.6, 13.6.

1-(benzofuran-2-yl(1-(tert-butyl)-1H-tetrazol-5-yl)methyl)-4-(3-(trifluoromethyl)pyridin-2-yl)piperazine (92)

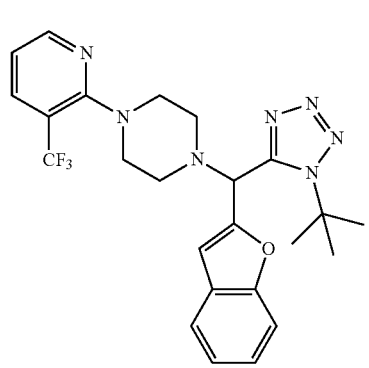

C$_{24}$H$_{26}$F$_3$N$_7$O
MW: 485.50

The synthetic procedure of 92 was similar to that of 1. $^1$H NMR (400 MHz, CDCl$_3$) δ 8.46-8.26 (dd, J=5.0, 1.8 Hz, 1H), 7.89-7.75 (dd, J=7.8, 1.9 Hz, 1H), 7.63-7.53 (m, 1H), 7.54-7.44 (m, 1H), 7.35-7.28 (ddd, J=8.3, 7.3, 1.4 Hz, 1H), 7.27-7.21 (m, 1H), 7.02-6.98 (d, J=0.8 Hz, 1H), 6.97-6.91 (ddd, J=7.8, 4.8, 1.0 Hz, 1H), 5.75-5.52 (s, 1H), 3.42-3.23 (m, 4H), 3.03-2.90 (ddd, J=10.4, 6.4, 3.2 Hz, 2H), 2.85-2.72 (ddt, J=11.2, 6.8, 3.7 Hz, 2H), 1.8 (s, 9H). $^{13}$C NMR (100 MHz, CDCl$_3$) δ 159.2, 154.6, 151.7, 150.9, 150.9, 150.7, 137.2, 137.2, 127.8, 124.7, 123.0, 121.5, 116.7, 111.3, 109.0, 62.0, 58.4, 50.6, 50.6, 49.8, 30.0.

1-(benzofuran-2-yl(1-butyl-1H-tetrazol-5-yl)methyl)-4-(3-(trifluoromethyl)pyridin-2-yl)piperazine (93)

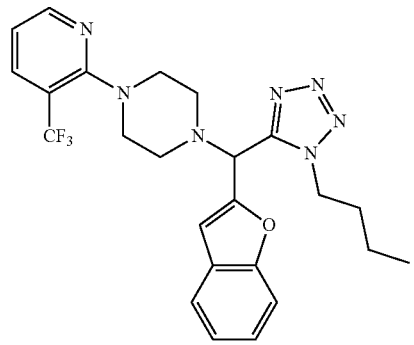

C$_{24}$H$_{26}$F$_3$N$_7$O
MW: 485.50

The synthetic procedure of 93 was similar to that of 1. ¹H NMR (400 MHz, CDCl₃) δ 8.48-8.36 (dd, J=4.8, 1.7 Hz, 1H), 7.89-7.79 (dd, J=7.7, 1.9 Hz, 1H), 7.63-7.54 (m, 1H), 7.54-7.43 (dd, J=8.2, 1.0 Hz, 1H), 7.35-7.29 (m, 1H), 7.28-7.23 (m, 1H), 7.03-6.95 (m, 2H), 5.41-5.33 (s, 1H), 4.82-4.61 (m, 2H), 3.43-3.25 (t, J=4.9 Hz, 4H), 2.83-2.68 (dd, J=10.7, 5.3 Hz, 2H), 2.68-2.55 (dd, J=10.8, 5.3 Hz, 2H), 2.03-1.94 (td, J=7.5, 2.3 Hz, 2H), 1.56-1.41 (m, 2H), 1.05-0.98 (t, J=7.4 Hz, 3H). ¹³C NMR (100 MHz, CDCl₃) δ 159.3, 154.9, 151.9, 151.0, 150.1, 137.2, 137.2, 127.5, 125.0, 123.3, 121.5, 117.2, 111.3, 108.6, 77.2, 59.2, 50.9, 50.5, 48.2, 31.6, 19.9, 13.6.

1-(benzofuran-2-yl(1-(tert-butyl)-1H-tetrazol-5-yl)methyl)-4-(2,3-dimethylphenyl)piperazine (94)

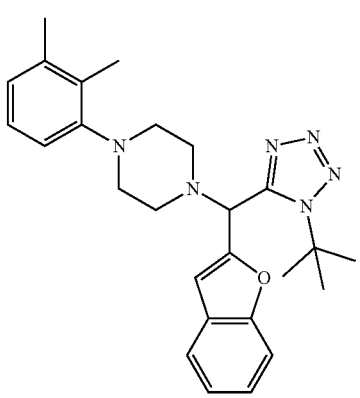

C₂₆H₃₂N₆O
MW: 444.57

The synthetic procedure of 94 was similar to that of 1. ¹H NMR (400 MHz, CDCl₃) δ 7.64-7.56 (ddd, J=7.6, 1.4, 0.7 Hz, 1H), 7.55-7.48 (dd, J=8.2, 1.0 Hz, 1H), 7.36-7.29 (m, 1H), 7.28-7.22 (m, 1H), 7.09-7.01 (t, J=7.7 Hz, 1H), 7.01-6.96 (m, 1H), 6.91-6.88 (d, J=2.5 Hz, 1H), 6.88-6.85 (d, J=3.2 Hz, 1H), 5.83-5.57 (s, 1H), 3.10-2.96 (d, J=5.6 Hz, 2H), 2.95-2.84 (dd, J=5.8, 3.4 Hz, 4H), 2.84-2.72 (s, 2H), 2.27-2.20 (s, 3H), 2.20-2.11 (s, 3H), 1.88-1.73 (s, 9H). ¹³C NMR (100 MHz, CDCl₃) δ 154.5, 151.8, 151.2, 150.9, 137.9, 131.2, 125.9, 125.0, 124.7, 123.0, 121.3, 116.3, 111.3, 108.9, 61.7, 58.5, 51.9, 29.7, 20.6, 13.9.

1-(benzofuran-2-yl(1-butyl-1H-tetrazol-5-yl)methyl)-4-(2,3-dimethylphenyl)piperazine (95)

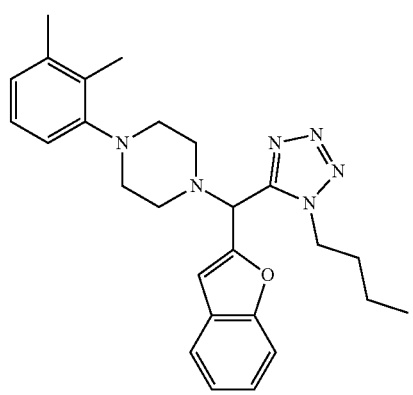

C₂₆H₃₂N₆O
MW: 444.57

The synthetic procedure of 95 was similar to that of 1. ¹H NMR (400 MHz, CDCl₃) δ 7.65-7.55 (dt, J=7.3, 0.9 Hz, 1H), 7.53-7.44 (dd, J=8.2, 1.0 Hz, 1H), 7.36-7.29 (m, 1H), 7.28-7.23 (m, 1H), 7.10-7.03 (t, J=7.8 Hz, 1H), 7.03-6.99 (m, 1H), 6.93-6.84 (t, J=7.2 Hz, 2H), 5.54-5.32 (s, 1H), 4.77-4.58 (m, 2H), 2.99-2.86 (t, J=4.8 Hz, 4H), 2.85-2.50 (m, 4H), 2.34-2.19 (s, 3H), 2.18-2.13 (s, 3H), 2.03-1.94 (m, 2H), 1.55-1.42 (m, 2H), 1.07-0.96 (t, J=7.4 Hz, 3H). ¹³C NMR (100 MHz, CDCl₃) δ 154.9, 151.9, 150.9, 150.2, 138.1, 131.3, 127.5, 125.8, 125.2, 125.0, 123.3, 121.5, 116.4, 111.3, 108.5, 59.1, 52.0, 51.3, 48.1, 31.6, 20.6, 19.9, 13.9, 13.6.

1-(benzofuran-2-yl(1-(tert-butyl)-1H-tetrazol-5-yl)methyl)-4-(2,5-dimethylphenyl)piperazine (96)

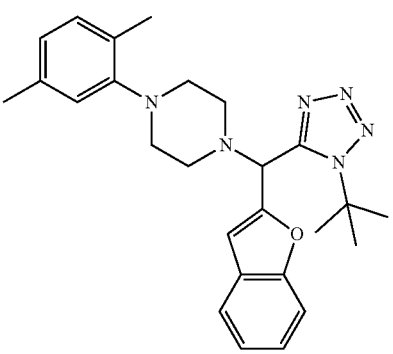

C₂₆H₃₂N₆O
MW: 444.57

The synthetic procedure of 96 was similar to that of 1. ¹H NMR (400 MHz, CDCl₃) δ 7.65-7.56 (ddd, J=7.6, 1.5, 0.7 Hz, 1H), 7.56-7.48 (dq, J=8.3, 0.9 Hz, 1H), 7.35-7.29 (ddd, J=8.3, 7.3, 1.4 Hz, 1H), 7.28-7.22 (m, 1H), 7.04-6.96 (m, 2H), 6.81-6.74 (m, 2H), 5.82-5.55 (s, 1H), 3.07-2.96 (m, 2H), 2.96-2.86 (m, 4H), 2.84-2.74 (m, 2H), 2.41-2.22 (s, 3H), 2.22-2.13 (s, 3H), 1.86-1.76 (s, 9H). ¹³C NMR (100 MHz, CDCl₃) δ 154.6, 151.8, 150.9, 150.9, 136.0, 130.8, 129.3, 127.9, 124.7, 123.8, 123.0, 121.5, 119.6, 111.3, 109.9, 108.9, 61.9, 58.4, 51.8, 50.2, 30.0, 21.1, 17.4.

1-(benzofuran-2-yl(1-butyl-1H-tetrazol-5-yl)methyl)-4-(2,5-dimethylphenyl)piperazine (97)

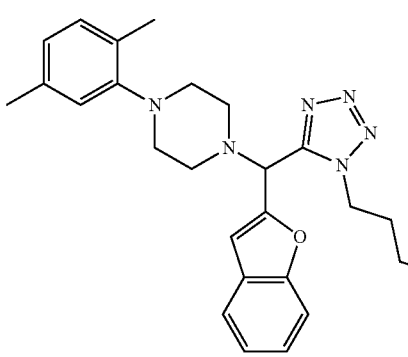

C₂₆H₃₂N₆O
MW: 444.57

The synthetic procedure of 97 was similar to that of 1. $^1$H NMR (400 MHz, CDCl$_3$) δ 7.62-7.56 (m, 1H), 7.51-7.45 (m, 1H), 7.37-7.29 (m, 1H), 7.29-7.23 (m, 1H), 7.07-6.99 (m, 2H), 6.83-6.77 (td, J=4.2, 1.8 Hz, 2H), 5.43-5.32 (s, 1H), 4.78-4.60 (m, 2H), 3.04-2.86 (m, 4H), 2.84-2.71 (dt, J=9.9, 4.9 Hz, 2H), 2.70-2.56 (dd, J=10.2, 5.1 Hz, 2H), 2.34-2.26 (s, 3H), 2.25-2.16 (s, 3H), 2.08-1.92 (m, 2H), 1.58-1.43 (h, J=7.4 Hz, 2H), 1.07-0.96 (t, J=7.4 Hz, 3H). $^{13}$C NMR (100 MHz, CDCl$_3$) δ 154.9, 151.9, 150.7, 150.2, 136.0, 130.9, 129.3, 127.5, 125.0, 124.0, 123.3, 121.5, 119.6, 111.3, 108.5, 59.1, 51.6, 51.3, 48.1, 31.6, 21.1, 19.9, 17.4, 13.6.

1-(1-(benzofuran-2-yl(1-(tert-butyl)-1H-tetrazol-5-yl)methyl)piperidin-4-yl)-1H-benzo[d]imidazol-2(3H)-one (98)

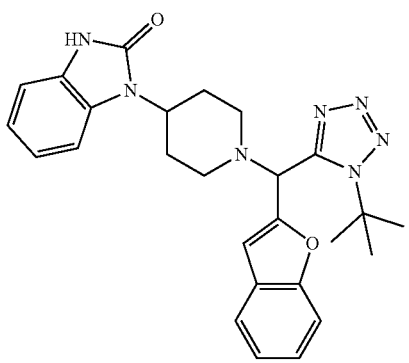

C$_{26}$H$_{29}$N$_7$O$_2$
MW: 471.55

The synthetic procedure of 98 was similar to that of 1. $^1$H NMR (400 MHz, CDCl$_3$) δ 7.84-7.72 (s, 1H), 7.69-7.56 (dt, J=7.6, 1.1 Hz, 1H), 7.56-7.50 (dq, J=8.3, 0.9 Hz, 1H), 7.38-7.30 (ddd, J=8.3, 7.3, 1.4 Hz, 1H), 7.30-7.22 (m, 1H), 7.13-7.04 (dd, J=6.0, 2.9 Hz, 1H), 7.03-6.91 (m, 4H), 5.79-5.72 (s, 1H), 4.29-4.03 (tt, J=12.0, 4.0 Hz, 1H), 3.28-3.19 (d, J=11.6 Hz, 1H), 3.19-3.11 (m, 2H), 2.94-2.80 (m, 1H), 2.57-2.33 (m, 3H), 1.86 (s, 9H), 1.83-1.73 (m, 1H). $^{13}$C NMR (100 MHz, CDCl$_3$) δ 153.4, 153.2, 150.7, 150.1, 128.1, 127.4, 126.5, 123.6, 122.0, 120.2, 119.5, 119.3, 110.2, 108.1, 107.5, 107.4, 61.0, 56.9, 49.1, 46.4, 39.6, 38.9, 28.7, 28.63, 27.9.

1-(1-(benzofuran-2-yl(1-butyl-1H-tetrazol-5-yl)methyl)piperidin-4-yl)-1H-benzo[d]imidazol-2(3H)-one (99)

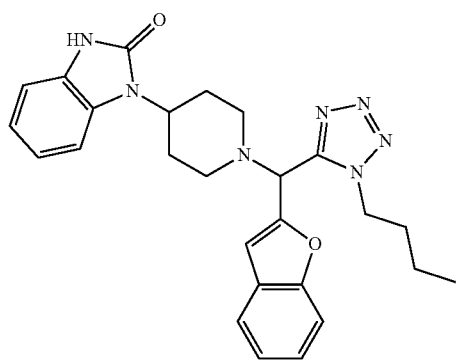

C$_{26}$H$_{29}$N$_7$O$_2$
MW: 471.55

The synthetic procedure of 99 was similar to that of 1. $^1$H NMR (400 MHz, CDCl$_3$) δ 10.37 (brs, NH), 7.64-7.56 (d, J=7.6 Hz, 1H), 7.53-7.46 (d, J=8.2 Hz, 1H), 7.38-7.30 (m, 1H), 7.30-7.23 (t, J=7.5 Hz, 1H), 7.18-7.08 (m, 2H), 7.08-6.99 (dd, J=6.2, 3.0 Hz, 3H), 5.40 (s, 1H), 4.81-4.53 (m, 2H), 4.45-4.19 (m, 1H), 3.21-2.96 (d, J=11.4 Hz, 2H), 2.75-2.63 (m, 1H), 2.61-2.42 (m, 2H), 2.40-2.28 (m, 1H), 2.11-1.96 (m, 2H), 1.94-1.76 (m, 1H), 1.62-1.41 (q, J=7.5 Hz, 2H), 1.11-0.97 (t, J=7.3 Hz, 3H). 13C NMR (100 MHz, CDCl$_3$) δ 155.2, 154.8, 152.0, 150.1, 129.0, 128.1, 127.5, 125.0, 123.3, 121.5, 121.3, 120.9, 111.3, 109.9, 109.0, 108.6, 58.6, 52.1, 50.4, 49.1, 48.0, 31.7, 29.4, 29.0, 20.0, 13.6.

1-(benzofuran-2-yl(1-benzyl-1H-tetrazol-5-yl)methyl)-4-(3,5-dichloropyridin-4-yl)piperazine (100)

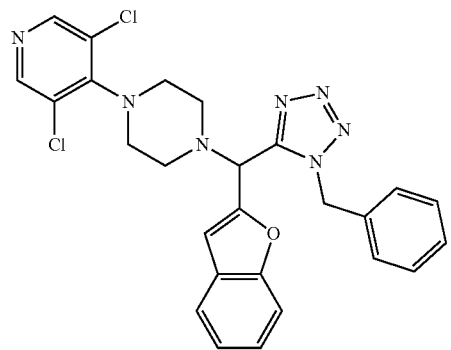

C$_{26}$H$_{23}$Cl$_2$N$_7$O
MW: 520.41

The synthetic procedure of 100 was similar to that of 1. $^1$H NMR (400 MHz, CDCl$_3$) δ 8.29 (s, 2H), 7.59-7.53 (m, 1H), 7.42-7.29 (m, 4H), 7.29-7.21 (m, 4H), 6.95-6.93 (d, J=0.9 Hz, 1H), 6.10-5.80 (m, 2H), 5.37-5.11 (s, 1H), 3.31-3.04 (m, 4H), 2.80-2.31 (m, 4H). $^{13}$C NMR (100 MHz, CDCl$_3$) δ 154.9, 152.3, 150.7, 149.6, 149.1, 133.7, 129.0, 128.7, 128.3, 127.5, 127.4, 125.0, MW 520.41 123.3, 121.5, 111.3, 108.8, 77.3, 77.0, 76.7, 59.1, 51.7, 51.2, 49.7.

2-(benzofuran-2-yl)-2-(4-(3,5-dichloropyridin-4-yl)piperazin-1-yl)acetamide (102)

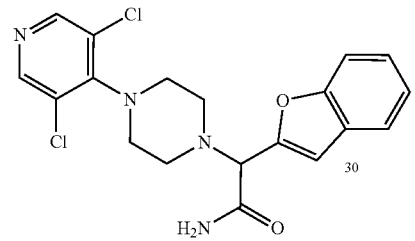

C$_{19}$H$_{18}$Cl$_2$N$_4$O$_2$
MW: 405.28

A mixture of 1-(3,5-dichloropyridin-4-yl)piperazine (1.29 g, 5.56 mmol), benzofuran-2-ylboronic acid (0.900 g, 5.56 mmol) and 2-oxoacetic acid (0.411 g, 5.56 mmol) in DCM (10 ml) was stirred at rt for 16 h. The reaction solvent was removed to get the crude product. Without purification, the crude product was dissolved in DCM (10 ml) and DMF (1 ml), 2,2-dimethoxyethanamine (0.584 g, 5.56 mmol), N,N-dimethylpyridin-4-amine (0.679 g, 5.56 mmol), and N1-((ethylimino)methylene)-N3,N3-dimethylpropane-1,3-diamine (1.122 g, 7.23 mmol) were added to the solution. The reaction mixture was stirred at rt for 16 h. The reaction mixture was extracted with water (10 ml) and brine (10 ml), dried over $MgSO_4$, evaporated in vacuo to get the crude product. The crude product was purified with silica gel chromatography (eluent, ethyl acetate: hexanes=0 to 100%) to afford 2-(benzofuran-2-yl)-2-(4-(3,5-dichloropyridin-4-yl)piperazin-1-yl)-N-(2,2-dimethoxyethyl)acetamide (1 g, 2.027 mmol, 36.5% yield) as an yellowish oil for the next step reaction. A mixture of 2-(benzofuran-2-yl)-2-(4-(3,5-dichloropyridin-4-yl)piperazin-1-yl)-N-(2,2-dimethoxyethyl)acetamide (0.78 g, 1.581 mmol) and ammonium acetate (1.219 g, 15.81 mmol) in acetic acid (10 ml) was heated at 140° C. for 40 min under microwave irradiation. The reaction solvent was removed in vacuo and the residue was dissolved in ethyl acetate (20 mL), washed with saturated sodium bicarbonate (20 mL) and brine (20 ml). The organic layer was dried over $MgSO_4$, evaporated in vacuo to obtain the crude product. The crude product was further purified with silica gel chromatorgaphy (eluent, ethyl acetate: hexanes=0 to 100%) to afford 2-(benzofuran-2-yl)-2-(4-(3,5-dichloropyridin-4-yl)piperazin-1-yl)acetamide (135 mg, 0.333 mmol, 21.07% yield).

1-(benzofuran-2-yl(1-(tert-butyl)-1H-tetrazol-5-yl)methyl)-4-(4-methoxyphenyl)piperazine (103)

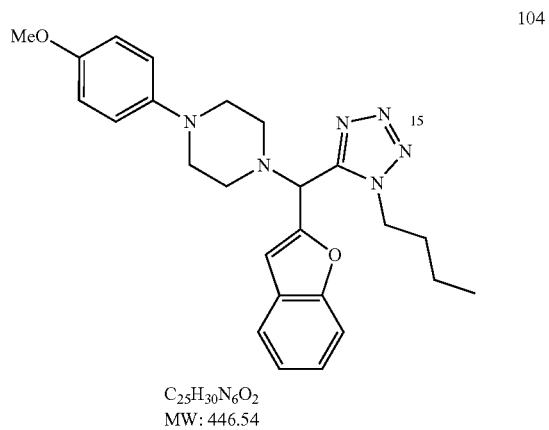 [SMILES: CCCCn1nnnc1C(c1cc2ccccc2o1)N1CCN(c2ccc(OC)cc2)CC1]

The synthetic procedure of 103 was similar to that of 1. $^1$H NMR (400 MHz, $CDCl_3$) δ 7.64-7.43 (m, 2H), 7.36-7.17 (m, 2H), 7.06-6.95 (d, J=0.9 Hz, 1H), 6.89-6.76 (m, 4H), 5.71-5.61 (s, 1H), 3.74 (s, 2H), 3.12-3.05 (m, 4H), 3.06-2.99 (m, 2H), 2.89-2.74 (m, 2H), 1.89-1.68 (s, 9H). $^{13}$C NMR (100 MHz, $CDCl_3$) δ 154.6, 153.9, 151.7, 150.6, 145.4, 127.8, 124.7, 123.0, 121.4, 118.3, 114.3, 111.3, 109.0, 62.0, 58.3, 55.5, 50.9, 49.9, 30.0.

1-(benzofuran-2-yl(1-butyl-1H-tetrazol-5-yl)methyl)-4-(4-methoxyphenyl)piperazine (104)

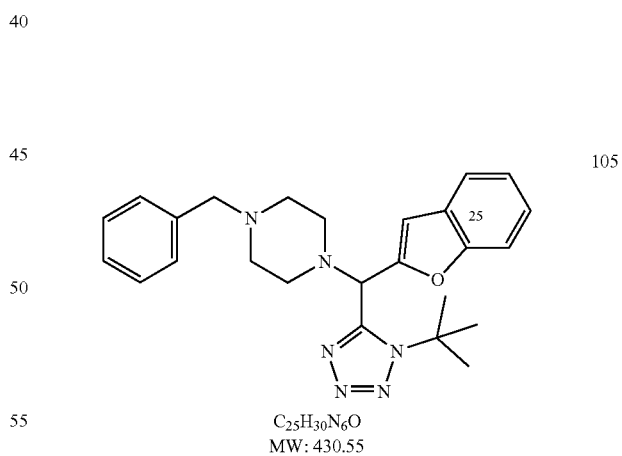

The synthetic procedure of 104 was similar to that of 1. $^1$H NMR (400 MHz, $CDCl_3$) δ 7.69-7.54 (m, 1H), 7.52-7.41 (dd, J=8.2, 1.0 Hz, 1H), 7.37-7.16 (m, 2H), 7.08-6.96 (d, J=0.9 Hz, 1H), 6.90-6.74 (m, 4H), 5.44-5.33 (s, 1H), 4.71-4.57 (t, J=7.6 Hz, 2H), 3.81-3.70 (s, 3H), 3.18-3.00 (t, J=4.9 Hz, 4H), 2.88-2.74 (t, J=5.6 Hz, 2H), 2.72-2.59 (dd, J=10.7, 5.5 Hz, 2H), 2.03-1.90 (t, J=7.6 Hz, 2H), 1.54-1.37 (m, 2H), 1.08-0.90 (t, J=7.4 Hz, 3H). $^{13}$C NMR (100 MHz, $CDCl_3$) δ 154.9, 154.0, 151.9, 150.0, 145.2, 127.5, 125.0, 123.3, 121.5, 118.3, 114.4, 111.3, 108.6, 58.9, 55.5, 50.8, 50.7, 48.1, 31.6, 19.9, 13.6.

1-(benzofuran-2-1(1-(tert-butyl)-1H-tetrazol-5-yl)methyl)-4-benzylpiperazine (105)

The synthetic procedure of 105 was similar to that of 1. $^1$H NMR (400 MHz, $CDCl_3$) δ 7.57-7.52 (dt, J=7.5, 0.9 Hz, 1H), 7.50-7.45 (m, 1H), 7.34-7.18 (m, 7H), 7.00-6.95 (d, J=0.8 Hz, 1H), 5.57 (s, 1H), 3.47-3.42 (d, J=3.9 Hz, 2H), 2.93-2.80 (dt, J=10.0, 4.5 Hz, 2H), 2.74-2.60 (dt, J=10.8, 4.2 Hz, 2H), 2.54-2.39 (brs, 4H), 1.86-1.68 (s, 9H). $^{13}$C NMR (100 MHz, $CDCl_3$) δ 154.5, 151.8, 150.7, 137.8, 129.2, 129.1, 128.1, 127.9, 127.0, 124.6, 123.0, 121.4, 111.2, 108.9, 62.8, 61.9, 58.2, 53.1, 29.9.

1-benzofuran-2-yl(1-butyl-1H-tetrazol-5-yl)methyl)-4-benzylpiperazine (106)

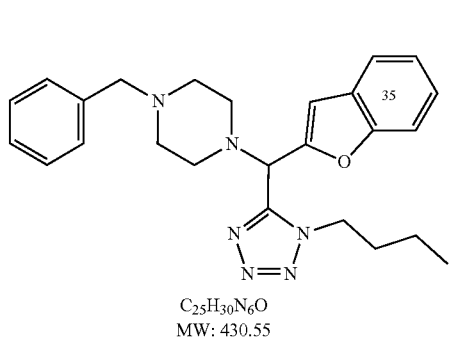

C$_{25}$H$_{30}$N$_6$O
MW: 430.55

The synthetic procedure of 106 was similar to that of 1. $^1$H NMR (400 MHz, CDCl$_3$) δ 7.59-7.52 (ddd, J=7.6, 1.5, 0.8 Hz, 1H), 7.48-7.41 (dq, J=8.1, 0.9 Hz, 1H), 7.34-7.19 (m, 7H), 6.99-6.94 (d, J=0.8 Hz, 1H), 5.8 (s, 1H), 4.70-4.57 (m, 2H), 3.50-3.47 (d, J=1.1 Hz, 2H), 2.73-2.57 (m, 2H), 2.57-2.33 (m, 6H), 2.02-1.87 (m, 2H), 1.56-1.38 (m, 2H), 1.06-0.93 (t, J=7.4 Hz, 3H). $^{13}$C NMR (100 MHz, CDCl$_3$) 154.8, 151.9, 150.1, 137.6, 129.2, 129.0, 128.2, 128.1, 127.5, 127.1, 124.8, 123.2, 121.4, 111.2, 108.4, 62.8, 58.8, 52.9, 48.0, 31.5, 19.9, 13.6.

1-(benzofuran-2-yl(1-(tert-butyl)-1H-tetrazol-5-yl)methyl)-4-(2,5-dimethylphenyl)piperidine (107)

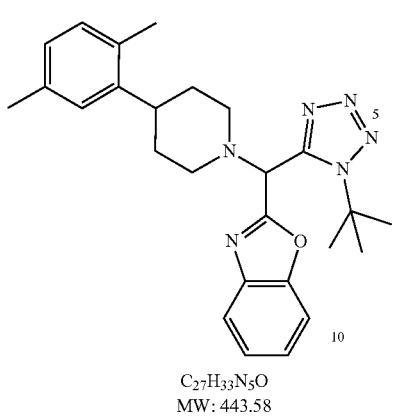

C$_{27}$H$_{33}$N$_5$O
MW: 443.58

The synthetic procedure of 107 was similar to that of 1. $^1$H NMR (400 MHz, CDCl$_3$) δ 7.62-7.56 (m, 1H), 7.55-7.49 (dq, J=8.3, 0.9 Hz, 1H), 7.35-7.29 (ddd, J=8.3, 7.3, 1.4 Hz, 1H), 7.28-7.22 (m, 1H), 7.02-6.97 (m, 2H), 6.97-6.93 (s, 1H), 6.92-6.86 (dt, J=7.8, 1.0 Hz, 1H), 5.73-5.64 (s, 1H), 3.25-3.00 (m, 2H), 2.94-2.75 (m, 1H), 2.71-2.53 (d, J=7.7 Hz, 1H), 2.41-2.30 (d, J=11.0 Hz, 1H), 2.31-2.25 (s, 3H), 2.24-2.18 (s, 3H), 1.88-1.79 (s, 9H), 1.79-1.74 (m, 2H), 1.74-1.66 (dt, J=8.9, 4.3 Hz, 2H). $^{13}$C NMR (100 MHz, CDCl$_3$) δ 154.6, 151.9, 151.2, 143.5, 135.4, 132.0, 130.2, 127.9, 126.5, 126.1, 124.6, 123.0, 121.4, 111.3, 108.8, 61.9, 58.7, 52.6, 49.0, 37.8, 33.1, 32.5, 30.0, 21.1, 18.8.

1-(benzofuran-2-yl(1-butyl-1H-tetrazol-5-yl)methyl)-4-(2,5-dimethylphenyl)piperidine (108)

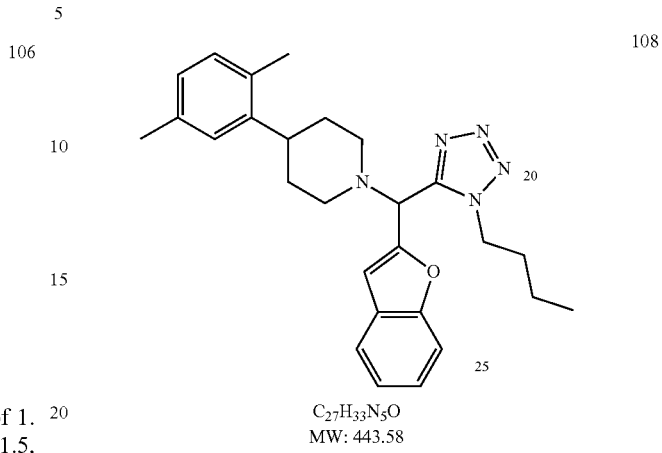

C$_{27}$H$_{33}$N$_5$O
MW: 443.58

The synthetic procedure of 108 was similar to that of 1. $^1$H NMR (400 MHz, CDCl$_3$) δ 7.64-7.55 (m, 1H), 7.53-7.44 (m, 1H), 7.36-7.29 (ddd, J=8.3, 7.2, 1.4 Hz, 1H), 7.28-7.22 (m, 1H), 7.05-6.97 (m, 3H), 6.94-6.87 (dd, J=7.6, 1.8 Hz, 1H), 5.41-5.33 (s, 1H), 4.71-4.58 (td, J=7.4, 4.4 Hz, 2H), 3.07-2.88 (t, J=12.1 Hz, 2H), 2.73-2.61 (s, 1H), 2.60-2.49 (d, J=4.0 Hz, 1H), 2.36-2.28 (s, 3H), 2.28-2.25 (d, J=4.2 Hz, 1H), 2.24-2.20 (s, 3H), 2.07-1.94 (tt, J=7.6, 6.6 Hz, 2H), 1.84-1.69 (ddd, J=24.3, 8.6, 3.3 Hz, 4H), 1.57-1.44 (m, 2H), 1.08-0.99 (t, J=7.4 Hz, 3H). $^{13}$C NMR (100 MHz, CDCl$_3$) δ 154.8, 152.1, 150.5, 143.2, 135.5, 132.0, 130.3, 127.6, 126.6, 126.0, 124.8, 123.2, 121.4, 111.3, 108.3, 59.1, 53.2, 50.3, 48.0, 37.7, 32.8, 32.4, 31.7, 21.1, 19.9, 18.8, 13.6.

4-((4-(benzofuran-2-yl(1-(tert-butyl)-1H-tetrazol-5-yl)methyl)piperazin-1-yl)methyl)benzonitrile (109)

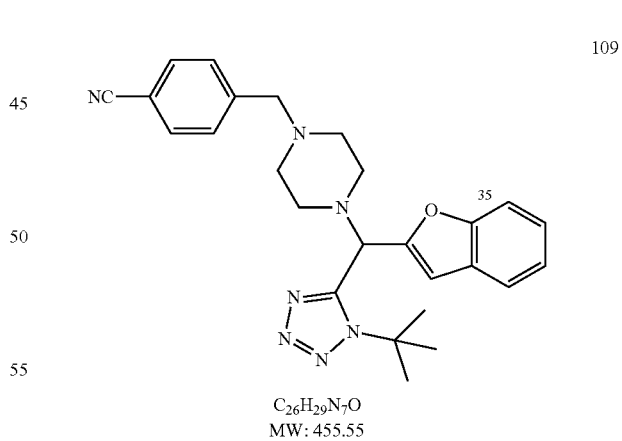

C$_{26}$H$_{29}$N$_7$O
MW: 455.55

The synthetic procedure of 109 was similar to that of 1. $^1$H NMR (400 MHz, CDCl$_3$) δ 7.59-7.56 (t, J=1.5 Hz, 1H), 7.56-7.53 (m, 2H), 7.52-7.45 (dq, J=8.3, 0.9 Hz, 1H), 7.43-7.36 (m, 2H), 7.34-7.28 (ddd, J=8.4, 7.2, 1.4 Hz, 1H), 7.26-7.21 (m, 1H), 7.00-6.92 (m, 1H), 5.71-5.52 (s, 1H), 3.59-3.40 (m, 2H), 3.02-2.81 (dt, J=10.4, 4.8 Hz, 2H), 2.76-2.58 (m, 2H), 2.54-2.41 (d, J=6.1 Hz, 4H), 1.84-1.71 (s, 9H). $^{13}$C NMR (100 MHz, CDCl$_3$) δ 154.6, 151.7, 150.6, 143.9, 132.0, 129.4, 127.8, 124.7, 123.0, 121.4, 118.9, 111.3, 110.8, 108.9, 62.1, 61.9, 58.2, 53.1, 49.4, 30.0.

4-((4-(benzofuran-2-yl(1-butyl-1H-tetrazol-5-yl)methyl)piperazin-1-yl)methyl)benzonitrile (110)

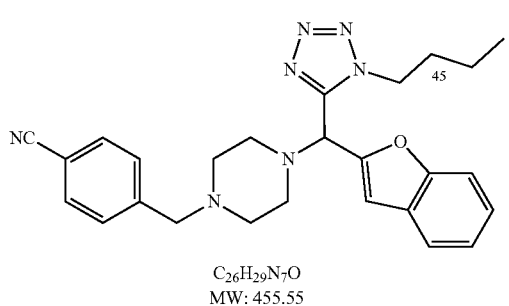

C$_{26}$H$_{29}$N$_7$O
MW: 455.55

The synthetic procedure of 110 was similar to that of 1. $^1$H NMR (400 MHz, CDCl$_3$) δ 7.60-7.57 (d, J=1.4 Hz, 1H), 7.57-7.55 (t, J=1.6 Hz, 2H), 7.48-7.43 (m, 1H), 7.42-7.40 (s, 1H), 7.40-7.37 (s, 1H), 7.34-7.28 (ddd, J=8.4, 7.2, 1.4 Hz, 1H), 7.27-7.22 (m, 1H), 7.02-6.93 (d, J=1.0 Hz, 1H), 5.45-5.20 (m, 1H), 4.66-4.50 (m, 2H), 3.64-3.45 (s, 2H), 2.77-2.62 (dt, J=9.2, 4.0 Hz, 2H), 2.58-2.41 (m, 6H), 2.01-1.89 (m, 2H), 1.57-1.37 (m, 2H), 1.05-0.90 (t, J=7.4 Hz, 3H). $^{13}$C NMR (100 MHz, CDCl$_3$) δ 154.8, 151.8, 150.0, 143.7, 132.1, 129.4, 127.5, 124.9, 123.2, 121.4, 118.8, 111.2, 110.9, 108.5, 62.1, 58.7, 52.9, 50.6, 48.0, 31.5, 19.9, 13.6.

4-((4-((1-(tert-butyl)-1H-tetrazol-5-yl)methyl)piperazin-1-yl)methyl)benzonitrile (111)

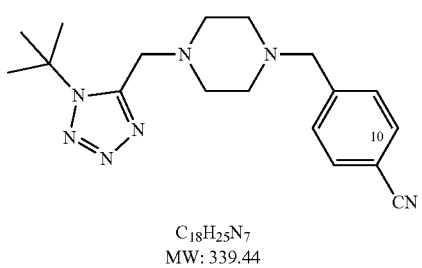

C$_{18}$H$_{25}$N$_7$
MW: 339.44

The synthetic procedure of 111 was similar to that of 1. $^1$H NMR (400 MHz, CDCl$_3$) δ 7.65-7.57 (m, 2H), 7.48-7.40 (d, J=8.3 Hz, 2H), 3.96-3.80 (s, 2H), 3.65-3.38 (s, 2H), 2.58-2.47 (t, J=4.6 Hz, 4H), 2.49-2.41 (s, 4H), 1.84-1.67 (s, 9H). $^{13}$C NMR (100 MHz, CDCl$_3$) δ 151.0, 143.9, 132.1, 132.1, 129.4, 118.8, 110.9, 62.2, 62.0, 52.8, 52.8, 52.0, 29.3.

4-((4-(benzofuran-2-ylmethyl)piperazin-1-yl)methyl)benzonitrile (112)

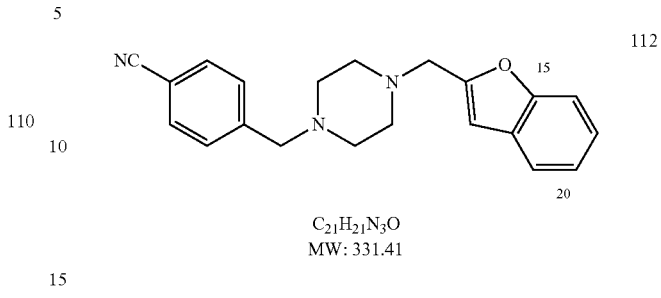

C$_{21}$H$_{21}$N$_3$O
MW: 331.41

The synthetic procedure of 112 was similar to that of 22. $^1$H NMR (400 MHz, CDCl$_3$) δ 7.61-7.59 (s, 1H), 7.59-7.57 (s, 1H), 7.55-7.50 (m, 1H), 7.49-7.46 (d, J=1.0 Hz, 1H), 7.45-7.40 (m, 2H), 7.30-7.13 (m, 2H), 6.68-6.50 (s, 1H), 3.82-3.65 (s, 2H), 3.65-3.49 (s, 2H), 2.78-2.47 (m, 8H). $^{13}$C NMR (100 MHz, CDCl$_3$) δ 155.0, 154.1, 144.0, 132.0, 129.4, 128.2, 123.9, 122.6, 120.7, 118.9, 111.3, 110.8, 105.8, 62.2, 55.3, 52.8, 52.8.

1-(benzofuran-2-yl(1-(tert-butyl)-1H-tetrazol-5-yl)methyl)-4-(2-methoxyphenyl)piperidine (113)

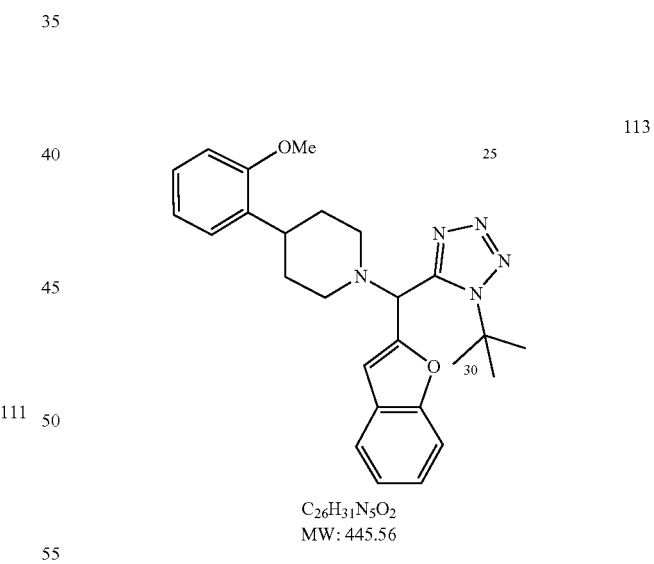

C$_{26}$H$_{31}$N$_5$O$_2$
MW: 445.56

The synthetic procedure of 113 was similar to that of 1. $^1$H NMR (400 MHz, CDCl$_3$) δ 7.62-7.56 (m, 1H), 7.54-7.49 (m, 1H), 7.34-7.28 (ddd, J=8.2, 7.3, 1.4 Hz, 1H), 7.27-7.22 (m, 1H), 7.19-7.11 (m, 2H), 7.00-6.96 (s, 1H), 6.94-6.86 (td, J=7.5, 1.2 Hz, 1H), 6.85-6.77 (d, J=8.0 Hz, 1H), 5.68-5.63 (s, 1H), 3.80-3.72 (s, 3H), 3.16-3.00 (m, 2H), 2.95-2.77 (m, 2H), 2.44-2.32 (td, J=11.5, 2.8 Hz, 1H), 1.87-1.80 (s, 9H), 1.78-1.56 (m, 4H). $^{13}$C NMR (100 MHz, CDCl$_3$) δ 156.7, 154.5, 152.0, 151.2, 134.0, 127.9, 126.9, 126.3, 124.5, 123.0, 121.4, 120.5, 111.3, 110.2, 108.7, 62.0, 58.7, 55.2, 52.7, 48.8, 34.8, 32.5, 31.9, 29.9.

1-(benzofuran-2-yl(1-butyl-1H-tetrazol-5-yl)methyl)-4-(2-methoxyphenyl)piperidine (114)

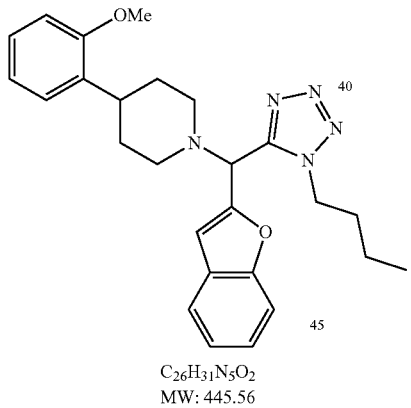

C₂₆H₃₁N₅O₂
MW: 445.56

The synthetic procedure of 114 was similar to that of 1. ¹H NMR (400 MHz, CDCl₃) δ 7.63-7.55 (ddd, J=7.7, 1.6, 0.7 Hz, 1H), 7.53-7.44 (dq, J=8.2, 0.9 Hz, 1H), 7.35-7.28 (m, 1H), 7.28-7.22 (m, 1H), 7.20-7.12 (m, 2H), 7.02-6.99 (d, J=1.2 Hz, 1H), 6.94-6.89 (td, J=7.5, 1.1 Hz, 1H), 6.86-6.81 (dd, J=8.1, 1.1 Hz, 1H), 5.40-5.32 (s, 1H), 4.76-4.56 (m, 2H), 3.83-3.74 (s, 3H), 3.00-2.85 (tt, J=11.7, 3.6 Hz, 2H), 2.62-2.48 (td, J=11.7, 2.6 Hz, 1H), 2.33-2.20 (td, J=11.5, 2.9 Hz, 1H), 2.07-1.93 (tt, J=7.6, 6.6 Hz, 2H), 1.91-1.82 (m, 1H), 1.82-1.63 (m, 4H), 1.55-1.43 (m, 2H), 1.05-0.98 (t, J=7.4 Hz, 3H). ¹³C NMR (100 MHz, CDCl₃) δ 156.7, 154.8, 152.2, 150.6, 133.7, 127.6, 127.0, 126.2, 124.8, 123.1, 121.4, 120.5, 111.2, 110.3, 108.3, 59.2, 55.2, 53.2, 50.3, 48.0, 34.8, 32.2, 31.7, 31.6, 19.9, 13.6.

4-(4-(benzofuran-2-yl(1-(tert-butyl)-1H-tetrazol-5-yl)methyl)piperazin-1-yl)phenol (115)

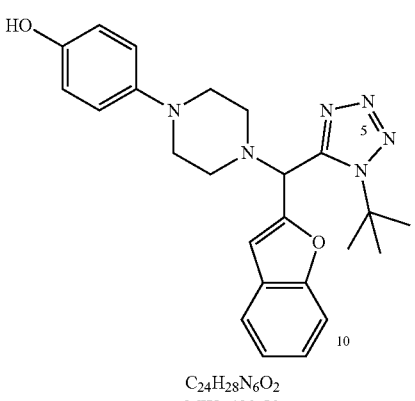

C₂₄H₂₈N₆O₂
MW: 432.52

The synthetic procedure of 115 was similar to that of 1. ¹H NMR (400 MHz, CDCl₃) δ 7.61-7.51 (ddd, J=7.9, 1.6, 0.8 Hz, 1H), 7.51-7.43 (m, 1H), 7.32-7.26 (m, 1H), 7.25-7.19 (m, 1H), 6.98-6.95 (m, 1H), 6.76-6.74 (d, J=1.4 Hz, 4H), 5.86-5.70 (s, 1H), 5.70-5.56 (s, 1H), 3.16-2.93 (m, 8H), 1.79-1.78 (s, 9H). ¹³C NMR (100 MHz, CDCl₃) δ 154.6, 151.9, 150.5, 145.1, 127.7, 124.7, 123.1, 121.4, 118.6, 115.9, 111.3, 109.0, 62.1, 58.3, 53.3, 51.0, 49.9, 30.0.

4-(4-(benzofuran-2-yl(1-butyl-1H-tetrazol-5-yl)methyl)piperazin-1-yl)phenol (116)

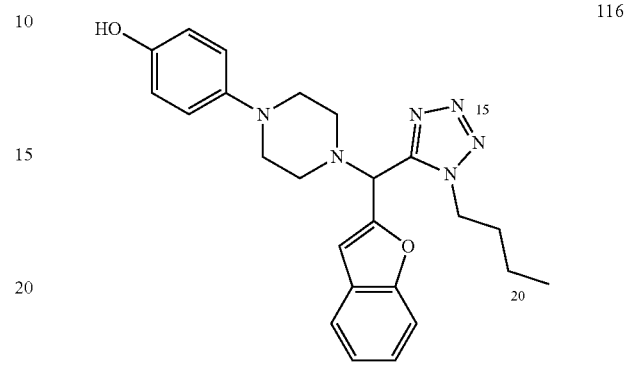

C₂₄H₂₈N₆O₂
MW: 432.52

The synthetic procedure of 116 was similar to that of 1. ¹H NMR (400 MHz, CDCl₃) δ 7.61-7.54 (m, 1H), 7.50-7.42 (dt, J=7.4, 0.9 Hz, 1H), 7.34-7.28 (ddd, J=8.2, 7.2, 1.4 Hz, 1H), 7.27-7.21 (m, 1H), 7.00-6.96 (d, J=0.9 Hz, 1H), 6.79-6.75 (m, 4H), 6.13-5.75 (m, 1H), 5.35-5.33 (s, 1H), 4.71-4.59 (m, 2H), 3.12-2.98 (m, 4H), 2.83-2.71 (dt, J=10.1, 4.8 Hz, 2H), 2.67-2.53 (dt, J=10.2, 4.8 Hz, 2H), 2.02-1.91 (m, 2H), 1.52-1.39 (dq, J=14.8, 7.4 Hz, 2H), 1.03-0.94 (t, J=7.4 Hz, 3H). ¹³C NMR (100 MHz, CDCl₃) δ 154.9, 152.0, 150.3, 149.9, 144.9, 127.4, 125.0, 123.3, 121.5, 118.6, 115.9, 111.3, 108.6, 58.9, 50.8, 50.8, 48.2, 31.5, 19.9, 13.6.

1-(1-(tert-butyl)-1H-tetrazol-5-yl)methyl)-4-(4-methoxyphenyl)piperazine (117)

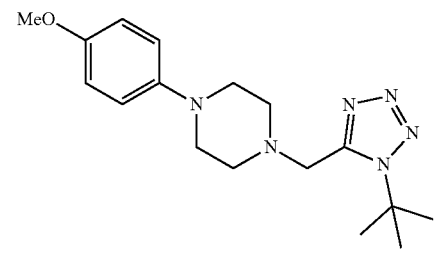

C₁₇H₂₆N₆O
MW: 330.43

The synthetic procedure of 117 was similar to that of 1. ¹H NMR (400 MHz, CDCl₃) δ 6.98-6.71 (m, 4H), 3.99-3.83 (s, 2H), 3.84-3.69 (s, 3H), 3.16-2.97 (m, 4H), 2.72-2.55 (m, 4H), 1.88-1.69 (s, 9H). ¹³C NMR (100 MHz, CDCl₃) δ 153.8, 151.0, 145.2, 118.1, 114.3, 62.1, 55.4, 52.9, 52.0, 50.3, 29.3.

1-(benzofuran-2-ylmethyl)-4-(4-methoxyphenyl) piperazine (118)

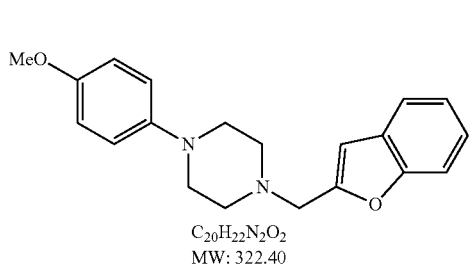

C₂₀H₂₂N₂O₂
MW: 322.40

The synthetic procedure of 118 was similar to that of 22. ¹H NMR (400 MHz, CDCl₃) δ 7.60-7.42 (m, 2H), 7.36-7.14 (m, 2H), 6.92-6.86 (m, 2H), 6.85-6.80 (m, 2H), 6.65-6.61 (d, J=0.9 Hz, 1H), 3.76 (s, 3H), 3.71 (s, 2H), 3.21-3.07 (m, 4H), 2.79-2.65 (m, 4H). ¹³C NMR (100 MHz, CDCl₃) δ 155.1, 154.2, 153.8, 145.6, 128.2, 123.9, 122.6, 120.6, 118.2, 114.3, 111.3, 105.8, 55.5, 55.4, 53.1, 50.5.

1-(benzofuran-2-yl(1-(tert-butyl)-1H-tetrazol-5-yl) methyl)-4-(4-methoxyphenyl)piperidine (119)

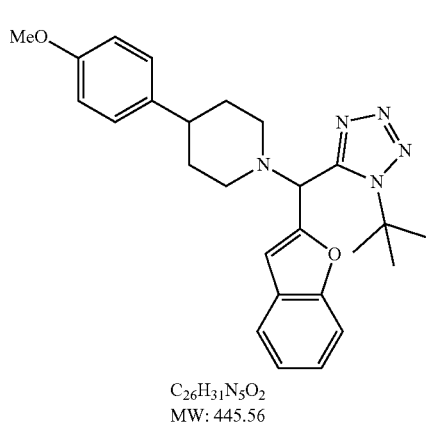

C₂₆H₃₁N₅O₂
MW: 445.56

The synthetic procedure of 119 was similar to that of 1. ¹H NMR (400 MHz, CDCl₃) δ 7.78-7.53 (m, 2H), 7.53-7.48 (dt, J=8.2, 1.3 Hz, 1H), 7.36-7.28 (m, 1H), 7.27-7.21 (m, 1H), 7.14-7.02 (m, 2H), 6.85-6.76 (m, 2H), 5.73-5.57 (s, 1H), 3.83-3.67 (s, 3H), 3.24-2.99 (d, J=3.6 Hz, 2H), 2.89-2.71 (d, J=2.8 Hz, 1H), 2.53-2.23 (m, 2H), 1.78 (s, 9H), 1.78-1.12 (m, 4H). ¹³C NMR (100 MHz, CDCl₃) δ 158.0, 154.5, 152.0, 151.0, 138.0, 128.9, 127.6, 124.6, 123.0, 121.5, 113.4, 111.1, 108.9, 62.0, 58.6, 55.3, 52.2, 48.6, 41.3, 34.0, 33.5, 29.7.

1-(benzofuran-2-yl(1-butyl-1H-tetrazol-5-yl) methyl)-4-(4-methoxyphenyl)piperidine (120)

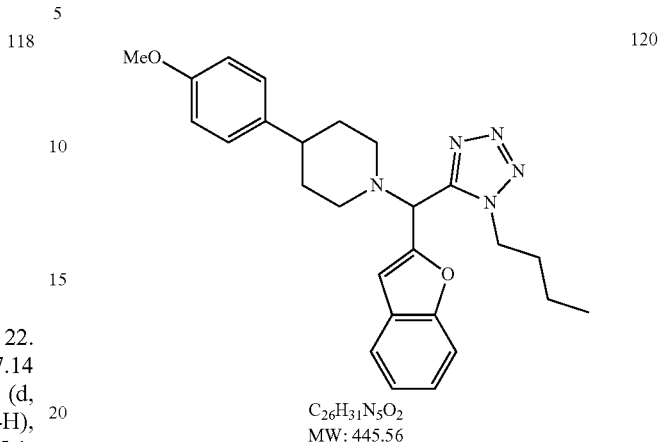

C₂₆H₃₁N₅O₂
MW: 445.56

The synthetic procedure of 120 was similar to that of 1. ¹H NMR (400 MHz, CDCl₃) δ 7.63-7.43 (m, 2H), 7.37-7.19 (m, 2H), 7.17-7.04 (m, 2H), 7.04-6.96 (d, J=0.9 Hz, 1H), 6.88-6.76 (m, 2H), 5.39-5.30 (s, 1H), 4.70-4.58 (td, J=7.3, 2.8 Hz, 2H), 3.80-3.74 (s, 3H), 2.98-2.86 (d, J=7.8 Hz, 1H), 2.59-2.38 (m, 2H), 2.31-2.14 (m, 2H), 2.06-1.91 (m, 2H), 1.91-1.64 (m, 4H), 1.55-1.43 (m, 2H), 1.09-0.97 (m, 3H). ¹³C NMR (100 MHz, CDCl₃) δ 158.0, 154.8, 152.2, 150.5, 137.8, 127.6, 127.5, 124.8, 123.2, 121.4, 113.8, 111.3, 108.3, 59.1, 55.2, 53.0, 50.2, 48.0, 41.2, 33.9, 33.4, 31.6, 19.9, 13.6.

2-(benzofuran-2-yl(4-(3,5-dichloropyridin-4-yl)piperazin-1-yl)methyl)-1-benzyl-1H-benzo[d]imidazole (121)

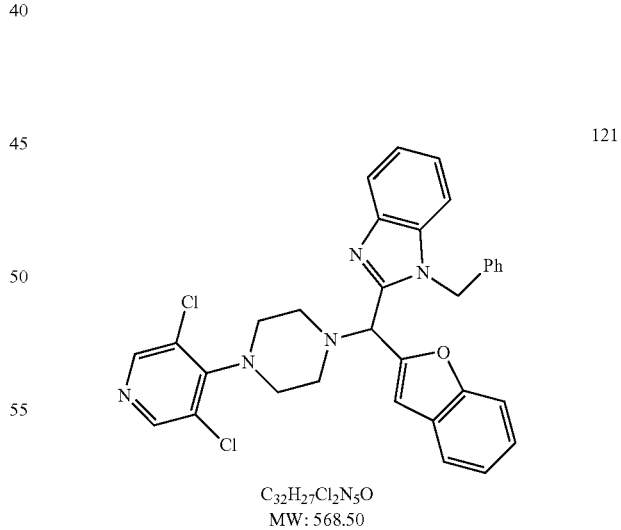

C₃₂H₂₇Cl₂N₅O
MW: 568.50

The synthetic procedure of A121 was similar to that of 73. ¹H NMR (400 MHz, CDCl₃) δ 8.34-8.18 (s, 2H), 7.87-7.76 (m, 1H), 7.55-7.44 (m, 1H), 7.33-7.13 (m, 9H), 7.09-6.95 (m, 2H), 6.97-6.82 (d, J=0.7 Hz, 1H), 6.05-5.93 (m, 1H), 5.91-5.77 (m, 1H), 5.36-5.21 (s, 1H), 3.35-3.10 (tdt, J=15.2, 9.4, 2.9 Hz, 4H), 2.75-2.54 (m, 4H).

2-(benzofuran-2-yl(4-(3,5-dichloropyridin-4-yl)pip-erazin-1-yl)methyl)-5-butyl-1,3,4-oxadiazole (122)

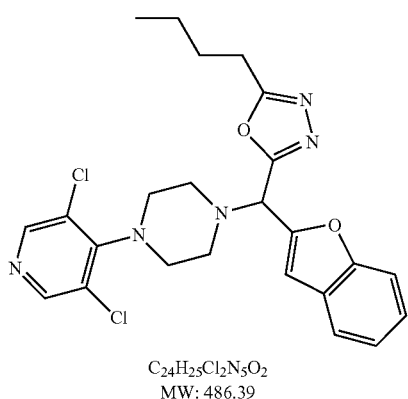

C$_{24}$H$_{25}$Cl$_2$N$_5$O$_2$
MW: 486.39

$^1$H NMR (400 MHz, CDCl$_3$) δ 8.33-8.29 (s, 2H), 7.60-7.51 (m, 2H), 7.35-7.29 (ddd, J=8.3, 7.3, 1.4 Hz, 1H), 7.27-7.23 (m, 1H), 6.90-6.88 (t, J=0.8 Hz, 1H), 5.40-5.26 (d, J=0.7 Hz, 1H), 3.46-3.40 (m, 4H), 2.95-2.88 (dd, J=8.1, 7.1 Hz, 2H), 2.87-2.78 (dt, J=10.1, 4.7 Hz, 2H), 2.74-2.67 (dt, J=10.3, 4.3 Hz, 2H), 1.86-1.76 (tt, J=7.6, 6.6 Hz, 2H), 1.48-1.37 (m, 1H), 0.98-0.93 (t, J=7.4 Hz, 3H). $^{13}$C NMR (100 MHz, CDCl$_3$) δ 168.0, 162.7, 155.1, 150.9, 150.5, 149.2, 149.1, 128.3, 127.5, 124.9, 123.1, 121.2, 111.5, 107.7, 60.1, 51.1, 49.9, 28.4, 25.1, 22.1, 13.5.

2-(benzofuran-2-yl(4-(3,5-dichloropyridin-4-yl)pip-erazin-1-yl)methyl)-5-(tert-butyl)-1,3,4-oxadiazole (123)

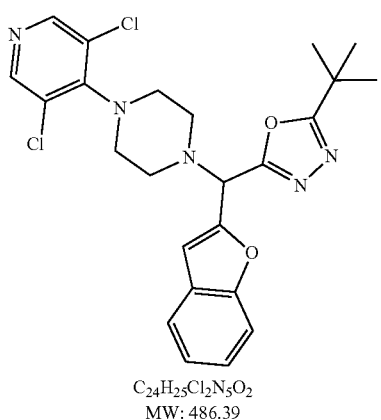

C$_{24}$H$_{25}$Cl$_2$N$_5$O$_2$
MW: 486.39

$^1$NMR (400 MHz, CDCl$_3$) δ 8.33-8.30 (s, 11H), 7.60-7.50 (m, 12H), 7.35-7.29 (ddd, J=8.3, 7.2, 1.4 Hz, 6H), 7.27-7.23 (m, 6H), 6.90-6.86 (s, 5H), 5.43-5.41 (s, 6H), 3.47-3.41 (dq, J=6.0, 3.5 Hz, 26H), 2.92-2.83 (dt, J=9.4, 4.1 Hz, 13H), 2.78-2.69 (dt, J=13.8, 4.2 Hz, 13H), 1.48-1.47 (m, 1H). $^{13}$C NMR (100 MHz, CDCl$_3$) δ 174.1, 162.4, 155.1, 151.0, 149.1, 148.9, 128.2, 127.5, 124.9, 123.1, 121.3, 111.5, 107.8, 59.8, 50.8, 50.4, 50.1, 49.9, 49.5, 32.5, 28.4, 28.0, 27.6.

1-(benzofuran-2-yl(4-butyl-4H-1,2,4-triazol-3-yl) methyl)-4-(3,5-dichloropyridin-4-yl)piperazine (124)

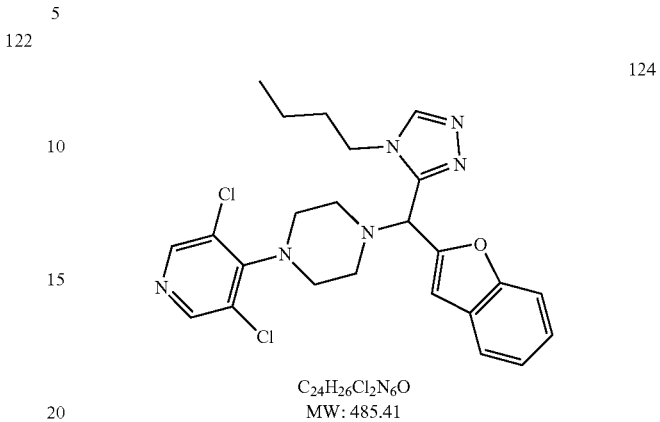

C$_{24}$H$_{26}$Cl$_2$N$_6$O
MW: 485.41

$^1$H NMR (400 MHz, CDCl$_3$) δ 8.36-8.22 (s, 2H), 8.21-8.16 (s, 1H), 7.61-7.55 (m, 1H), 7.49-7.43 (m, 1H), 7.33-7.27 (ddd, J=8.2, 5.8, 1.4 Hz, 1H), 7.27-7.20 (m, 1H), 7.02-6.98 (d, J=0.9 Hz, 1H), 5.40-5.16 (s, 1H), 4.45-4.23 (m, 2H), 3.47-3.31 (q, J=4.7 Hz, 4H), 2.87-2.74 (dt, J=10.3, 4.8 Hz, 2H), 2.69-2.59 (dt, J=10.5, 4.7 Hz, 2H), 1.97-1.76 (ddd, J=13.0, 9.2, 7.6 Hz, 2H), 1.61-1.40 (m, 2H), 1.09-0.95 (t, J=7.4 Hz, 3H). $^{13}$C NMR (100 MHz, CDCl$_3$) δ 154.8, 151.4, 150.9, 149.1, 128.3, 127.7, 124.6, 123.1, 121.4, 111.2, 108.2, 77.3, 77.0, 76.6, 60.5, 51.3, 50.1, 44.8, 32.7, 20.0, 13.6.

1-(benzofuran-2-yl(1-benzyl-1H-1,2,3-triazol-4-yl) methyl)-4-(3,5-dichloropyridin-4-yl)piperazine (125)

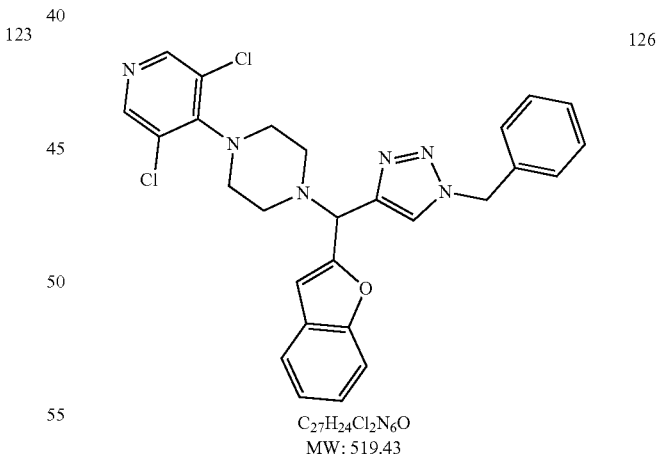

C$_{27}$H$_{24}$Cl$_2$N$_6$O
MW: 519.43

$^1$H NMR (400 MHz, CDCl$_3$) δ 8.35-8.22 (s, 2H), 7.70-7.63 (s, 1H), 7.55-7.45 (m, 2H), 7.43-7.32 (m, 3H), 7.31-7.16 (m, 4H), 6.78-6.67 (d, J=0.9 Hz, 1H), 5.66-5.39 (m, 2H), 3.51-3.28 (m, 4H), 2.80-2.56 (m, 4H). $^{13}$C NMR (100 MHz, CDCl$_3$) δ 155.0, 154.4, 151.0, 149.1, 134.4, 129.1, 128.8, 128.0, 127.8, 124.2, 122.9, 122.8, 121.0, 111.4, 106.4, 77.3, 77.0, 76.7, 61.0, 54.3, 51.4, 50.0.

Having now fully described the invention, it will be understood by those of skill in the art that the same can be performed within a wide and equivalent range of conditions, formulations, and other parameters without affecting the scope of the invention or any embodiment thereof. All patents, patent applications and publications cited herein are fully incorporated by reference herein in their entirety.

INCORPORATION BY REFERENCE

The entire disclosure of each of the patent documents and scientific articles referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting the invention described herein. Scope of the invention is thus indicated by the appended claims rather than by the foregoing description, and all changes that come within the meaning and range of equivalency of the claims are intended to be embraced therein.

What is claimed is:
1. A compound described by Formula I:

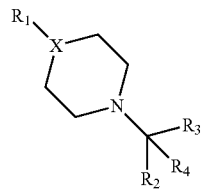

including pharmaceutically acceptable salts, solvates, and/or prodrugs thereof;
wherein X is Nitrogen rendering the resulting compound encompassed within Formula II:

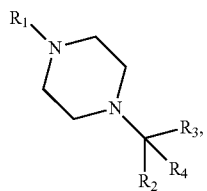
(Formula II)

or wherein X is C—H rendering the resulting compound encompassed within Formula III:

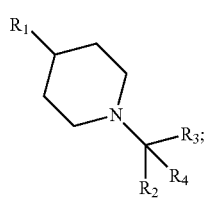
(Formula III)

wherein R1 is selected from

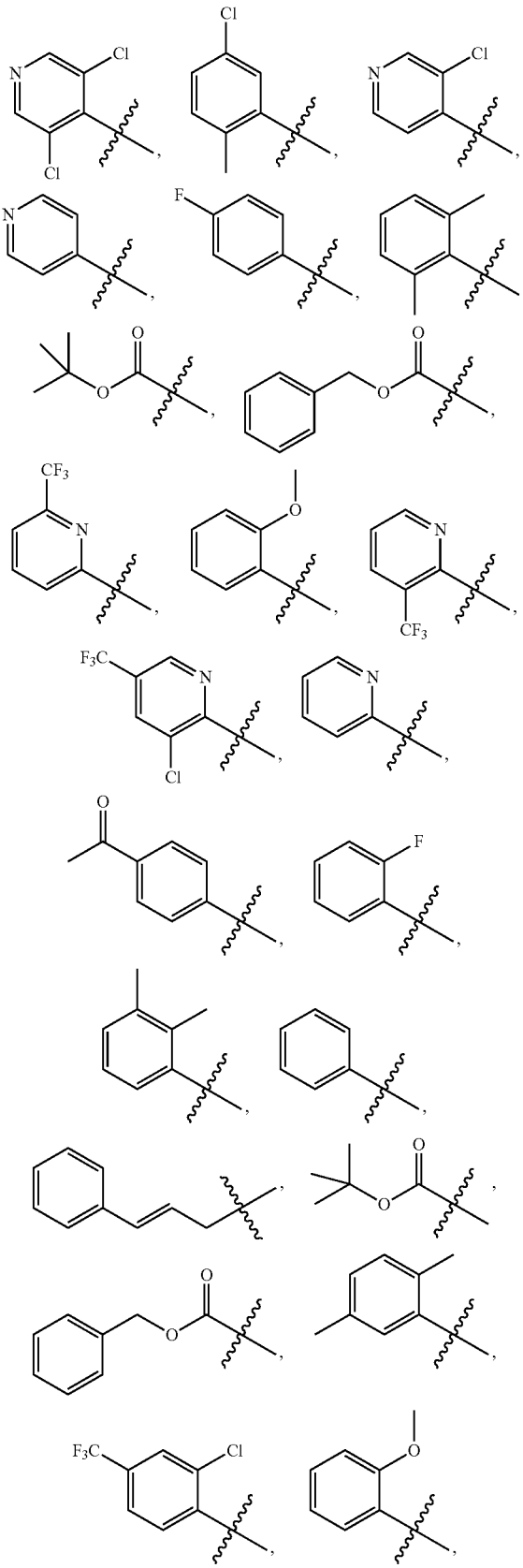

-continued
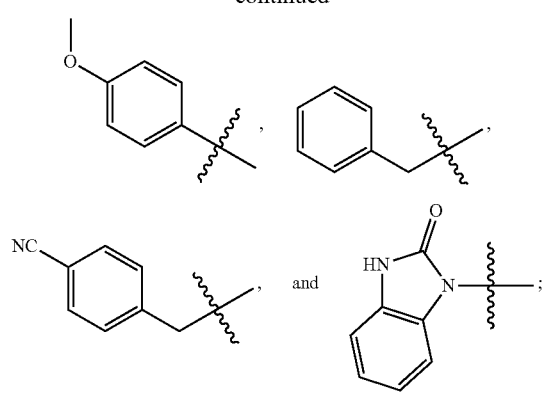
wherein R2 is selected from hydrogen, methyl,
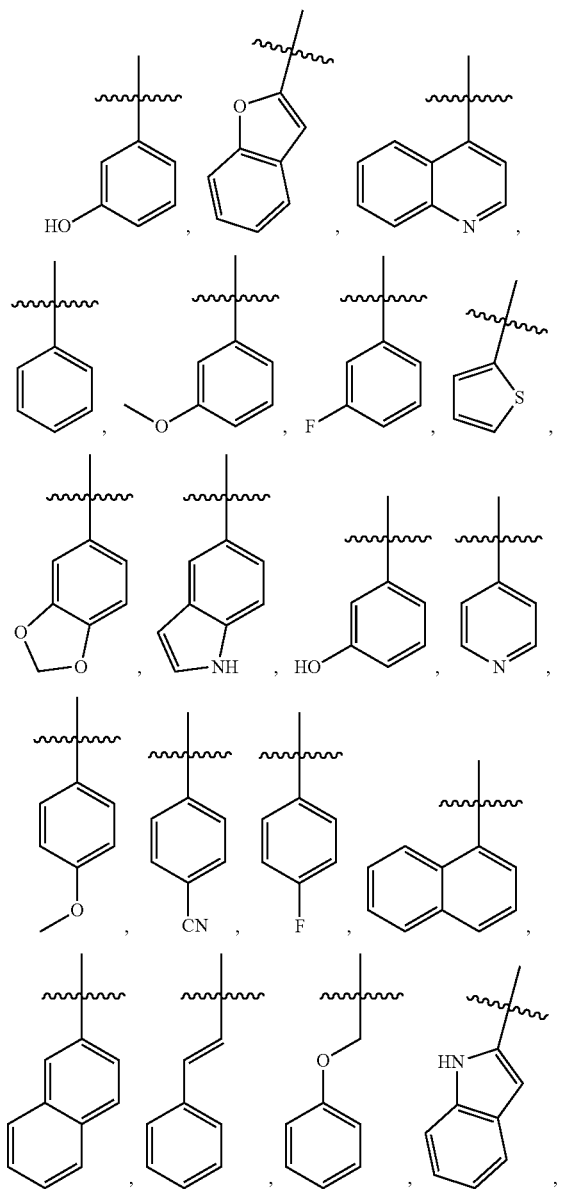
-continued
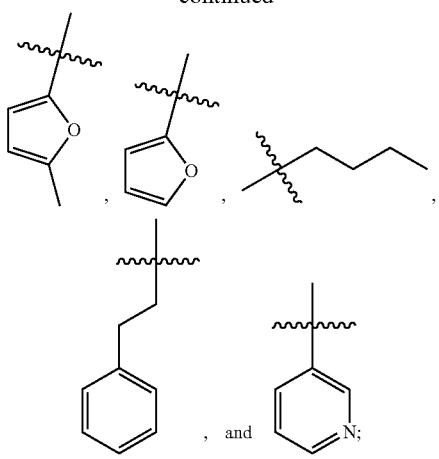
wherein R3 is selected from hydrogen, methyl,
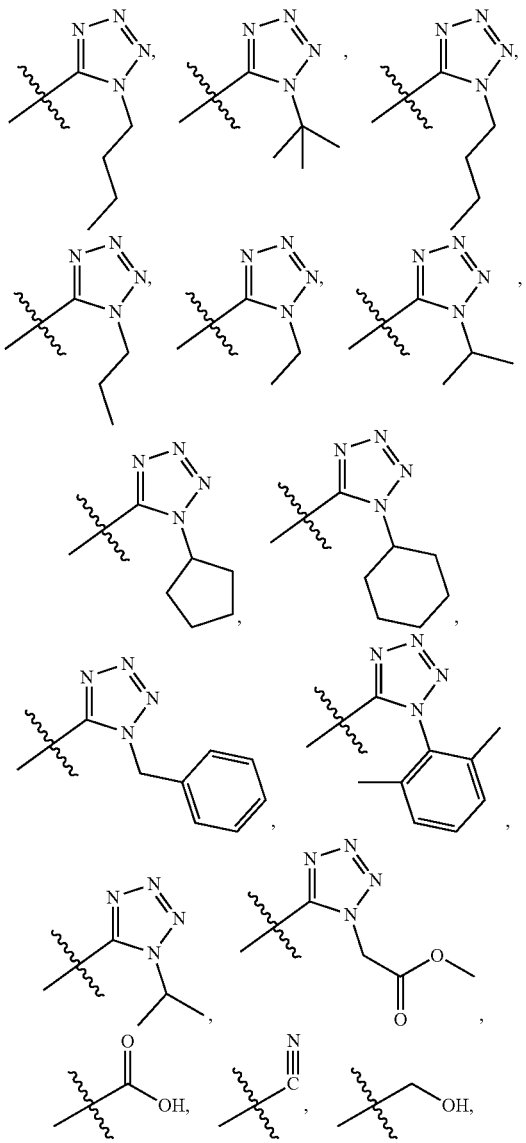

155
-continued
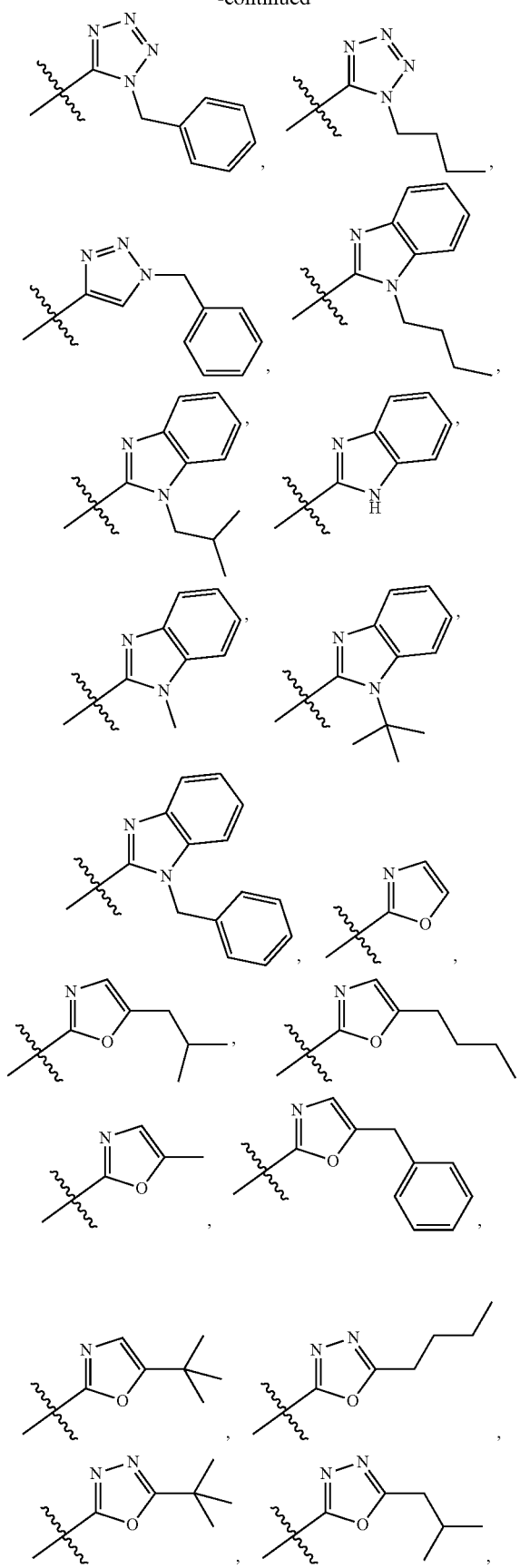
156
-continued
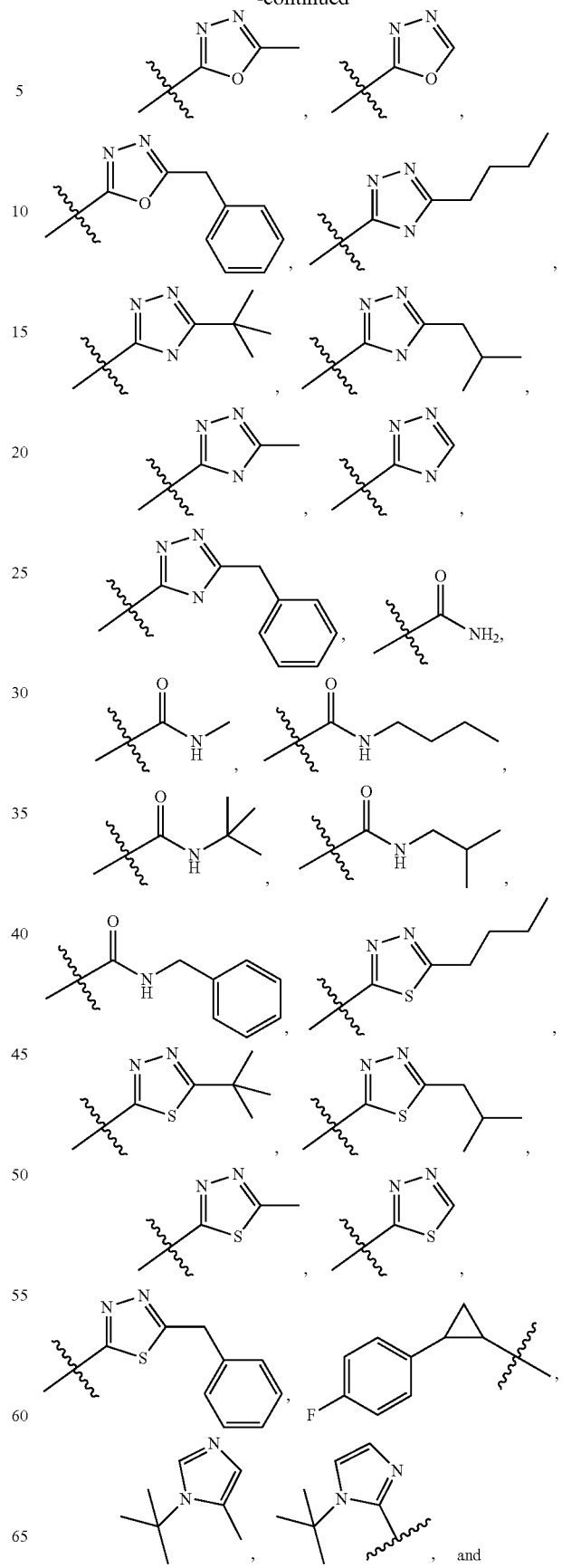
and

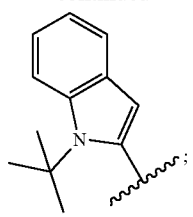
and
wherein R4 is selected from hydrogen and methyl.
2. The compound of claim 1, wherein the compound is selected from the group consisting of:
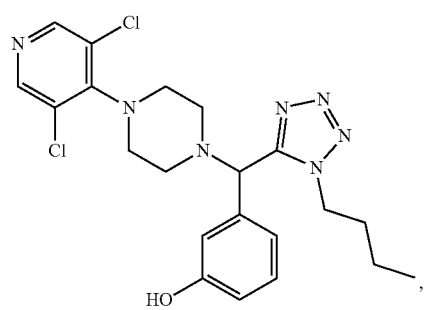
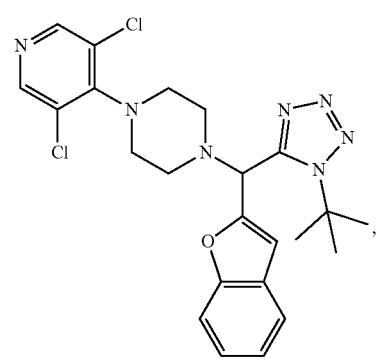
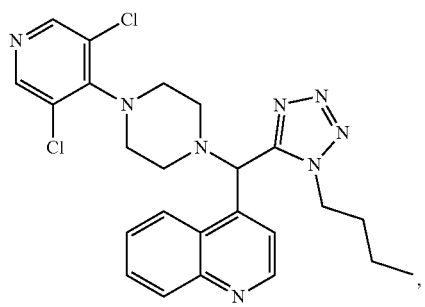
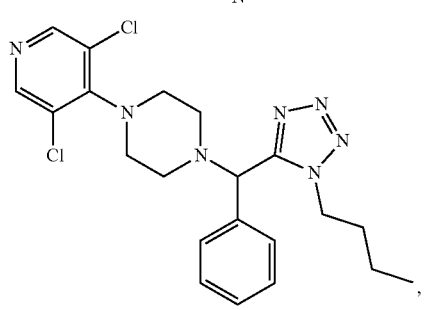
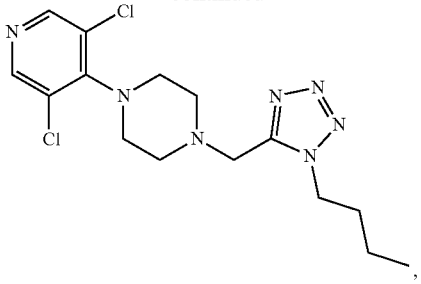

159
-continued
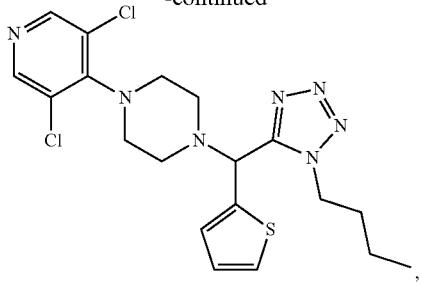
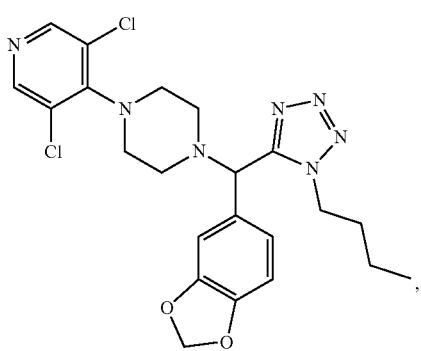
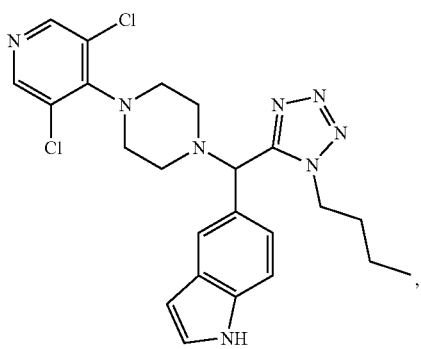 [SMILES: CCCCn1nnnc1C(c1ccc2[nH]ccc2c1)N1CCN(c2c(Cl)cncc2Cl)CC1]
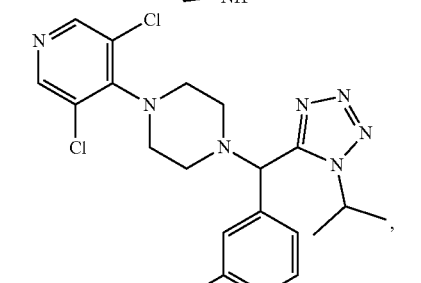
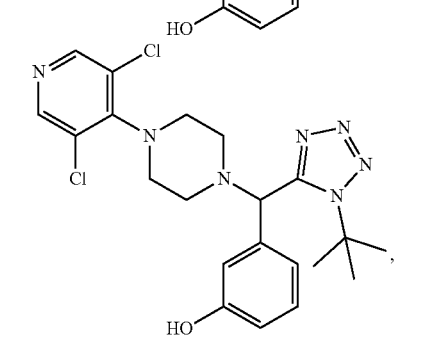
160
-continued
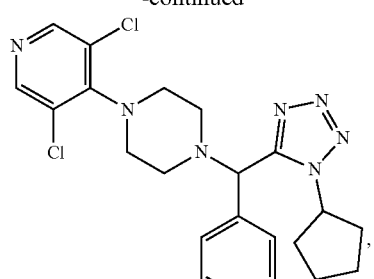
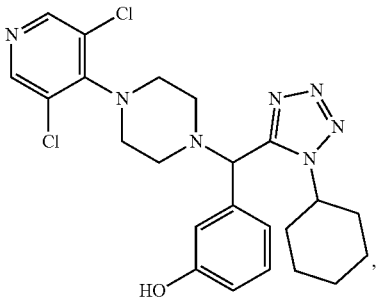
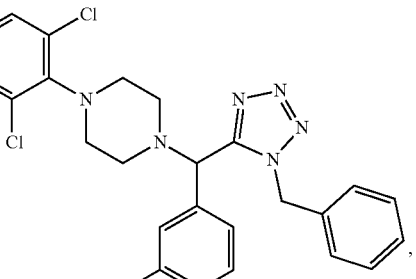
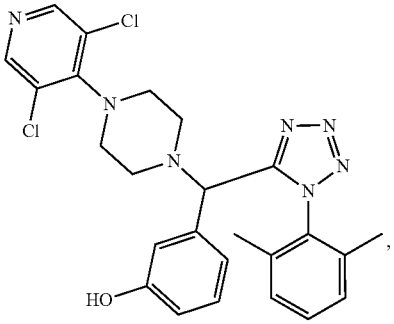
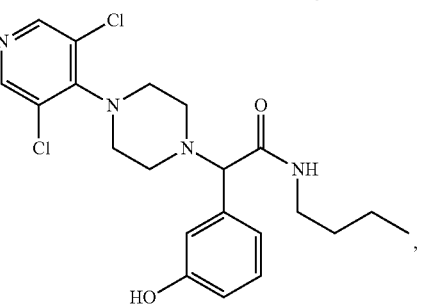
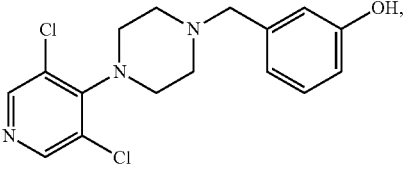

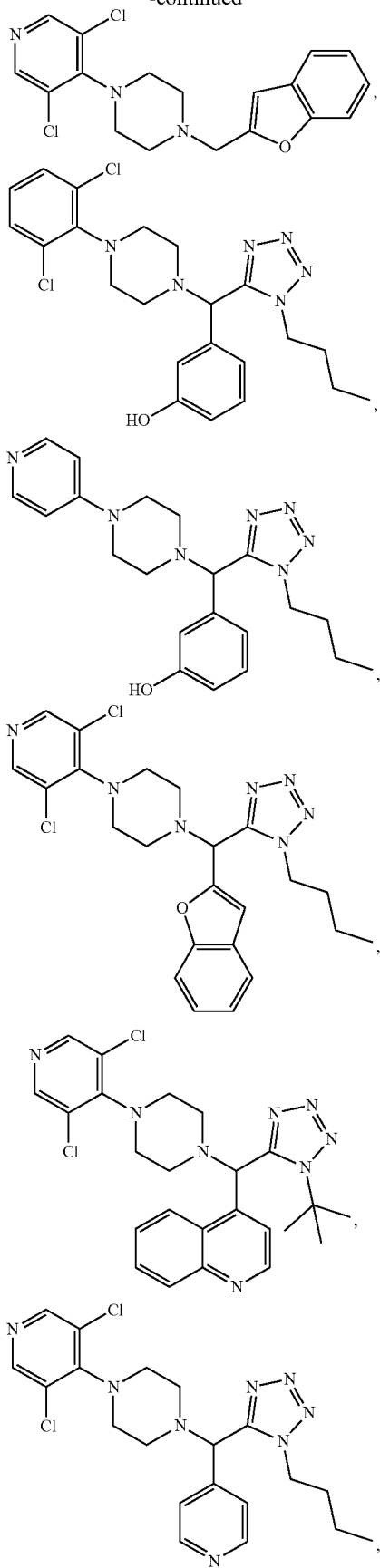
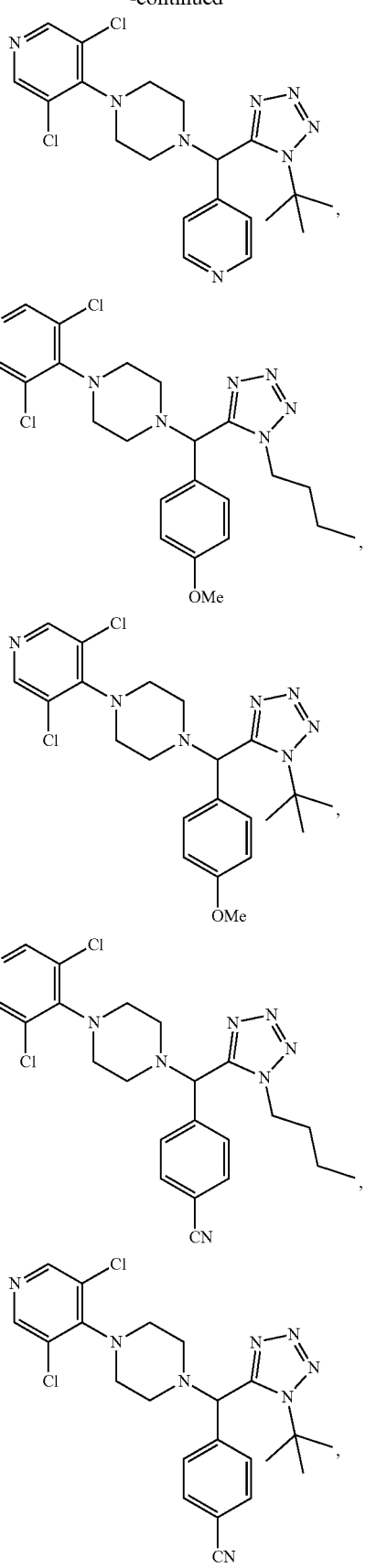

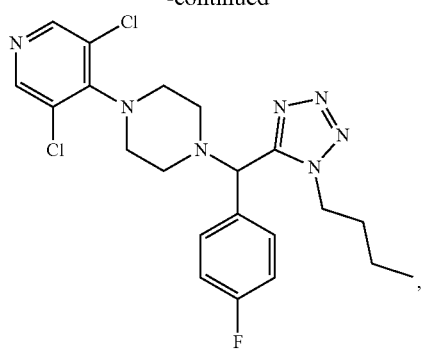
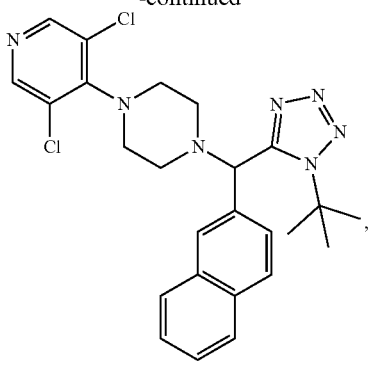

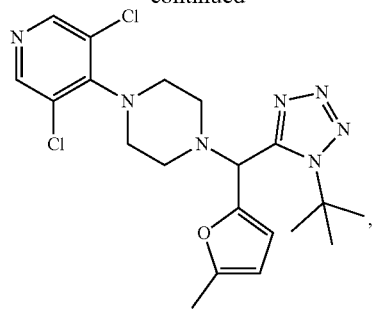
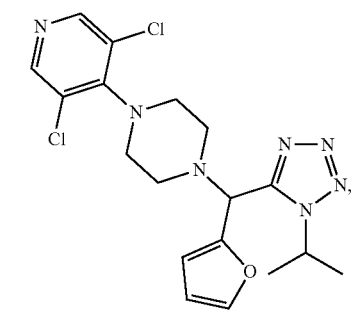
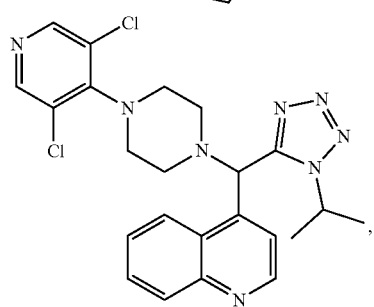
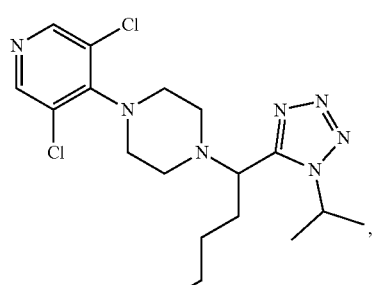
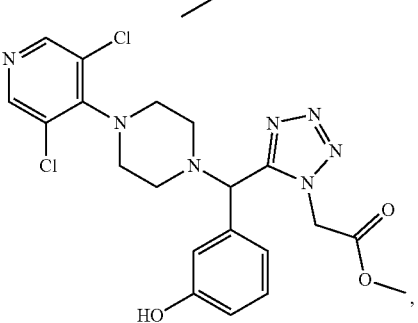
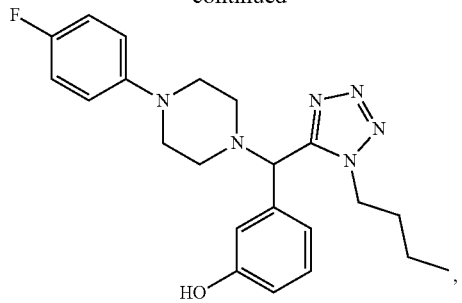
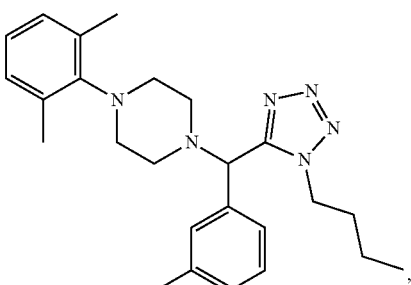
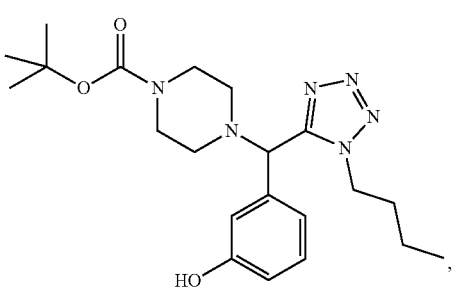
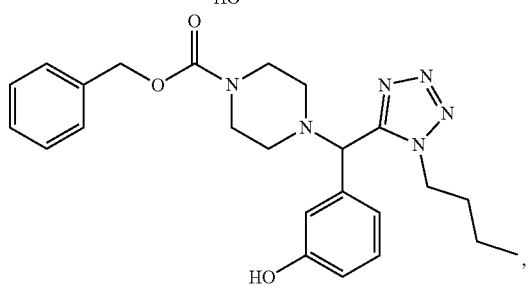
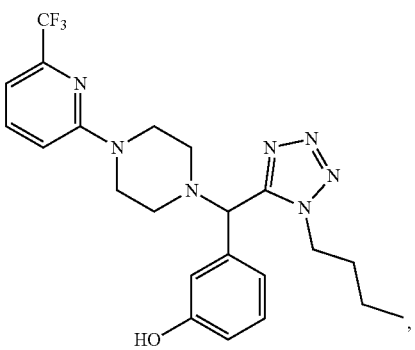

167
-continued
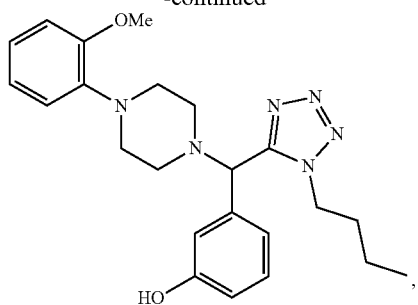
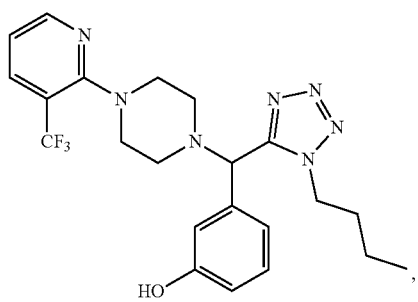
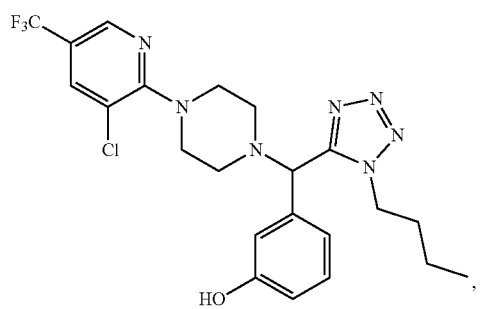
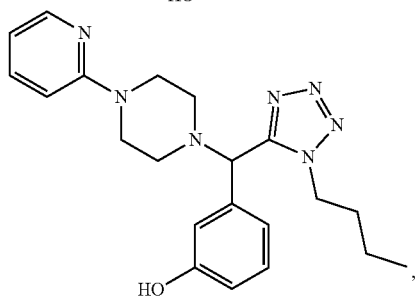
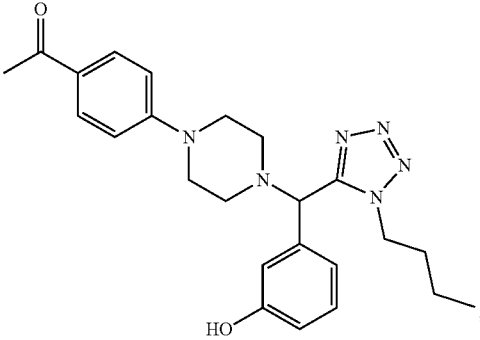
168
-continued
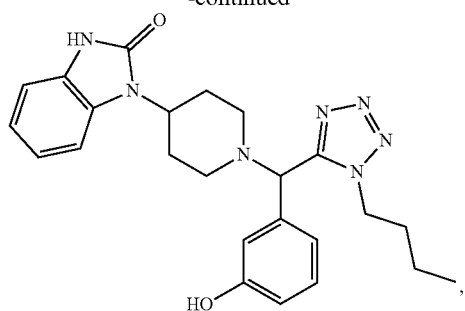
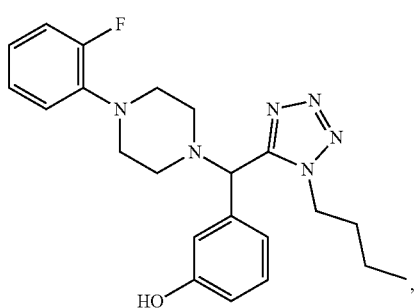
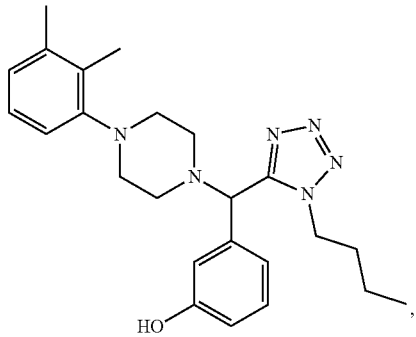
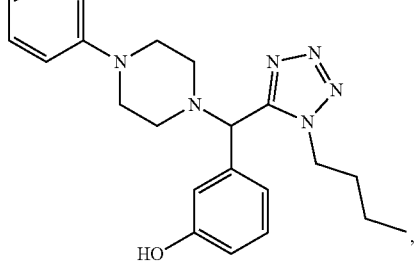
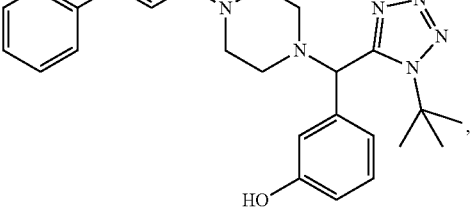

169
-continued
170
-continued
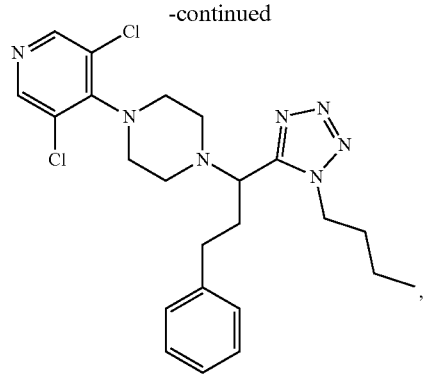
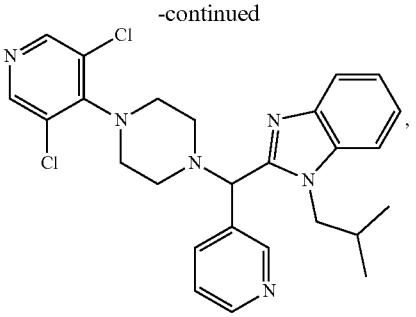
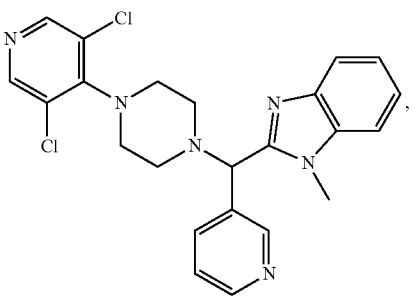
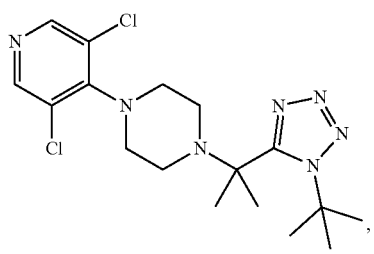
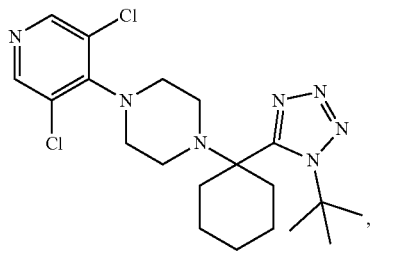
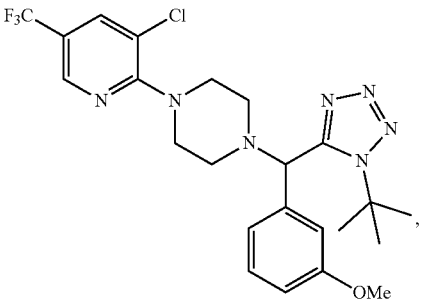
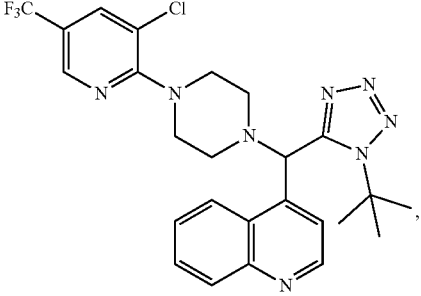

171
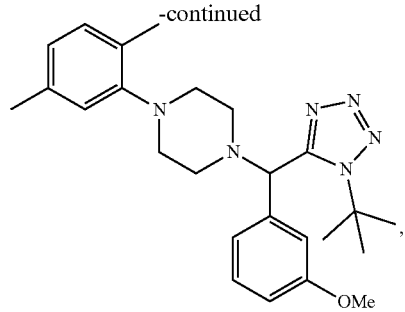
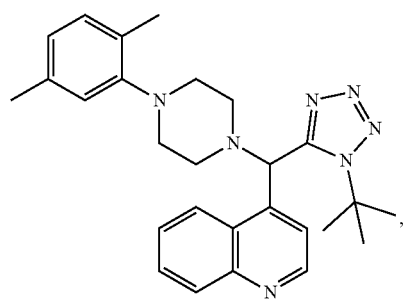
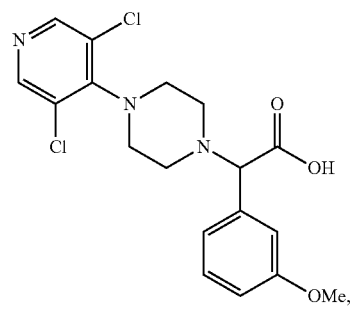
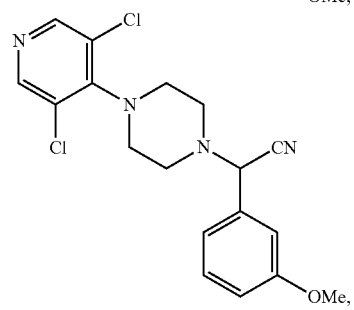
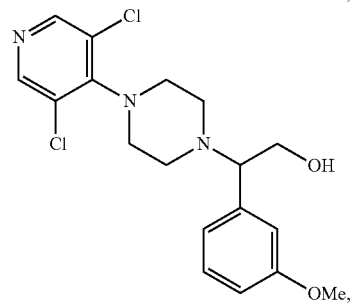
172
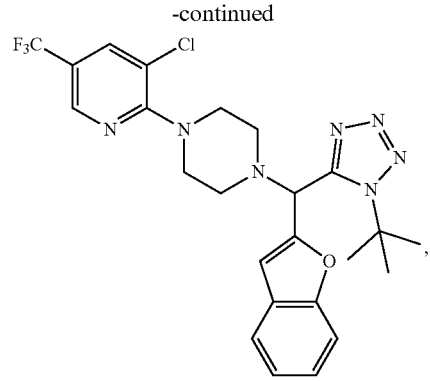
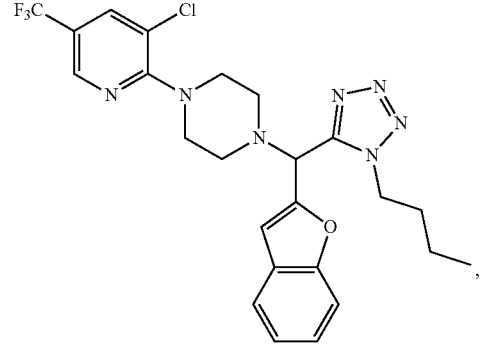
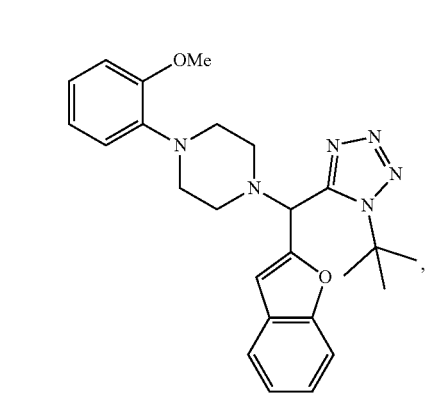
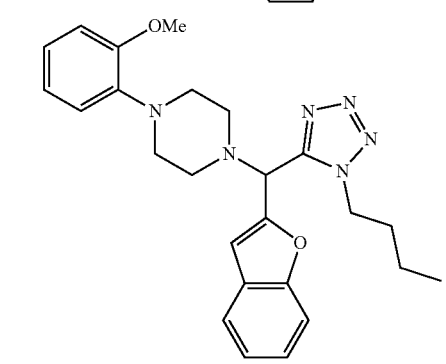

173
-continued
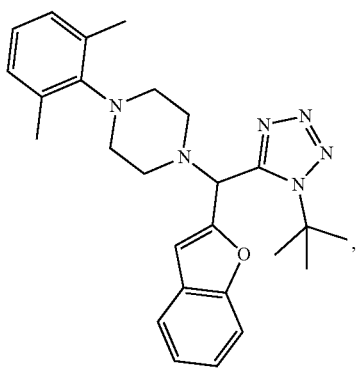
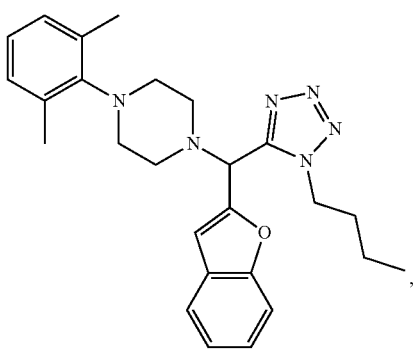
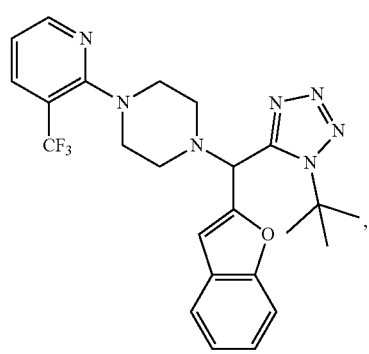
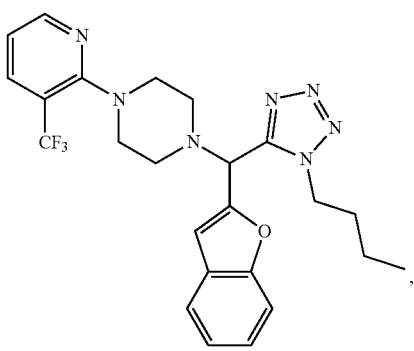
174
-continued
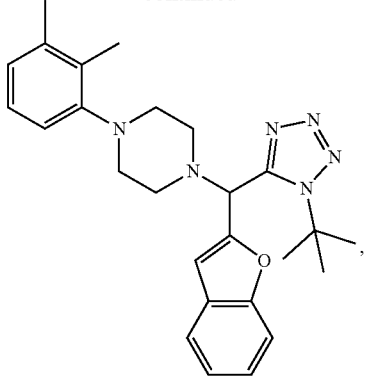
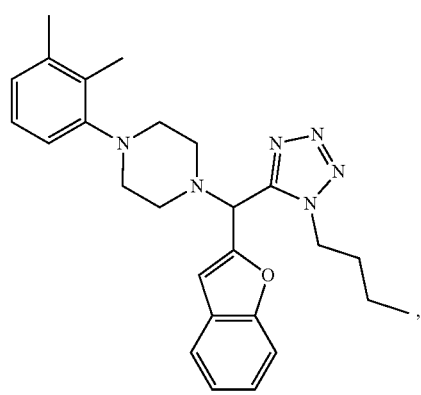
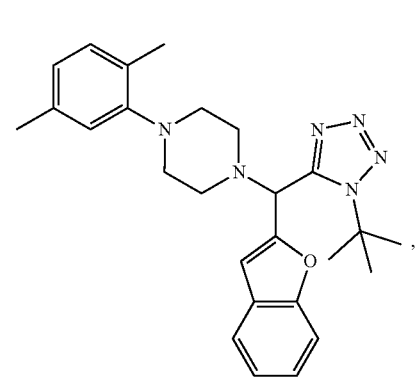
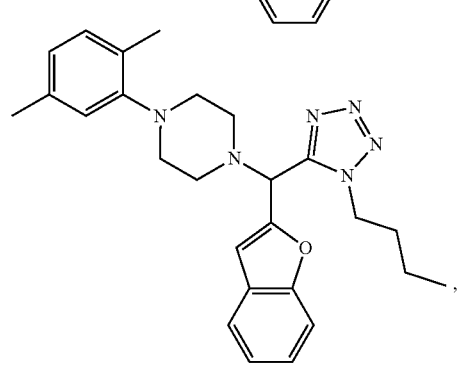

-continued
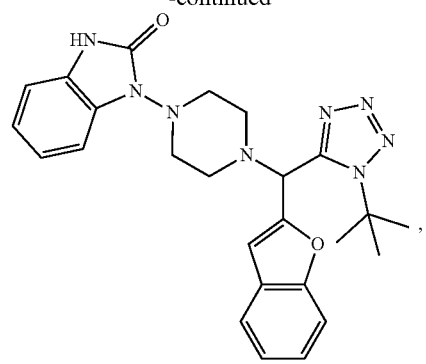
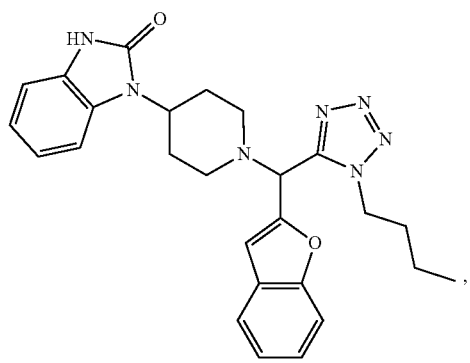
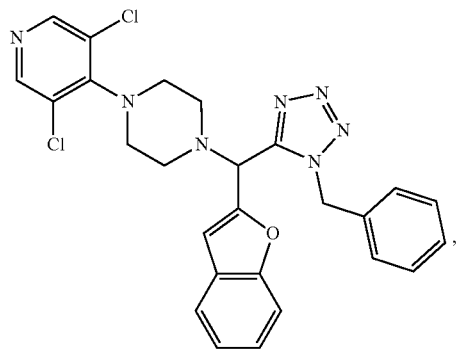
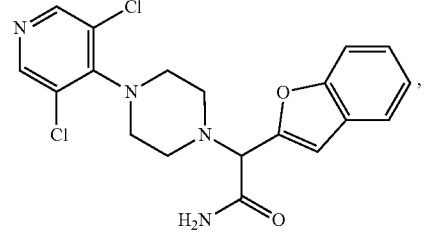
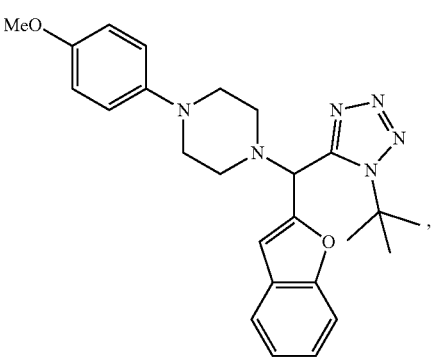
-continued
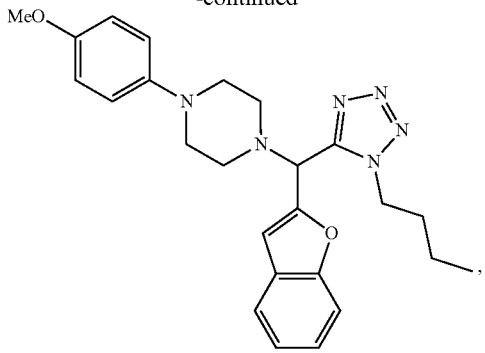
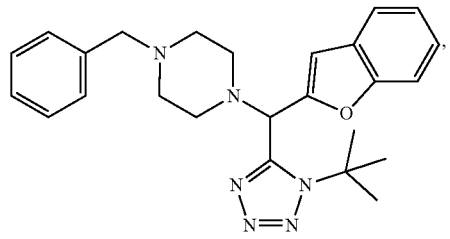
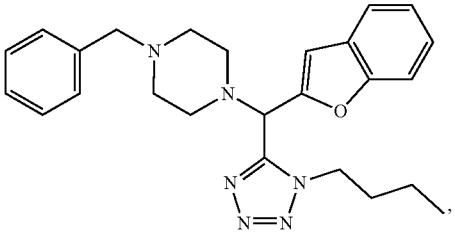
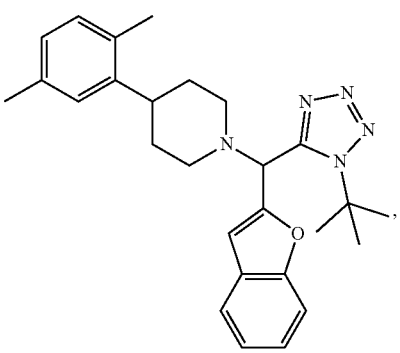
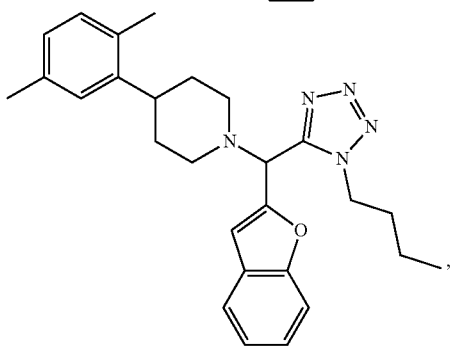

177
-continued
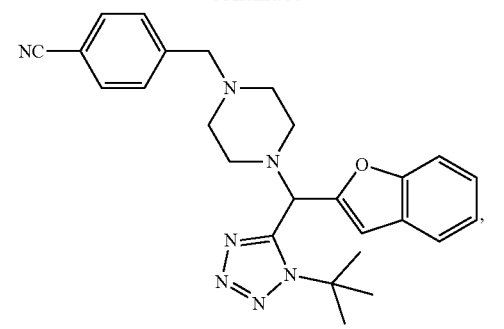
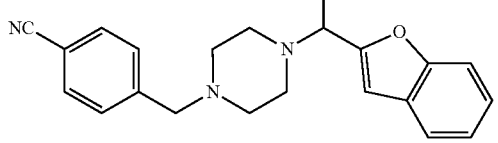
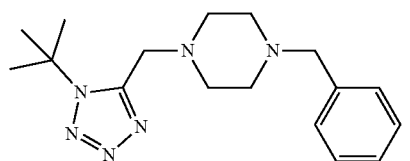
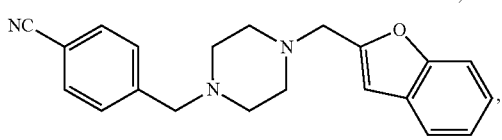
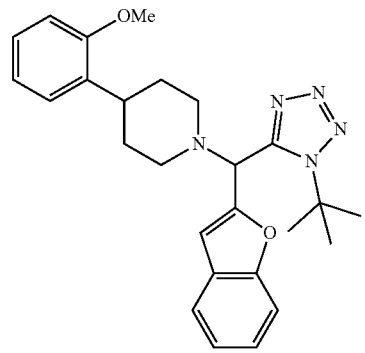
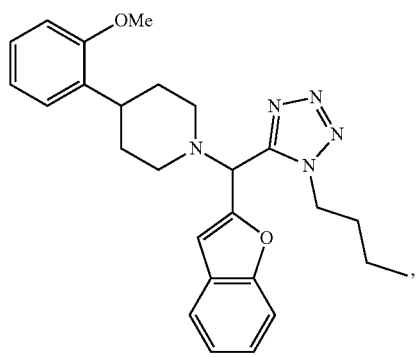
178
-continued
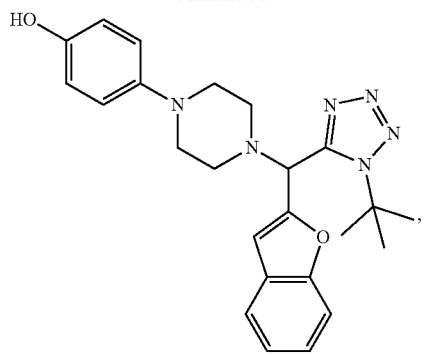
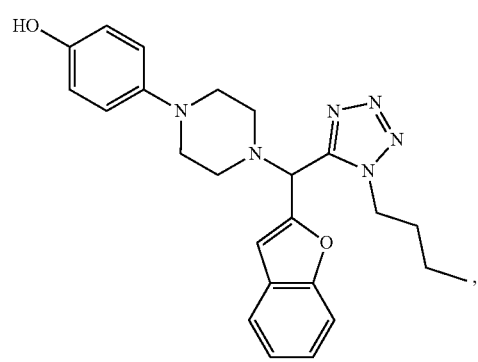
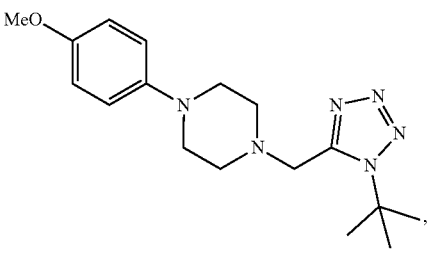
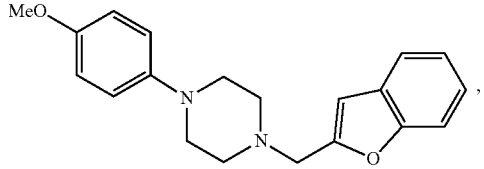
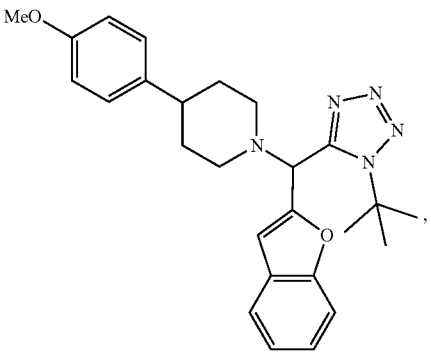

179
-continued
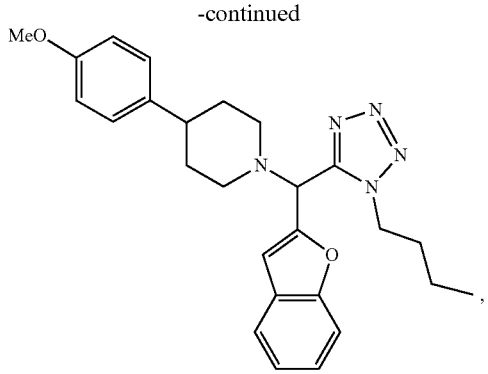
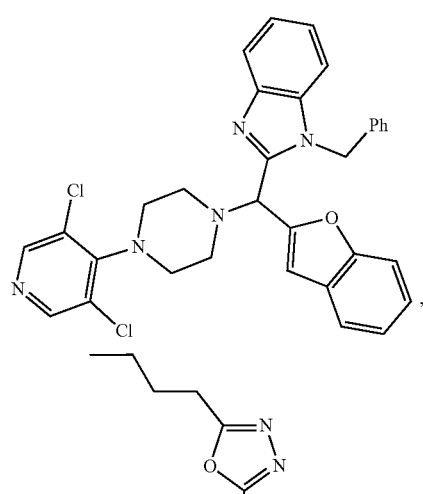
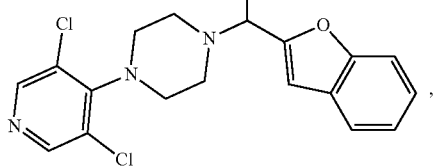
180
-continued
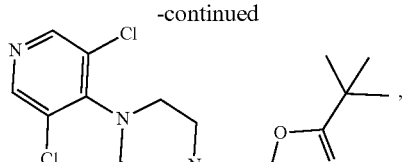
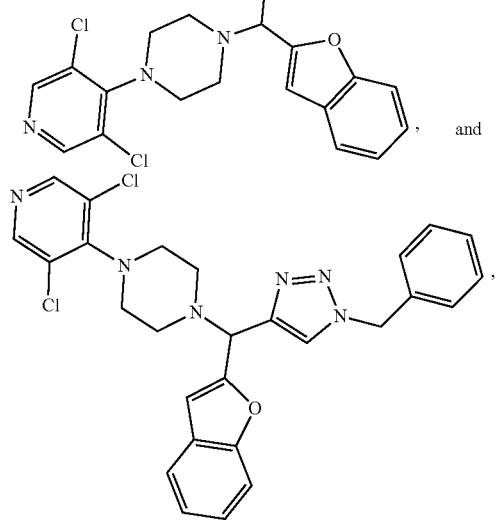
or a pharmaceutically acceptable salt, solvate, or prodrug thereof, and a pharmaceutically acceptable carrier.
3. The compound of claim 1, wherein the compound is comprised within a pharmaceutical composition.
4. A kit comprising a compound of claim 1, and instructions for administering said compound to a patient.
* * * * *